(12) United States Patent
Allen

(10) Patent No.: US 11,828,083 B2
(45) Date of Patent: Nov. 28, 2023

(54) CONTROL STRUCTURE WITH ROTARY FORCE LIMITER AND ENERGY DISSIPATER

(71) Applicant: John Damian Allen, Auckland (NZ)

(72) Inventor: John Damian Allen, Auckland (NZ)

( * ) Notice: Subject to any disclaimer, the term of this patent is extended or adjusted under 35 U.S.C. 154(b) by 0 days.

(21) Appl. No.: 17/177,204

(22) Filed: Feb. 17, 2021

(65) Prior Publication Data

US 2022/0042340 A1 Feb. 10, 2022

Related U.S. Application Data

(63) Continuation-in-part of application No. PCT/IB2019/056940, filed on Aug. 16, 2019, and a
(Continued)

(30) Foreign Application Priority Data

Feb. 16, 2017 (NZ) ........................................ 729195
Aug. 17, 2018 (NZ) ........................................ 745412
(Continued)

(51) Int. Cl.
 *E04H 9/02* (2006.01)
(52) U.S. Cl.
 CPC ........... *E04H 9/023* (2013.01); *E04H 9/0237* (2020.05)
(58) Field of Classification Search
 CPC ... E04H 9/023; E04H 9/0237; B65G 2207/20; B65G 1/02
 See application file for complete search history.

(56) References Cited

U.S. PATENT DOCUMENTS

| 4,187,573 A | 2/1980 | Fyfe et al. |
| 5,161,655 A | 11/1992 | Shimoda |

(Continued)

FOREIGN PATENT DOCUMENTS

| IT | PI20090109 A1 | 3/2011 |
| JP | 3140573 A | 6/1991 |

(Continued)

OTHER PUBLICATIONS

Allen, J.D. et al, "Limit Analysis of Plates and Isoperimetric Inequalities," School of Engineering, University of Auckland, Auckland, New Zealand; The Royal Society Great Britain 1994; Excerpt from p. 113.
(Continued)

*Primary Examiner* — Patrick J Maestri
(74) *Attorney, Agent, or Firm* — Avyno Law P.C.

(57) ABSTRACT

A control structure comprising a pivotably based rocker frame assembly integral with rotary yield units able to produce a constant resistive yield force through high elasto-plastic displacements and high ductilities. Located within and distributed about the rotary yield units are flexural yield plates with particular boundary conditions enabling them to elasto-plastically flex to high cycling elasto-plastic displacements and high displacement and curvature ductilities, while maintaining a constant resistive yield force. The constant resistive yield force produced by the replaceable rotary units enables the control structure to resist and endure extreme seismic events (base motion input) with a constant resistive yield force, while plastic curvatures within the yield zones of the flexural plates of the rotary units are maintained well within their capacity; and forces within the control structure, within its supporting foundations, and within masses or other structures it is seismically supportive of are controlled and limited.

34 Claims, 70 Drawing Sheets

Related U.S. Application Data continuation-in-part of application No. 16/486,582, filed on Aug. 16, 2019, now Pat. No. 11,299,901, and a continuation-in-part of application No. 16/486,590, filed as application No. PCT/IB2017/056137, filed as application No. PCT/IB2017/056135 on Oct. 5, 2017.

(30) Foreign Application Priority Data

| | | |
|---|---|---|
| Aug. 20, 2018 | (NZ) | 745493 |
| Aug. 31, 2018 | (NZ) | 745931 |
| Feb. 16, 2019 | (NZ) | 729197 |

(56) References Cited

U.S. PATENT DOCUMENTS

| | | | |
|---|---|---|---|
| 5,509,238 | A | 4/1996 | Scalfati |
| 6,324,795 | B1 | 12/2001 | Stiles et al. |
| 7,249,442 | B2 | 7/2007 | Pellegrino et al. |
| 7,263,806 | B2 | 9/2007 | Pellegrino et al. |
| 11,002,032 | B2 | 5/2021 | Campillay et al. |
| 2001/0005961 | A1 | 7/2001 | Fukuta et al. |
| 2010/0251637 | A1 | 10/2010 | Nishimoto et al. |
| 2010/0293873 | A1 | 11/2010 | Mualla |
| 2012/0038091 | A1 | 2/2012 | Tagawa |
| 2012/0304587 | A1* | 12/2012 | Kenho ............... F16F 15/06 52/699 |
| 2014/0115979 | A1 | 5/2014 | Kenho |
| 2014/0174002 | A1 | 6/2014 | Mualla |
| 2014/0374974 | A1 | 12/2014 | Goold et al. |
| 2015/0101269 | A1 | 4/2015 | Moreno et al. |
| 2016/0115703 | A1 | 4/2016 | Katayama et al. |
| 2016/0237681 | A1 | 8/2016 | Tanaka et al. |
| 2017/0081845 | A1 | 3/2017 | Kinoshita et al. |
| 2017/0107734 | A1 | 4/2017 | Gray et al. |
| 2017/0145686 | A1 | 5/2017 | Lee et al. |
| 2017/0276204 | A1 | 9/2017 | Uno et al. |
| 2018/0216687 | A1 | 8/2018 | Thompson et al. |
| 2020/0318373 | A1 | 10/2020 | Campillay et al. |

FOREIGN PATENT DOCUMENTS

| | | |
|---|---|---|
| JP | 7285623 | 10/1995 |
| JP | 2002338018 A | 11/2002 |
| JP | 2004069067 A | 3/2004 |
| JP | 200492096 A | 5/2004 |
| WO | 9314279 A1 | 7/1993 |
| WO | 2009124985 A2 | 10/2009 |
| WO | 2011029749 A1 | 3/2011 |
| WO | 2015025821 A1 | 2/2015 |
| WO | 2018150235 A1 | 8/2018 |

OTHER PUBLICATIONS

Lowe P.G., "Classical Theory of Structures Based on the Differential Equation," Cambridge at the University Press; 1971; Excerpts from pp. 2,3,6,7,146,147.

Raney, Joshua Michael et al, "Influence of Boundary Conditions on Building Behavior," American Society for Engineering Education, 2015; 122nd ASEE Annual Conference and Exposition Jun. 14-17, 2015, Seattle, WA; pp. 26.959.1-26.959.9.

* cited by examiner

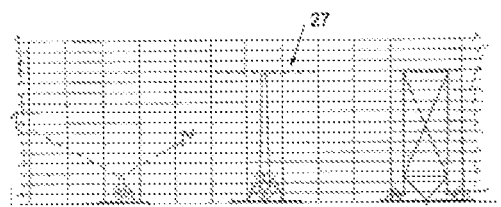 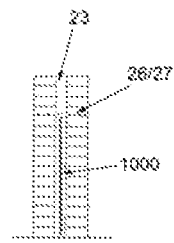
FIGURE 7        FIGURE 8
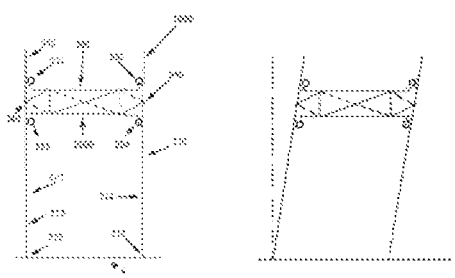 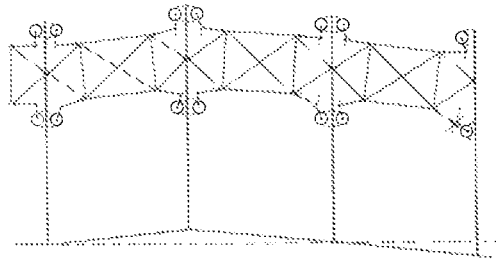
FIGURE 9    FIGURE 10        FIGURE 11
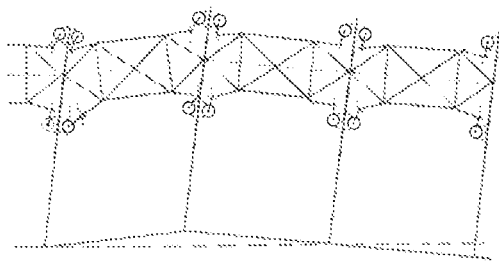 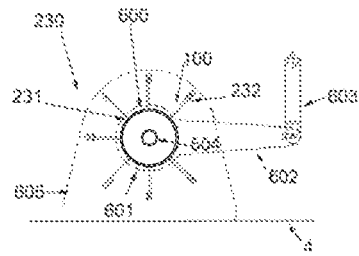
FIGURE 12        FIGURE 13

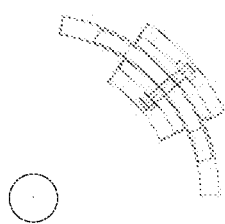
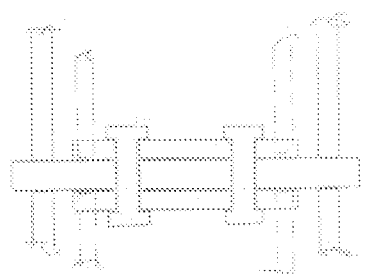
FIGURE 152
FIGURE 153
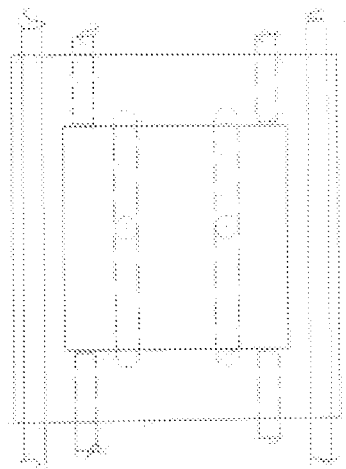
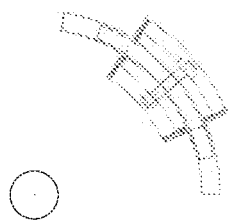
FIGURE 154
FIGURE 155
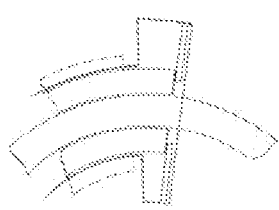
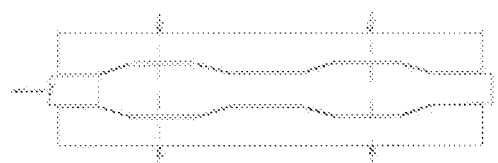
FIGURE 157
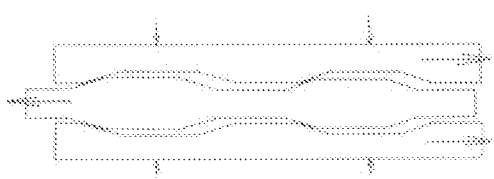
FIGURE 156
FIGURE 158

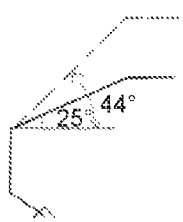
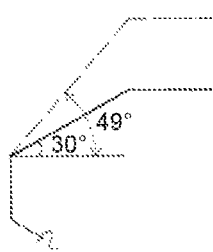
FIGURE 188
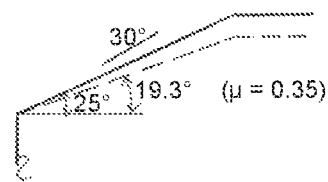
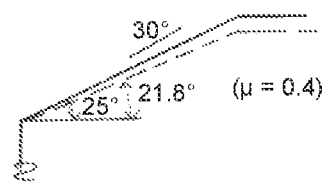
FIGURE 189
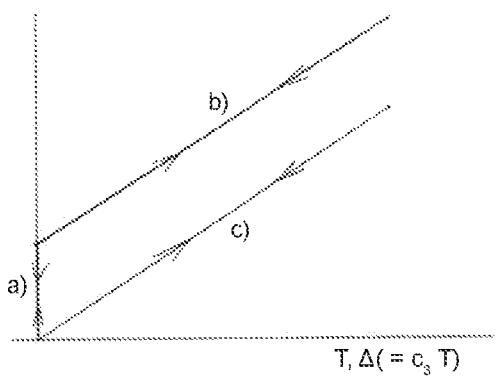
FIGURE 190
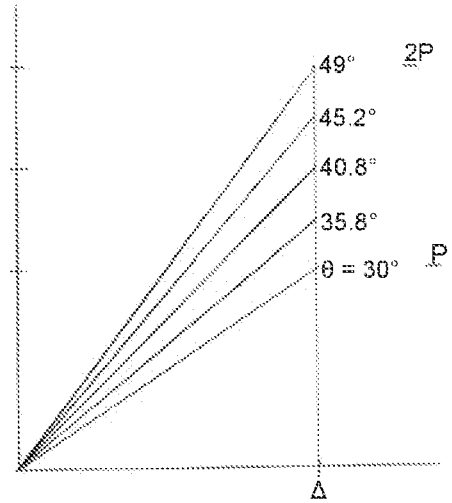
FIGURE 191
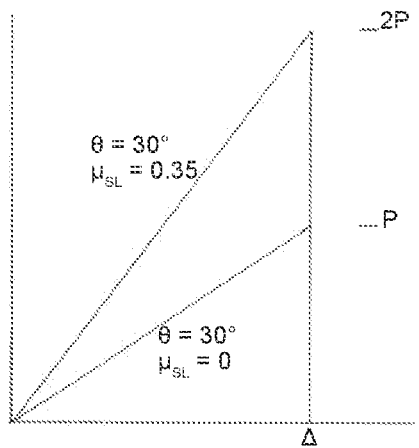
FIGURE 192
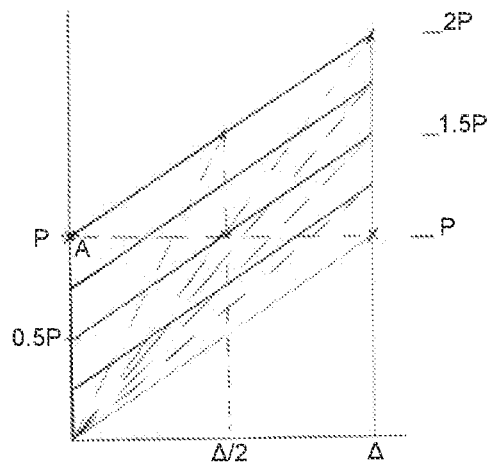
FIGURE 193

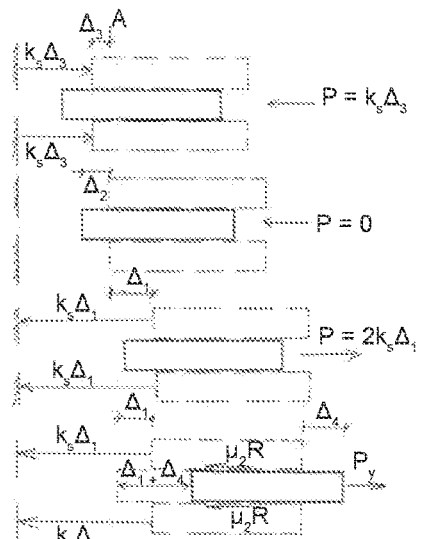
FIGURE 202
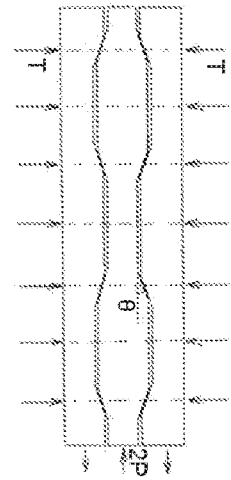
FIGURE 203
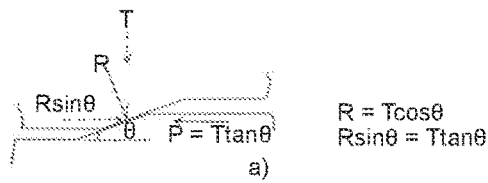
a)
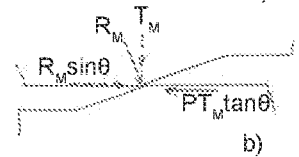
b)
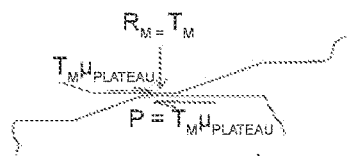
c)
FIGURE 204
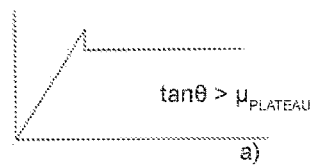
a)
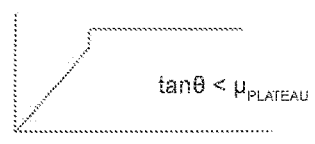
b)
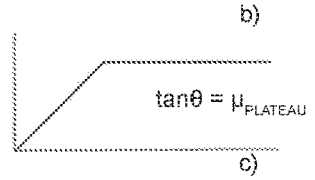
c)
FIGURE 205
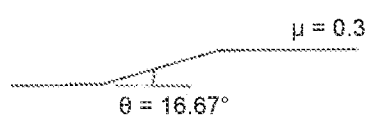
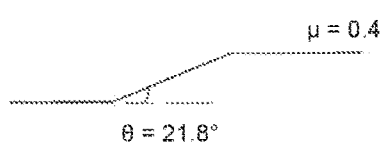
FIGURE 206
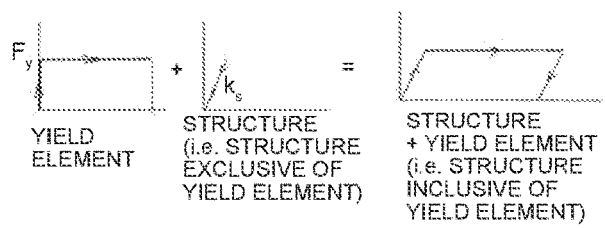
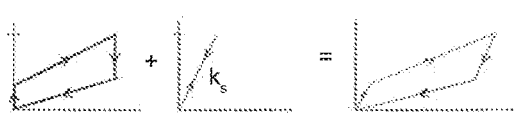
FIGURE 207

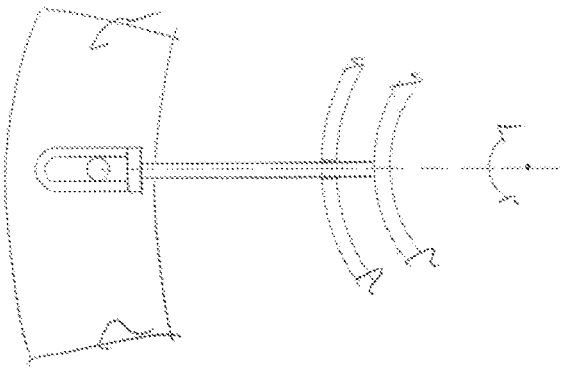

FIGURE 245

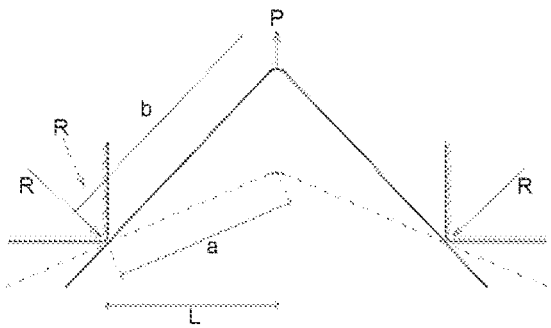

FIGURE 246

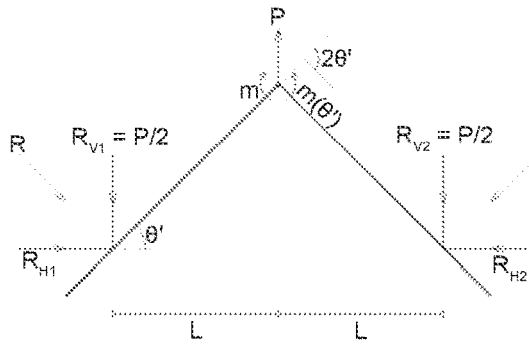

FIGURE 247

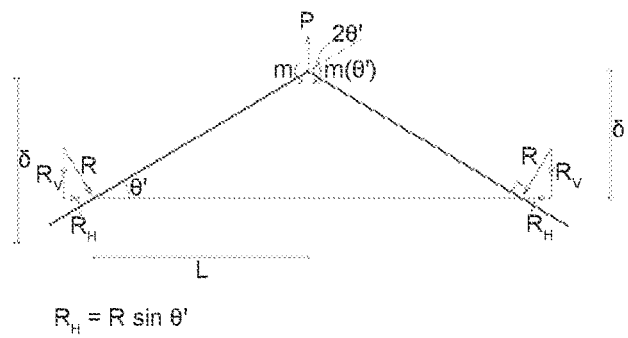

$R_H = R \sin \theta'$
$R_V = R \cos \theta'$
$R_H = R_V \tan \theta'$

FIGURE 248

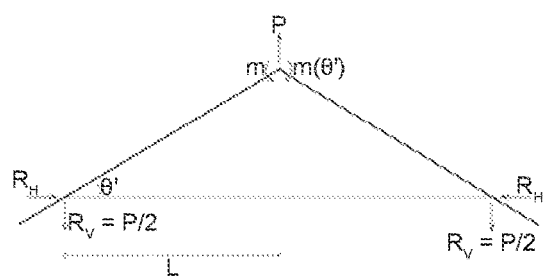

$m = R_V L + R_H \delta$
$\quad = R_V L (1 + \tan^2 \theta')$
$\quad = (PL / 2)(1 + \tan^2 \theta')$ P decreases as $\theta'(\delta)$ increases $P = 2m / (L (1 + \tan^2 \theta'))$

FIGURE 249

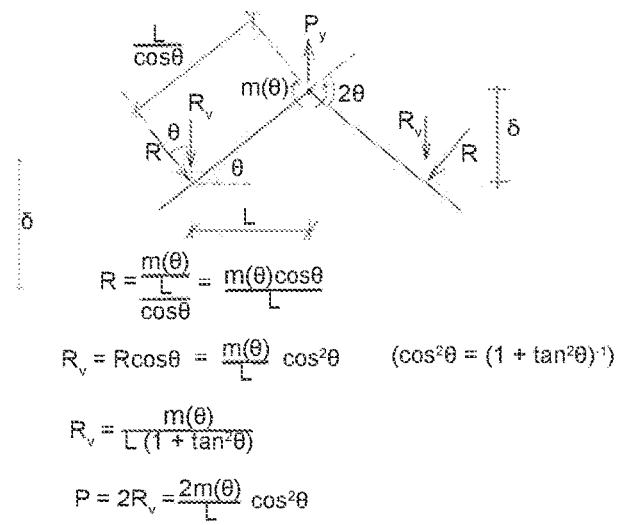

$R = \dfrac{m(\theta)}{\frac{L}{\cos\theta}} = \dfrac{m(\theta)\cos\theta}{L}$ $R_V = R\cos\theta = \dfrac{m(\theta)}{L} \cos^2\theta \quad (\cos^2\theta = (1 + \tan^2\theta)^{-1})$ $R_V = \dfrac{m(\theta)}{L(1 + \tan^2\theta)}$ $P = 2R_V = \dfrac{2m(\theta)}{L} \cos^2\theta$

FIGURE 250

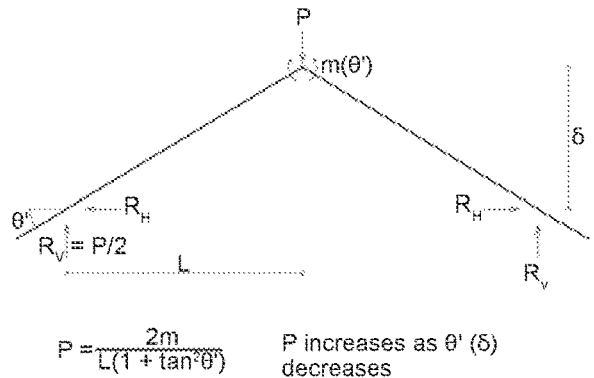
FIGURE 251
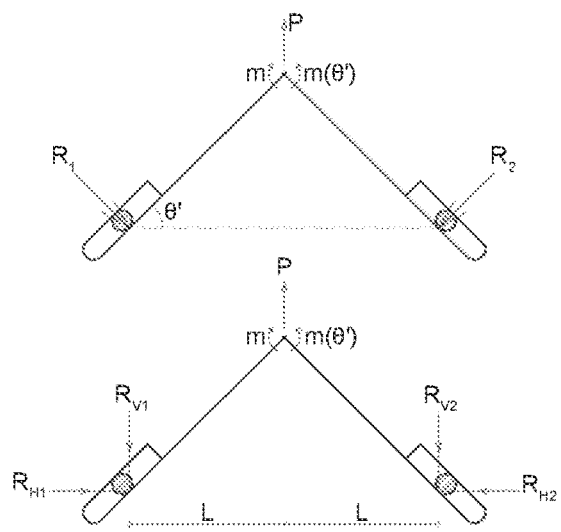
FIGURE 252
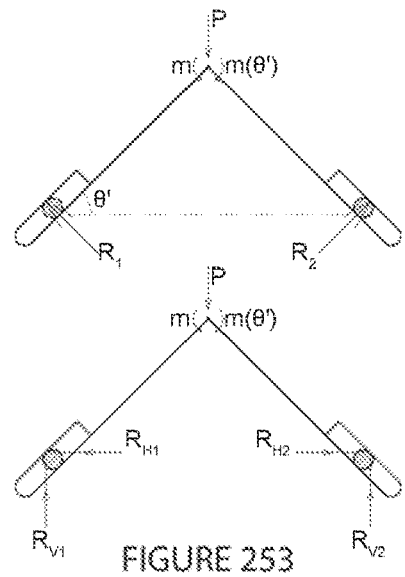
FIGURE 253
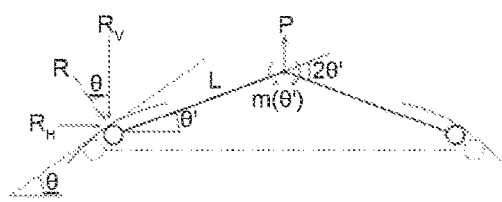
FIGURE 254
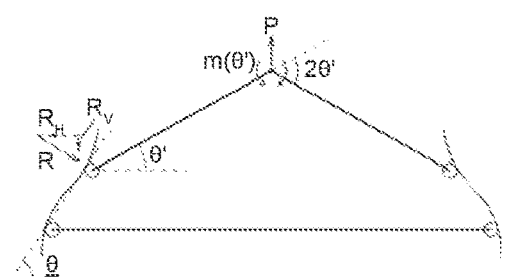
FIGURE 255
FIGURE 256

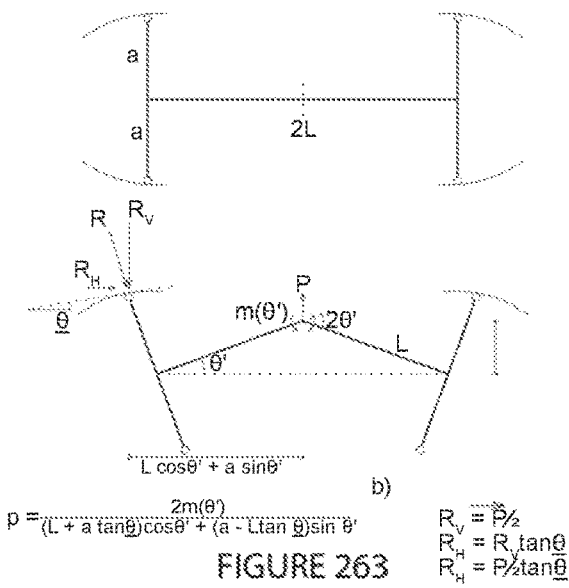

$m(\theta') = R_V (L \cos \theta' + a \sin \theta')$
$\qquad + R_H (a \cos \theta' - L \sin \theta')$ $R_H = R_V \tan \underline{\theta}$
$R_V = P/2$
$R_H = P/2 \tan \underline{\theta}$ $m(\theta') = P/2 (L \cos \theta' + a \sin \theta')$
$\qquad + P/2 \tan \underline{\theta} (a \cos \theta' - L \sin \theta')$ $m(\theta') = P/2 [(L + a \tan \underline{\theta}) \cos \theta' + (a - L \tan \underline{\theta}) \sin \theta']$ $P = \dfrac{2m(\theta')}{(L + a \tan \underline{\theta}) \cos \theta' + (a - L \tan \underline{\theta}) \sin \theta'}$

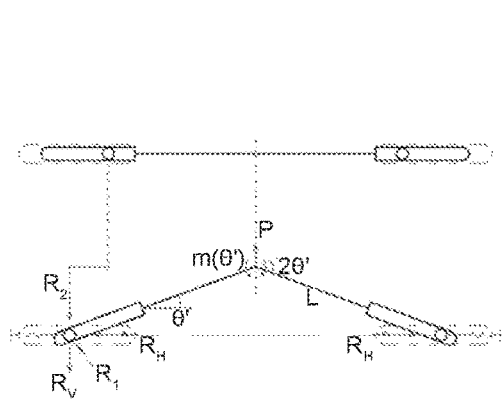

FIGURE 265

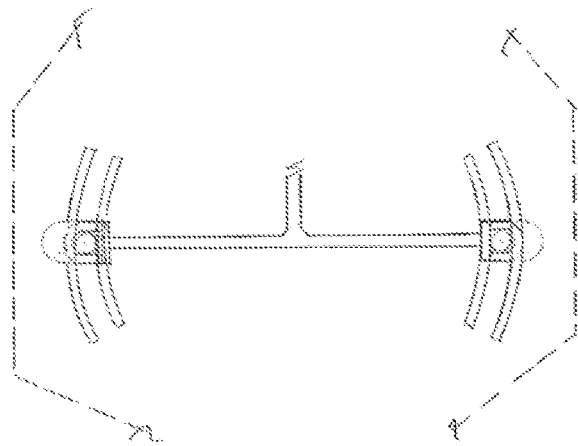

FIGURE 266

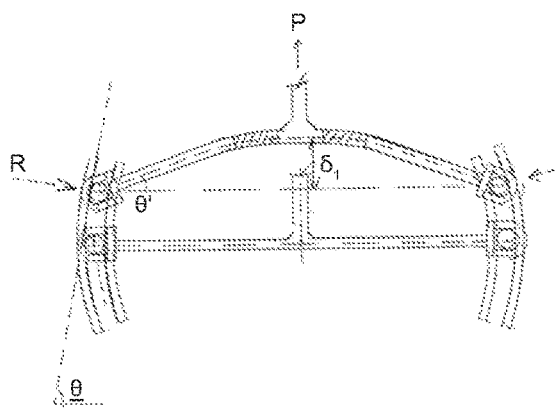

FIGURE 267

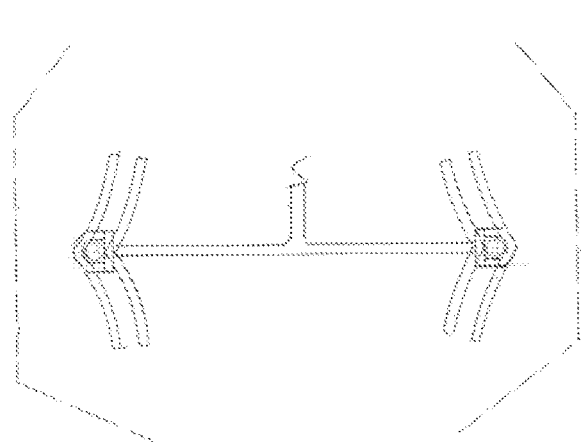

FIGURE 268

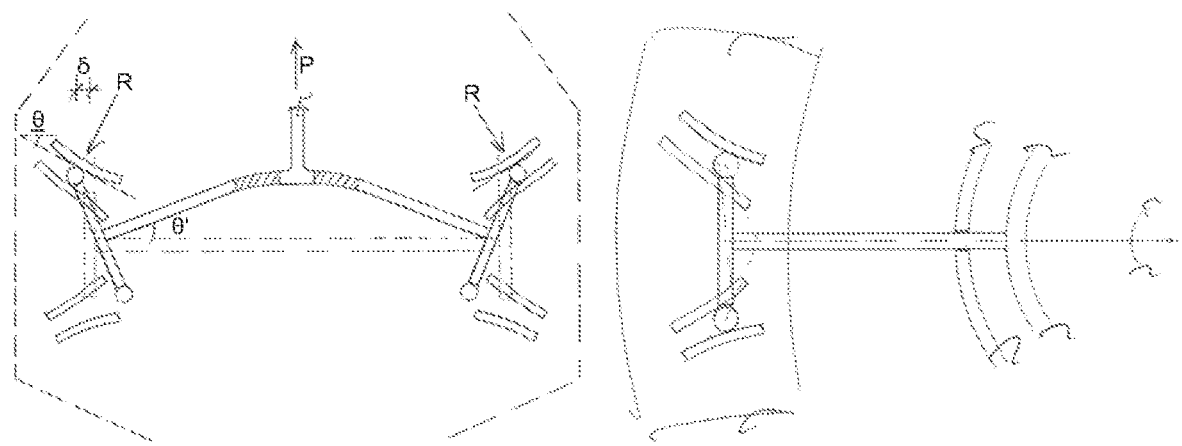
FIGURE 275  FIGURE 276
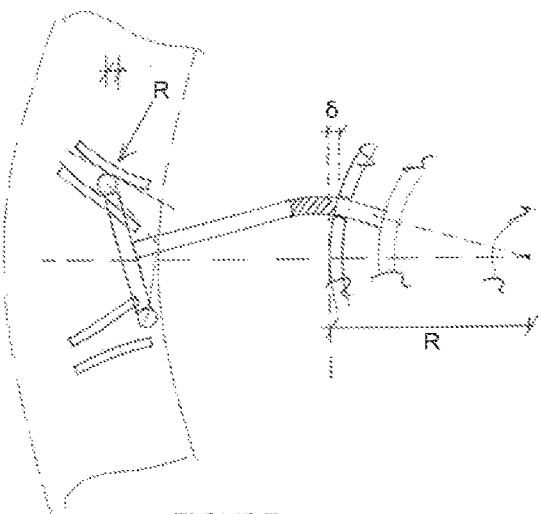
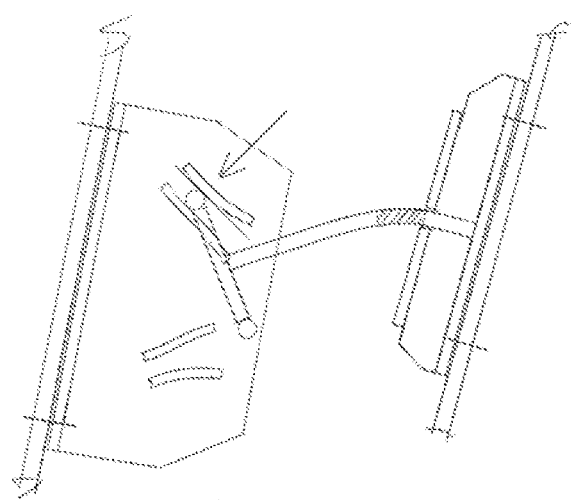
FIGURE 277  FIGURE 278
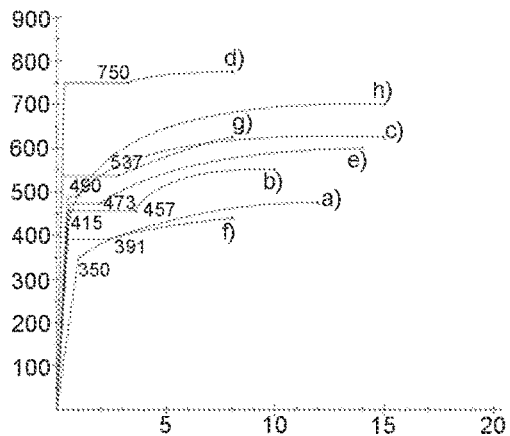
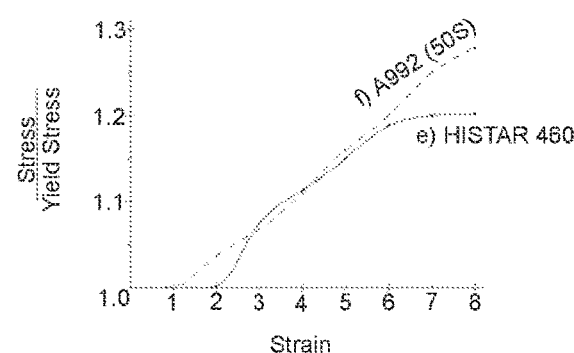
FIGURE 279  FIGURE 280

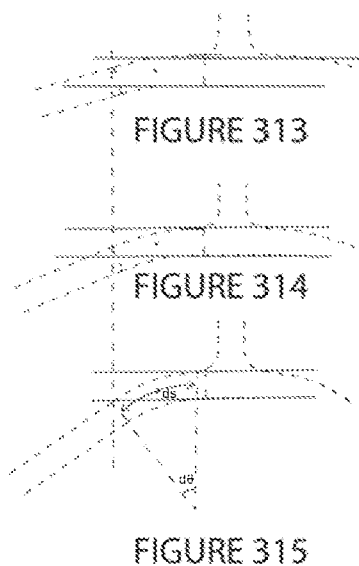
FIGURE 313
FIGURE 314
FIGURE 315
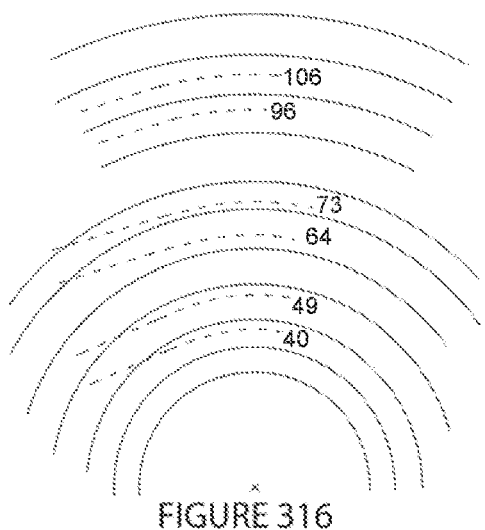
FIGURE 316
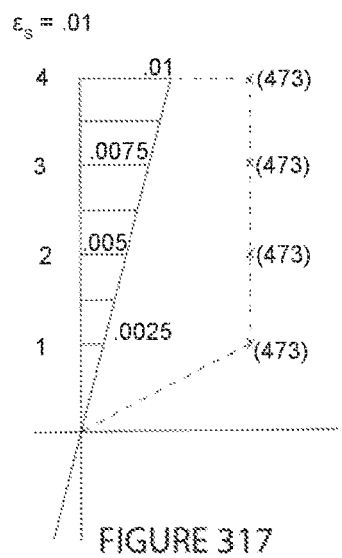
FIGURE 317
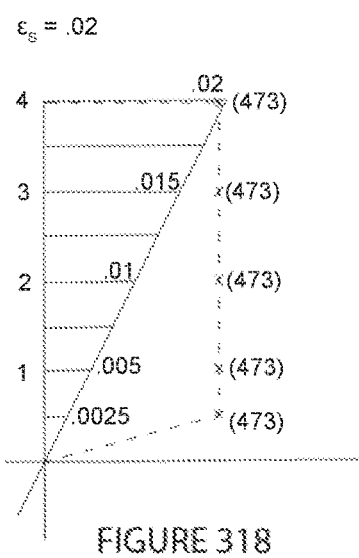
FIGURE 318
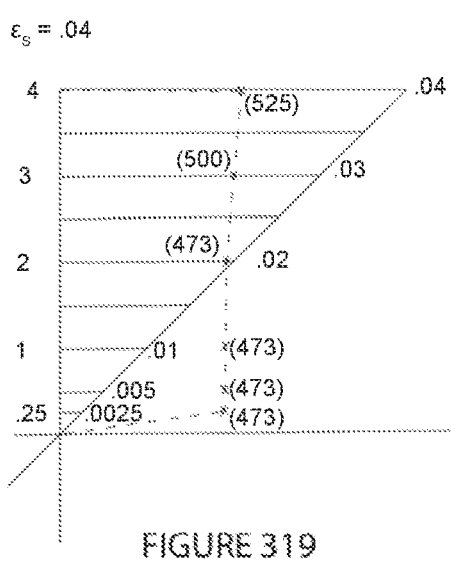
FIGURE 319
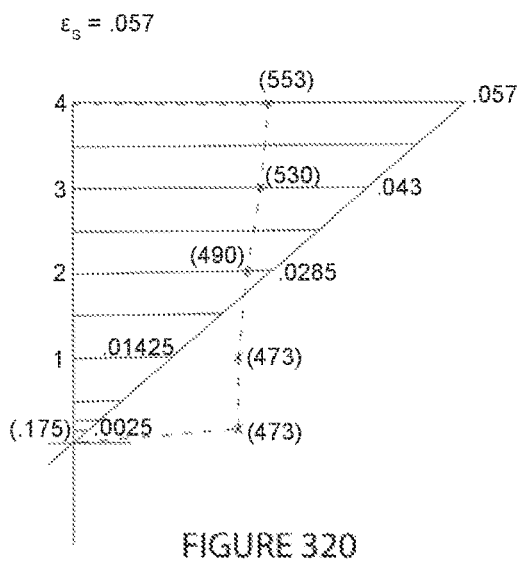
FIGURE 320

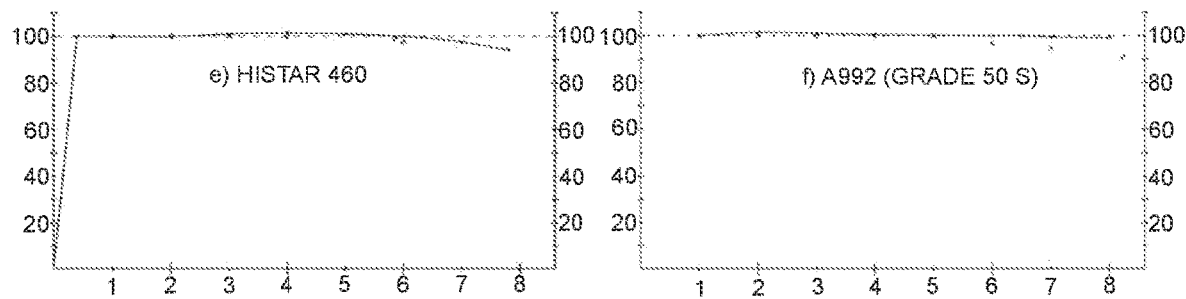
FIGURE 327
FIGURE 328
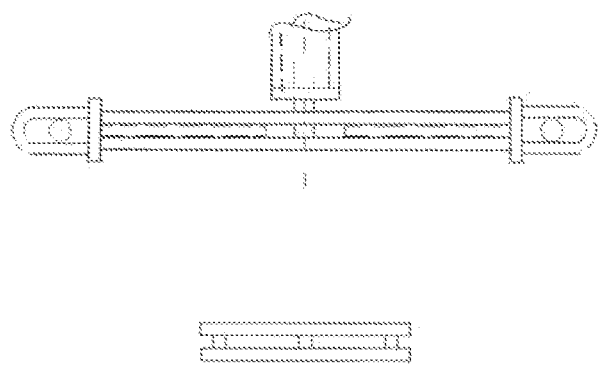
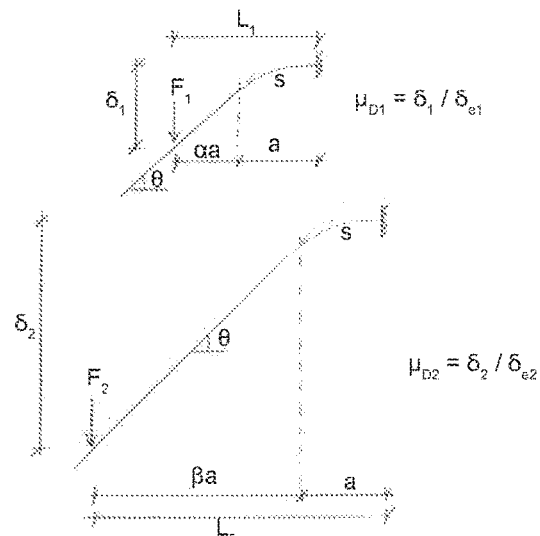
FIGURE 329
FIGURE 330
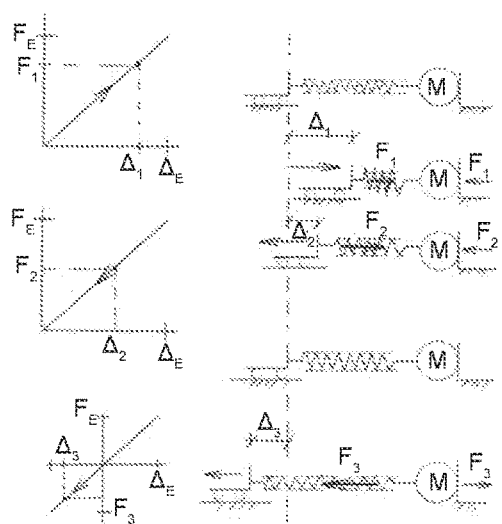
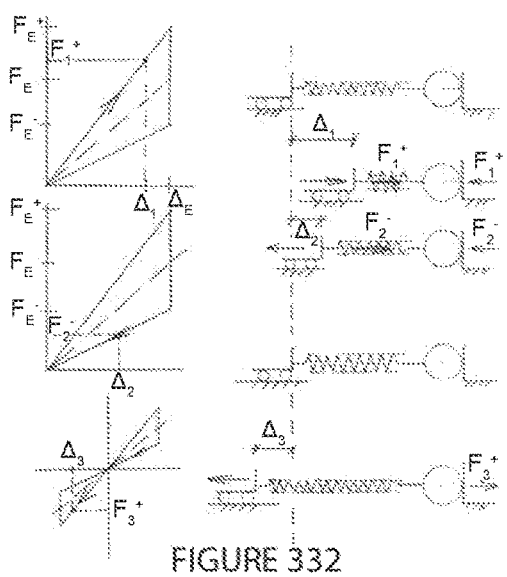
FIGURE 331
FIGURE 332

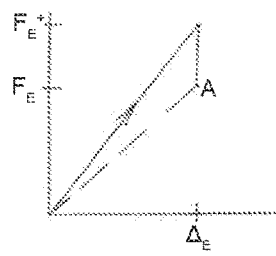
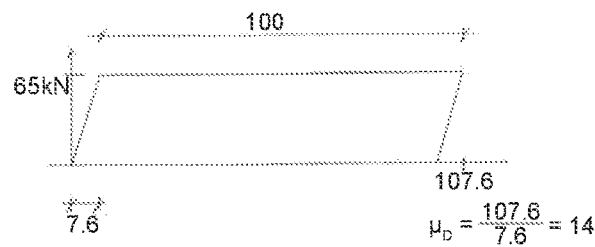
FIGURE 333
FIGURE 334
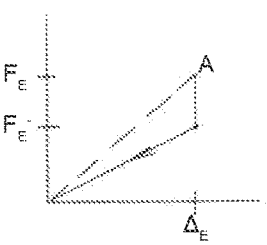
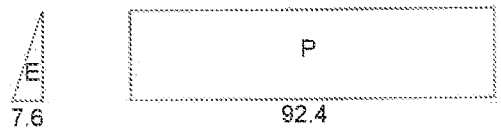
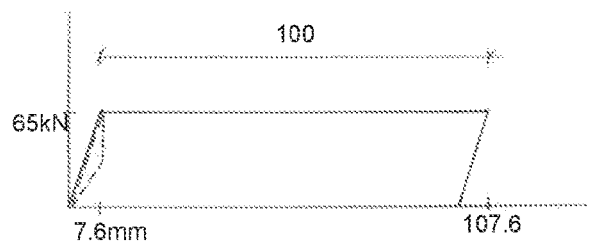
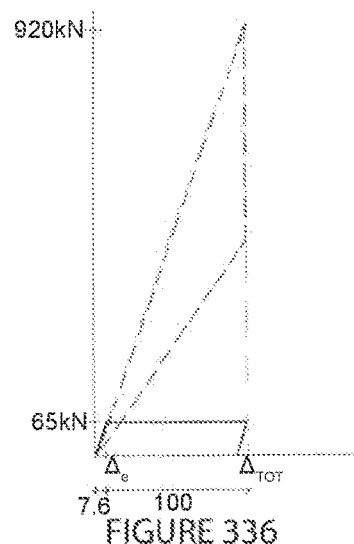
FIGURE 335
FIGURE 336
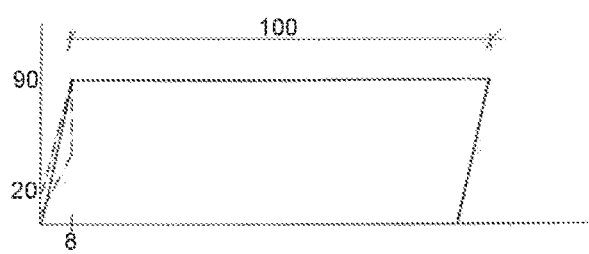
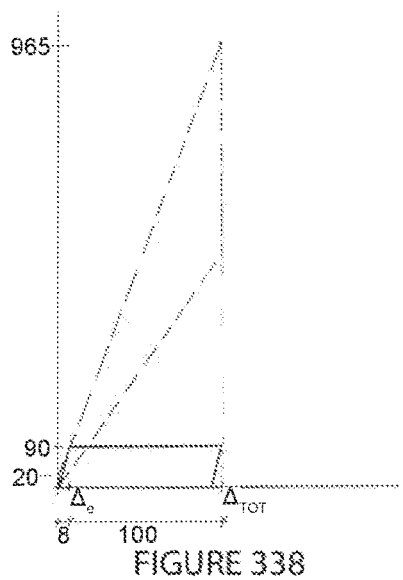
FIGURE 337
FIGURE 338

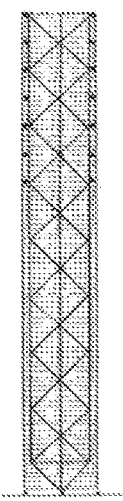
FIGURE 371
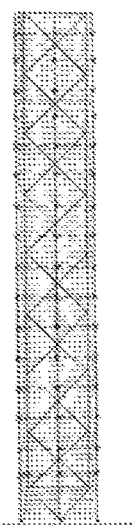
FIGURE 372
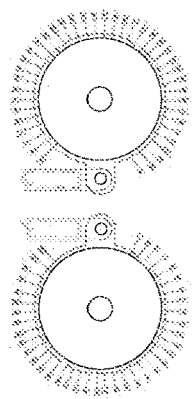
FIGURE 373
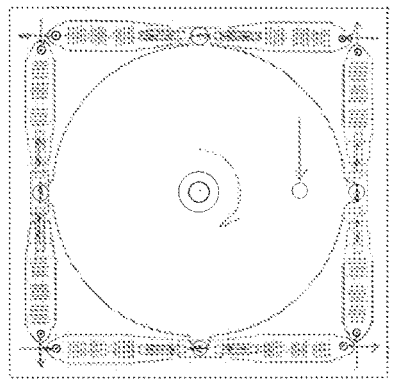
FIGURE 374
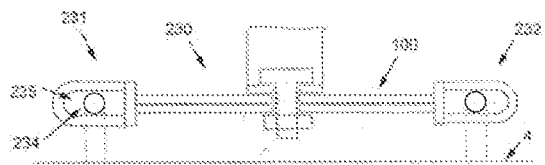
FIGURE 375
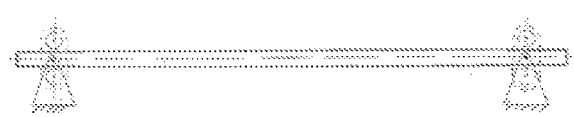
FIGURE 376
FIGURE 377

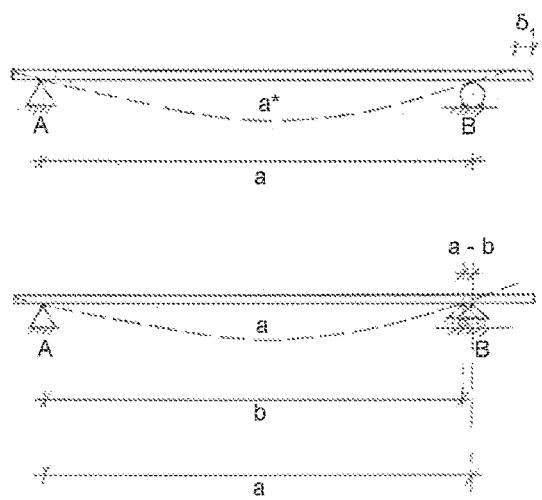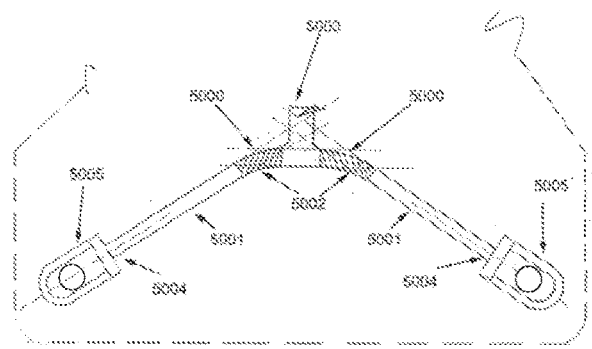
FIGURE 378  FIGURE 379
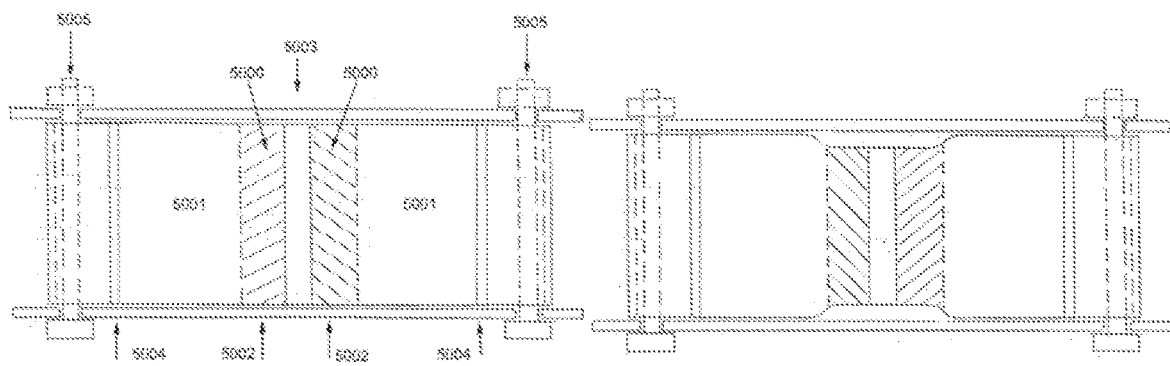
FIGURE 380  FIGURE 381
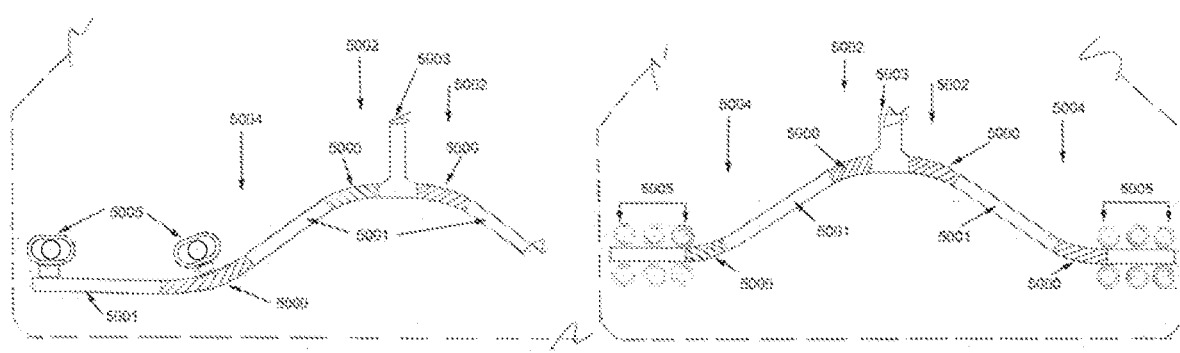
FIGURE 382  FIGURE 383

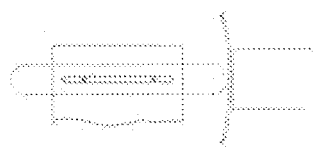
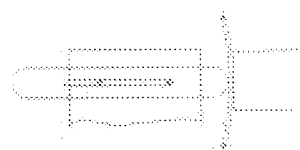
FIGURE 408
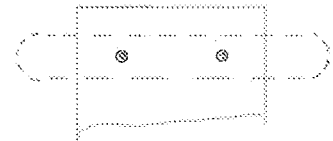
FIGURE 409
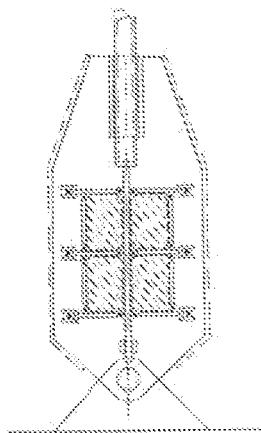
FIGURE 410
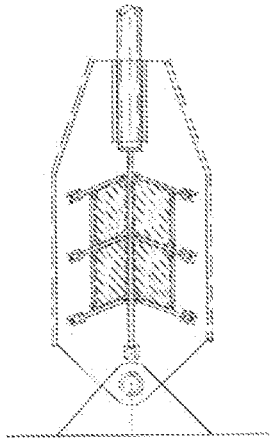
FIGURE 411
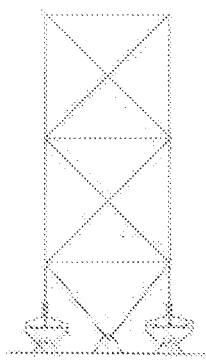
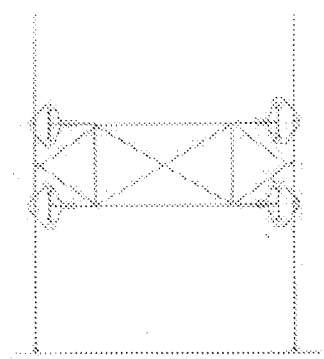
FIGURE 412
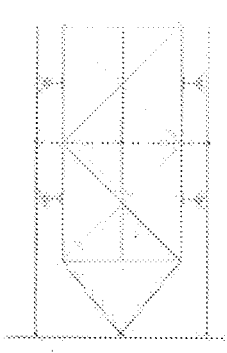
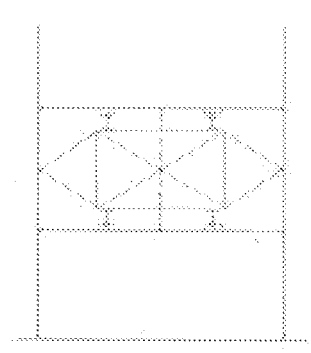
FIGURE 413

CONTROL STRUCTURE WITH ROTARY FORCE LIMITER AND ENERGY DISSIPATER

CROSS REFERENCE TO RELATED APPLICATIONS

This application is a continuation-in-part and claims priority to PCT/IB2019/056940 titled Control Structure with Rotary Force Limiter and Energy Dissipater filed on Aug. 16, 2019, which claims priority to NZ Patent Appln. Nos. 745412 filed Aug. 17, 2018, 745493 filed Aug. 20, 2019 and 745931 filed Aug. 31, 2018. This application is also a continuation-in-part of U.S. patent application Ser. No. 16/486,582 titled Control Structure, having a US filing date of Aug. 16, 2019, which application is a 371 of PCT/IB2017/056137, which claims priority to NZ Patent Appln. Nos. 729195 and 729197 both filed on Feb. 16, 2017. This application is also a continuation-in-part of U.S. patent application Ser. No. 16/486,590 titled Force Limiter and Energy Dissipater, having a US filing date of Aug. 16, 2019, which application is a 371 of PCT/IB2017/056135, which claims priority to NZ Patent Appln, Nos. 729195 and 729197 both filed on Feb. 16, 2017. All of the above applications are incorporated by reference in their entirety in this application.

FIELD OF THE INVENTION

The present invention relates to a force limiting and energy dissipating system. More particularly, but not exclusively, it relates to an energy absorbing system to reduce the impact of earthquake induced sway or racking motion of storage racks and buildings.

BACKGROUND OF THE INVENTION

Commercial and industrial storage rack systems are designed to hold various quantities of items and goods. While storage rack systems may withstand the vibrations caused by low levels of seismic forces, increased levels of seismic forces can both damage the racks and cause goods to fall off the racks.

Although they may vary in structure, a storage rack typically consists of a plurality of upright column pairs that are ordered in a rectilinear fashion to form two rows of upright columns. Usually a front row that is adjacent the passage way where forklifts may drive or automated systems operate, and a back row that may be adjacent a wall or a parallel passage. Between the columns are multiple horizontal shelves. The array of such shelves extends upwards to the top of the upright columns. Shelving or pallets installed across pairs of beams normally hold the items or materials being stored. The columns bear the weight of the items or materials and transfer that weight to the bottom of each column to the foundation on which the columns are installed. The racks in plan view are typically rectangular with lengths over 100 m possible, and typical widths of between 0.9 m and 3 m.

Swaying of the racks in the lengthwise direction can occur during an earthquake. This is due to the foundation moving in one direction and the inertial resistance of the masses (pallets) supported by a flexible structure resulting in a motion lag induced swaying of the rack. This movement can be descried as racking. Lengthwise racking can result in very high forces being developed in the rack structure.

Typical ways to reduce the effect of lengthwise racking is to use diagonal ties. The ties may be tensioned cables that are generally anchored at one end to an upper region of the rack and at the other end to the foundation. Multiple ties may be used that form a zig zag pattern along the lengthwise direction of rack. The ties help brace and reduce movement in the lengthwise direction relative to the bottom of the racks. They can make the rack very rigid. This is not ideal as it may result in very high peak loads being experienced by the ties and/or the racks. This may result in catastrophic failure.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

It is an object of the present invention to provide an energy absorbing system or mechanism or device or control structure or racking or building which overcomes, or at least partially ameliorates one or more of the abovementioned disadvantages or which at least provides the public with a useful choice.

SUMMARY OF THE INVENTION

In a first aspect the present invention may be said to be a device or mechanism or more preferably a control structure which is able to limit forces developed within itself and/or a structure (e.g. building or storage rack) it connects with and is seismically supportive of as it resists and endures ground or base motion input from a seismic event.

The control structure may be comprised of a (preferably relatively inflexible) rocker frame assembly which is pivotably connected to a structural base or structural member. Rotation of the rocker frame about its base pivot(s) causes a flexural member(s) (e.g. preferably plate) within a rotary unit which is directly or indirectly connected to the rocker frame, but distal to one of the rocker frame pivot(s), to flexurally displace (preferably deform by for example bending). The flexural member(s) (plate(s)), which is a part of the rotary unit, which in turn is part of the control structure, is configured with particular free translational or free translational and free rotational boundary conditions at one of its ends, to allow it to flex and yield about its minor bending axis to high elasto-plastic displacements (deformation) and high displacement and curvature ductilities, while maintaining a constant resistive yield force (and preferably not allowing or causing membrane forces to develop within itself).

Of significance, the particular boundary conditions, (in addition to the translational or translational and rotational properties above) also enable the length along the elasto-plastically flexing curve of the plate (between its reaction points) to freely increase or decrease as it displaces and/or enable the plate to develop a horizontal reaction at its reaction points or boundary surfaces as it (the plate) flexes and displaces.

The particular boundary conditions of the flexure member(s) (plates) which enable them to produce a constant, cycling, resistive yield force while flexing to high elasto-plastic displacements are explained in detail further on.

The pivotably based control structures are structures that the rotary yield units can be efficiently incorporated into.

That is, they (control structures) are of a form that enables them to efficiently utilize the constant resistive yield forces produced by the elasto-plastically flexing plates within the rotary units which (rotary units) are a connected part of the control structure.

The stable constant resistive yield force produced by the flexing plate(s) within the rotary unit enables the pivotable control structure to also form a stable elasto-plastic mechanism which is able to flow and cycle to high elasto-plastic displacements and high ductilities with a constant resistive force while internal forces within it, or within any adjacent structure it is connected with and seismically supportive of, are maintained and limited to maximum values which are a function of the yield force produced by the flexing yield plate(s) which are part of it.

By flowing as a stable, high displacement and high ductility capable, elasto-plastic mechanism, with constant resistive yield force, the control structure is limiting the magnitude of accelerations and dynamic forces that can develop within its members within its supporting foundations or within the members of another structure it may be seismically supportive of, as it resists and endures the ground motion (displacement, velocity, acceleration) input of a seismic event.

For tall control structures or control structures which are seismically supportive of tall buildings (e.g. 20 storey or higher); the flexibility (plates elastic yield displacement) of the yield plates and the flexibility (structures elastic yield displacement) of the pivotably based rocker frame assemblies (i.e. superstructure of control structure), and the sum of their flexibilities and the ratio of their flexibilities are able to be configured so that the high ductile capability of the yield plates (capable of flexing to high elasto-plastic displacements) is transferred to provide a high (global or structural) ductile capability for the control structure as a whole; and (also) that while (or if) the yield plates are flexing to high elasto-plastic displacements (and strains or ductilities), the drift in the control structure (while at high structural ductilities) is low, and P-DELTA effects are negligible (or manageable).

That is the control structure is able to resist and endure severe ground or base motion input (i.e. high peak ground accelerations, PGA) while (both) maintaining a constant resistive yield force (limiting peak response acceleration of masses supported by the control structure, limiting forces developed within the control structure, limiting forces within its foundations and limiting forces within a structure the control structure may be seismically supportive of) while maintaining a low peak (elasto-plastic) displacement response for the control structure as a whole (i.e. low lateral drift).

In one embodiment (designated here as an ALPHA1 rocker frame) a rocker frame assembly comprises a vertical (e.g. a tower) aspect and is pivotably connected to a horizontal structural base or foundation. The rocker frame connects by a double pin link or push rod to the extended arm of a rotary unit, which is distal to the rocker frame pivot, and connects to a horizontal structural base or foundation.

In a first embodiment (designated here as a BETA1 rotary unit or BETA1 rotor), the rotary unit comprises a first part being a relatively inflexible rotatable circular drum (or disc) set between and rigidly connected at each of its ends to rotor plates each with an integral arm which extends from the rotor plates and pin and slot connects with the ties (or push rods) (first structural member) of the control structure.

Flexure member(s) (plates) are rigidly fixed one end (first region) to, and distributed around, the circumference of the drum (or disc) (first anchor) in the form akin to an impeller. The first region of the plate moving in a circular arc with the first anchor to the rotatable drum.

The first part of the rotary unit comprises the drum, rotor plates with arms, and flexure plate(s). This assembly is supported off an axle shaft centroidal with the rotational axis of the drum and which rotatably connects the first part with the second part which comprises an outer casing or housing which is mounted off a horizontal structural base or foundation (second structural member).

The peripheral ends (second region) of the flexure member(s) (plates) (opposite the first region of the plate rigidly fixed to the drum) have particular translational or translational and rotational boundary conditions and are restrained from circular arc motion at their ends, such as by pins (second anchor) connecting their translationally or translationally and rotationally free end(s) (second region) to the exterior housing (or second part) of the rotary unit.

The first and second part of the rotary unit are preferably pivotably connected by the axle shaft.

Rotation of the rocker frame of the control structure about its base pivot(s) causes the connected pin and slot ended ties (or push rods) to push and pull the extended arms of the rotor plates, and rotate the circular drum (or disc) (first anchor) of the rotary unit to which the flexure member(s) (plates) are fixed and circumferentially distributed about. The end region (first region) of the flexure member(s) (plates) which is rigidly fixed to and distributed around the circumference of the drum (first anchor) rotates and arcs with the drum. Because the opposite (peripheral) end (second region) of the flexure member(s) (plates) are restrained against arc motion by pins (second anchor) an inter annular shear force is developed which causes the flexure member(s) (plates) to elastically or elasto-plastically flex.

In a second embodiment (designated here as a BETA2 rotary unit, or BETA2 rotor), the rotary unit again comprises a relatively inflexible rotatable inner circular drum(s) (first anchor) to and about which the flexure member(s) (plates) are rigidly fixed at their first region and distributed around the circumference of the drum (first anchor) in the form of an impeller.

The peripheral end (second region) of the flexure member(s) (plates) again have the same particular translational or translational and rotational boundary conditions and are restrained from circular arc motion at their ends by pins (second anchors) connecting the peripheral ends (second region) with a second (outer) annulus of the form of a turbine casing (or cowling) which is concentric with the inner rotatable drum. The outer drum (casing) is fixed against movement and anchors to a structural base (second structural member).

The inner rotatable drum(s) may be set between circular end plates (rotor plates) which are rigidly fixed to and supported off a torque axle shaft rotatably fixed to a structural base (second structural member). A rigid arm located exterior to the concentric drums connects orthogonally with the axis of the torque shaft and extends to pin and slot connect at its opposite end with the push rods (first structural member) of the control structure.

In a further embodiment to above, the inner rotatable drum extends through and beyond the outer circular casing to function as both the first anchor and the torque shaft.

In a further embodiment the ALPHA1 rocker frame has two pivots and connects in a similar way to both a horizontal base or foundation and a relatively inflexible overhead structure member.

In a further embodiment the rocker frame has a horizontal (spanning truss) aspect and is pivotably connected at each end to vertical chords or towers which are pivotably connected to a horizontal base or foundation. The rotary units and flexure member(s) (plates) within, are preferably similarly distal to the rocker frame pivots and preferably connect to the rocker frame through a double pin link or push rod and are fixed to the vertical chords or towers. The pivotable horizontally orientated rocker frame(s), preferably double pin links, rotary unit with flexure plates and pivotable columns or towers all parts of the control structure.

In a further embodiment, designated here as an ALPHA2 rocker frame, a rocker frame assembly comprises a vertical (tower) aspect and is pivotably connected to a horizontal base or foundation. The vertical chord(s) of the rocker frame are parallel with another set of adjacent exterior chords pivotably connected to the structural base of the foundation. These exterior chords may connect first to the pivot inclusive centreline of the rocker frame with horizontal relatively inflexible pin ended ties. The rotary unit within which the flexure member(s) (plates) are set are again distal to the rocker frame pivots, and are connected between and distributed along the rocker frame (first or second structural member) and the opposite face of the adjacent pivotable exterior chords (first or second structural member). The pivotable vertically orientated (tower aspect) rocker frame, rotary unit with flexure plates, pin ended exterior chord to rocker frame ties and exterior chord(s) with pivotable base connections, all parts of the control structure.

Rotation of the ALPHA2 rocker frame about its base pivot(s) produces an inter-lamina relative displacement between the chord of the rocker frame and the base pivotable exterior chord. This displacement is restrained by the rotary units (yield connectors) located between and along the respective chords which produce a reactive inter-lamina shear force between the sliding pin connection of the rotor arm to the exterior chord and the outer casing of the rotary unit which is fixed to the interior chord of the rocker frame. This shear force causes the drum of the rotary unit to rotate and the flexure members (yield plates) of the rotary unit to engage and elastically or elasto-plastically flex about their minor bending axis. The elasto-plastic flexure limiting forces and dissipating energy within the control structure and any other structure it may be seismically supportive of.

In a further embodiment the ALPHA2 rocker frame(s) may have a horizontal (spanning truss) aspect and is preferably pivotably connected at each end to the vertical chords or towers which are pivotably connected to a horizontal base or foundation. The horizontal exterior chords parallel with the horizontal chords of the rocker frame are similarly pivotably connected to the vertical chords or towers. The rotary unit within which the flexure members (plates) are set, are distal to the rocker frame pivots and are preferably located between and along the horizontal chords of the rocker frame and the opposite face of the parallel exterior chords. Vertically orientated pin ended ties may link the exterior chords with the pivot included centreline of the rocker frames. The pivotable horizontally orientated (spanning truss aspect) rocker frames, horizontal exterior chords pivotably connected to the vertical chords or towers with pivotable structural base or foundation connections, rotary unit with flexure plates and vertical ties connections horizontal exterior chords to centrelines of rocker frame all parts of the control structure.

In a further embodiment, the control structure comprises rotary yield units with double pin ended push rods which form the diagonal braces of a pivotably based and eccentrically braced frame (tower) structure, in which (horizontal) beams pin connect with (vertical) columns, the rotary unit of the diagonal brace connecting to an (upper) beam adjacent (eccentric to) the beam to column pin connection, and the diagonal opposite end of the brace, being the pin end of the push rod connecting concentrically with the (lower) beam to column connection.

In a further embodiment the control structure comprises rotary yield unit(s) located along and between one pivotably based wall element (or stiff chord) and another parallel and pivotably based wall element (or stiff chord), both wall elements also connected with pin ended motion control ties, all forming a pivotably based coupled shear wall (or stiff chord) control structure.

In a further embodiment the control structure comprises a series of parallel pivotably based wall elements (or steel chords) along and between which are located rotary yield units, all wall units also connected with motion control ties and all forming a control structure comprised of a series of coupled shear walls (or stiff chords).

In one embodiment, the flexural member is composed of steel.

In one embodiment, the elongate flexural member is composed of metal plate.

In one embodiment, the flexural member is replaceable.

In one embodiment, the flexural member undergoes plastic deformation at a yield zone intermediate first anchor and second anchor during a seismic event as a result of oscillatory movement of the rocker frame and the subsequent rotation of the drum of the rotary unit.

In one embodiment, the primary structure (i.e. structure seismically supported by control structure) is or is part of a warehouse rack, building and/or large civil structure.

In one embodiment, the first anchor or second anchor rigidly constrains the first region so received at the anchor, in 6 degrees of freedom.

In one embodiment, there are a plurality of connectors intermediate said rocker frame and said structure or base.

In a second aspect the present invention may be said to consist of a device or mechanism, and more preferably a force limiting and energy dissipating rotary unit within which flexural member(s) (plates) are anchored, which by its form is capable of producing a stable, constant, cycling resistive yield force, while the structural plates within it flexurally yield about their minor bending axis to high elasto-plastic displacements. It enables structure(s) it is directly supportive of, and control structure(s) it is part of, to form a stable elasto-plastic mechanism which is able to flow and cycle to high elasto-plastic displacements and high ductilities with constant resistive yield force while internal forces within the structure(s) and their foundations are helped to be maintained and are preferably limited to maximum values which are a function of the yield force of the structural plates which are a part of it.

The plate(s) within the rotary unit in yielding at a constant force through its own high elasto-plastic flexural displacements is modifying the natural response (displacement, velocity, acceleration) of the structure it is part of and masses and/or structures it is directly or indirectly seismically supportive of; by limiting the magnitude of accelerations and dynamic forces that can develop within the structure as it resists and endures the ground motion (displacement, velocity, acceleration) input of a severe seismic event, by flowing as a constant resistive force plastic mechanism.

Contingent on the plates to limit the forces within the control structure and any connected structure; is their ability to sustain potentially high cycling elasto-plastic displacements (deformation) in a stable manner while maintaining a constant resistive yield force.

The magnitude of the peak elasto-plastic displacement demand on the plates is a function of a number of variables including; ground motion (acceleration) input, mass seismically supported by structure and its distribution, elastic natural frequency of structure(s) (inclusive of plates) and yield strength of plate(s). The ability of the plate(s) to sustain the cycling peak displacement demands on them, while maintaining a stable constant resistive yield force is further dependent on their material stress-strain characteristics, and structural form.

The flexural member's (plate's) geometry (shape) and strength along its direction of flexing is configured so that flexural yielding (i.e. plastic flow, plastic straining, plastic curvature) within the plate is preferably confined to a specific and finite 'yield zone' within the end regions of the plate immediately adjacent one or all of the plate's anchors. The plate remains preferably elastic between the yield zone within the first region(s) of the plate adjacent its first anchor and the distal yield zone within the second end region(s) of the plate adjacent its second anchor(s) or between the yield zone within the first end region (adjacent the first anchor) of the plate and a distal non-yielding second end region (adjacent a second anchor). A person skilled in the art will understand that confinement of yielding to these zones may simply be achieved by the use of a rectangular plate of constant cross section and material properties (prismatic) along its direction of flexure.

In a further aspect the present invention may be said to be a force limiting and energy dissipating device for absorbing energy during movement between two structure members, the device comprises
  a first part of the rotary unit secured to a first of said structural member
  second part of the rotary unit secured to a second of said structural member
  a resiliently deformable flexural member within the rotary unit having a first region and a second region(s) spaced from the first region and located respectively by the first anchor and the second anchor(s), whereby the first anchor secures the first region to the first part of the rotary unit so that the first region is able to move with the first part relative to the second region(s) and second part of the rotary unit during a seismic event, and the second anchor(s) allows translation or translation and rotation of the second region(s) (with particular boundary conditions) relative to the second anchor(s) during oscillatory movement of the first structure relative the second structure and subsequently first part of rotary unit relative to second part of rotary unit, allowing the flexural member to flexurally yield while maintaining a stable constant resistive yield force (and preferably not causing internal membrane forces to develop in said elongate member).

In one embodiment the flexure member extends at least between the two anchors in a first direction, wherein the first anchor secures the first region to the first rotary unit part so as to move with said first rotary unit part during the seismic event, and the second anchor is configured to allow the second region
  to rotate relative said rotary unit part about an axis perpendicular to the first direction and parallel the unit in operation, and
  laterally relative said rotary unit part translate in said first direction.

In a further aspect the control structure may consist of a rotary unit alone (without a rocker frame) in which the rotary system is mounted directly to a foundation, or, above and to, a secondary flexural member (base) in turn fixed to an underlying foundation, and in which the extended arm of the rotary unit connects directly or via diagonal ties to the structure it is seismically supportive of.

In a further aspect the present invention may be said to be a rotary tie anchor for anchoring at least one diagonal tie of or for a seismically supported structure to a foundation.

In a further aspect the present invention may be said to be a racking constraining system having at least one diagonal tie to resist racking of a structure mounted on a foundation or base; wherein the at least one tie attaches from the rack to a rotary tie anchor, the tie anchor being, as described above, a rotary unit within which flexure member(s) (plates) are set and from which an extended arm connects with at least one diagonal tie.

Preferably the rotary unit with elongate flexure member (plates) is held at the foundation or secondary flexure member base without compromise, or substantial compromise, of the flexure member's resilient and/or plastic flexure response to rack racking and/or load inputs via the at least one tie.

In one embodiment, the seismically supported structure is either a rack or a building.

In one embodiment, there are 2 ties connected to the anchor.

In one embodiment, the ties are connected to an uppermost region of the seismically supported rack.

In one embodiment, the 2 ties are connected to either side of the vertically extended arm of the anchor.

In one embodiment, the ties are subjected to tensile loads during seismic activity in operation.

In one embodiment, the tie anchor comprises a hold down anchor at each anchor region of a secondary flexure member, (which underlies and supports the rotary system (unit)) where the rotary system is centrally located between both hold down anchors.

In one embodiment, at least one hold down anchor of the secondary member is configured to allow its respective anchor region to move in a lateral translational direction towards and away from the other anchor.

In one embodiment, both hold down anchors of the secondary member are configured to allow the respective anchor region of the secondary flexure member to rotate about a rotational axis, located at the respective end region, perpendicular to said elongate direction of the secondary flexure member and parallel to the foundation or base during flexure of the primary flexure member (rotary unit).

In one embodiment, the central pivotal connection is formed in a central hold down anchor intermediate the 2 end hold down anchors of the secondary flexure member.

In one embodiment, the secondary flexure member is over 1 m long.

In one embodiment, the secondary flexure member is 2 m long.

In one embodiment, the drum, rotors with arms and housing of the rotary unit is significantly stiff relative to the flexure plates to resist substantial elastic deformation so as to transfer the tie forces directly into the flexure member.

In one embodiment, the primary flexure member (plates) is highly flexible relative the overall rotary system.

In one embodiment, the primary flexure member is highly ductile relative the overall rotary system.

In one embodiment, the secondary flexure member which underlies the rotary unit and primary flexure member (plates), substantially forms a curved shape of a standing second order harmonic wave during deformation.

In one embodiment, the secondary flexure member substantially forms a sideways S shape during deformation.

In one embodiment, the secondary flexure member substantially forms a positive lobe to one side of the upstand and a negative lobe to the other side of the upstand.

In one embodiment, the curved shape of the secondary flexure member has a point coincident with the pivot point of the central anchor that does not translate in any direction.

In one embodiment, the secondary flexure member is divided into two wings, a first wing located at a first side of the central anchor and a second wing located at a second of the central anchor.

In one embodiment, the tie anchor is located and connected above each of the first wing and second wing.

In one embodiment, the primary flexure member within the rotary unit and secondary flexure member act substantially in series.

In a further aspect the present invention may be said to be an anchored storage rack assembly, the use of diagonal ties from the rack into a rotatable upstand from a triple anchored damping system capable of absorbing or dissipating energy provided in the upstand via the ties during a seismic or high force load event.

Preferably the triple anchoring of the supporting secondary member allows a single curvature flexure upwardly on one side of the secondary member and a single curvature flexure downwardly on the other side of the secondary member under any racking of the rack relative to the underlying support for the anchors.

In a further aspect the present invention may be said to an energy absorbing structure assembly, the spaced anchoring from an underlying support of an energy absorbing flexure member attached directly or indirectly (e.g. via bolts, ties, ties via an upstand, or the like) to the rack to anchor the rack, the anchoring allowing a symmetric and/or asymmetric arc like movement of the flexure member without endwise cantilevering from its ends from its resilient extent into plastic deformation.

In a further aspect the present invention may be said to consist of a bracing anchor that is able to substantially convert lateral tensile forces from a structure (preferably of a racking type) into substantially rotationally distributed forces (torque) in operation, so as to absorb the rotationally distributed forces by means of elastic and plastic yielding on one or more elongate flexure members that are dependent (directly or indirectly) from a foundation for the structure.

In one embodiment, the rotational action is transmitted to the flexure member that absorbs energy, received from the tensile forces, in a controlled manner.

In one embodiment, the structure is held rigidly to the foundation (second structural member) in the absence of seismic activity.

In one embodiment, upon seismic activity the structure has its energy damped via the rotary unit.

In one embodiment, the rotary unit is held (elastically and effectively) rigidly to the foundation in all degrees of freedom with the absence of seismic activity, upon seismic activity and yielding of the flexure members, there is a (kinematically) relative ease of lateral translation along the elongate direction at at least one end region of the flexure member, and (kinematically) relative ease of rotation about a rotational axis, perpendicular to the elongate axis and parallel to the foundation at both end regions of a flexure member.

In a further aspect the present invention may be said to an assembly for absorbing energy from a structure, mounted to a foundation, that will rock in a lateral plane from a seismic event, the assembly comprising a stiff elongate body (rocker frame) configured to rock, during said seismic event, about a pivotable anchor located at a first end of the body, the pivotable anchor having a pivot axis perpendicular to the lateral plane and parallel to the foundation, a deformable yield member within a rotary unit dependent from the body and spaced apart from the pivotable anchor in at least a direction perpendicular to said pivot axis, the rotary unit with deformable yield member connecting the body to a first member of one selected from;
   said foundation,
   a vertical chord connected (preferably pivotally) in operation to said foundation,
   a horizontal chord pivotally connected to a vertical chord connected (preferably pivotally) in operation to said foundation,
the rotatable anchor configured and located so that the body during rocking causes relative movement between the body and the first member and wherein one or more selected from the body, and vertical chord, are configured to engage, or are integral, with the structure in operation so the movement of the structure is transferred to the one or more selected from the body, and vertical chord.

In one embodiment, the relative movement causes elastoplastic deformation of the deformable member within the rotary unit.

In one embodiment, the body is a column.

In one embodiment, the body is a truss.

In one embodiment, one or both of the chords are columns.

In one embodiment, one or both of the chords are trusses.

In one embodiment, the deformable yield member is plate like.

In one embodiment, the deformable yield member comprises a steel plate.

In one embodiment, the deformable yield member comprises a damper comprising a spring or rubber element, or friction plate element, or shear yielding element.

In one embodiment, the deformable member bends about its minor axis.

In one embodiment, the body and chords are substantially stiff compared to the yield member(s).

In one embodiment, the body (rocker frame) is pivotally fixed to another seismically dependent structure two thirds up the height of the control structure.

In one embodiment, the vertical chord of the control structure is pivotally fixed to the seismically dependent structure two thirds up the height of the control structure.

In one embodiment, the pivotable anchor is configured to pivotally engage the body with the foundation.

In one embodiment, the deformable member within the rotary unit, is engaged between the body and the foundation.

In one embodiment, the body comprises rotary anchors located at each end of the body, a first rotary anchor and a second rotary anchor.

In one embodiment, the second rotary anchor is attached to an upper region such as an upper floor, ceiling or other upper region of said structure.

In one embodiment, further deformable members are engaged between the body and the upper region.

In one embodiment, the stiff elongate body is substantially horizontal.

In one embodiment, there are two vertical chords, a first vertical chord and a 2nd vertical chord, pivotally connected in operation to said foundation, at each end of the elongate body.

In one embodiment, the first rotary anchor is attached to the said first vertical chord and the second rotary anchor is attached to the 2nd vertical chord.

In one embodiment, both vertical chords are configured to pivotally attached to the foundation.

In one embodiment, both vertical chords are configured to pivotally attached to an upper region.

In one embodiment, the body is further engaged to each vertical chord by spaced apart deformable members.

In one embodiment, there are multiple bodies (rocker frames) and associated deformable members within and part of rotary units along the height of the vertical chords.

In one embodiment, the deformable members are substantially plate like members within and part of rotary units intermediate the body and the vertical chord.

In one embodiment, the rotary units with deformable members transfer shear forces between the vertical chord and the body.

In an alternative embodiment, the rotary unit has two end regions, one first end region constrained relative the body, and the vertical chord is configured to act at the second end region opposite the first end region to cause rotation of the drum of the rotary unit and to deform the deformable member during relative movement.

In one embodiment, the body is substantially elongate in a horizontal direction and pivotally engaged intermediate 2 vertical chords.

In one embodiment, there is least one horizontal chord pivotally engaged intermediate two pivotably based vertical chords.

In one embodiment, there are two chords pivotally engaged intermediate the two vertical chords.

In one embodiment, the rotary units with deformable members are intermediate the body (rocker frame) and the horizontal chord/s.

In one embodiment, during movement of a structure or assembly from a seismic event, there is relative movement between the stiff elongate body and the horizontal chord to cause rotation of the drum of the rotary unit and flexural deformation of the deformable members within and part of the rotary unit.

In one embodiment, the foundation is one of a ground, a floor, a ceiling, a beam, and a truss.

In one embodiment, at least one end region of the deformable member has a sliding engagement.

In one embodiment, there is a pin ended tie system to tie the vertical chords and/or body together.

In one embodiment there is a pin ended tie system to tie the horizontal chords and/or body together.

In a further aspect the present invention may be said to consist in an energy absorbing system for a structure mounted to a foundation, to constrain lateral movement of an upper region of said structure during a seismic event with respect to the foundation, wherein the system comprises;
  a rocker rigidly connected at a first end of a stiff body engaged to said structure and configured to transfer lateral movement of said upper region about the body, the rocker comprising
    a pivot anchor that is configured to pivot the body about
      a pivot axis perpendicular to said lateral movement and parallel said foundation, and
    at least two spaced apart rotary unit anchors, one anchor each side of the pivot axis, each anchor dependent from, and intermediate, said foundation and the body, each anchor comprising at least one deformable member configured to elastically or elasto-plastically deform during said lateral movement, and
  wherein a second end of the body opposite the rocker is constrained to one selected from the upper region, and a second rocker.

In one embodiment, said structure is a rack, ceiling, and/or building.

In one embodiment, the foundation is one of a ground, a floor, a ceiling, a beam, and a truss.

In one embodiment, the deformable member within the rotary unit is dependent from the foundation.

In one embodiment, the deformable member is dependent from a vertical chord engaged to said structure.

In one embodiment, the vertical chord is substantially stiff compared to the deformable member.

In one embodiment, the vertical chord is pivotally dependent from the foundation via a vertical chord pivot anchor comprising a vertical chord pivot axis parallel to the pivot anchor pivot axis.

In one embodiment, there are two vertical chords, each with their own respective vertical chord pivot anchor and spaced apart anchors, the anchors and central pivot anchor rigidly joined together by the body.

In one embodiment, the body is a truss.

In one embodiment, the body is substantially rigid compared relative to the deformable members.

In one embodiment, the upper region of the vertical chords are engaged to the structure.

In one embodiment, the vertical chords are engaged to a seismically dependent structure two thirds up the height of the control structure.

In a further aspect the present invention may be said to an energy absorbing system for a structure mounted to a foundation to absorb lateral movement of said structure during earthquake, the upper region of the structure moving laterally during a seismic event, wherein the system comprises a body comprising a top region laterally constrained in operation to the upper region of said structure and a base opposite the top region comprising
  a pivot that is configured to pivotally depend from said foundation about an axis perpendicular to the lateral movement and parallel the foundation, the pivot allowing the body to rock back and forth about the axis and
  at least two spaced apart yield connectors (rotary units), one yield connector on each side of the pivot, each spaced apart yield connector dependent from said foundation and body, and comprising one or more deformable members configured to plastically deform during rocking.

In one embodiment, the upper region of the seismically dependent structure is engaged to the control structure two thirds up the height of the seismically supported structure.

In one embodiment, the height of the structure (dependent or control) is more than 30 metres.

In one embodiment, the top region of the body is constrained with the upper region via cables.

In one embodiment, in operation one yield connector (rotary unit) will deform in a clockwise direction and the opposite yield connector will deform in a counter clockwise direction when the body is rocked about the pivot.

In one embodiment, there are two ties connected to the upper region.

In one embodiment, the two ties are connected to the structure either side of the body.

In one embodiment, the ties are subjected to tensile loads during seismic activity in operation.

In one embodiment, the body is substantially stiff so as to allow minimal elastic deformation, and no plastic yielding, during lateral movement of the structure.

In one embodiment, the body may be a multimember truss system.

In one embodiment, the yield connectors (rotary unit) are intermediate the body, and one selected from a vertical chord, horizontal chord, and foundation.

In one embodiment, the system comprises cables retaining the body to the vertical and/or or horizontal chord.

In one embodiment, the top region of the body is constrained to the structure from a substantially single point.

In an alternative embodiment, the top region of the body is constrained to the structure from laterally spaced apart regions.

In one embodiment, the deformable member within the rotary unit has at least two spaced apart anchor regions.

In one embodiment, a seismic event creates relative movement between the foundation and body, which creates relative movement between the deformable member anchor regions.

In one embodiment, the anchors are configured to allow at least one anchor region to move in a rotary arc direction away from the other anchor region, and at least one anchor region to rotate about a rotational axis perpendicular to said lateral direction and parallel with the plane of the foundation.

In one embodiment, the deflection of the deformable member caused by plastic yielding is far greater than the deflection caused by elastic deflection.

In one embodiment, the deformable member is highly flexible and/or ductile relative the truss.

In a further aspect a secondary flexural member is located intermediate of the rocker frame(s) inclusive of rotary unit with primary flexural members (plates), and a horizontal (e.g. foundation) or vertical (e.g. columns) structural base.

The invention relates to a control structure which helps direct and control the motion of connected force limiting and energy dissipating structural members (preferably a plate or plates), which are capable of stable cycling high displacement elasto-plastic flexure about their minor bending axis.

The plates enable the control structure to form a stable cycling high displacement and high ductility capable elasto-plastic mechanism of constant resistive yield force in resistive response to a seismic ground (base) motion input. The flexural yielding action of the plates at a constant resistive yield force, in turn, limits the magnitude of forces that can develop within the control structure and within adjacent structures that the control structure may also be seismically supportive of.

That is, the control structure inclusive of the rotary units directs and controls the motion of the yielding plates; while the plates, yielding at a constant resistive force, limit the forces generated within the structure(s).

The present invention incorporates a rocker as part of a substantially stiff pivotably based control structure that incorporates at least one yield connector (rotary unit) to a) transfer ground motion induced forces from the upper region of a storage rack or building structure to the foundation, and b) intermediate of the foundation and the upper region through plastic yielding of the yield members (plates) of the control structure, limit forces that could develop both within the control structure and any adjacent structure it is seismically supportive of (rack or building).

In a further aspect the present invention may utilise a yield connector (rotary unit) for absorbing energy during oscillatory movement between two structure members, the connector comprises:

a first anchor comprising the drum of the rotary unit a second anchor comprising the peripheral pins fixed to the casing of the rotary unit, a flexural member having a first region (preferably an end region of the flexural member) supported at the first anchor and a second region (preferably an end region of the flexural member) spaced from the first region and supported at the second anchor in a simply supported manner.

This is to preferably allow the flexural member to yield in a bending mode as the first and second anchors move relative each other in a direction (and reverse) that is normal to the plane of the flexural member.

Preferably at one of the first and second regions, the flexural member is able to rotate and translate relative to its respective anchors and at the other of the first and second regions the flexural member is cantilever (rigidly fixed) to its respective anchor.

In a further aspect the present invention may be said to be a control structure incorporated with a primary structure or seismically dependant structure (e.g. a building or storage rack) to limit forces and dissipate energy in said primary structure during a seismic event, the control structure comprising:

a) a rocker frame, directly or indirectly pivotally supported at a pivot connected to a horizontal or vertical structural base of member, and b) at least one yield connector (rotary unit) connecting with the rocker frame at a location away from the pivot of the rocker frame, the yield connector (rotary unit) comprising of at least one elongate flexural member able to bend about its minor axis and connected by the yield connector (rotary unit) to the rocker frame in a manner to produce a stable, constant resistive yield force while flexurally yielding about its minor bending axis in response to relative displacement between the rocker structure (first structural member) and horizontal (e.g. foundation) or vertical second structural member.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

The term "comprising" as used in this specification [and claims] means "consisting at least in part of". When interpreting statements in this specification [and claims] which include that term, the features, prefaced by that term in each statement, all need to be present but other features can also be present. Related terms such as "comprise" and "comprised" are to be interpreted in the same manner.

As used herein the term 'diagonal' and its derivatives refers to any angle(s) obliquely of the vertical and the horizontal directions.

'Single curvature' means without forming a plural lobed arch form. It includes a symmetric form on either side of its intended attachment to the structure or rack from its anchoring, encumbered, fettered or like adaptions or zones.

As described herein the term plastic or ductile can be interchangeable and relate to material deformation past elastic deformation. When a stress is sufficient to permanently deform a material (such as a flexure member), it is called plastic or ductile deformation.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

FIGURE DESCRIPTIONS

The invention will now be described by way of example only and with reference to the drawings in which:

FIG. 1: shows a schematic front view of a control structure comprised of a rotary unit alone with inclined tension bracing, connecting to a structure it is seismically supportive of.

FIG. 2: shows a schematic front view of a control structure of FIG. 1 but with extended vertical arm connecting to plan bracing, of a structure it is seismically supportive of.

FIG. 3: shows a schematic front view of a control structure comprised of an ALPHA1 rocker frame assembly with rotary force limiter/energy dissipaters (BETA1 or BETA2 rotors) and connecting to plan bracing.

FIG. 4: schematically shows the control structure of FIG. 3 in sway mode.

FIG. 5: shows the schematic front view of the control structure of FIG. 3 but with multiple rotary units.

FIG. 6: shows a schematic view of a control structure with multiple rotary units which are vertically stacked.

FIG. 7: shows control structures of FIGS. 1-3 within a rack structure or general building structure to which the control structure is seismically supportive of.

FIG. 8: shows an end view of FIG. 7 showing location of control structures of FIGS. 1-3 located intermediate of two storage racks.

FIG. 9: shows a schematic front view of a control structure with APLHA1 rocker frame horizontally orientated and located between two stiff vertical chords which are pivotably based.

FIG. 10: shows the displaced form of the control structure of FIG. 9 in sway mode.

FIG. 11: shows the displaced form of the control structure of FIG. 9 when subject to differential vertical base displacement of the vertical chords.

FIG. 12: shows the displaced form of the control structure of FIG. 9 in sway mode and subject to differential vertical base displacement of the vertical chords.

FIG. 13: shows a schematic front view of a BETA1 rotary unit with extended rotor arm, pin and slot connecting to the push rod of an ALPHA1 rocker frame.

FIG. 14: shows the displaced form of the rotary unit of FIG. 13 when the ALPHA1 rocker frame, it connects with, is in sway mode.

FIG. 15: shows a schematic plan (overhead) view of the rotary unit of FIG. 13.

FIG. 16: shows the rotary unit of FIG. 13 with a secondary flexural base support.

FIG. 17: shows a part plan view of FIG. 16.

FIG. 18: shows a schematic front view of a BETA2 rotary unit with extended rotor arm pin and slot connecting to the push rod of an ALPHA1 rocker frame.

FIG. 19: shows the displaced form of the rotary unit of FIG. 18 when the ALPHA1 rocker frame, it connects with, is in sway mode.

FIG. 20: shows a schematic detail of a DELTA4 yield plate within the rotary unit of FIG. 18.

FIG. 21: shows a schematic detail of the displaced form of the DELTA4 yield plate of FIG. 20 within the rotary unit of FIG. 18.

FIG. 22: shows a schematic plan view of the rotary unit if FIG. 18 with concentrically located extending rotor arms (or lever arms).

FIG. 23: shows a schematic plan view of the rotary unit of FIG. 18 with eccentrically located extending rotor arms.

FIG. 24: shows a schematic plan view of a dual rotary unit in transverse formation with centrally located extending arms.

FIG. 25: shows a schematic plan view of a dual rotary unit in longitudinal formation with centrally connecting arms.

FIG. 26: shows a rocker frame pivot anchor to vertical chord connection.

FIG. 27: shows a plan cross sectional view of FIG. 26.

FIG. 28: shows a schematic front view of a control structure with a two pivot rocker frame located between top and bottom beam with anchor ties.

FIG. 29: shows a schematic front view of two framing control structures located between top and bottom beam.

FIG. 30: shows a schematic front view of the control structure of FIG. 9 in tower form.

FIG. 31: shows a schematic front view of a control structure with an ALPHA2 rocker frame assembly and inter-lamina rotary units.

FIG. 32: shows the control structure of FIG. 31 in sway mode.

FIG. 33: shows a schematic front view of a control structure with an ALPHA2 rocker frame assembly which is horizontally orientated and located between two stiff vertical chords, which are pivotably based.

FIG. 34: shows the control structure of FIG. 33 in sway mode.

FIG. 35: shows a schematic detail of a DELTA4 yield plate within a BETA2 rotor (rotary unit).

FIG. 36: shows the displaced form of the DELTA4 yield plate of FIG. 35.

FIG. 37: shows a detail schematic of a DELTA5 yield plate within a BETA2 rotor.

FIG. 38: shows the displaced form of the DELTA5 yield plate of FIG. 37.

FIG. 39: shows a detail schematic of a DELTA6 yield plate within a BETA2 rotor.

FIG. 40: shows the displaced form of the DELTA6 yield plate of FIG. 39.

FIG. 41: shows the control structure of FIG. 31 inclusive of motion control ties.

FIG. 42: shows the control structure of FIG. 32 (in sway mode) and inclusive of motion control ties.

FIG. 43: shows the control structure of FIG. 34 (in sway mode) and inclusive of motion control ties.

FIG. 44: shows a schematic front view of the control structure of FIG. 9 with secondary flexural member(s).

FIG. 45: shows the control structure of FIG. 44 in sway mode.

FIG. 46: shows a load displacement graph for a two-tier elasto-plastic system (with secondary flexural member).

FIG. 47: shows a schematic view of control structure comprised of a rotary unit alone connected to inclined tension bracing and within a rack structure.

FIG. 48: shows a schematic view similar to FIG. 47 but with cable guides maintaining a practicably horizontal connection of the tension bracing to the vertically extending arm of the rotary unit.

FIG. 49: shows a schematic front view detail of a BETA2 rotary unit supported off a secondary flexural base.

FIG. 50: shows a schematic front view of the rotary unit of FIG. 49 in displaced form but without flexure in the secondary member.

FIG. 51: shows a schematic front view of the rotary unit of FIG. 49 in displaced form and inclusive of flexure in the secondary member.

FIG. 52: shows a schematic of a rocker frame which is able to directly support gravity loads without reliance on flexure members (plates) within the rotary unit to provide vertical stability.

FIG. 53: shows the displaced form of the frame of FIG. 52.

FIG. 54: shows a schematic elevation of a non-symmetrical rocker frame with a rotary unit to one side only.

FIG. 55: shows a side elevation of a plate, similar to FIG. 35, which is fixed one end and free to slide and rotate by way of a slot in the outer annulus of a Type II (BETA2) rotor.

FIG. 56: shows the displaced form of FIG. 55.

FIG. 57: shows the plan view of FIG. 55.

FIG. 58: shows a side elevation of a plate, similar to FIG. 37, with continuous anchored end regions which are free to slide and rotate by way of slots in the outer annulus of a Type II rotor.

FIG. 59: shows the plan view of FIG. 58.

FIG. 60: shows a side elevation of a plate, similar to FIG. 39, with an end region which is free to slide but rotationally restrained by way of slots in the outer annulus of a Type II rotor.

FIG. 61: shows a plan view of FIG. 60.

FIG. 62: shows the side elevation of a plate in which the sliding and rotating end regions of the plate by way of slotting of anchors is located at the rotatable inner anchor of a Type II rotor and where the fixed end of the plate is located at the outer annulus.

FIG. 63: shows the displaced form of FIG. 62.

FIG. 64: shows the elasto-plastically displaced form of a DELTA4 yield plate with hatched yield zone.

FIG. 65: shows the plan view of FIG. 64 inclusive of yield zone.

FIG. 66: shows a plan view similar to FIG. 65 but with a reduced (necked) cross section at the yield zone.

FIG. 67: shows the elasto-plastically displaced form of a DELTA5 yield plate with hatched yield zones.

FIG. 68: shows a plan view of FIG. 67 inclusive of yield zones.

FIG. 69: shows a plan view similar to FIG. 68 but with a reduced (necked) cross section at the yield zones.

FIG. 70: shows the elasto-plastically displaced form of a DELTA6 yield plate with hatched yield zones.

FIG. 71: shows a plan view of FIG. 70 inclusive of yield zones.

FIG. 72: shows a plan view similar to FIG. 71 but with a reduced (necked) cross section at the yield zones.

FIG. 73: shows a schematic plan of a DELTA4 yield plate, where the plate is locally tapered in its yield region, the angle of taper equating to elastic moment demand.

FIG. 74: shows a schematic of a rotary unit with lever arm of length a.

FIG. 75: shows a schematic of the displaced form of FIG. 74 and generating a constant yield force, P1, in the push rod of a control structure.

FIG. 76: shows a schematic of a rotary unit with lever arm of length b.

FIG. 77: shows a schematic of the displaced form of FIG. 76 and generating a constant yield force, P2, in the push rod of a control structure.

FIG. 78: shows a schematic of a control structure in displaced form, with yield force of P1 in its push rods and equivalent resistive yield force, V1 (at height h).

FIG. 79: shows a schematic of a control structure in displaced form, with yield force, P2, in its push rods and equivalent resistive yield force V2 (at height h).

FIG. 80: shows a schematic of a rotary unit integral with a secondary flexural member.

FIG. 81: shows a schematic detail of a rotary unit with a sleeve guided BETA rocker unit (third part) connected to its peripheral (second) part.

FIG. 82: shows a schematic similar to FIG. 81 but with a non-specific force limiter and energy dissipater.

FIG. 83: shows the displaced form of part of FIG. 82.

FIG. 84: shows a schematic similar to FIG. 82, with friction plate force limiters and energy dissipaters within a sleeve guided BETA rocker unit.

FIG. 85: shows a schematic of a rotary friction unit composed of a circular plate (first part) clamped to an annular ring (second part).

FIG. 86: shows the non-displaced and displaced form of part of FIG. 85.

FIG. 87: shows a schematic of a rotary unit composed of annular friction plates and discs with rotor arm length a.

FIG. 88: shows a schematic similar to FIG. 86 but with rotor arm length b.

FIG. 89: shows the non-displaced and displaced form of part of FIGS. 87 and 88.

FIG. 90: shows a schematic section through FIGS. 87 and 88.

FIG. 91: shows a part schematic similar to FIGS. 87 and 88 but where the friction plates of the first part of the rotary unit are individual units.

FIG. 92: shows a schematic section of FIG. 91.

FIG. 93: shows a schematic part view of the tension bolts through the outer annular (first) part of FIG. 92 and through the slotted pads of the inner second part FIG. 94: shows a schematic of the rotary units of FIGS. 87 and 88 integral with a secondary flexure member base.

FIG. 95: shows a schematic section similar to FIG. 90, but where the rotary unit has a flat inner disc and external lever arms, the slotted inner disc rotating with the lever arms.

FIG. 96: shows a case similar to FIG. 95 but where the external plates rotate with the lever arm, both relative to the slotted inner plate (disc).

FIG. 97, 98, 99: show various schematic sections of rotary friction units with friction units centrally located and rotating with lever arms, both located between outer plate.

FIG. 100: shows a plan view schematic of FIG. 97.

FIG. 101: shows a schematic elevation of a rotary unit similar to FIG. 7.

FIG. 102: shows a schematic cross-section of FIG. 101.

FIG. 103: shows a schematic of a rotary unit, where the yield plates are peripherally distributed, and their plane is normal to the plane of the first part (circular disc) of the rotary unit.

FIG. 104: shows a part front elevation of a yield plate with annular ring anchors.

FIG. 105: shows a side elevation of a yield plate fixed one side and pin connecting opposite side.

FIG. 106: shows a plan view of FIG. 105.

FIG. 107: shows a part front elevation of a yield plate, similar to FIG. 104, with connecting pivotable anchor pin both in non-displaced form.

FIG. 108: shows the displaced form of FIG. 107.

FIG. 109: shows a plan view of the (flexing) displaced form of the flexure member (plate) inclusive of its anchor pin along its principal line.

FIG. 110: shows a schematic cross section of FIG. 103.

FIGS. 111, 112, 113: show various schematic sections of rotary yield units, where the yield plates are connected (anchored) to the peripheral edges of two integral discs (Part A) which are centred on two outer discs (Part B).

FIG. 114: shows a plan view schematic of FIG. 111.

FIG. 115: shows a schematic of a rotary unit comprised of circular discs, and with a general force limiter and energy dissipater.

FIG. 116: shows a plan view of FIG. 111.

FIG. 117: shows a schematic of a friction plate force limiter and energy dissipater within the rotary unit of FIG. 111.

FIG. 118: shows a schematic view of a rotary friction unit similar to FIG. 99 but where an elastic component (spring leaf) has been integrated with the two rotary parts.

FIGS. 119 to 123: show how the spring leaves (or elastic plates) displace with the friction units (or pads).

FIG. 124: shows a cross sectional schematic of FIG. 118.

FIG. 125: shows the outer plates of FIG. 124 relative to the inner plates.

FIG. 126: shows a schematic view of a rotary unit, similar to FIG. 118 but where the clamping connectors (e.g. tension bolts) are exterior to the friction plates (pads), that is, they do not pass through the pads.

FIG. 127: shows a cross sectional view of FIG. 126.

FIGS. 128 and 129: show the tension bolts relative to the movements of the inner and outer plates.

FIG. 130: shows a schematic view of a rotary friction unit with elastic component, the inner plate rotating with the lever arm.

FIG. 131: shows a schematic cross sectional view of FIG. 130.

FIG. 132: shows a schematic of a rotary friction unit with elastic component similar to FIG. 130, but where the outer plates rotate with the lever arms.

FIG. 133: shows a schematic cross sectional view of FIG. 132.

FIGS. 134 to 137: show the progressive displacements of the inner friction plate (shoe or pad), the elastic flexing of the spring plate, and the displacement of the outer plate relative to the inner friction pad after displacement of the inner plate (pad) has ben stopped (arrested).

FIG. 138: shows the tension bolts through the outer plate.

FIGS. 139 and 140: show schematic side views of a BETA rocker friction unit with elastic component.

FIG. 141: shows a schematic section of FIG. 140 inclusive of guides.

FIGS. 142 to 156: show further rotary units in which the friction components are curved and as above into which an elastic component can be integrated FIGS. 157 to 215: consider a corrugated friction yield block, with clamped frictionless sloping surfaces which provide an elastic component and clamped flat frictional surfaces which provide a separate plastic component.

FIG. 216: shows a schematic view of a sleeve guided rocker unit with DELTA1 yield plates FIGS. 217 to 220: show schematic views of a sleeve guided rocker unit with friction blocks and elastic (DELTA1) flexural plates.

FIGS. 221 to 224: show schematic views of a sleeve guided rocker unit with corrugated friction yield blocks.

FIG. 225: shows a sleeve guide rocker unit within which shear yield blocks are located.

FIG. 226: shows the displaced form of FIG. 225.

FIG. 227: shows a DELTA4 yield plate which elasto-plastically displaces in one direction only and returns under load to an effectively horizontal position.

FIG. 228: similarly shows a DELTA4 yield plate which elasto-plastically displaces in one direction only but returns under load to a displacement just below its initial horizontal position.

FIG. 229: shows a DELTA4 yield plate which primarily elasto-plastically displaces in one direction but returns under load to a displacement just above its initial horizontal position.

FIG. 230: shows an ALPHA1 control structure in which the yield plates elasto-plastically displace in one direction only FIGS. 231-235: show a connector located between the lever arm and the rotor plate of the drum which enables each to connect and disconnect as the control structure sways.

FIG. 236: shows both a lever arm and rotor plate coincidentally displaced downwards along with elasto-plastically flexing yield plate.

FIG. 237: shows a lever arm and rotor plate coincidentally returned to a horizontal position along with yield plate effectively horizontal (or re-straightened).

FIG. 238: shows a lever arm and rotor plate now rotationally displaced and disconnected in which the lever arm and yield plate remain effectively non-displaced and the lever arm displaced upwards.

FIG. 239: shows a non-displaced braced frame control structure within which rotary units with pin ended diagonal push rods are located.

FIG. 240: shows the braced frame of FIG. 239 in displaced form.

FIG. 241: shows a schematic of a two bay braced frame arrangement in which connect-disconnect-connect joints between the lever arm and rotor plates are employed.

FIG. 242: shows the braced frame of FIG. 241 in displaced form.

FIG. 243: shows a schematic of a flexure member (DELTA1 plate) within a BETA1 rocker with sleeve guides which is part of a control structure with an ALPHA1 rocker frame as described in WIPO, PCT/IB2017/056135 and WIPO, PCT/IB2017/056137.

FIG. 244: shows a schematic of a flexure member (DELTA4 plate) which is part of a control structure with an ALPHA2 rocker frame as described in WIPO, PCT/IB2017/056135 and WIPO, PCT/IB2017/056137.

FIG. 245: shows a schematic of a flexure member (DELTA4 plate) within a BETA rotor which as with FIGS. 243 and 244 is the force limiting and energy dissipating part of a control structure with an ALPHA1 or ALPHA2 rocker frame.

FIG. 246: shows a flexure member (plate) in a state of plastic flow under applied load P. The deforming length of the plate, between boundary reaction points increases from $2a$ to $2b$ and a reaction R, orthogonal to the plate, is generated.

FIG. 247: shows the reaction R of FIG. 246 resolved into a vertical, RV, and a horizontal, RH, component.

FIG. 248: shows the resolved components of FIG. 247 in terms of the (half) angle of rotation of the yield zone $\Theta'$.

FIG. 249: derives the applied load, P, as a function of the yield zone moment, M, and the (half) angle of rotation of the yield zone, $\Theta'$.

FIG. 250: shows a further description of the mechanics of the yielding plate.

FIG. 251: shows the reaction direction for the reverse direction of applied load P.

FIG. 252: shows the reactions for a DELTA1 plate in a state of plastic flow under applied load P.

FIG. 253: shows the reactions for a DELTA1 plate in a state of plastic flow under reverse direction applied load P.

FIG. 254: shows the reactions for a plate of constant deforming length with a curved boundary and derives the applied (or resistive) load, P, as a function of the boundary curve $\Theta$ and the (half) angle of rotation of the yield zone $\Theta'$.

FIG. 255: is similar to FIG. 254 but with a concave boundary surface

FIG. 256: is similar to FIGS. 254 and 255 but with a contra-curving boundary.

FIG. 257: derives a boundary curve $\Theta$ which is equal to the (half) angle of rotation of the yield zone $\Theta'$.

FIG. 258: derives the boundary curve, $\Theta$, of FIG. 257 in terms of rectangular coordinates, x and y.

FIG. 259: shows a positive and negative direction boundary curve for which $\Theta = \Theta'$ FIGS. 260 & 261: show the displacements and reactions for a plate with different constant slope boundary conditions.

FIG. 262: gives the resistive (or applied) load, P, for a plate with end region extensions of length a and convex boundary.

FIG. 263: similarly gives the resistive (or applied) load, P, for a plate with end region extensions of length a, and concave boundary.

FIG. 264: derives the resistive load, P, for FIGS. 262 and 263.

FIG. 265: shows a plate in a state of plastic flow, in which the horizontal displaced reaction, RH, is generated by use of a spring.

FIGS. 266 to 278: show various non-displaced and displaced forms of plates with a curved boundary in finite dimension.

FIG. 279: shows the stress-strain curves of common structural steels produced in the United States, Europe and the United Kingdom.

FIG. 280: shows the ratio of stress at a given strain, to yield stress for Histar 460 and A992 steel.

FIG. 281: shows a direct trace of the maximum (cycled) amplitude a grade 460, 8 mm plate, was load tested to.

FIG. 282: similar to FIG. 281, shows a direct trace of the maximum cycled amplitude a 12 mm grade 460 plate was load tested to.

FIG. 283: shows the ratio of stress at a given strain to yield stress for Histar 460, A992, and S460 steel (similar to FIG. 280) and adds to the horizontal axis, the displacement and plastic rotation of the plate of FIG. 281 equated with general direct strain values, and the inverses of the load reduction values derived on FIGS. 249 and 254.

FIGS. 284 to 290: show the stress strain curves of FIG. 279 along with the inverses of the load reduction factors derived on FIGS. 249 and 254.

FIGS. 291 to 297: show the resistive (or applied) load, P, as a percentage of initial (first yield) resistive force for the steels of FIG. 279.

FIG. 298: shows a plate with free translational and free rotational boundary conditions provided by a slotted anchor.

FIG. 299: shows the plate of FIG. 298 in a state of plastic flow, and the vertical (only) reactions generated.

FIG. 300: shows the plate of FIG. 298 subject to reverse applied (or resistive) load.

FIG. 301: shows the displaced form of a plate with constant curvature.

FIG. 302: shows a schematic view of a triangular tapered plate and displaced form with slotted anchor.

FIG. 303: shows local yielding within the plate of FIG. 302.

FIG. 304: shows a schematic view of an X-plate and its displaced form.

FIG. 305: shows displaced forms of the X-plate of FIG. 304 inclusive of tensile membrane forces.

FIG. 306: shows the load-displacement curve for the plate of FIG. 298, for plates which generate membrane forces, and for plates with the particular free translational and free rotational boundary conditions of FIGS. 243 to 263, and FIG. 281.

FIG. 307: shows the hysteresis loop obtained from cyclic loading the plate of FIG. 298.

FIG. 308: shows the pinched hysteresis loop of a plate which generates membrane forces.

FIG. 309: shows the hysteresis loop obtained from cyclic loading a plate with the boundary conditions of FIGS. 243 to 263.

FIGS. 310, 311, 312: show direct traces of the same 8 mm test plate, cycled to three increasing amplitudes.

FIGS. 313, 314, 315: show close ups of the yield zones of FIGS. 310 to 312.

FIG. 316: shows the yield zones of FIGS. 313 to 315 superimposed onto concentric circles.

FIGS. 317 to 321: show the strain and stress profiles for a Hi-Star 460 yield plate at linearly varying flexural strains.

FIGS. 322 to 326: show the strain and stress profiles for a Grade A992 yield plate at linearly varying flexural strains.

FIG. 327: shows the ratio of yield force to initial yield force for Hi-Star 460 steel with the flexural stress profiles of FIGS. 317 to 321.

FIG. 328: shows the ratio of yield force to initial yield force for Grade A992 steel with the flexural stress profiles of FIGS. 322 to 326.

FIG. 329: shows a schematic view of a composite yield plate.

FIG. 330: relates displacement ductility to a yield zone of given plastic curvature.

FIGS. 331 to 333: compare load paths of a conventional linear elastic system with load paths of an elastic system of two load direction dependent stiffnesses.

FIGS. 334 to 339: compare elasto-plastic load paths with elastic load paths including the elastic load paths of systems with clamped frictional sloping surfaces.

FIG. 340: shows a control structure comprised of a pivotably based rocker frame, double pin ended push rods and base located rotary yield units all forming a pivotably based control structure of vertical (tower) aspect (or pivotably based cantilever wall).

FIG. 341: shows a control structure comprised of pivotably based vertical chords, rocker frames in horizontal (spanning) aspect pivotably connected to vertical chords, double pin ended push rods and rotary yield units all forming a pivotably based control structure of a moment frame aspect.

FIG. 342: shows a control structure comprised of a pivotably based rocker frame, pivotably based exterior chords (parallel with the chords of the rocker frame) and rotary yield units distributed between and along the rocker frame and exterior chords, all forming a pivotably based control structure.

FIG. 343: shows a control structure comprised of pivotably based vertical chords, rocker frames in horizontal (spanning) aspect pivotably connected to the vertical chords, exterior chords (parallel with the chords of the rocker frame) and pin connected to the vertical chords; and rotary yield units distributed between and along the rocker frame and external chords all forming a pivotably based control structure.

FIG. 344: shows a control structure comprised of pin connected beams and columns, double pin ended push rods and rotary yield units forming a pivotably based eccentrically braced frame.

FIGS. 345 and 346: show a control structure comprised of pivotably based wall elements, connected by pin ended motion control ties, with rotary yield units located and connected between the walls, all forming a pivotably based control structure of coupled shear wall form.

FIGS. 347 and 348: show a plan view of rotary units located between the foundation and overlying superstructure.

FIG. 349: shows a schematic plan detail of the rotary units of FIG. 347/348 with a secondary flexural member.

FIG. 350: shows a longitudinal section of FIG. 347, one part of the rotary unit connecting to the foundations and the other part to the base of the superstructure.

FIG. 351: shows a schematic view of a rotary unit with DELTA1 yield plates.

FIG. 352: shows a plan view of FIG. 351.

FIG. 353: shows a schematic view of a rocker unit.

FIG. 354: shows a close up detail of FIG. 353.

FIG. 355: shows a rocker unit similar to FIG. 354 but with ten DELTA1 yield plates.

FIG. 356: shows a plan view of the rocker units of FIGS. 353 to 355.

FIG. 357: shows a plan sectional view of a guide within the rocker unit,

FIG. 358: shows a cutout in the DELTA1 yield plate.

FIG. 359: similar to FIG. 357 but with an enlarged guide.

FIG. 360: similar to FIG. 358 but with two cut outs and ties.

FIG. 361: shows a rotary unit with rocker yield units forming a third connecting part.

FIG. 362: shows a plan view of FIG. 361.

FIG. 363: shows a plan view of the connection of the push rod (of the rocker frame assembly to the rotary unit of FIG. 361).

FIG. 364: shows a schematic view of a 10 storey/35 m building with ALPHA1 frames and base located rotary units.

FIG. 365: shows a schematic view of a 20 storey/70 m building with ALPHA1 frames and base located rotary units.

FIG. 366: shows a schematic view of a 40 storey/140 m building with ALPHA2 frames and rotary units connecting to and distributed between the interior and exterior chords of the control structure.

FIG. 367: shows a rotary unit with composite plates.

FIG. 368: shows a schematic view of a 100 storey/342 m building with ALPHA2 frames and rotary units distributed over its height.

FIG. 369: shows a plan view of FIG. 368.

FIG. 370: similar to FIG. 368 but with rotary units located closer to the base of the control structure.

FIG. 371: similar to FIG. 368 but with rotary units located closer to the top of the control structure.

FIG. 372: shows a schematic view of motion control ties, for the ALPHA2 control structure, pin connecting the exterior chords to the centreline of the rocker frame.

FIGS. 373 to 374: show schematic plan views of rotary units configured as base isolation units.

FIGS. 375 and 376: show a DELTA1 yield plate in undisplaced and displaced form.

FIG. 377: shows a flexing plate with pivotable roller supports.

FIG. 378: shows one case of a simply supported plate in which the length along its flexing curve between supports increases/decreases with displacement and with flexure the plate generates a horizontal reaction. The second case shows a plate whose flexing length remains constant and in which no horizontal reaction is generated.

FIGS. 379 to 383: show the yield zones of DELTA1, DELTA2, and DELTA3 yield plates.

FIGS. 384 to 387: show schematic views of a DELTA1 yield plate within a sleeve guided rocker, where load is applied to the yield plates via the sliding hinges.

FIGS. 388 to 397: show schematic views of a DELTA1 yield plate and connect-disconnect-connect joint which produces flexing within the plate in. primarily, one direction only.

FIG. 398: shows a sleeve guided rocker unit with DELTA1 yield plate and connect-disconnect-connect (CDC) joint at end of push rod.

FIGS. 399 to 404: show sleeve guided rocker units within concentrically and eccentrically braced frames and with CDC joints.

FIGS. 405 and 406: show a sleeve guided rocker unit with friction plates and a flexing plate which provides the elastic component of the unit.

FIGS. 407 to 409: show the displacement profiles of the friction yield unit of FIGS. 405 and 406.

FIGS. 410 and 411: show schematic views of a sleeve guided rocker unit with shear yield blocks in non-displaced and displaced form.

FIGS. 412 to 418: show sleeve guided rocker units within various pivotably based control structures.

FIGS. 419 to 421: show sleeve guided rocker units configured as base isolation units.

FIGS. 422 to 429: show schematic views of sleeve guided rocker units with multiple DELTA1 yield plates.

FIGS. 430 to 440: show various pivotably based ALPHA1 and ALPHA2 control structures within which are located the rocker yield units of FIGS. 422 to 429.

DETAILED DESCRIPTION

The invention relates to a control structure which helps direct and control the motion of connected force limiting and energy dissipating structural members (preferably a plate or plates of a yield anchor (rotary unit)), which are capable of stable cycling high displacement elasto-plastic flexure about their minor bending axis, or out of plane bending axis.

The invention may comprise a device and mechanism, or more specifically a pivotably based control structure with a pivoting rocker frame assembly and rotary unit(s), which directs and governs the motion of a connected force limiting and energy dissipating structural plate(s) which are within and part of the rotary unit (yielding connector or yield connector). The plate(s) by its form is capable of producing a stable, constant resistive yield force while flexurally yielding about its minor (or out of plane) bending axis to high elasto-plastic displacements and high ductilities (while preferably not allowing or causing any membrane forces to develop within itself). The particular boundary conditions of the plate(s), which enables it to produce a constant resistive yield force while flexing to high elasto-plastic displacements are described in detail further on. The plate(s) action within the rotary unit(s) enables the control structure, it is a part of, to form a stable elasto-plastic mechanism which is able to flow and cycle to high elasto-plastic displacements and ductilities also with constant resistive yield force, in resistive response to ground (base) motion input, while internal forces within it (control structure) or any adjacent structure it may also be seismically supportive of, are maintained and limited to maximum values which are a function of the yield force of the structural plates which are part of it.

The control structure by governing the motion of the yielding plates within it in a controlled manner is subsequently modifying its own natural response (displacement, velocity, acceleration) and the response of masses or adjacent structures it may be directly or indirectly seismically supportive of.

By flowing as a stable, high displacement and high ductility capable, elasto-plastic mechanism with constant resistive yield force; the control structure is limiting the magnitude of accelerations and dynamic forces that can develop within its members as it endures the ground motion (displacement, velocity, acceleration) input of a severe seismic event.

That is, the control structure directs and controls the motion of the yielding plates; while the plates, yielding at a constant resistive force, limit the forces generated within the structure(s) (while preferably not allowing or causing any membrane forces to develop within itself).

The plates are effectively cushioning the control structures response to ground motion or base excitation.

Contingent on the plates to limit the forces within the control structure and any connected structure; is their ability to sustain potentially high cycling elasto-plastic displacements (deformation) and high plastic strains in a stable manner while maintaining a constant resistive yield force.

The magnitude of the peak elasto-plastic displacement (and ductility) demand on the plates is a function of a number of variables including; ground motion (acceleration) input, mass seismically supported by structure and its distribution, elastic natural frequency of structure(s) (inclusive of plates) and yield strength of plate(s).

The ability of the plate(s) to sustain the cycling peak displacement demands on them, while maintaining a stable constant resistive yield force is further dependent on their material stress-strain characteristics, and structural form.

The lateral strength to elastic limit, (i.e. lateral yield strength) and ductility of the control structure as a whole is solely dependent on the replaceable flexural member(s) (plate(s)). Further, neither the control structure or the plate(s) which are a part, are necessarily providing additional lateral strength or ductility to another structure (e.g. structural frame) which has a given lateral strength or ductility of its own. In other words, the control structure may simply be an independent standalone structure (supportive of, or not supportive of, masses) rather than one seismically supporting another structure. Further, the control structure (and its flexural member(s) (plates)) is able to return, after each cycle, to its original positions, solely through lateral action and without any reliance or assistance from gravity loads to 'flatten back' the yield plates.

Further, the rotary units may be used to resist/absorb single acceleration pulses (e.g. blast impact) and mechanical impact (e.g. train engine/station buffers).

During a seismic event, as described previously, storage racks and buildings can sway in a lengthwise and width-wise direction.

During a seismic event the equivalent force applied to the structure can be approximated to be acting at say around 70% the height of the storage rack 3 or load supporting structure. This does, depend on the weight distribution of goods supported on the rack 3.

The system of the current invention can be incorporated (and retrofitted) to a storage rack or structure to modify and control the displacement, velocity and acceleration response of both the structure and masses supported by it, to ground motion (earthquake acceleration) input and limit the forces generated within the members of the rack structure or building structure and the control structure, seismically supportive of it, during a seismic event.

The present invention utilises a system as part of or incorporated into a structure to restrain (but not prevent) the structure against movement during a seismic event and to dissipate energy and limit forces developed within the control structure or any structure it may be seismically supportive of as it endures ground motion input. The present invention incorporates a rocker 2000 as part of a substantially stiff and pivotably based control structure that incorporates at least one yield connector (rotary unit) to
 a) transfer ground motion induced forces from the upper region of a storage rack or building structure to the foundation, and
 b) intermediate of the foundation and the upper region through plastic yielding of the yield members (plates) within the rotary unit(s) of the control structure, limit forces that could develop both within the control structure within its foundations and within any adjacent structure it is seismically supportive of (rack or building).

The simple structural behaviour of the yield plate of the yield connector (rotary unit) 230 allows for its performance to be both load tested and calculated accurately. Its design is such that its yield force and energy absorbing performance remains predictable during each movement cycle of the control structure and storage rack during a seismic event. The yield connector (rotary unit) utilises a flexure member 100, that is able to elasto-plastically deform. Because the structural behaviour or performance of the flexure member 100 (plate(s)) is readily defined by calculation and test, and because of the simple (effectively single degree of freedom) response of the rocker frame of the control structure; the response of the control structure, as a whole, to ground motion input is readily established. It is important that the flexure member 100 (plate) is not able to develop tensile or compressive membrane forces within itself as it flexes to high transverse plastic displacements during yield. Membrane forces generated within a yielding member (plate) will both increase the (plate) stiffness and result in an increasing force resistance within the plate with increased deformation. This in turn will reduce its energy dissipating and force limiting ability, resulting in higher forces being developed in both the control structure and any adjacent structure the control structure may be seismically supportive of.

FIGS. 1 to 6 show a variety of energy absorbing systems 1000 (also herein referred to as control structures) that can be included or that can form part of a storage rack or general building structure. Their incorporation in a storage rack or building is shown in FIG. 7. FIG. 3 comprises a rocker 2000 that includes a frame 280 and a pivot anchor 240. In the examples shown in FIGS. 1 to 6 the systems may be directly connected to the foundation 4. In other embodiments herein after described, the systems may be connected to other structures or other component.

The control structure (energy absorbing systems 1000) may comprise the rotary units alone as in FIGS. 1 and 2 or a rocker 2000 (frame 280 and pivot 240) with a rotary unit(s) yield connector 230 (with flexure member(s) 100) as in FIGS. 3 and 4, or be part of a pivotably based rocker frame assembly within which the rotary units are located.

The pivot anchor 240 provides a dedicated pivot for rotational movement of the frame 280 of the control structure it is part of. The movement is constrained at least in part by the yield connectors (rotary units) 230 that are disposed outwardly from each side of the pivot anchor 240 in the lengthwise direction. Preferably the pivot anchor 240 is located centrally and intermediate two spaced apart connectors 230A and 230B. Preferably the connectors 230A and 230B are the same.

In some embodiments, the rocker 2000 comprises a frame 280 which engages the two spaced apart yield connectors 230 and the pivot anchor 240. The frame 280 may be part of the storage rack or be incorporated therewith preferably to extend and be secured (directly or indirectly) to an upper region 27 of the storage rack 3 or to each floor of a general building structure. The upwardly extending parts of the frame 280 connecting to the storage rack allow for some or all of the forces from the swaying of the rack 3 or structure to be transferred to the pivot anchor 240 and the yield plates of the yield connector (rotary unit) 230. The motion of the frame 280 being compatible with the motion of the rack 3 or structure. That is, the connection between the control structure and any other adjacent structures it is seismically supportive of must be compatible with the motion of the control structure. For example a vertically slotted pinned connection at the centrelines of the frame pivot 240 or chord base pivots 315. The frame 280 may be short as shown in FIG. 1 or tall as shown in FIGS. 2 & 3. A short frame 280 may be joined to an upper region by ties, struts or cables 270 to provide the force transfer during swaying, as shown in FIG. 1. In this case, the control structure is comprised of the rotary unit alone (without a rocker frame). The short frame embodiment as shown in FIG. 1 may be utilised where lower rack heights are encountered. Where higher rack 3 heights are encountered, a tall frame embodiment may be desirable.

FIG. 1 shows an embodiment that may be best suited for a low storage rack height or where tie cables 270 may be used. Preferably the tie cables 270 do not exceed a 45 degree angle with the foundation. This helps them efficiently transfer lengthwise forces from the storage rack 3 to the rotary unit.

The tension bracing wires connecting to the rotary unit are preferably maintained horizontal. This is achieved in FIG. 48 by the use of cable guides.

The energy absorbing system 1000 (control structure) may be joined to an upper region 27 of a storage rack 3. This may be two thirds up the height of the storage rack 3. This is a typical approximation of where the equivalent applied forces from seismic activity may be focused. It is envisaged that a person skilled in the art will realise that the energy absorbing system 1000 may be engaged at any height and at any number of heights to a storage rack or building.

Preferably the energy absorbing system 1000 comprises a top attachment 250. The top attachment 250 is be configured to attach to a member such as bracing 26 (sometimes known in the industry as plan bracing) of the storage rack 3. If the bracing is a strut or other similar stiff member, preferably this top attachment can pivot so it does not create any torque or moments in the frame 280 or rack 3.

The bracing 26 is merely a method of connecting the top of the frame 280 or top attachment 250 to the storage rack 3. Where two racks are provided back to back, bracing is typically located intermediate of the racks as shown in FIG. 8. Plan bracing and connections can also be located at beam levels below the top of the structure.

The plan bracing 26 can span two or more racks. Intermediate the two racks is gap 23 where the energy absorbing system 1000 is located. In alternative embodiments the energy absorbing system 1000 is located at the front face of a storage rack or on both the front and back face.

The frame 280 is preferably a relatively stiff structure compared to the flexible nature of the flexure member 100 (yield plates). Preferably the frame 280 is of a truss type configuration. The truss may be of a multitude of designs and configurations as appropriate for the construction and required functional characteristics of the energy absorbing system 1000. In applications to general building structures a stiff planar reinforced concrete element could also be used for frame 280.

As briefly described earlier, the energy absorbing system 1000 (control structure) is connected or able to be connected to the storage rack 3 or other structure at or near its upper region 27. It is retrofittable to the storage rack or other structure. Given that the stiff frame 280 has little internal displacement (distortion) under applied load, the stiff frame 280 gets rocked or rotated about the pivot anchor 240. The role of the frame 280 is to transfer forces during length wise movement from the upper region 27 to the pivot 240. The rocking movement about the pivot anchor 240 is transferred to the spaced apart yield connectors (rotary units) 230. The rocking movement is then at least partially absorbed by the flexure members 100 (yield plates) (within and part of the rotary system) as these plastically flex. For example, as shown in FIG. 3B, a lengthwise movement of the storage rack 3 to the right will cause clockwise rotation of the frame 280 about the pivot anchor 240. This will cause the extended arm of the yield connector (rotary unit) 230A to move in an upwards manner and the extended arm of the yield connectors 230B to move downwards. The lengthwise movement (induced by ground motion) of the upper region 27 is transferred into substantially rotational movement (in one embodiment) in the yield connectors 230. The rotational displacement (motion) of the yield plates within the rotary unit is directed and controlled by the control structure of which the yield plates are a part. The yield plates with their particular free translational or free translational and free rotational end region boundary conditions, in deforming (flexing) beyond their yield deflection produce a constant resistive yield force which in turn limits the forces that could develop within the control structure and any adjacent structure it may be seismically supportive of.

FIGS. 9 & 10 show another embodiment of the energy absorbing system 1000. FIG. 9 shows a control structure in its non-displaced condition, and FIG. 10 shows a control structure in a displaced condition.

This embodiment is referenced by numerals 300. I.e. the frame 280, is referenced as the frame 380 and so forth. In this example, the energy absorbing system 1000 effectively comprises two pivot anchors connected by a frame 380. The frame 380 pivots about each pivot anchor 340 and also connects to the rotary units (yield connectors). The yield connectors 331-334 are rotary units of which the flexure members (yield plates) are part of. The control structure of FIGS. 9 and 10 is a pivotably based rocker frame assembly with rotary yield units.

The energy absorbing system 1000 locates a rocker 2000 intermediate of two substantially stiff vertical chords 310 (also known as vertical chords) that can sway relative to the ground. The vertical chords 310 are pivotally connected by pivot anchors 315 to the foundation 4. The vertical chords 310 are shown schematically in FIG. 9. In summary, the rocker 2000 comprises a frame 380 and two pivot anchors 340. The four yield connectors 331-334 are engaged to the respective vertical chords 310. The yield connectors 331-334 are rotary units (with yield plates) which connect to vertical chords 310. The extended lever arms of the rotary units connect to the rocker 2000 via pin connected push rods.

The frame 380 is preferably a stiff truss like configuration, as described previously, to help transfer forces and movement between the two stiff vertical chords 310. The function of the two pivot rocker 2000 is much the same as the rocker 2000 previously described. It comprises pivot anchors 240 that allow the frame to pivot relative the vertical chords 310. The yield connectors 331-334 and the frame pivots 240 in this embodiment are not anchoring the rocker 2000 or frame 380 directly to the foundation, but anchoring the frame 380 to each vertical chord 310 that in turn is pivotally anchored to the foundation 4. The foundation 4 is the floor of a structure, a foundation, or a beam or truss type system.

The pivot anchor 315 is engaged to the foundation 4 and defines a rotational axis parallel to the foundation 4 and perpendicular to the lengthwise direction of the control structure. In the preferred embodiment the upper regions 312 of the stiff vertical chords 310 may or may not be connected/engaged with the upper region of the storage rack 3 or building structure.

In a preferred embodiment, there is a first upper yield connector 331 and a second upper yield connector 332 respectively connected to a first of said stiff vertical chords 313 and a second of said stiff vertical chords 314. Furthermore there is a lower first yield connector 333 and a lower second yield connector 334 connected to respective first vertical chord 313 and second vertical chord 314. The extended arms of the upper yield connectors 331 and 332 deflect in the direction of movement of the storage rack 3 during lengthwise movement of the storage rack 3, and the extended arms of the yield connectors 333 and 334 deflect in the opposite direction of lateral movement of the storage rack 3 during seismic activity.

The frame 380 stays substantially horizontal during motion and together with the yield connectors (rotary units) 331-334 allows, yet resists, the racking movement of the energy absorbing structure.

FIG. 11 shows the displacement of the control structure for the case of differential vertical displacement between vertical supports due to vertical ground acceleration. FIG. 12 shows displacement due to combined horizontal and vertical ground displacement.

One type of yield connector (rotary unit) 230 that may be used for many embodiments of the energy absorbing system 1000 herein described is shown in FIGS. 13-17.

As discussed previously, it is ideal that tensile or compressive membrane forces do not develop in the flexure member 100 (plate) of the rotary unit (yield connector). Briefly, the flexure members 100 peripheral end regions 232 should be able to translate freely without impediment or restriction, or being encumbered, fettered or the like during a yielding condition. The ability of the end region 232 to translate relatively freely during yielding or flexing of the flexure member is preferred to allow the flexure member 100 to be pulled and deformed/deflected into a curve. In other words the yield member 100 plates are free to flex simply and extend without generating any tensile or compressive membrane forces in the end regions 232 and hence within themselves and for the plate, shown in FIG. 21, also be free to rotate at its end regions so as not to develop any unintended end moments.

In one embodiment the peripheral end of the flexure member (plate), has a translational and rotational end condition as shown in FIGS. 17, 20 and 21. This particular free translational or free translational and free rotational boundary condition is an extension of the plate itself. The deforming length of the plate is able to change (increase/decrease) between its reaction points as the plate flexes. The peripheral end of the flexure plate described herein, alternatively may be a continuous boundary with translational freedom or a rotationally restrained boundary with translational freedom as shown in FIGS. 37 and 39.

FIGS. 35, 37, and 39 are of yield plates defined herein as DELTA plates (specifically DELTA4, DELTA5 and DELTA6). Their particular boundary conditions (e.g. sliding hinge) allow the yielding plate(s) to change length (extend/retract) along their deforming curves (between reaction points) as they elasto-plastically flex. The significance of this property/feature, which enables the yielding plate to maintain a constant resistive yield force as it elasto-plastically flexes to high-displacements is described in detail further on.

The yield connector must also allow for relatively easy lateral translation of a flexure member 100 end region during yielding. This lateral translation during yielding, allows the flexure member 100 to deform and flex and extend during yielding without stretching, or generating membrane tension in the flexure member, or prying at the end regions. And subsequently the substantially lateral translation of an end region allows the flexure member 100 to be driven in the opposite direction, during its operational yielding in the opposite direction, without the flexure member 100 crumpling or kinking.

FIG. 13 shows the yield connector 230 (rotary unit) in non-deflected condition, and FIG. 14 shows a yield connector 230, with the flexure members 100 in displaced form. FIGS. 13 and 14 utilise a pin 234 and slot 235 system to allow both translation and rotation at end region 232. The slot or hinge is an extension of the plate itself. The deforming length of the plate along its line of flexure, inclusive of the slotted hinge, increases or decreases as the plate flexes. The pin remaining fixed in space.

In a first embodiment (designated here as a BETA1 rotary unit or BETA1 rotor) (FIGS. 13-17) the rotary unit comprises a first part being a relatively inflexible circular drum 600 set between and rigidly connected at each of its ends to rotor plates 601 each with an integral arm 602 which extends from the rotor plates and pin and slot connects (with return spring) with the ties 603 (or push rods) (first structural member) of the control structure.

Flexure member(s) (plates) 100 are rigidly fixed one end (first region) 100 to, and distributed around, the circumference of the drum (first anchor) 600 in the form of an impeller. The first region of the plate moving in a circular arc with the first anchor at the rotatable drum. The first part of the rotary unit comprises the drum 600, rotors 601 with arms 602, and flexure plate(s) 100. This assembly is supported off an axle shaft 604 centroidal with the rotational axis of the drum and which rotationally connects the first part with the second part of the rotary unit which comprises an outer casing 605 or housing which is mounted off a horizontal structural base 4 or foundation (second structural member). The peripheral ends (second region) 232 of the flexure member(s) (plates) (opposite the first region of the plate 231 rigidly fixed to the drum 600) have particular translational or translational and rotational boundary conditions 235 and are restrained from circular arc motion at their ends by pins (second anchor) 234 connecting their translationally or translationally and rotationally free end(s) (second region) 232/235 to the exterior housing 605, or second part, of the rotary unit (the first and second part of the rotary unit being pivotably connected by axle shaft). Rotation of the rocker frame 2000, of the control structure, about its base pivot 250 causes the connected pin ended ties (or push rods) 603 to push and pull the extended arms 602 of the rotor plates 601, and rotate the circular drum (first anchor) 600 of the rotary unit 230 to which the flexure member(s) (plates) 100 are fixed and circumferentially distributed. The end region (first region) 231 of the flexure member(s) (plates) is rigidly fixed to and around the circumference of the drum (first anchor) 600 and rotates and arcs with the drum. Because the opposite (peripheral) end (second region) 232/235 of the flexure member(s) (plates) are restrained against arc motion by pins (second anchor) 234 an inter annular shear force is developed which causes the flexure member(s) (plates) 100 to elastically or elasto-plastically flex.

In a second embodiment (designated here as a BETA2 rotary unit or BETA2 rotor) (FIGS. 18-25), the rotary unit 230 again comprises a relatively inflexible rotatable inner circular drum(s) (first anchor) 600 to and about which the flexure member(s) (e.g. plates) 100 are rigidly fixed at their first region 231 and distributed around the circumference of the drum (first anchor) 600 in the form of an impeller.

The peripheral end (second region) 232/235 of the flexure member(s) (plates) 100 again have their particular translational or translational and rotational boundary conditions 235 and are restrained from circular arc motion at their ends by pins (second anchors) 234 connecting the peripheral ends (second region) 232/235 with a second (outer) annulus 607 (second part of rotary unit) of the form of a turbine casing which is concentric with the inner rotatable drum 600 (first part of rotary unit). The outer (casing) 607 is fixed against movement and anchors to a structural base 4 (second structural member). The inner rotatable drum(s) 600 may be set between circular end plates (rotor plates) 601 which are rigidly fixed to and supported off a torque axle shaft 604 rotatably fixed to a structural base 609. A rigid arm 606 located exterior to the concentric drums 600, 607 connects orthogonally with the axis of the torque shaft 604 and extends to pin and slot connect (with return spring) 608 at its opposite end with the push rods 603 of the control structure (first structural member).

In a further embodiment to above, the inner rotatable drum 600 extends beyond the outer circular casing 607 to also function as both the first anchor 600 and the torque shaft.

FIGS. 22-25 show various arrangements of rotary units in plan view. FIG. 22 shows a single rotary unit with a pair of symmetrically arranged arms. FIG. 23 shows a single rotary unit eccentric to the push rods of the rocker frame 2000. FIG. 24 shows a pair of rotary units in transverse or parallel formation, overall centred on the rocker frame. FIG. 25 shows a pair of rotary units longitudinally arranged or in series, overall centred of the rocker frame 2000. FIGS. 24 and 25 can be combined to form an overall system with four rotary units. The horizontally extended arms 602 of FIGS. 13 and 18 can similarly be vertically extended. Where the rotary units are standalone control structures without rocker frames (FIGS. 1 and 2) the multiple units of Figured 24 and 25 are similarly possible.

A detailed view of the pivot anchor 340 engaged to a vertical chord 310 as per the configuration of FIG. 9 is shown in a side view in FIG. 26 A plan cross sectional view is shown in FIG. 27. Preferably the pivot anchor 340 is pinned by a pin 342 to the vertical chord 310 through the centroid of the vertical chord. The pivot anchor 340 has a pivot axis 341, and the pin 342 allows the frame 280 to pivot about the pivot axis 341 on the vertical chord 310.

FIGS. 28 and 29 show two embodiments of the energy absorbing system 1000. The system 1000 comprises a two pivot rocker 2000 as previously described. Instead of the system 1000 being engaged intermediate two vertical chords as in FIG. 9, it is engaged between a base (like a foundation 4 or floor) and a beam, roof, ceiling or upper region of a rack 2.

In a further embodiment as shown in FIG. 29, there may be multiple energy absorbing structures 1000. For example a very tall (and/or heavy) storage rack 2 or structure may have four to twenty (or more) energy absorbing structures 1000 spaced apart along its height. In typical embodiments, each energy absorbing structures 1000 is preferably identically configured and of a kind herein described.

Alternatively the embodiment shown in FIGS. 28 and 29 may be used between a top hat 500, such as a stiff beam or truss, and a lower beam or foundation of a storage rack. In which case the top hat 500 may be connected to the plan bracing of the storage rack. The top hat 500 is connected to the upper pivot of rocker 2000. The top hat 500 both increases the elastic stiffness of the control structure, reducing its elasto-plastic displacement during a seismic event and increases the strength and energy absorbing capacity of the control structure. These lateral extensions of a system can be attached to plan bracing of a storage rack or structure and increases the amount of contact and leverage the energy absorbing structure 1000 has with the rack 2. Ties 501 may also be used where the system is used on the end of a storage rack, and not on the side of a rack.

FIG. 29 shows a further embodiment where a top hat joins to energy absorbing structure 1000. The energy absorbing structures 1000 is engaged at their upper and bottom regions so the effects of any lateral movement will be moved through into each yield connectors much like as described in FIG. 9.

An example of an energy absorbing structure 1000 (control structure) in a general building structure form is shown in FIG. 30 where the stiff vertical chords are shown as trusses. A close-up view of the yield connectors (rotary units) 230, having multiple flexure members 100 (plates) joined to a frame 380, and the vertical chord 310 is as shown in FIGS. 13 and 18.

A further embodiment of an energy absorbing system 1000—'shear type' embodiment, with 'shear type' yield connectors 230, is shown in FIGS. 31 and 33.

Here flexural yielding in the plates is a response to the inter-lamina shear forces and displacements generated between an exterior chord and an interior frame chord as the pivotably based control structure sways in response to ground motion input.

FIG. 31 shows an energy absorbing system 1000 (control structure), with a frame 280 pivotable about a pivoting anchor 240. The frame 280, and pivot anchor 240 are as described previously. The yield connectors (rotary units) 230 are located on either side of the frame 280. Two stiff vertical chords 310 are located on either side of the frame 280, and are pivotably anchored to the foundation (or like, such as a floor or beam) preferably by a vertical chord pivot 315. Intermediate each vertical chord and the frame 280 are one or more yield connectors 230. In this embodiment the yield connectors 230 transfer inter-lamina shear force between the exterior chords 310 and the interior chords of the frame 280. This shear force rotates the drum of the rotary unit relative to its casing and produces flexing in the plates (flexure member 100). Their flexural yielding absorbs energy and limits forces within the control structure or any adjacent structure it may be seismically supportive of. The control structure produces a shearing motion between the frame 280 and a stiff vertical chord 310 when the system is rocked by an earthquake for example. This embodiment still shares the same concepts as the energy absorbing systems 1000 as previously described—where the rocker 2000, translates lateral movement from the upper region 27 about the pivot anchor 240, to thus influence the yield connectors (rotary units) 230 on each lateral side of the pivot anchor 240.

Examples of the yield plates within the rotary units are shown in FIGS. 35-39 and described later.

In a further embodiment as shown in FIG. 33, the 'shear type' energy absorbing system 1000 (control structure) may also be utilised in a horizontal configuration. In this embodiment the energy absorbing system 1000 is rotated horizontally. The two pivot 240 rocker 2000 is placed intermediate two stiff horizontal chords 510.

Both the energy absorbing system 1000 and the horizontal chords 510 are retained and engaged intermediate two stiff pivotably based vertical chords 310 as previously described. In this embodiment, the energy absorbing system 1000 shares the same yield connectors (rotary units) 230 as described earlier. The horizontal chords 510 are pivotally attached at each of their ends to the two spaced apart and pivotably based vertical chords 510.

The relative movement of the vertical chords 310 and the rocker 2000, creates relative rotational displacement between the drum and housing of the rotary unit. This produces flexure and yielding in the yield plates (yield members 100).

The yield connectors 230 as used in the vertical or horizontal shear embodiment are shown in detail in FIG. 35—a non-displaced condition, and FIG. 36—a displaced condition. FIGS. 37 and 39 respectively show the cases of flexurally continuous and rotationally restrained inter annular shear transfer flexural plates. Non displaced and displaced conditions are shown. FIG. 35 shows a simple embodiment with only one flexure member 100. In other embodiments there are multiple flexure members circumferentially distributed about and fixed to the surface of the drum of the rotary unit.

As stated previously all yield plates within and part of a control structure are detailed to be free to translate at their peripheral end region so as to help avoid self-generate internal membrane forces when flexing to high elasto-plastic displacements.

The flexure member 100 is preferably connected at its end regions 231 and 232. The end regions of each flexure member 100 are connected to, or engage with the drum (inner annulus) 600 and circularly distributed pin restraints 234 fixed to the housing 605/607 of the yield connector (rotary unit). The yield connector (rotary unit) 230 is engaged intermediate or is integral with and along
  a) the vertical chord 310 and rocker 2000, in the vertical embodiment, or
  b) the horizontal chord 510 and rocker 2000, in the horizontal embodiment.

In one embodiment as shown in FIG. 35, each end region of the flexure member 100 has different engagement types. As shown in FIG. 35, one end region 231 of the flexure member 100 has a rigidly fixed connection which is rigidly constrained to the drum of the rotary unit. The opposite end region 232 of the flexure member 100 has a sliding and pivoting engagement with the pin restraints fixed to the outer housing of the rotary unit. The sliding engagement helps prevents the flexure member 100 (plates) from developing direct tensile or compressive membrane forces within itself.

Because the connection between the rotor plates (extended arm) of the rotary unit and the chord(s) is slotted (i.e. it can slide relative to), the entire system must be tied together. For this reason, rigid, but pin ended motion control ties 400 should be utilised to connect the vertical chords 310 to the rocker 2000. The ties 400 are preferably pin connected to the centrelines of the exterior chords 310 and the centreline of the frame 280. The ties 400 are seen in FIGS. 41 and 42, a non-displaced and displaced condition respectively. FIG. 43 shows the ties in a displaced condition for the horizontally orientated system.

Here more specifically, and as previously referenced in the list of figures,
  a) rocker frames with pin ended push rods which connect to horizontally or vertically mounted rotary units (yield connectors) (FIGS. 3, 9, 28-30) are designated as ALPHA1 rocker frames
  b) shear type rocker frames with exterior chords which are parallel with the interior integral chords of the rocker frame and between which the rotary units are located and distributed (FIGS. 31 and 33) are designated as ALPHA2 rocker frames
  c) flexure member(s) 100 (plates) with second end regions which are simply supported (FIG. 35), flexurally continuous (FIG. 37) or rotationally restrained (FIG. 39) are respectively designated as DELTA4, DELTA5, DELTA6 plates
  d) rotary units with side housings (FIG. 13) and rotary units with annular (turbine type) housing (FIG. 18) are respectively designated as BETA1 rotors and BETA2 rotors.

Preferably the entire system is composed substantially of metal. Even more preferably, composed of steel. The pivotable anchors, chords, frame, trusses are substantially stiff and strong so as not to substantially flex or yield during a seismic event. There are variations that are available to an engineer to design the trusses, body, chords et cetera. For example the frame 280 could comprise a stiff planar reinforced concrete element. This results in a composite concrete/steel control structure.

In further embodiments, any of the embodiments above may utilise a secondary flexure member for added control and resilience (FIGS. 44 and 45). Where the secondary flexure member is intermediate a yield connectors (rotary units) and the equivalent foundation (i.e. the foundation 4 or a vertical chord, or ceiling). The secondary flexure members add in a second structural layer. In this case the yield plates of the rotary units can have flexural deflection (travel) limiters (e.g. a drum rotation brake) which stop plastic flexure in them at a prescribed limit. Only after these limiters engage is the second tier system able to yield.

By adjusting the relative strengths and elastic stiffness's of the yield plates (rotary units) and secondary flexure member a bi-linear elastic stiffening system can be developed in which yield can occur in one member only (either plate or secondary member) or both.

The secondary flexure member allows the elastic frequency of the control structure, and any structure the control structure may be seismically supportive of, to be varied without change to the rotary units or plates within. As above it can also be used to provide a two-tier ductile system.

FIG. 46 shows a load-displacement graph for a two tier ductile system. Line a represents the elastic response of the yield plate (elastic stiffness k1) combined with the elastic response of the secondary flexural member (elastic stiffness k2). Line b represents plastic yielding of the flexural plates at constant resistive yield force. Line c represents the continued elastic response of the secondary flexural member only, after the flexural displacement of the yielding plates has been stopped by motion or travel limiters, and line d represents the second tier of plastic yielding, this time in the secondary flexural member.

In FIGS. 55-61, sliding or sliding and rotation of the end region of the plate is achieved by slotting of the rotary units housing or outer annulus. Of significance as described in detail further on, these boundary conditions, although they provide free translational or free translational and rotational movement of the peripheral end regions of the plate, they do not enable the plate to produce a constant resistive yield force while flexing to high elasto-plastic displacements. Here, in contrast to all the previously described boundary conditions, the length along the flexing line (curve) of the plate is not changing with displacement, and horizontal reactions are not developed at the plates reaction points.

In a further embodiment shown in FIGS. 62 and 63, the sliding or sliding and rotating end of the plate is conversely located at the rotating inner anchor.

A further embodiment is where a spring or elastic structural component is added to the pin ended ties connecting the frame 280 to the yield connectors in the ALPHA1 frame or a spring added at the connection of the exterior chords to the horizontal or vertical bases of the shear action ALPHA2 frames. This also allows another independent adjustment of the control structures natural elastic frequency.

Where a ground 2 has been mentioned, it is envisaged that the ground could also be a floor or ceiling of a building or structure, a beam, or truss, or part of a structure that is engaged to the anti-racking system as described.

It is appreciated that where all of these structures and systems herein described are symmetrical, the systems may be halved or doubled or so forth and still be effective. For example the energy absorbing system 1000, may only have one yield connector 232 on one side of the pivot anchor 240. In a similar fashion, the energy absorbing system FIG. 41 may also be halved so there is only one set of yield connector 430 spaced between a frame 400 and one stiff column 310.

The embodiments described above may be altered and combined together to form further embodiments. A person skilled in the art will realise that these configurations can be adapted to suit many different purposes and functional characteristics of a structure or storage rack. Such as the height of the structure or storage rack, the number of storage racks to restrain, the weight of the structure or storage rack, the weight of the goods or structure, the tendency and frequency and magnitude of seismic events where the structure or rack is installed. Furthermore these configurations may be adapted depending on the materials used and the factor of safety required.

Features, Advantages and Attributes

1. The control structure, comprised of a base pivoting rocker frame assembly and force limiting and energy dissipating flexural members (plates) contained within rotary units, is able to form a kinematically simple and stable elasto-plastic mechanism which is able to flow and repetitively cycle, and sustain very high elasto-plastic (deformations) displacements and ductilities while maintaining a constant resistive yield force. The constant resistive yield force produced by the yielding flexural members, with their particular translational or translational and rotational boundary conditions, enables the control structure, of which the rotary units are a part, to limit response accelerations and dynamic forces within itself, within its foundations, or within or any masses or structures it may be seismically supportive of as it resists and endures severe ground or base motion input.
2. The form of the control structure produces a simple elasto-plastic dynamic response which is primarily of single degree of freedom. Its dynamic behaviour is consequently predictable and simple to analyse.
3. The flexural members (plates) within the rotary units remain structurally stable while flexurally yielding about their minor bending axis to very high reversing elasto-plastic displacements (deformations).
4. The flexural members (plates) are detailed to translate or translate and rotate at one of their end regions allowing them to flex (deform) to very high elasto-plastic displacements without generating any membrane stresses within themselves.
5. The elasto-plastic behaviour of the flexural plates (with their particular boundary conditions) is simply determined theoretically and the limits of their performance under extreme cycling load demand readily established by load testing.
6. The flexural members (plates) and rotary units containing them are able to maintain a high and consistent yield displacement (i.e. displacement at elastic limit) yield strength
elastic stiffness
ductility
while the plates cyclically flex to very high elasto-plastic displacements and very high ductilities.
7. Because of the form of the overall control structure, the attributes of the flexural plates; high ductility, stability, toughness, constant resistive yield force, analytical simplicity, predictable response and load test established performance, all translate to be attributes of the control structure as a whole.
8. The grade and type of material (e.g. steel) of the yielding elements (plates) is able to be specified independently of the material (e.g. steel) used for the overall superstructure of the control structure.
9. Because of the form of the overall control structure its fundamental structural and dynamic characteristics (e.g. yield strength, elastic natural frequency, ductility) are able to be adjusted by varying the characteristics of the flexurally yielding elements (plates) of the rotary units alone.
10. The constant resistive force produced by the rotary units in yielding, and the subsequent constant resistive yield force of the control structure as a whole, is able to be continuously adjusted simply by varying the length of the lever arm (extended arm) of the rotary unit, i.e. without any change to the flexural members of the rotary unit.
11. The addition of a secondary flexural base member, integral with the rotary unit in conjunction with the variable length lever and of the rotary unit allows both the constant resistive yield force of the control structure and the elastic natural frequency of the control structure to be each continuously and independently varied without any change made to the flexural members of the rotary unit.

12. Elasto-plastic yielding (deformation) within the control structure is confined to flexural yielding of the plates within the rotary units. These plates and units are able to be replaced while the overall structure is retained and re-aligned.
13. The yielding elements (plates) and rotary units, on which the structural and dynamic performance of the control structure and any other control structure it may be seismically supportive of, are dependent, are able to be independently produced using independently sourced materials in a quality controlled environment (i.e. factory).
14. The use of multiple plates within a rotary unit and multiple rotary units smooths the effect of any material or construction (e.g. weld) defects or variations within a particular plate or unit. That is, the rotary units are able to provide a high degree of structural redundancy (backup) to overall structure.
15. The rotary units are able to contain multiple flexural yield members (plates) distributed around their rotatable drum (first part) which are able to produce a high combined resistive yield force; while the rotary unit is able to be relatively compact.
16. The yield plates, (with their particular boundary conditions which enable them produce a constant resistive yield force while flexing to high elasto-plastic displacements) limit and control internal (dynamic) forces within the control structure (or structure the control structure is seismically supportive of) as the control structure resists and endures input. Because of the reduced internal forces, the control structure's superstructure its supporting foundations and any structure it is seismically supportive of are able to be more economically designed.

Further, the constant resistive yield force produced by the plates, while flexing to very high elasto-plastic displacements and very high ductilities (plastic strains) allows a constant value for yield strength to be used in an elasto-plastic time history analysis. The accuracy and reliability of the analysis is maintained at very high ductilities. While allowances are made for yield plateau gradients and strain hardening with analysis of conventional structures, accuracy and reliability of the analysis is rapidly lost with increasing ductilities (plastic straining). For example the assumption of a bi-linear material response with a simple 5% yield plateau, results in strengths (used in the analysis) of twice initial yield strength at ductilities of 20 and three times initial yield strength at ductilities of 40. These values resulting in both an incorrect and unsafe analysis.

All plates (flexure member 100) described here are able to cyclically flex to high elasto-plastic displacements and high ductilities while remaining stable and maintaining a constant resistive yield force.

The control structures that they are part of, are consequently also able to maintain a constant resistive yield, and limit forces generated within their structures as they endure and respond to base motion (seismic) input. The particular boundary conditions of the plate(s), which enables it to produce a constant resistive yield force while flexing to high elasto-plastic displacements are described in detail further on.

The flexural member's (plate's) geometry (shape) and strength along its direction of flexing is configured so that flexural yielding (i.e. plastic flow, plastic strains, plastic curvature) within the plate (refer FIGS. 64, 67, 70) is preferably confined to a specific finite 'yield zone' 5000 within the end regions 5002, 5004 of the plate immediately adjacent the plate's anchors 5003, 5005. The plate remains preferably elastic 5001 between the yield zone 5000 within the first region(s) 5002 of the plate adjacent its first anchor 5003 and the distal yield zone 5000 within the second end region(s) 5004 or between the yield zone 5000 within the first end region 5002 (adjacent the first anchor) 5003 of the plate and a distal non-yielding second end region 5004 (adjacent a second anchor) 5005.

A person skilled in the art will understand that confinement of yielding to these zones may be achieved simply by the use of a rectangular plate of constant cross section and material properties (prismatic) along its direction of flexure.

The elasto-plastic deflection profiles shown in FIG. 64 are a direct trace taken from a rectangular constant section (prismatic) 8 mm plate which was cyclically load tested, first to ten load reversals, each to an elasto-plastic to elastic limit deflection ratio (ductility factor) of 25 and then into a final ratio (ductility) set of 50. A constant yield load and yield zone was obtained with each cycle with no breakdown (e.g. cracking or splitting) in the plate. The natural extent of the yield zone obtained from such testing can be further ensured, controlled or reduced by reduction (necking) of the width (or thickness) of the plate in the yield zone regions as shown in FIGS. 66, 69, 72.

In a further embodiment the yield zone region of the plate may be tapered as in FIG. 73.

FIGS. 74 to 80 show that by simply varying only the length of the extended arm (lever arm) of the rotor plate of the rotary unit, the constant resistive yield force of the control structure (as a whole) is directly and proportionally varied. That is, the constant resistive force, R, (FIGS. 75 & 77) or torque, T, produced by the elasto-plastically flexing yield plates within the rotary unit(s) is maintained, while the subsequent (geared) constant resistive yield force of the control structure (equivalent to V, FIGS. 78, 79) may be continuously adjusted (varied) by changing the lever arm length from say a to b (FIGS. 74 to 77), i.e. the rotary unit has gearing adjustment.

The elastic natural frequency of the control structure as a whole is also subsequently varied with the change in lever arm length (while the structural (global) displacement ductility capacity of the control structure is maintained). The addition of a secondary flexure base member (FIG. 80) integral with the rotary unit allows for both the constant resistive yield force of the control structure and its elastic natural frequency to be each continuously and independently adjusted (variable). This allows for the elastic and elasto-plastic displacement, velocity and acceleration response (response spectra) of the control structure to be continuously varied, with no change made to the superstructure (e.g. rocker frame) of the control structure or the flexural members of the rotary unit, or any structure it may be seismically supportive of.

Variation of the structural properties (form, strength, stiffness, materials) of the flexure member(s) (yield plates) within the rotary units and variation of the relative proportions (dimensions) of the rotary unit itself allows for further flexibility in adjustment again.

FIG. 81 shows a further embodiment of the rotary unit. Here the force limiting and energy dissipating flexural member(s) (plate) are located at the outer periphery of the rotary unit. A DELTA1 yield plate within a BETA1 sleeve guided rocker, as described in WIPO PCT/IB2017/056135 and WIPO PCT/IB2017/056137, pivotably connects one end to the second part of rotary unit and via the push rod of the sleeve guided rocker and a rigid impeller (length L2) to the first part (circular drum) of the rotary unit.

The push and pull of the double pin push rods of the control structure, as described previously causes the extended lever arm (length L1) of the drum end rotor plates to rotate the circular drum.

The rigid impeller arms, rigidly connected circumferentially to the circular drum (cylinder), rotate with the drum, their peripheral pin ends arcing in a circular motion and causing the (second) push rods of the sleeve guided BETA1 rocker unit to elastically or elasto-plastically displace the DELTA1 yield plate, and similarly produce a constant resistive yield force, R, and constant resistive torque, T. As above, the length, L1, of the extended lever arm of the rotor plate (integral with the drum and pin/slot (with return spring) connecting to the push rods of the control structure) can be continuously varied (or geared) to adjust the constant resistive yield force, P, of the push rods, and the constant resistive force, V, of the control structure as a whole. Further as above a secondary flexure member base can be integrated with the rotary unit to provide continuous and independent adjustment of both the resistive yield force and elastic natural frequency of the control structure as a whole.

In a further embodiment shown in FIG. 82, the flexure member (DELTA1 yield plate) of FIG. 81 is substituted with another type or form of force limiter and energy dissipater.

FIG. 83 shows a part of FIG. 82 in displaced form.

FIG. 84 shows the general force limiter and energy dissipater of FIG. 82 as a clamped friction plate(s) with slotted central plate. Here the three plates will not displace (slide) (relatively) until a threshold force, R, within the push rods of the BETA1 rocker is reached. The threshold force, R, is the force required to overcome the resisting friction forces between the friction plates, which are clamped together by friction grip bolts, with or without spring washers, to a known and specified clamping force, C. The force, R, required to slide the plates is preferably constant while the plates slide. The force, R, determined by load test.

Friction unit assemblies discussed herein typically consist of three friction block or friction plate elements. These comprise a slotted central or interior plate or block sandwiched between two outer or exterior plates. The clamping force from a tensioned bolt or sprung washer is applied directly to the outer plates only. That is, bolt heads, bolt nuts or sprung washers are in contact only with the outer plates or blocks. Only the inner plate is slotted. The contact surfaces (friction surfaces) between the inner plate and outer plates are able to displace (slide) without exerting any lateral force on the clamping bolts.

FIG. 85 shows a further embodiment of a rotary unit. Here the extended arm of the rotary unit, pin connecting to the push rods of the control structure (and centre to centre length L1), cause a central circular plate (in or parallel with the plane of the lever arm) to rotate about its centroidal axis. The rotatable plate connects with the second part of the rotary, unit (here annular rings, either side of the central plate), with clamping friction grip bolts with or without spring washers. As with FIG. 84 the two parts of the rotary unit will rotatably displace relative to each other once the frictional resistance of the plates is overcome, the force required to overcome this frictional resistance, R, preferably constant as the plates slide relative to each other.

Figure 80:
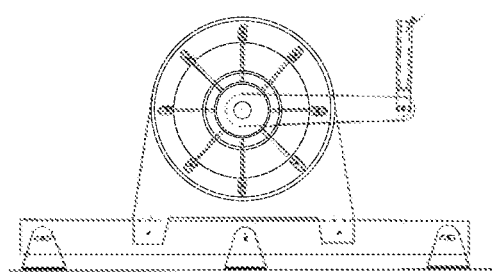
Figure 81:
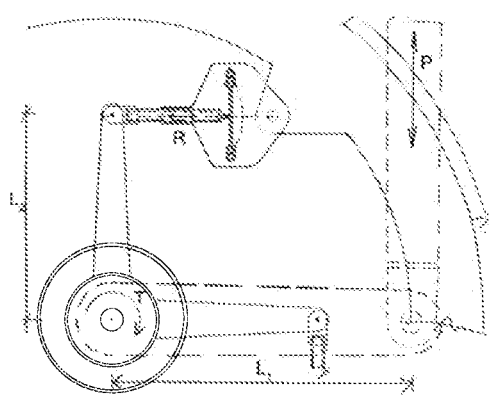
Figure 82:
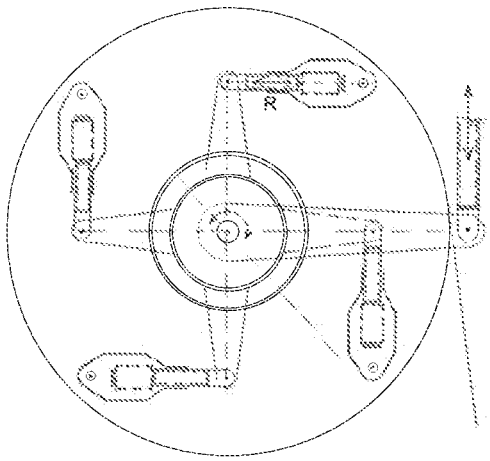
Figure 83:
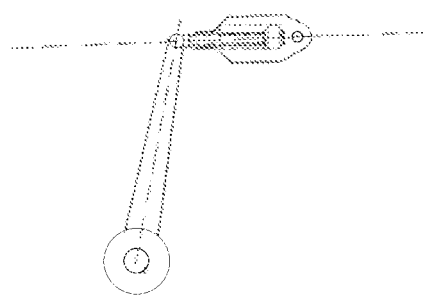
Figure 84:
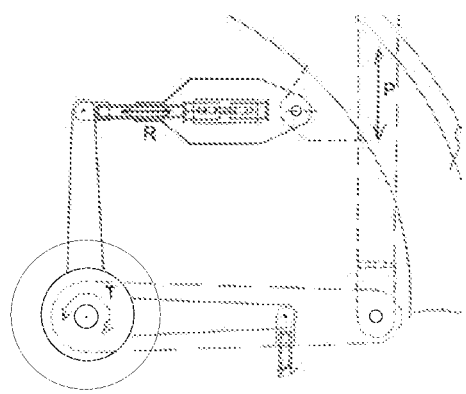
Figure 85:
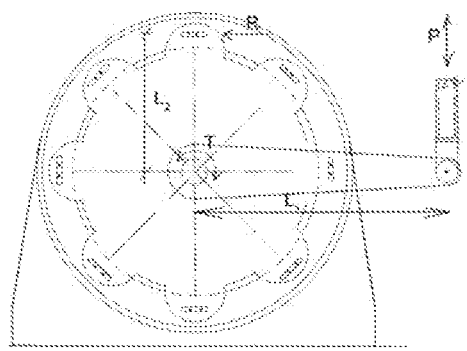
Figure 86:
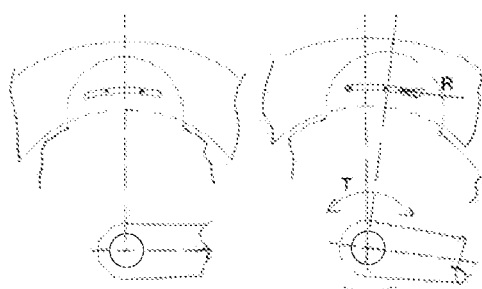
FIG. 86 shows the non-displaced and displaced forms of the clamped regions of the plates.
Figure 87:
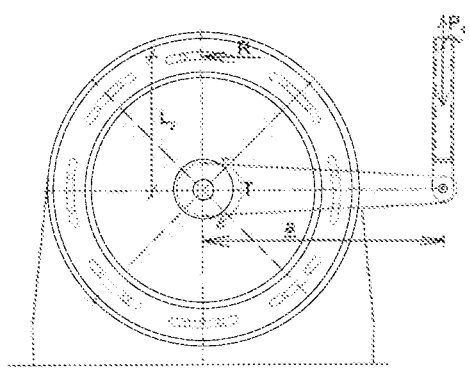
FIG. 87 shows a further embodiment of a rotary unit. Here the lever arm length is a and the resistive force within the push rod of the control structure is P1.
Figure 88:
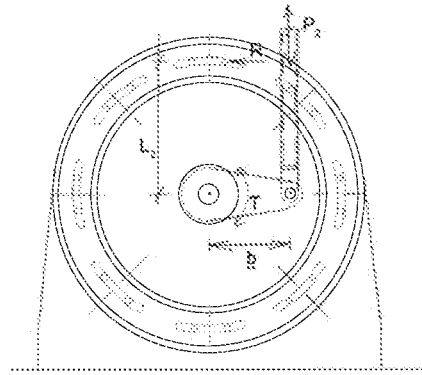
Figure 94:
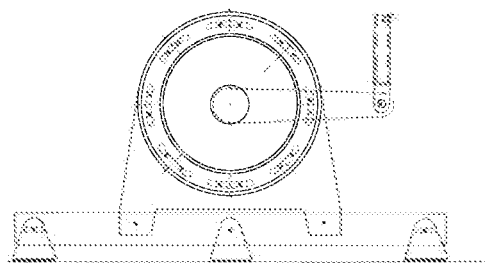

FIG. 88 shows a rotary unit similar to FIG. 87 but here the lever arm length is b and the resistive force within the push rod of the control structure is P2. As with the rotary units of FIGS. 74 to 77, varying the length of the extended lever arm alone, allows for adjustment of the force P in the push rods of the control structure, and the resistive force of the control structure as a whole. As with FIG. 80 a secondary flexure base member is added to the rotary units of FIGS. 87/88 in FIG. 94. This, as previously, allows for both the resistive force of the control structure and its elastic natural frequency to be each continuously and independently adjusted. The (elastic) stiffness of the rotary units of FIGS. 87 and 88 is very high prior to frictional forces being overcome. The addition of the secondary flexure member base allows for this elastic stiffness to be reduced and the elastic response of the control structure modified.

Figure 89:
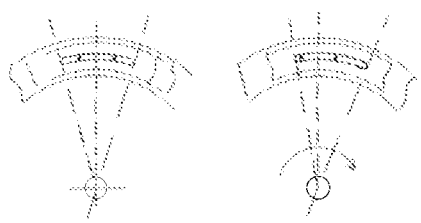

FIG. 89 shows the non-displaced and displaced form of the clamped regions of the rotary units of FIGS. 87 and 88.

Figure 90:
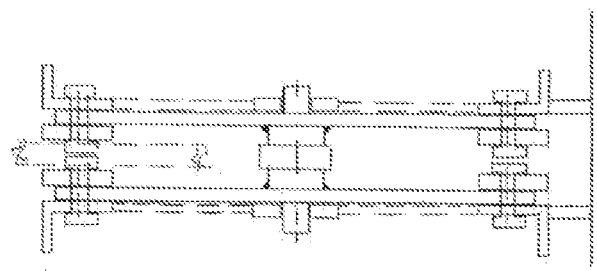

FIG. 90 shows a section through FIGS. 87 and 88. Here the continuous annular contact (friction) plates (rings) of the first and second parts of the rotary unit are shown with a clamping force, C, and the force, R, produced at the contact points as the plates slide relative to each other.

Figure 91:
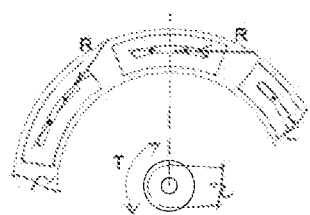

FIG. 91 shows a further embodiment where the friction plates of the first part of the rotary unit are individual (shoe) plates.

Figure 92:
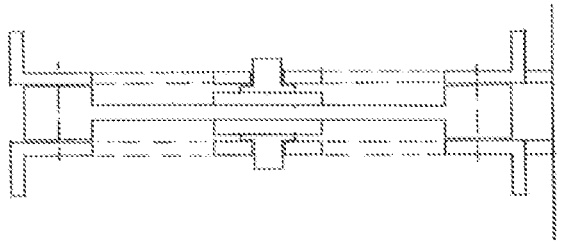

FIG. 92 shows a section through FIG. 91.

Figure 93:
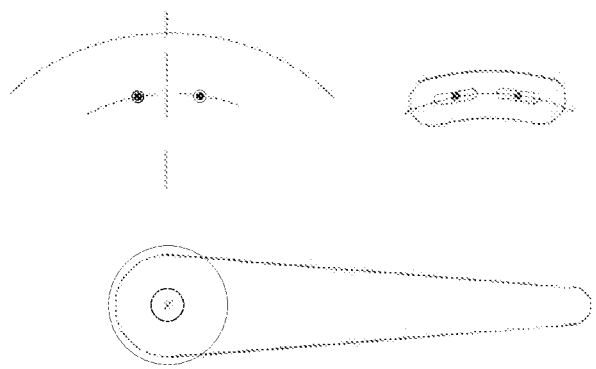

FIG. 93 shows a schematic part view of the tension bolts through the outer annular (first) part of FIG. 92, and through the slotted pads of the inner second part.

Figure 95:
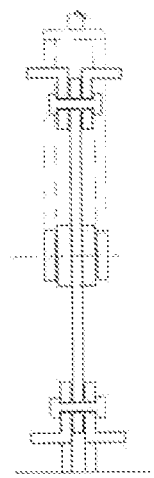

FIG. 95 shows a schematic section similar to FIG. 90, but where the rotary unit has a flat inner disc and external lever arms, the slotted inner disc rotating with the lever arms.

Figure 96:
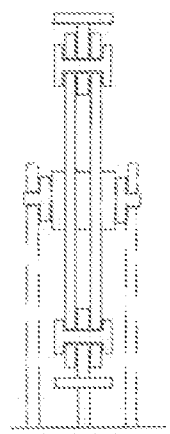

FIG. 96 shows a case similar to FIG. 95 but where the external plates rotate with the lever arm, both relative to the slotted inner plate (disc).

Figure 97:
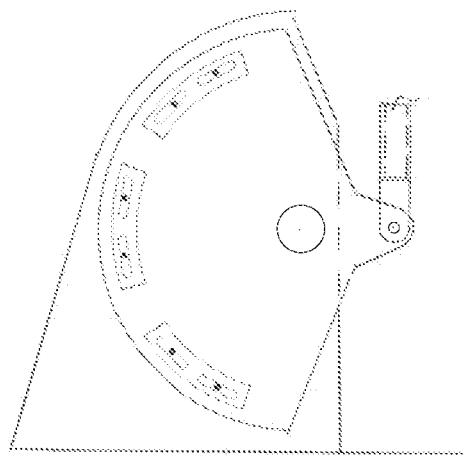
Figure 98:
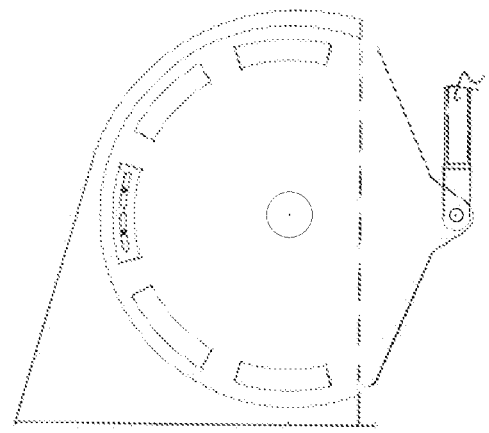
Figure 99:
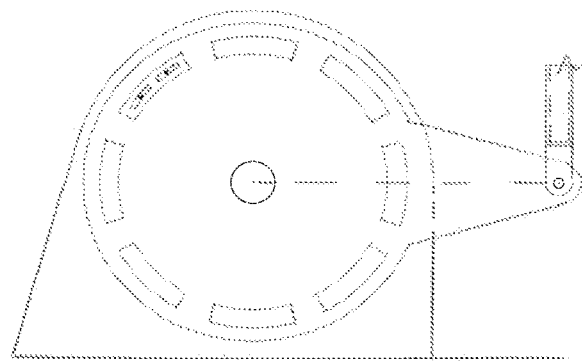

FIGS. 97, 98, 99, show various schematic sections of rotary friction units with friction units (e.g. block) centrally located and rotating with lever arms, both located between outer plates.

Figure 100:
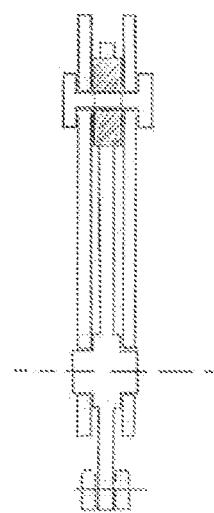

FIG. 100 shows a plan view schematic of FIG. 97.

Figure 1:
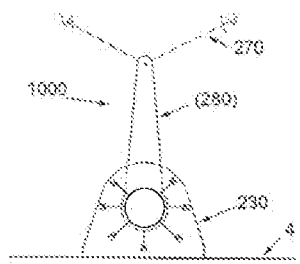
Figure 2:
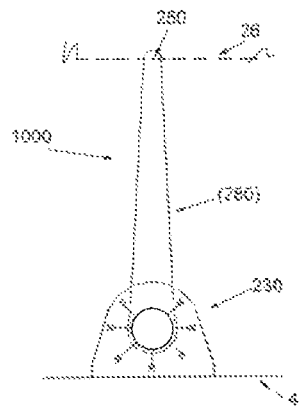
Figure 3:
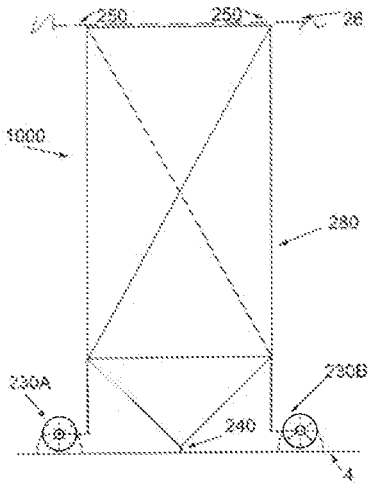
Figure 4:
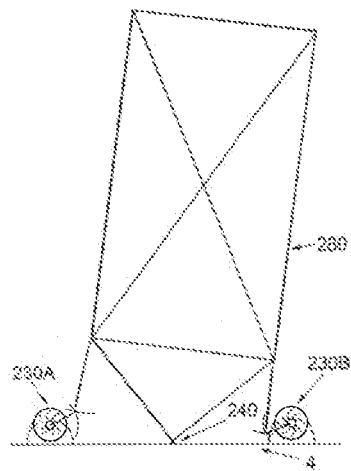
Figure 5:
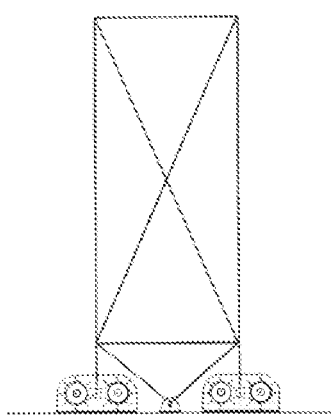
Figure 6:
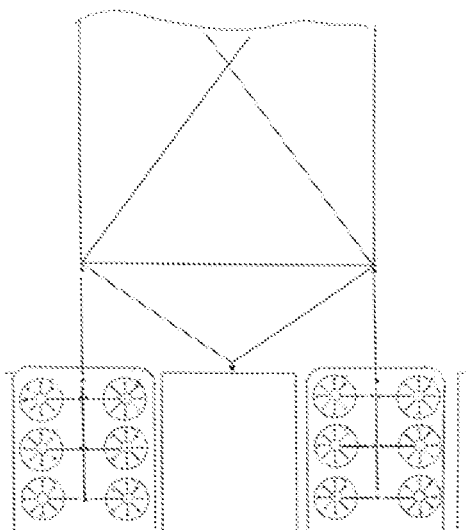
Figure 14:
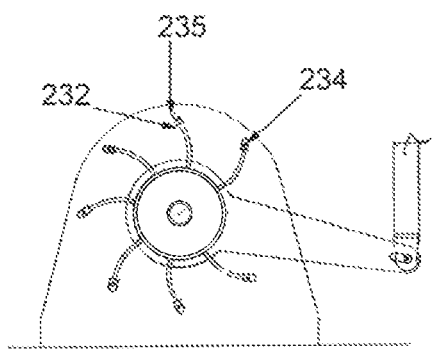
Figure 15:
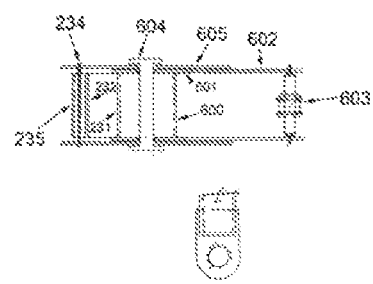
Figure 16:
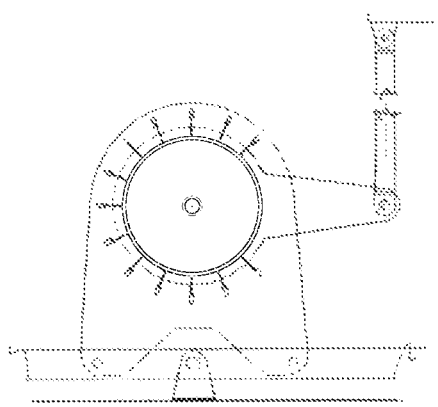
Figure 17:
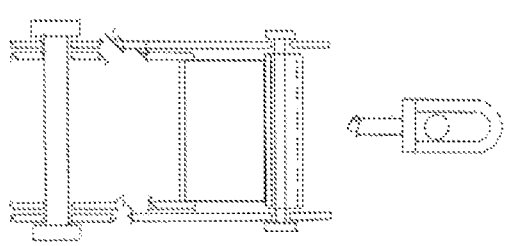
Figure 18:
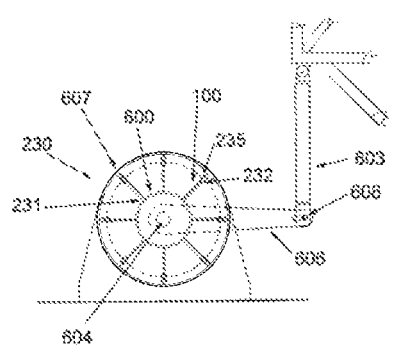
Figure 19:
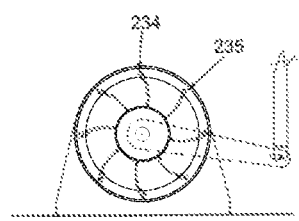
Figure 101:
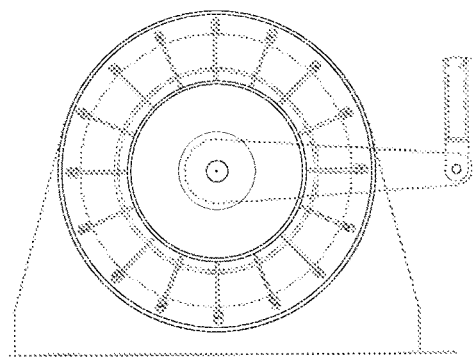

Returning to flexurally yielding plates, FIG. 101 shows a rotary unit similar to the rotary unit(s) of FIG. 18; but here the flexure members (plates) are located (relatively) more towards the circumferential periphery of the rotary unit; the diameter of the circular drum of the first part of the rotary unit being larger relative to the flexing length of the flexure members. For this rotary unit, as with the unit of FIGS. 18 & 19 the flexing direction (direction of principal curvature) of the plate(s) is normal (orthogonal) to the axis of rotation of the rotary unit.

Figure 102:
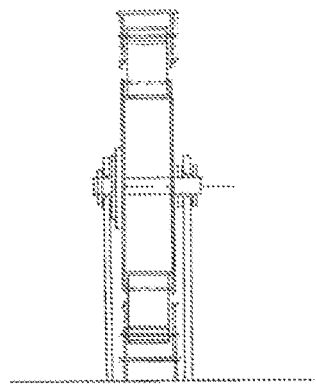

FIG. 102 shows a section of FIG. 101.

Figure 103:
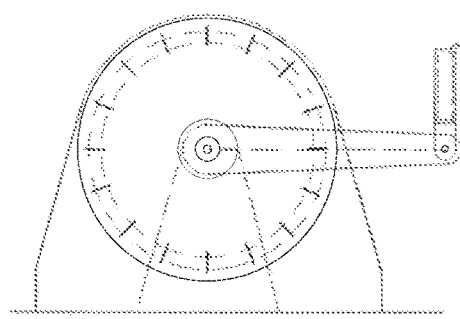

FIG. 103 shows a further embodiment of a rotary unit with DELTA4 yield plates. Here the first part of the rotary unit comprises a circular disc (single or double disk) to which the flexure members (plates) are fixed, (the plane of the flexure members normal (orthogonal) to the plane of the disc) and distributed about the circumferential periphery of the disc (first part). As with the rotary units described previously, a lever arm (in the plane or parallel with the plane of the first part (disc)) and integral with the first part; extends from the axis of rotation of the first part and pin/slot connects with a first structural member (show in this case as a push rod of a control structure).

Figure 104:
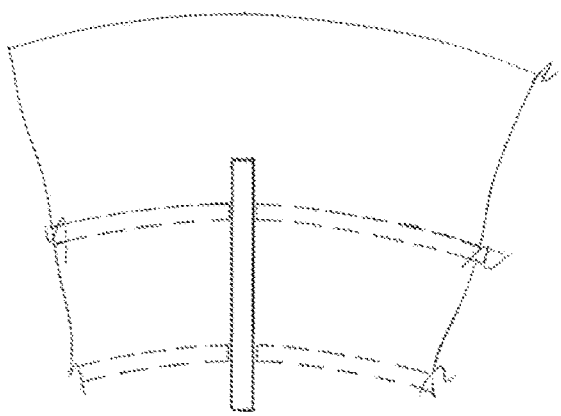

FIG. 104 shows a part front elevation of the flexure member with stiffening and anchoring annular rings in the (dotted) background and the outer circular edge of the first part (the flexure member projecting out of the page).

Figure 105:
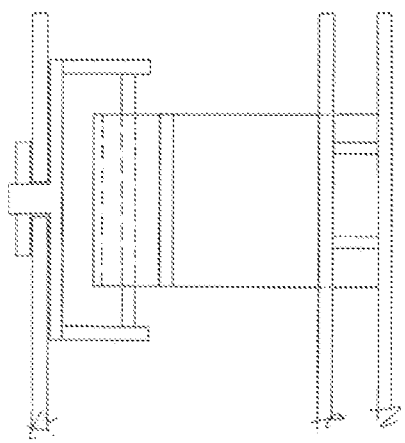

FIG. 105 shows a side elevation of a flexure member (plate) fixing one end to the first part of the rotary unit, (here a double disc with connecting annular rings which also provide anchorage for the flexure member). The opposite end of the flexure member comprises a sliding hinge, as described previously, connecting with (around) the anchor pin (shaft) of the second part of the rotary unit. The second part of the rotary unit also being a circular disc rigidly connecting to a second structural member (shown here as a foundation base). Distributed around its circumferential periphery and pin connecting to the circular disk of the second part, are pivotable connectors within which the anchor pins (shafts) are located.

Figure 110:
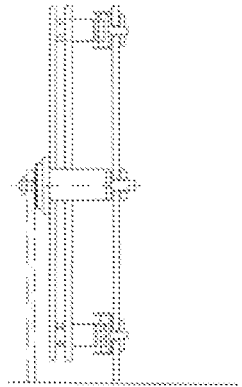

FIG. 110 shows the first and second parts of this rotary unit rotatably connecting at their axis of rotation and further connecting at their circumferential periphery via connection between the flexure members (plates) (fixed to the first part of the rotary unit) and the anchor pins (rods/shafts) (pivotably connected to the second part of the rotary unit).

Figure 106:
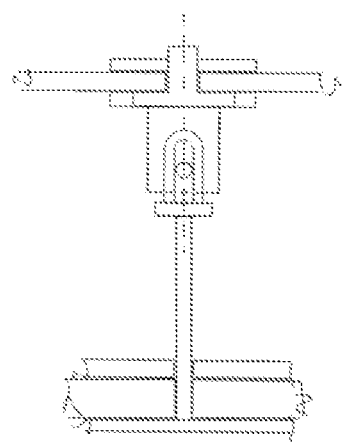

FIG. 106 shows a plan view of FIG. 105.

Figure 107:
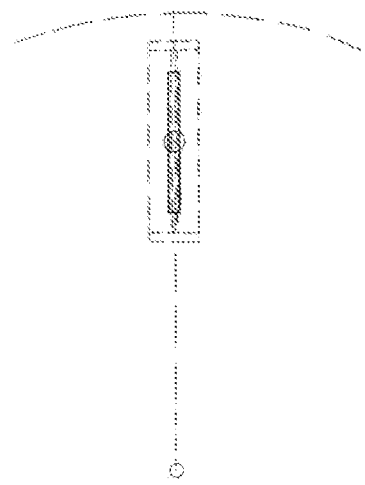

FIG. 107 shows an end elevation of a non-displaced flexure member (similar to FIG. 104), along with the location of the connecting pivotable anchor pin (shaft) all relative to the axis of rotation.

Figure 108:
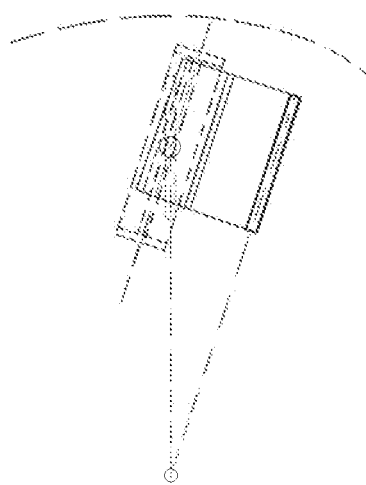

FIG. 108 shows the displaced form of FIG. 107. Here the flexure member has rotated and translated both horizontally and vertically relative to its non-displaced position and the anchor pin it connects with has pivoted (rotated) with the flexure member to the same angle of rotation as the flexure member. The sliding hinge of the flexure member has also translated, relatively, along the rotated axis of the anchor pin (shaft).

Figure 109:
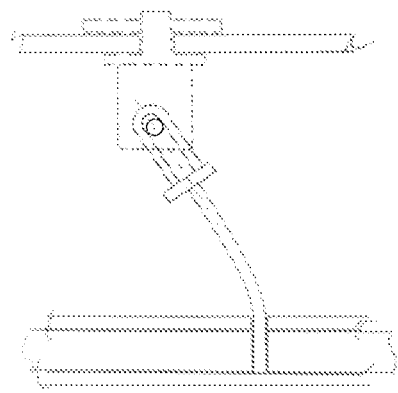

FIG. 109 shows a plan view of the displaced form of the flexure member (plate) inclusive of its anchor pin (shaft) along the principal line of rotation. Here, the principal direction of flexure of the elastic or elasto-plastically flexing yield plate is parallel with the axis of rotation of the rotary unit. This is in contrast to the rotary units of FIGS. 18, 101 and 102, where the principal direction of flexure of their yield plates is normal (orthogonal) to the axis of rotation of the rotary unit. As previously; no membrane forces (or torsional stresses) are developed within the flexure member; and with its particular free translational and free rotational boundary conditions, the flexure member yields at a constant resistive yield force to high elasto-plastic displacements. The rotary unit, subsequently, rotatably yields at a constant resistive yield force (torque) and the control structure it is part of yields at a constant resistive yield force as it resists and endures ground (base) motion input.

Figure 111:
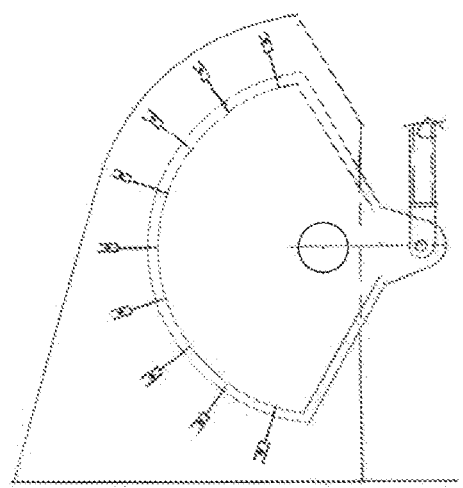
Figure 112:
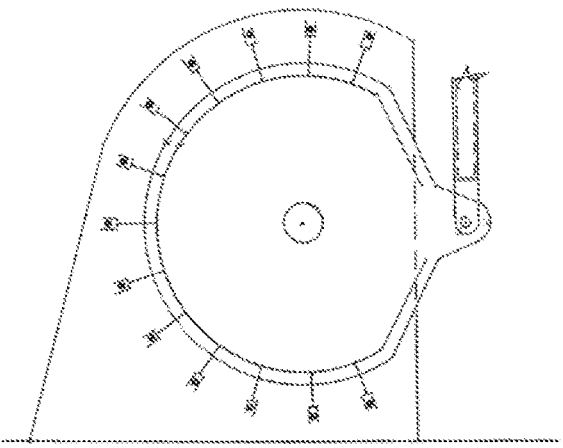
Figure 113:
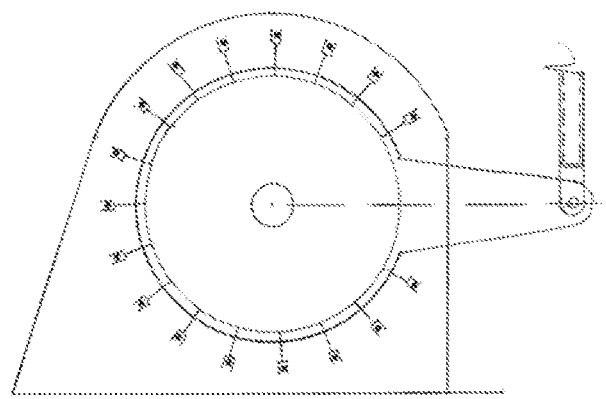

FIGS. 111, 112, 113 (similar to the rotary friction yield units of FIG. 628), show various schematic sections of rotary yield units, where the yield plates are connected (anchored) to the peripheral edges of two integral discs (Part A) which are centred on two outer discs (Part B).

Figure 114:
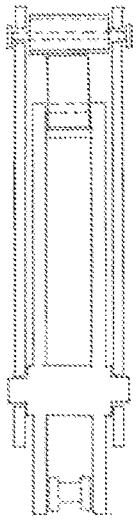

FIG. 114 shows a plan view schematic of FIG. 111.

As with all rotary units previously described variation of the length of the extended lever arm of the first part of the rotary unit allows the constant resistive force within the control structure to be varied; and the addition of a secondary base flexure member allows for both the resistive yield force and natural (elastic) frequency of the control structure to be independently varied.

Figure 115:
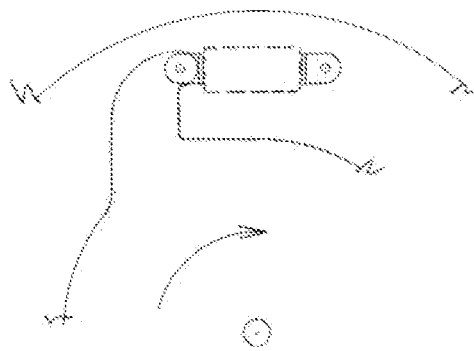

In a further embodiment as shown in FIG. 115, a force limiter and energy dissipater of specific or general form as shown in FIGS. 81 to 84 is, as with FIG. 103, located and pivotably connected about the peripheral circumference of a rotary unit, comprised of circular disks.

Figure 116:
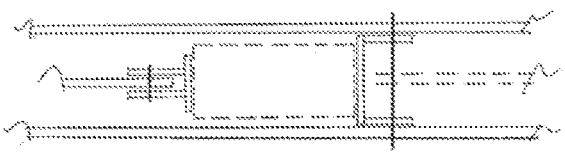

FIG. 116 shows a plan view of FIG. 115. Here the inner disc is the first part of the rotary unit (with as previously, extended and integral lever arm) and the outer disc(s) is the second part fixed to a second structural member.

Figure 117:
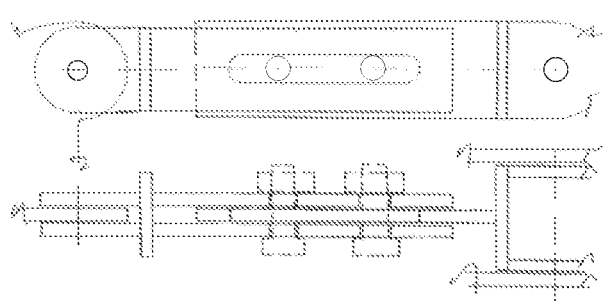

FIG. 117 shows a part schematic, of one case, where the force limiter and energy dissipater is comprised of friction plates, as described previously, within the rotary unit of FIG. 115.

Figure 118:
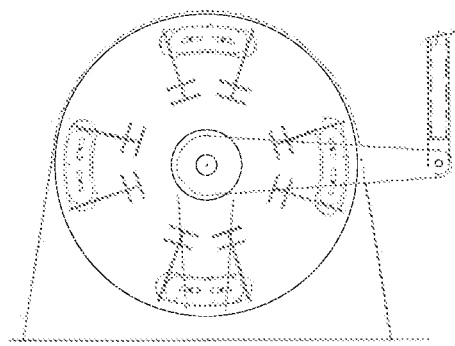

In a further embodiment FIG. 118 shows a schematic view of a rotary friction unit similar to FIG. 99, but where an elastic component, in this case in the form of a cantilever spring leaf (or plate) has been incorporated within the rotary unit. This is in contrast to the case of the secondary flexural member, described above, which is integral with but exterior to the rotary units.

Figure 124:
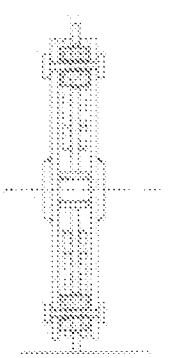

FIG. 124 shows a schematic cross section of FIG. 118. Here a fixed or base anchored central plate is located between two outer plates which rotate with the lever arm(s) of the rotary plate which is integral with the outer circular plates. Clamped between the two outer plates are slotted friction blocks. Larger slots in the central plate allow the blocks to run directly through them.

Figure 119:
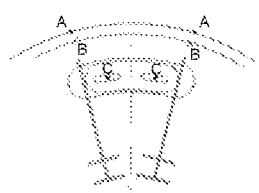

FIG. 119 shows a part of the rotary unit in its non-displaced (or original) position.

Figure 120:
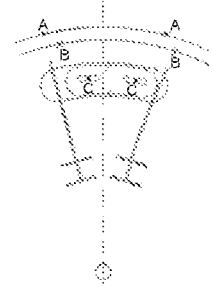

FIG. 120 shows the outer plates displacing (rotating) relative to the inner plate. Here the inner friction blocks which are friction clamped (with or without tension washers) to the outer circular discs travel with the outer plates. The central friction blocks in displacing with the outer plates displace the elastic cantilever spring leaves which are fixed to the inner base fixed plate. Motion of the friction blocks (or shoes) clamped between and moving with the outer circular discs is hence (elastically) resisted by the spring leaves, this resistance force increasing with displacement of the friction pads (shoes) and the spring leaf until as in FIG. 121 the friction shoes make contact with the end of the slot within the inner fixed plate. At this stage movement of both the friction shoe and elastic spring leaf is stopped (or arrested). For the outer plates to continue displacing (rotating) they must overcome this frictional force between them and the inner friction pad (now stopped from moving). When this friction force(s) is overcome the outer plates continue to displace while the slotted friction pad (shoe/block) and the elastic cantilever leaf spring remain fixed in position with the base anchored central plate.

Figure 121:
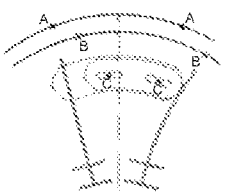
Figure 122:
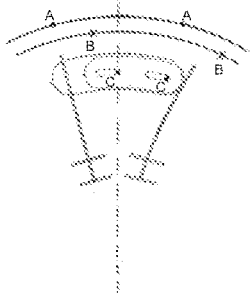

FIG. 122 shows the outer plate continuing to displace relative to the friction shoe. The tension clamping bolts (with or without tension washers) fixed to the outer plates able to displace (relatively) along the slots within the (inner) friction block. The frictional force overcome between the outer plates and the inner friction block(s) is preferably maintained as a constant resistive force as the outer plate displaces from its position in FIG. 122. If the clamping force between the inner block and outer plates and hence frictional resistive force is configured to match the elastic resistive force of the elastic cantilever spring leaves at their travel or displacement limit as shown in FIG. 121, an elasto-frictional system equivalent to an elasto-plastic system is obtained. The constant resistive yield force produced by the plastically straining yield plates with their particular boundary conditions equating with the preferably constant resistive friction force produced between the outer plates and inner friction block as they displace (slip/slide) relative to each other.

Figure 123:
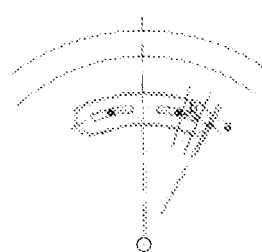

FIG. 123 schematically shows the elastic (yield equivalent) displacement component of the system, a, and the frictional (or plastic) displacement component b.

Figure 125:
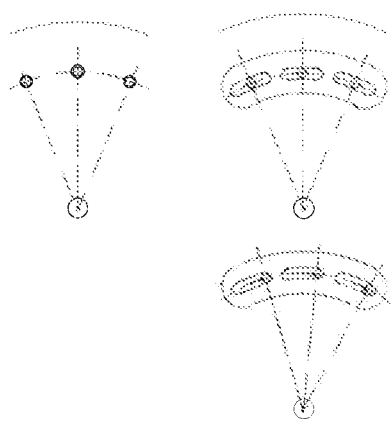

FIG. 125 shows the tension clamping bolts fixed in position relative to the outer plate, and moving relative to the inner friction block.

Figure 126:
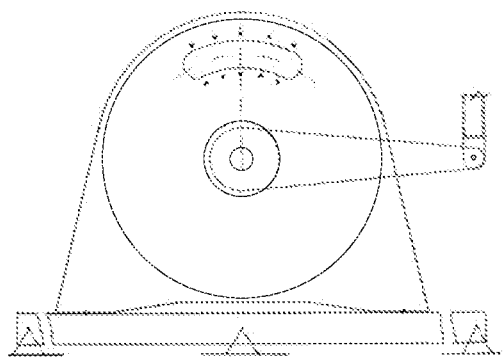

FIG. 126 shows a case similar to above, but here the clamping bolts do not run through the friction block but are located outside and adjacent to it. The rotary unit of FIG. 126 is here shown integral with a secondary flexural member.

Figure 127:
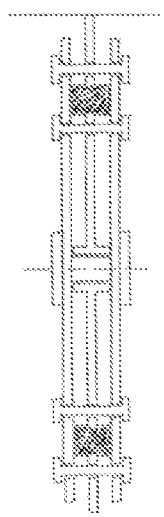

FIG. 127 shows a schematic cross section of FIG. 126.

Figure 128:
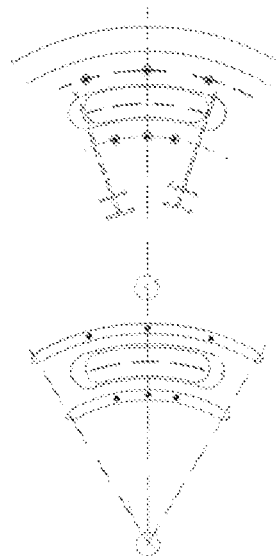

FIG. 128 shows the clamping bolts (with or without tension washers) located within the outer plates and within the slotted inner plate.

Figure 129:
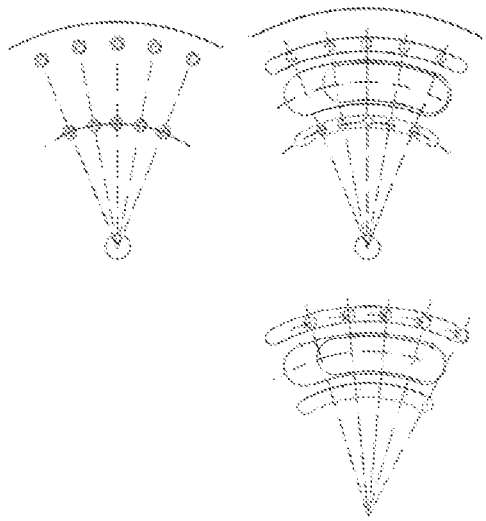

FIG. 129 shows the friction block, as clamped between the two outer plates, being arrested from further movement as it makes contact with the end of the (larger) slot within the inner plate, and the outer plates (after overcoming friction resistant forces) continuing to displace, the clamping bolts moving with it within the (smaller) slots within the inner plate, and the frictional resistance force as the outer plates displace relative to the inner friction block being preferably constant.

Figure 130:
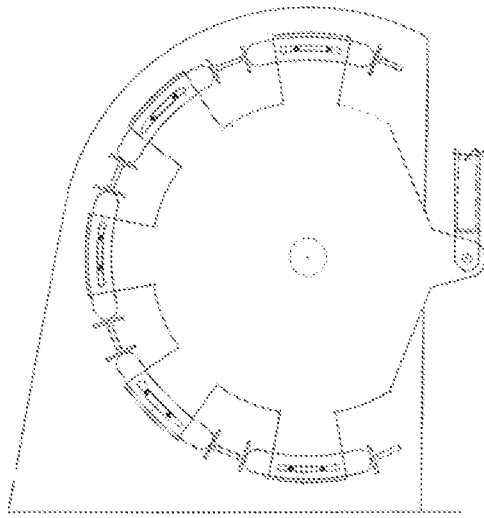

FIG. 130 shows a schematic view of a rotary friction unit similar to those of FIGS. 118 and 126 but here the inner plate rotates with the lever arm of the unit.

Figure 131:
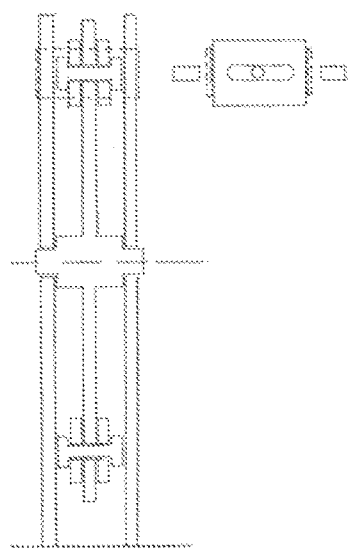

FIG. 131 shows a schematic cross sectional view of FIG. 130. Friction blocks are clamped either side of the central disc. As above the friction plates move with the inner disc while elastic plates (in contact with the friction plates) resist this motion but do not produce forces high enough to produce slippage between the friction blocks and the central plate. When the displacing friction plates (rotating with inner plate) and flexing (spring) plates make contact with their travel limiters which are fixed and span across the two outer based fixed plates, they and the elastic spring plates are arrested or stopped from moving. The inner plate, once it overcomes the frictional forces between it and the now arrested friction blocks, is able to continue moving, its clamping bolts travelling along the slots within the friction blocks. The inner plate outcrops are hence effectively slicing through the friction blocks while the friction blocks produce a preferably constant resistive (frictional) force to this motion.

Figure 132:
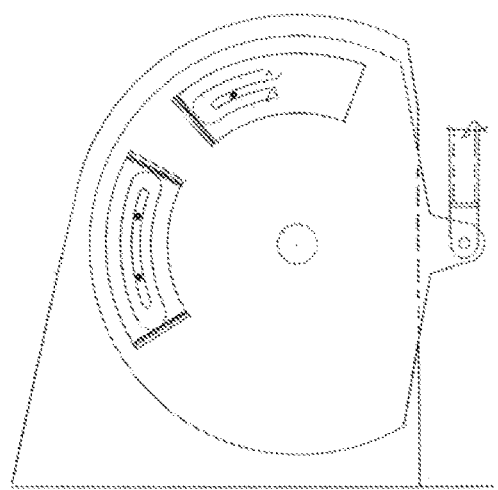
Figure 133:
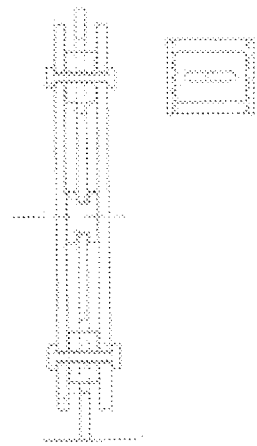

FIGS. 132 and 133 show a rotary friction unit similar in form to FIG. 130 but where the outer plates move with the lever arm while the inner plate is base anchored. This is similar to the rotary unit of FIG. 118.

FIG. 133 shows a schematic cross section of FIG. 132.

Figure 134:
Figure 138:
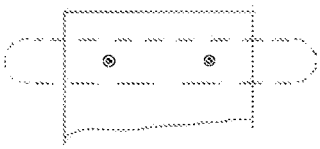

FIGS. 134 and 138 illustrate (in linear form) the movement of the friction blocks, plates (inner and outer), elastic spring plates and clamping bolts of FIG. 130.

FIG. 134 shows the centred friction block (with slots), outer plate(s), clamping bolts (with or without tension washers), elastic spring plate and travel limiter all in initial position.

Figure 135:
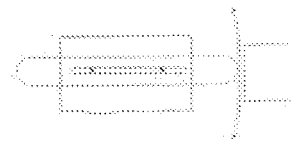

FIG. 135 shows the outer plate(s), (that is, the first part of rotary unit) displacing to the right. The central friction block clamped between the outer plates moves with the outer plates as it (friction block) pushes against the elastically flexing spring plate. The elastic force produced by the spring plate increasing as the friction block and connected (clamped) outer plates move further to the right, but not of a sufficient force to produce slippage between the friction block and outer plates.

Figure 136:
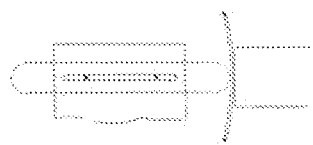

FIG. 136 shows the spring plate making contact with the travel limiter and both the flexing of the spring plate and displacement of the friction block stopping. At this instant there is still no slippage between the friction block and outer plates.

Figure 137:
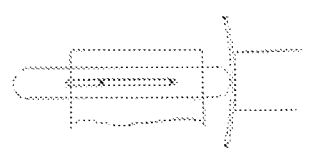

FIG. 137 shows the outer plate(s) displaced further to the right. For the outer plates to achieve displacement further to the right of their position shown in FIG. 136 they must first overcome the frictional forces between them and the central friction block. Once this is achieved the plates are able to move from their position in FIG. 136 to their position in FIG. 137, effectively pushing against a constant resistive (frictional) force.

FIG. 138 shows a schematic view of the clamping tension bolts fixed to the outer plates and relative to the inner friction block.

Figure 139:
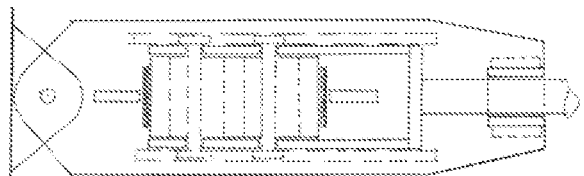
Figure 140:
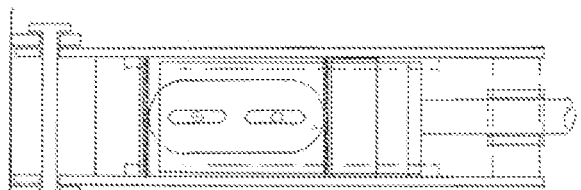

FIGS. 139 and 140 show the same system as described above but located within a sleeve guided BETA rocker unit similar to that shown in FIG. 138.

Figure 141:
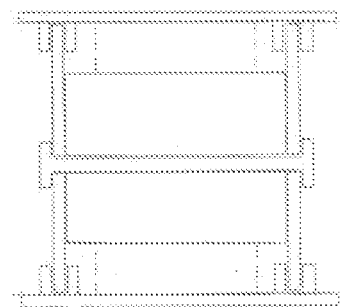

FIG. 141 shows a cross sectional view of FIGS. 139 and 140 inclusive of guides.

The friction blocks/plates/shoes/pads and their interface surfaces can be made or configured from or by any number or types or materials.

The elasto-frictional rotary unit either as a stand alone unit or located and distributed within a pivotably based rocker structure is able to produce a preferably constant resistive (frictional) force as clamped plates within it slide or slip relative to each other. The elastic component of the rotary (friction) unit being able to be provided by spring plates or similar, within the rotary unit, by secondary flexural members integral with but exterior to the rotary unit, or by the use of both. The elastic component of the friction rotary unit also able to be configured, so that slippage occurs between the friction plates once a resistive elastic force within the elastic component (e.g. spring plates) is reached. In other words, slippage at a constant resistive force could be achieved through use of the elastic components alone, that is without travel limiters (motion blocks) as described above.

An elasto-plastic system is hence achieved.

The rotary friction unit of FIG. 130 is able to be configured with an elastic component (e.g. spanning plate) which would produce the same elastic response as the (elasto-plastic) yield plates of the rotary yield unit of for example FIG. 112 or similar.

Similarly, the frictional yield (slip) force of the friction plates of FIG. 130 is able to be configured to produce the same (plastic) yield force produced by the yield plates of the rotary yield unit of FIG. 112 or similar.

Similarly, secondary flexural members are able to be added to both the rotary yield and rotary friction units of for example FIG. 112 or 130. The elasto-plastic response of both the rotary friction units are hence able to be configured to be effectively the same, each also with the same adjustable length lever arms and each being able to be developed into a two tier ductile system.

FIGS. 142 to 156 show further rotary friction units where the friction elements comprise continuous circular rings or circular curved pads/shows/blocks. The interface displacement between the curved surfaces of the friction elements is tangential to the curved surfaces, the tangent normal to both the axis of rotation of the rotary unit and to the radial, to the surface line.

Figure 142:
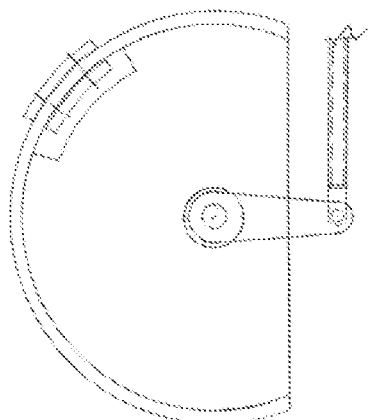

FIG. 142 shows a schematic side elevation of a part inner ring integral with two discs and lever arms. They are located within two outer discs which both, anchor or prevent the friction shoes (clamped to the inner ring and spanning laterally between the two outer discs) from arcing, and anchor the whole assembly to a structural base.

Figure 143:
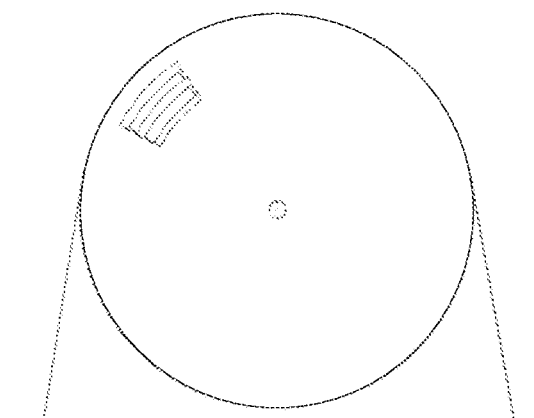

FIG. 143 shows a schematic side elevation of the two outer discs, with the friction shoes which are spanning to and laterally restrained by them.

Figure 144:
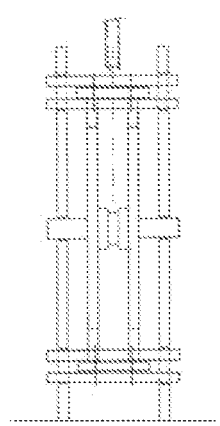

FIG. 144 shows a cross sectional view of the two base anchored outer discs, the inner rotatable discs, the continuous ring friction element and the two friction shoes which span to the outer discs and between which the continuous ring is slot clamped.

Figure 145:
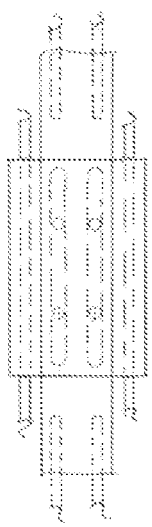

FIG. 145 shows a plan view of the continuous ring (slotted), the friction shows and the inner and outer discs.

Figure 146:
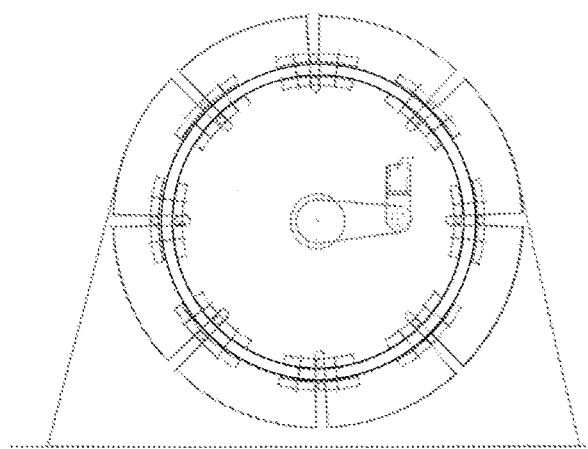

FIG. 146 shows a schematic elevation of a rotary unit comprised of two outer discs, each with a continuous circular friction ring, all of which are integral and rotate with the lever arm(s), and a central and slotted disc which anchors the assembly to a structural base. The slots within the centred and base anchored discs are to both enable the friction shoes to be freely clamped to each outer friction ring, and to restrain the friction shoes from circular arcing again, the continuous friction ring clamped between the laterally (or arc) anchored friction shoes, being slotted. That is the rings rotate relative to the shoes, the slotted friction element being the one sandwiched between the two outer friction shoes.

Figure 147:
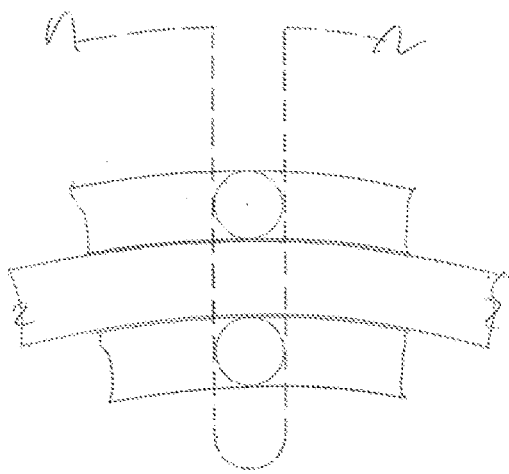

FIG. 147 shows a detail of the friction shoes, slot in inner plate and continuous friction ring.

Figure 148:
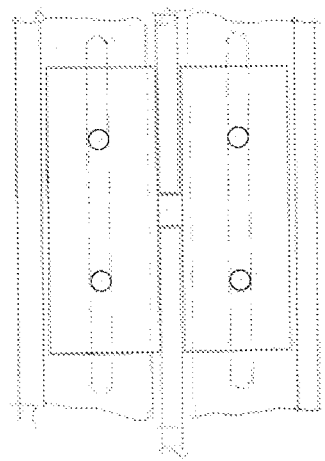

FIG. 148 shows a plan view of section 147.

Figure 149:
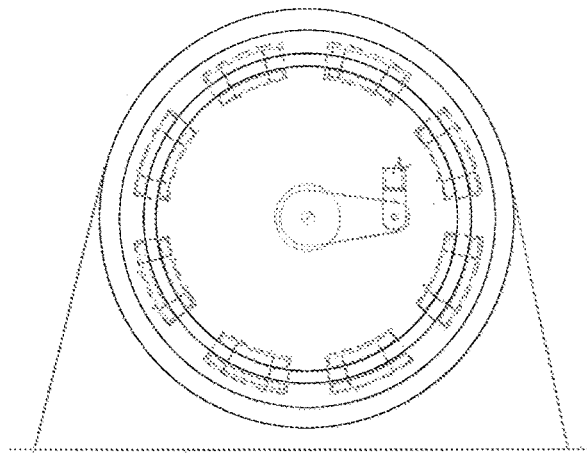
Figure 150:
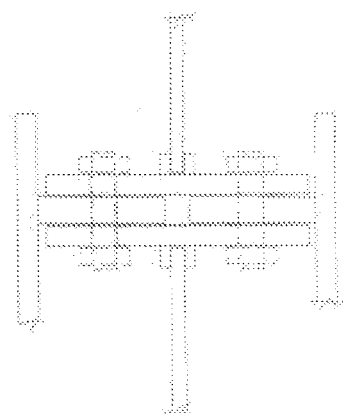

FIG. 149 shows a schematic elevation of a friction rotary unit similar to that of FIG. 146, but here the friction pads are prismatic, that is they run continuously through holes in the inner disc and are located by guides to the inner plate, as shown on FIG. 150.

Figure 151:
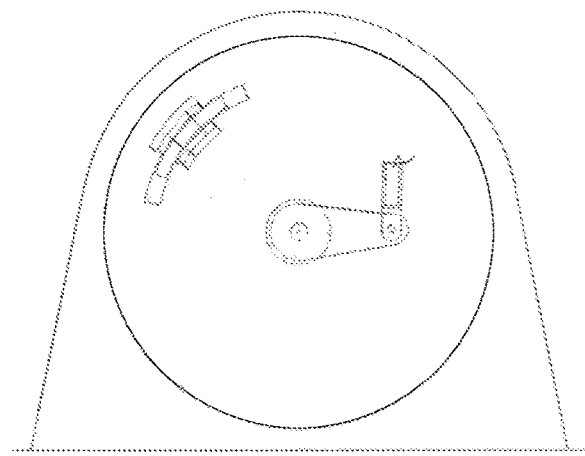

FIG. 151 shows a schematic elevation of a rotary friction unit in which the larger central curved shoe spans between and is anchored to the two outer discs which are integral with the lever arms and are the rotatable part of the unit. The larger (and slotted) friction shoe is clamped between the two smaller friction shoes, which laterally span between two inner discs of the unit which both restrain the smaller shoes from arcing action and anchor the assembly to a structural base. The cutout on FIGS. 151 and 152 is to the two inner discs. It restrains the smaller shoes from arcing, while allowing the inner shoe to rotate.

FIG. 153 is a sectional view of the plate assembly and FIG. 154 a plan view.

FIG. 155 shows a part elevation detail similar to FIG. 152 but here an elastic plate(s) has been introduced as an internal elastic component to the rotary unit.

The (cantilever) plates are in contact with the smaller outer friction shoes as the larger inner friction shoe rotates, the clamped outer plates travel with it but are subjected to an increasing (with displacement) elastic resistance from the cantilever plates as shown in FIG. 156 and as in previous rotary friction units described above, the elastic plates are able to flex until they make contact with the cutout of the inner ring. At this stage both elastic displacement of the (spring) plates and rotation/displacement of the two outer friction shoes is stopped, while the larger inner curved shoe is able to continue displacing against a preferably constant resistive (frictional) force, this being the effectively plastic phase of the displacement. The rotary friction unit as with other rotary friction units previously described is responding elasto-plastically. As also described previously a secondary flexural member is also able to be added to the rotary units to provide a (or further) elastic component.

Aspects of an elastically responding slip friction device as described in WIPO WO2016/185432 A1 are next considered. The frictional contact surfaces of the device are sloping relative to both the direction of force(s) as applied to it, and the direction or line of forces clamping the contact surfaces together. These clamping forces, as described in the WIPO publication, may be pretensioned. Pretensioning enables the two sloping surfaces to return or potentially return (that is slide back) to their original state after load (e.g. from a seismic event) is removed.

The flexural yield plates of the rotary yield units (which are the primary focus here) and the rotary friction yield units described above within which friction units which have an elastic component comprised of an elastically straining element (e.g. elastically flexing plate) which provides an elastic component and orthogonally clamped (flat or curved) friction surfaces, which effectively provide the separate plastic component of the unit, are compared further on with the clamped frictional sloping surface device referenced above. Also included in this comparison is a corrugated friction yield block developed here, which comprises clamped frictionless sloping surfaces and clamped frictional flat surfaces, each producing an independent elastic and plastic component. These serve to contrast the behaviour and response to seismic input of each unit.

The device referenced above is an elastic device that is configured to return to its origin after load is removed, but to also dissipate energy through frictional work, in the process.

A device that has both sliding and flat contact surfaces is developed here. The device has frictionless (or very low friction) clamped sloping contact surfaces and frictional flat (or horizontal) clamped contact surfaces. The frictionless sloping surfaces (which may also be of a roller surface form) provide the elastic component of the device, and separately to it, the flat clamped frictional contact surfaces provide the plastic component of the device. The result being an elasto-plastic system which responds to a similar capacity or performance as the rotary friction units discussed previously.

The mechanics of the displacing clamped contact surfaces, with frictionless sloping and flat (e.g. horizontal) frictional contact surfaces, and the mechanics of the sloping frictional surfaces as described in WIPO2016/185432 A1, are considered. Such systems, elastic (only) or elasto-plastic, are able to be compared with the rotary friction systems described above. As above, these rotary units contain yielding devices whose elastic component is provided by an elastically straining element (e.g. flexing plate and/or secondary flexural member) and whose plastic component is provided by two conventional friction surfaces which are clamped together, the line or direction of the clamping forces being normal to their (flat or curving) contact surfaces. Both the elastic straining component and plastic or yielding friction components act separately (that is not in unison).

An elasto-plastic friction yield block with frictionless sloping surfaces and flat frictional contact surfaces (relative to clamping forces) is as shown in FIG. 157. It is herein referred to as a corrugated block or corrugated friction yield block.

Figure 159:
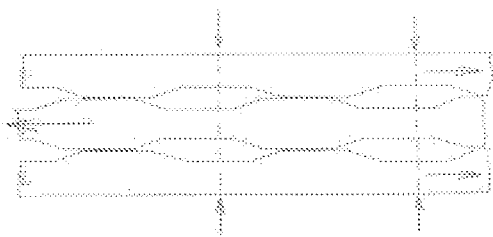

In the initial or non-displaced position in FIG. 157, only the sloping surfaces are in (clamped) contact. Tension, T, in the ties (whether pre-tensioned or not) increases with relative displacement of the sloping surfaces (up the slopes) as shown in FIG. 158 until it reaches a maximum value, say $T_m$, at the top of the respective slopes and before further displacement between two, now horizontal surfaces, clamped together with a constant clamped force $T_m$. The two horizontal surfaces as shown in FIG. 159 are providing a preferably constant resistive force to displacement.

Figure 160:
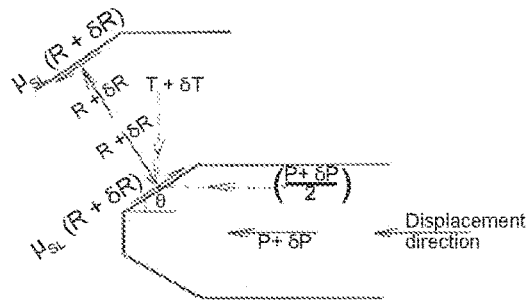

FIG. 160 derives the basic force and equilibrium relationships between two clamped sloping frictional surfaces in contact and displacing one relative to the other. In this case the (slotted) central block is moving to the left and the sloping surfaces of the two outer clamping blocks are relatively moving or sliding up the slopes of the central block. Displacement of the central block to the left is resisted by the horizontal components (summed) of both the direct force, R, orthogonal to the surface, which is due to the transverse clamping force, T, and the frictional force, μ.R, parallel to the surface and due to the orthogonal force R. That is, both forces are resisting displacement of the centre block to the left and force P is increasing with displacement in this direction. Equation 1) relates the force P at any time, t, to the clamping tension T(t), the angle of the contact surfaces, Θ, and the coefficient of friction μSL1 for displacement in this direction.

Figure 161:
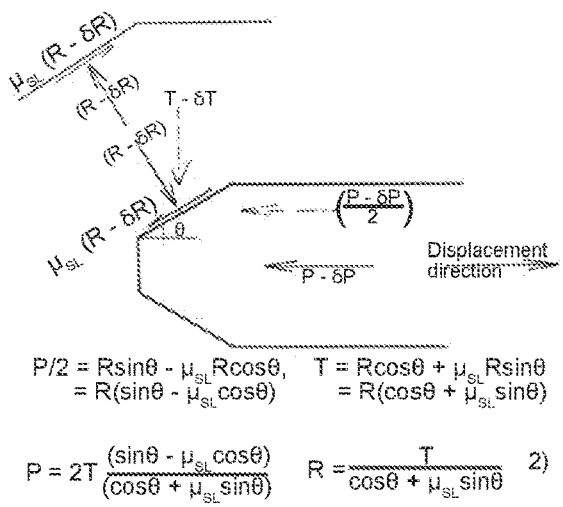

FIG. 161 is similar to FIG. 160; but here the central block is moving to the right and force P is reducing (or unloading) with displacement in this direction. In this case the direction of frictional resistance along the sloping surface has switched and its horizontal component is now in the opposite direction of the horizontal component of the force R, orthogonal to the surface. The relationship between the now reducing force, P, and again the clamping tension T(t), angle of surfaces, Θ, and coefficient of friction μSL2 for displacement in this direction is derived on FIG. 161 as equation 2). Equations (1) and 2)) describe the loading and unloading paths of a clamped sloping frictional surface and are essentially the same as those given in the above referenced WIPO publication.

Figure 162:
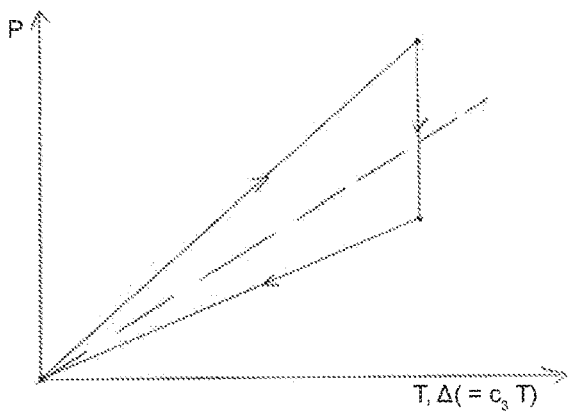
Figure 163:
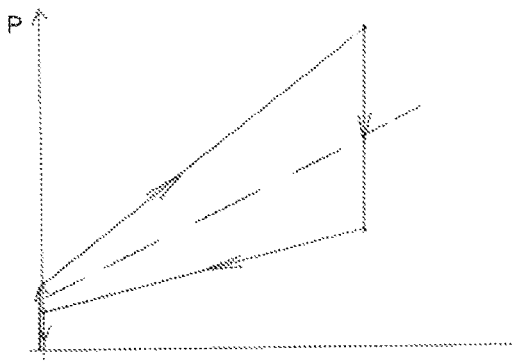

They (equations 1) & 2)) generate a load path with three vertices as shown in FIG. 162. With pretensioned clamping forces they generate a load path with four vertices as shown in FIG. 163. The dashed line through each of the Figures is the load path for the case of a clamped but frictionless sloping surface. Here the path for loading and unloading runs along the same line as with any conventional linear elastic element.

Figure 164:
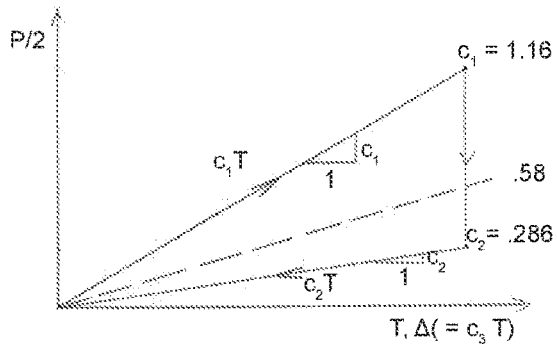

FIG. 164 shows an arbitrary normalised load path for a slope angle of 30° and with friction coefficients of 0.35 and 0.25 for loading and unloading respectively.

Figure 165:
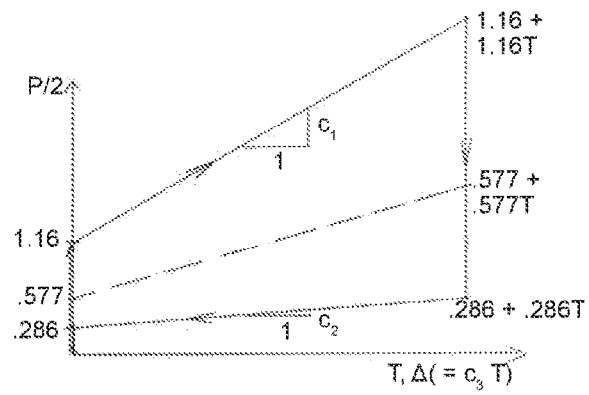

FIG. 165 shows the same case again of the clamped sloping frictional surfaces but here the clamping ties are pretensioned.

Figure 166:
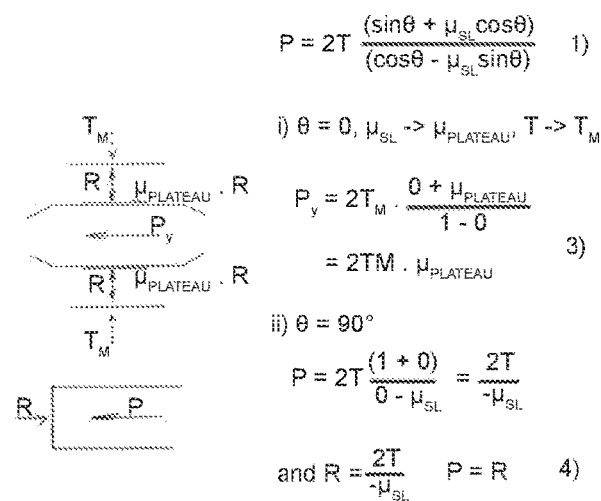

FIG. 166 considers the case of the two horizontal surfaces of the friction block displacing relative to each other, at a constant resistive force Py. Py is here able to be established directly from the first equation for sloping surfaces, equation 1), with Θ=0, T=Tm, and μSL=μplateau.

For the case where there is no frictional resistance between two sloping surfaces, equations 1) and 2) each reduce to $$P = 2T \tan \Theta$$

Figure 167:
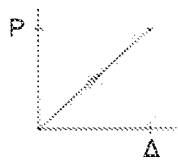
Figure 168:
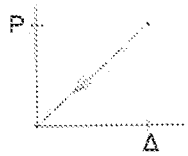
Figure 169:
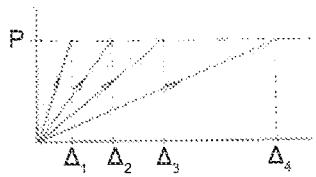

That is, the force P to displacement angle relationship is the same whether the central block is moving to the left (e.g. loading) or moving to the right (e.g. unloading), as shown on FIGS. 167 and 168. The load paths are on the same lines as with a conventional elastic straining system. This is simply because the clamping tension bolts are elastically straining. For this frictionless case, varying the slope of the contact surfaces (while maintaining clamping force T) varies the elastic stiffness, k, of the system, as shown in FIG. 169 where:

$$k = P/\Delta$$

This in turn varies the natural frequency of any mass connected with the system.

Figure 170:
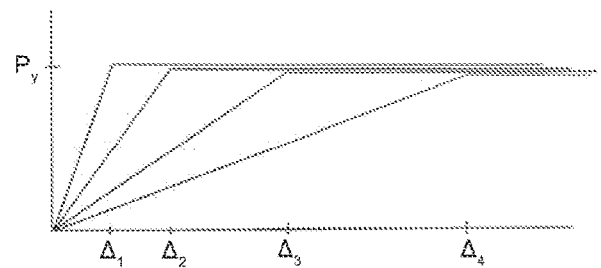

FIG. 170 shows the combined force-displacement relationships of the corrugated system with frictionless sloping surfaces and horizontal or flat surfaces with a coefficient of friction (e.g. μplateau). This being the same load-displacement relationship as a conventional ideal elasto-plastic system.

Figure 171:
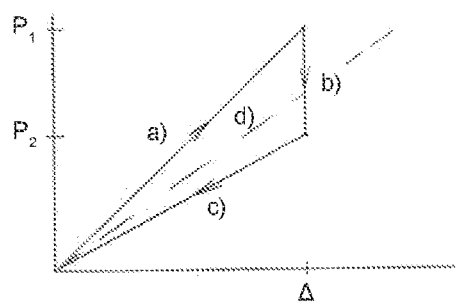

If frictional surfaces (and forces) are introduced to the sloping contact surfaces, the load-displacement path of, for example, the central block moving to the left as shown in FIG. 160 differs from the central block moving to the right as shown in FIG. 161. The response remains linear as for the frictionless case, but the two load directions each have a different stiffness and a different load path as shown in FIG. 171. Equation 1) describes the increasing load with increasing displacement as shown on line a). Line b) is a result of the switch in direction of the frictional forces along the sloping surfaces with change in displacement direction, and line c) is that of reducing load with displacement as described by equation 2) as the sloping surfaces return to origin. Line d) on the same figure represents the case of a frictionless sloping surface and of similar surface slope angle.

The introduction of frictional forces to the sloping surfaces, means that a greater force or more work (than with a same but frictionless surface) is required to displace the central block of FIG. 160 to the left (that is a greater resistance to movement in this direction by the system) and less work is done (than with the frictionless surface) by the system on the load when the central block returns to its origin.

The mechanics of the system can be illustrated in a simple form by use of conventional elastic springs or elastic rods.

Figure 172:
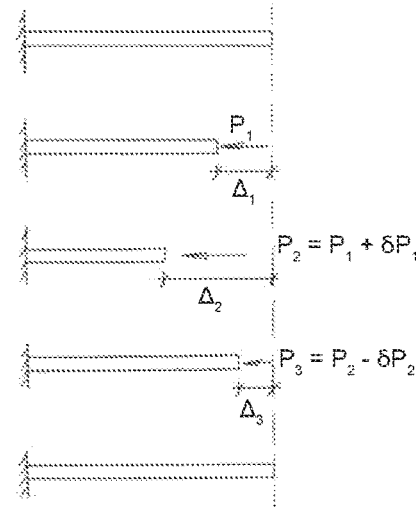

FIG. 172 shows an elastic rod which is progressively loaded and unloaded.

Figure 173:
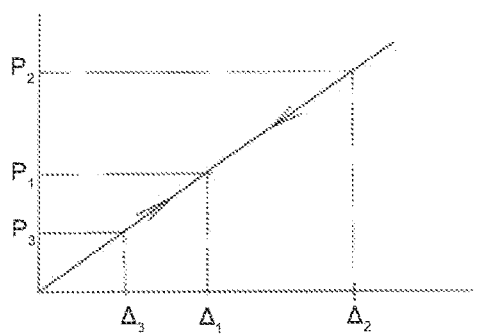

FIG. 173 shows its load path which is along the same straight line for loading and unloading; the rod being of a linear elastic material.

Figure 174:
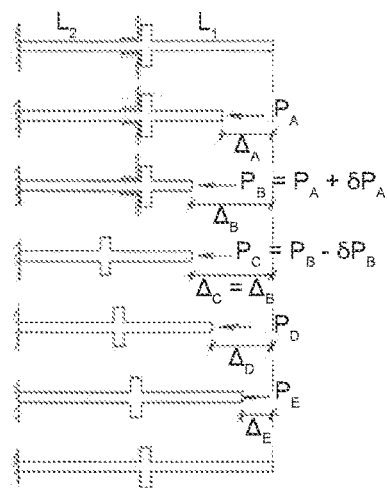

FIG. 174 shows another elastic rod subject to progressive loading and unloading; but here a restraint against displacement is located at around half the total length of the rod. The rod is first subject to a force PA acting to the left; and the right hand side, of initial length L, contracts by ΔA. Further load is applied in the same direction load magnitude PB and the right hand side of the rod contracts (or compresses) further to displacement ΔB.

Figure 175:
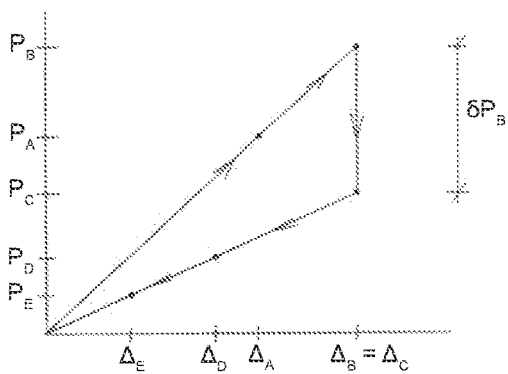

FIG. 175 shows the linear response along the upper line to load PB and displacement ΔB. At this point or time the centrally located restraint is removed which results in a reduction in elastic stiffness, a relaxation of the system and an instantaneous or step drop of load PB to load PC, while displacement remains constant. Load PC is next reduced (part unloaded) to load PD. Load PD is then reduced further to load PE. The response again is linear, but along the lower line which is of a lower slope (i.e. lower stiffness) than the upper line. Load is reduced further until the rod returns to its original (total) length.

Figures 176, 177:
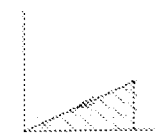

If the reduction (infinitesimal) in load PB (that is reversal of displacement direction) coincides with the removal of the central restraint the system simply has two different linear stiffness values, one for loading, and one for unloading. The different work done by the load or by the system as it is loaded or unloaded is shown in FIGS. 176 and 177.

Figure 178:
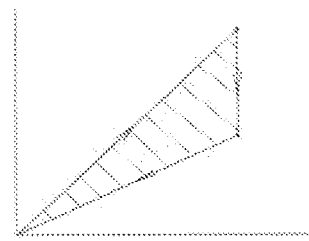

The hatched area shown in FIG. 178 is the difference between work done on (or internally by) the system as load is increased and work done on (or by) the system as displacement is reversed and load is reduced, and the elastic rod returns to its original length. This is not damping, which is a function of strain velocity, but simply the difference in work done by a system which has two elastic stiffness values, one for loading and one for unloading.

Figure 179:
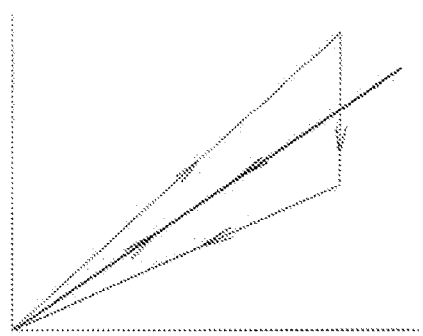

FIG. 179 shows the load (and unload) path of the conventional elastic rod of FIGS. 172 and 173 bisecting the upper and lower load path lines of the two-stiffness system of FIGS. 174 and 175. For this to occur the length of the rod of FIG. 172 sits half way between the restrained and unrestrained lengths of FIG. 174, that is ¾ of total length. The total work done in loading and unloading being the same in both systems. The elastic (strain) rod system of FIGS. 174 and 175 is similar to the elastic (friction) system of FIGS. 160 and 161. The load step of δPB in FIG. 175 equating to the reduction in load (or reversal of displacement direction) and reversal of frictional force direction on the sloping contact surface.

Figure 180:
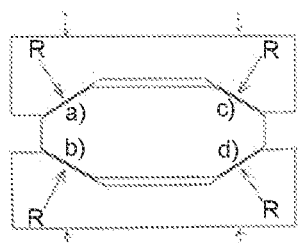
Figure 181:
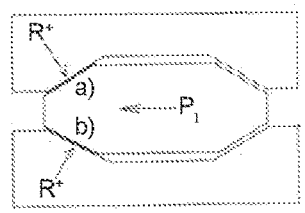

FIG. 180 shows the case of a corrugated friction block in which the clamps or clamping bolts are pretensioned. The blocks are internally strained but in a state of static equilibrium with the rotary units. That is, undisplaced, there is no effect on any structure they are a part of. However with displacement of the central block to the left and loss of contact at sloping surfaces c) and d) a force PI as shown in FIG. 181 is required to maintain equilibrium.

Figure 182:
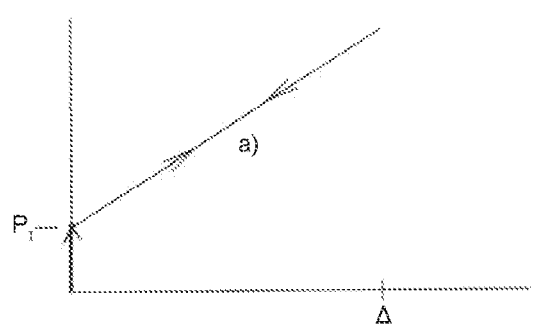
Figure 183:
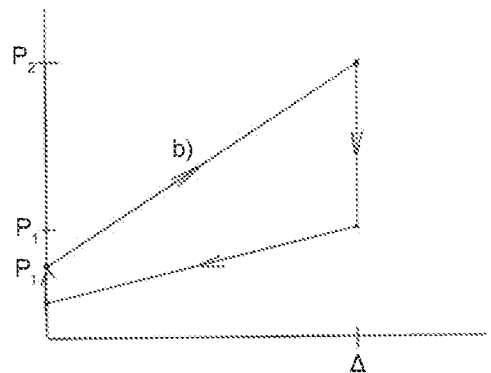

FIG. 182 shows the elastic load displacement curve for the case of pretensioned corrugated blocks with frictionless sloping surfaces and FIG. 183 shows the elastic load displacement curve(s) for devices with friction forces along their sloping surfaces. There is little or no movement with initial force. This equates to a high initial stiffness and force resistance. With increasing load the system shifts from rigid to linear elastic and displaces along line a) on FIG. 182 and along line b) on FIG. 183.

Figure 184:
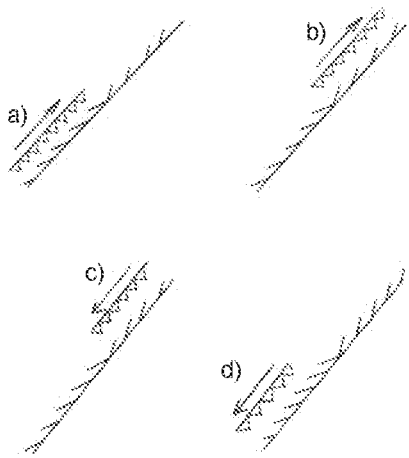

FIG. 184 shows a further possible embodiment of this concept. Here the frictional resistance of the sloping surfaces is directionally sensitive, akin to a telemark ski.

Figure 185:
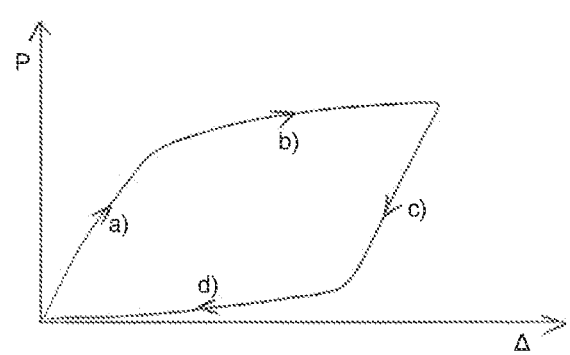

FIG. 185 shows the closed loop return to origin load path. This is an elastic system of continuously variable stiffness. It resists lower applied loads with a higher stiffness (low displacements) but softens as load increases from for example a seismic event. The softening, or reduction in stiffness with load, reduces the natural frequency of masses (and structure) it may be seismically supportive of, and hence the response acceleration of masses supported by the control structure and forces within the control structure.

Figure 186:
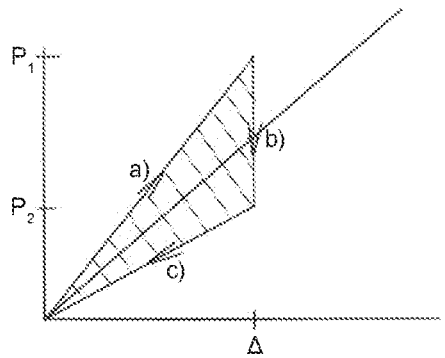

Differences between clamped sloping surfaces with and without a friction component are next considered. FIG. 186 shows the closed loop load path for clamped sloping surfaces with a friction component, and the single line load path of a clamped sloping surface of same slope angle but with no friction component. The elastic (frictionless) line typically lies close to the bisecting line of the closed loop path and, from above, the systems with friction and without friction respond with similar total energy while displacing to the same displacement and returning to origin. In static terms the system produces a greater resistive load under displacement than the frictionless system, but in dynamic terms attracts a higher force because it is a stiffer system.

Figure 187:
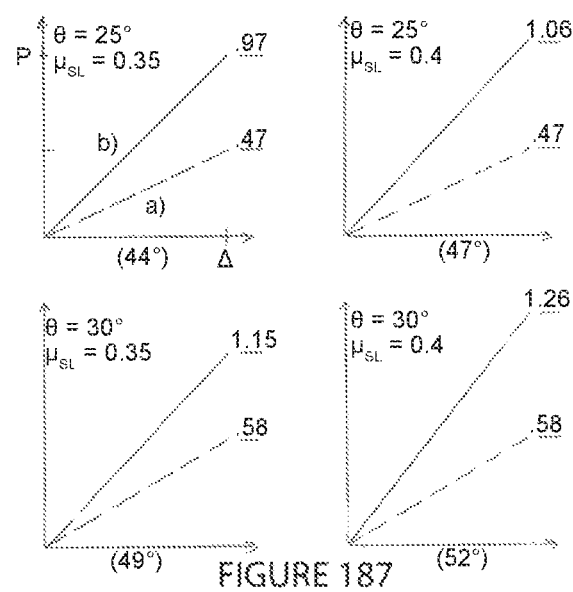

FIG. 187 shows the load paths for sloping surfaces with and without a friction component for various surface slope angles and coefficients of friction. The stiffness under load (along line b)) of the systems with a friction component is around twice that of the sloping surface without a friction component (line a)). This will result in the acceleration response of masses (for same input) directly connected to the sloping (friction) system and forces in connecting structures (and their foundations) being of the order of 40 to 50% more than that of the frictionless (sloping) clamped system but with 70% the response displacement. Elastic strain energies in the (sloping) frictionless system will hence be of the same order as that of the same slope friction system.

Following on from FIG. 187, FIG. 188 shows physically the angles (44° and 49°) of the frictionless contact surfaces required to produce the same (increasing) load-displacement lines as that of the frictional surfaces.

FIG. 189 shows the lower limit angle for frictional surfaces with frictional coefficients of 0.35 and 0.4 respectively. This is the angle below which (under clamping forces) the surfaces will not (without external force) return to origin (that is not slide back). This angle is simply the tan−1 µSL.

FIG. 190 shows the load paths of a pretensioned frictionless sloping surface element (lines a) and b)) and that (line c)) of sloping surface without pretensioning. Both with a common displacement Δ.

FIG. 191 shows the increasing slope or gradient of a clamped frictionless surface load path, with increasing slope angle, and constant clamping force.

FIG. 192 compares load paths for a frictionless sloping surface (30°) with a frictional sloping surface of same slope angle (30°, µSL=0.35) and same clamping force.

FIG. 193 shows the effect of pretensioning forces on a sloping frictionless surface (Θ=30°). This can be compared with the effect of increasing slope angle on FIG. 191.

Figure 194:
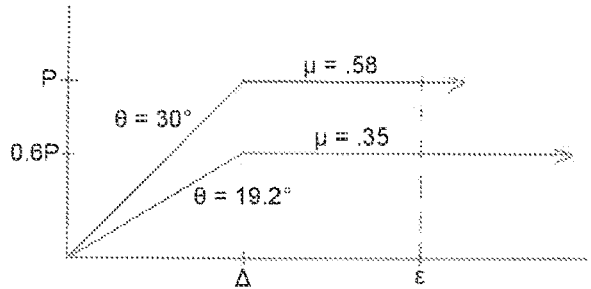

FIG. 194 shows the elasto-plastic load displacement curves of clamped corrugated friction yield blocks with frictionless sloping (elastic) surfaces and frictional flat (plastic) surfaces. The angles of the sloping frictionless surfaces and coefficients of friction of the flat frictional surfaces as described further on to produce an ideal elasto-plastic load displacement curve. With the corrugated friction yield block, the frictionless clamped sloping surfaces (or clamped roller surfaces) are providing the elastic component of the system and the (clamped) frictional flat surfaces are providing the plastic component of the system.

Figure 195:
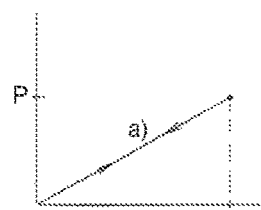
Figure 196:
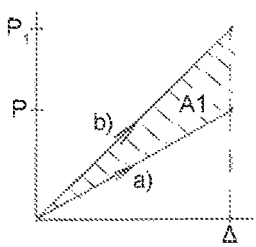

As described above FIG. 195 shows the load path for a conventional linear elastic system. Again as above the path is the same whether applied load is being increased or decreased. The path represents any conventional linear elastic element or system, such as a flexing plate (or a yield plate in its elastic phase), a structure, or as discussed here two sloping frictionless surfaces which are clamped (obliquely) together. The area under the path (line a)) represents the (elastic strain) energy stored in the system or work done on the system by an applied load, or for the case of reducing load, the energy released by the system or (reverse) work done by/on the applied load. If a friction component is added to the case of frictionless sloping surfaces the gradient of the load path increases from line a) for the frictionless case to line b) for the friction case as shown in FIG. 196. That is the elastic stiffness of the system has increased. The area under line b) is greater than the area under line a) however elastic strain energy stored in each system is the same. The increase in work done and higher force P1 is due to (increasing with displacement) frictional resistance along the sloping surfaces and is non-recoverable (or not stored) energy. Compared with the frictionless surfaces the additional work done by the applied load to reach same displacement Δ in the friction system is represented by the hatched area A1 of FIG. 196.

Figure 197:
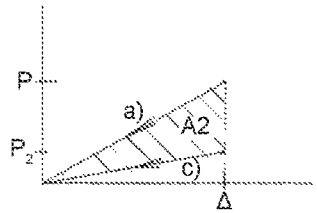
Figure 198:
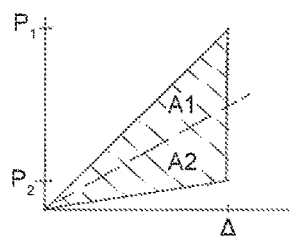

FIG. 197 shows the load paths of the same systems for reversal of displacement direction and reducing load. The load path for the frictionless system (line a)) is the same as that in FIG. 196 but as described above the load path c) for the friction system now lies below line a). The energy effectively released by the system is in this case lower than for the frictionless system. Again this is due to friction forces this time acting against stored elastic forces as displacement reduces to origin. The combined areas A1 and A2 (FIG. 198) represent unrecoverable or lost energy (through frictional displacement) in the load cycle of the friction system. That is, energy dissipation. When compared with the frictionless system there is with increasing load an increasing resistive force with displacement, an increased stiffness, and increased energy dissipation by friction with displacement. The additional strength or resistive force exceeds the increased acceleration response with stiffness of any connected mass (that is increased force). With reversal of displacement direction when compared with the same frictionless system the converse to the above occurs. Resistive force decreases (at same displacement), stiffness reduces and energy dissipation by friction with displacement reduces.

Areas A1 and A2 are of similar order. That is, the increase in work done (or of internal forces) with displacement in one direction is of the same order as the decrease in work done (or of internal forces) with displacement in the opposite direction. Both relative to the frictionless (or neutral) sloping surface.

Figure 199:
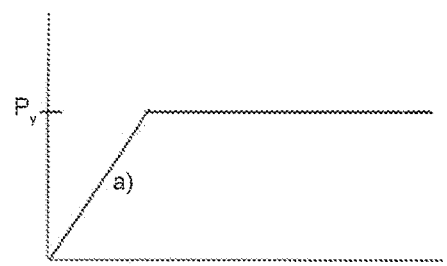

FIG. 199 shows the case of a frictionless sloping surface (or conventional elastic system) within an elasto-plastic system of yield strength Py. The plastic component is provided by for example the frictional resistance of two clamped flat surfaces. This is an ideal elasto-plastic response. The ideal elasto-plastic response is that of the rotary friction units described previously in which the elastic component is independently provided by, for example, a flexing plate and the plastic or yield component by two friction surfaces which are clamped together, the line or direction of the clamping forces being normal to their (flat or curving) contact surfaces. Similarly, rotary units with flexural yield plates (being the principal subject here) that are able to produce a constant resistive yield force, also produce the ideal elasto-plastic response of FIG. 199.

Figure 200:
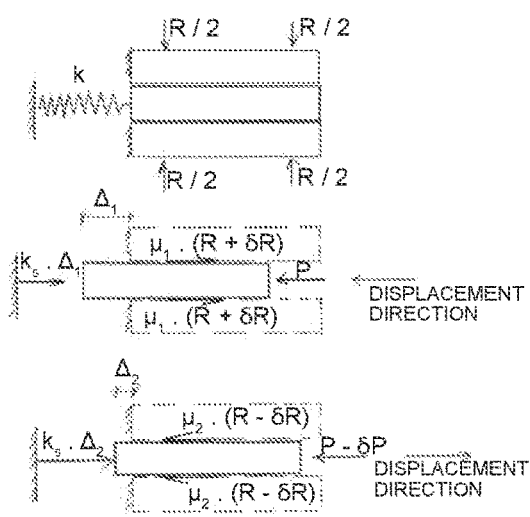

FIG. 200 further illustrates (in linear form) through the combination of a spring and flat frictional surfaces, the mechanics of a pretensioned clamped sloping frictional surface. Here, both spring and frictional surface resist applied load. The outer blocks are relatively fixed in position. There is no displacement in the spring (or applied load) until the frictional resistance of the clamped flat surfaces is overcome. With displacement both spring and clamped surface work in unison to resist the applied load. Increase in resistance with displacement occurs in both the spring and the frictional surface. This is because the spring is elastically compressing and the clamping force on the flat surfaces is increasing with displacement. With change in displacement direction (or unloading) the direction of frictional resistance has reversed and spring force and frictional force are now in opposing directions and the magnitude of each is reducing with displacement.

Figure 201:
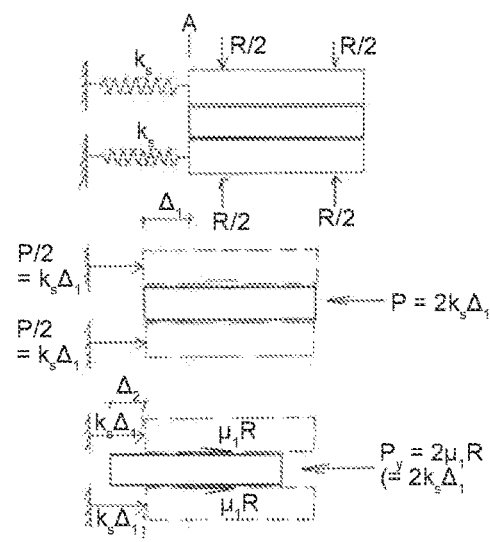

FIGS. 201 and 202 illustrate the mechanics of the rotary friction units described previously. Here the springs (e.g. flexing plate) compress first with no slippage between friction surfaces. That is the three friction blocks travel with the applied load, while spring forces to the two clamping plates (and to resisting load P) increase. Frictional sliding at the contact surfaces occurs only when the frictional resistance force $\mu 1R$ is exceeded. This can occur either by the spring force increasing to this value (i.e. $ks\Delta 1 = \mu 1R$) or by a physical limiter stopping displacement of the spring and applied load then reaching this force. At this stage the resistive force is (preferably) constant as the central (slotted) plate displaces relative to the two now stationary outer plates. Once load is reduced or displacement changes direction, slippage stops and the system reverts back to an elastic response which (typically) continues through two elastic limit displacements, at which stage the system is again responding plastically. Again this is illustrated in the load paths of FIG. 199.

FIG. 203 shows a clamped corrugated friction yield block. The sloping surfaces at angle Θ have no (or very low) friction component. That is the surfaces are frictionless. The flat surfaces, however, have a friction component. That is they are frictional surfaces and with a friction coefficient of μplateau.

FIG. 204 shows the sloping frictionless surface(s) of FIG. 203 displaced relative to each other. The clamping ties are stressed and providing a vertical clamping force, T, at the surface contacts. This resolves as a horizontal resistance force of $$T \tan \Theta$$

Figure 39:
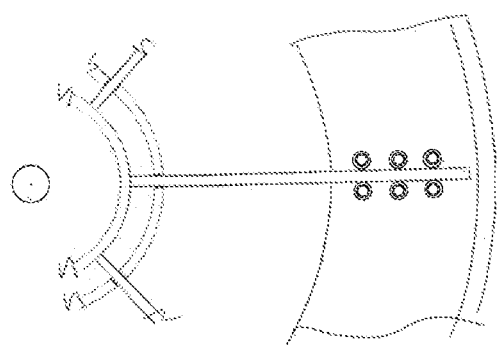
Figure 40:
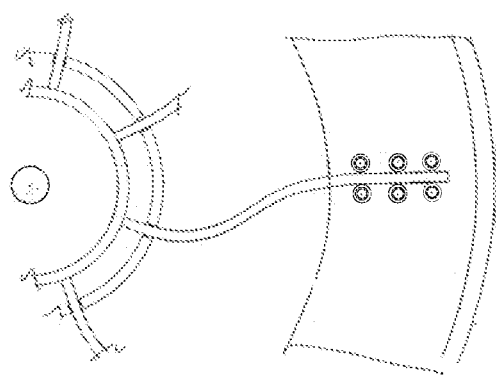
Figure 41:
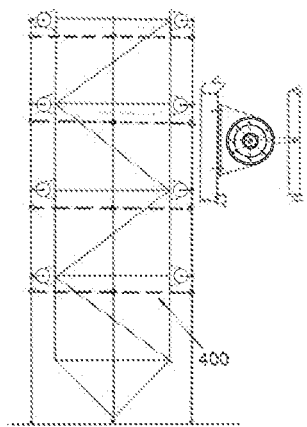
Figure 42:
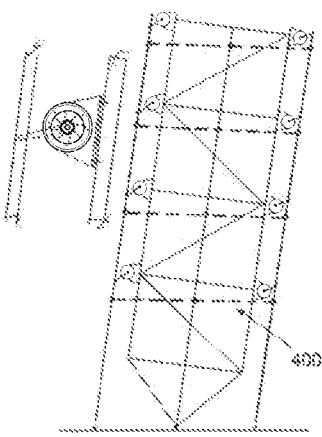
Figure 43:
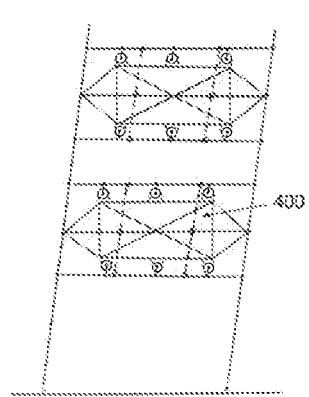
Figure 44:
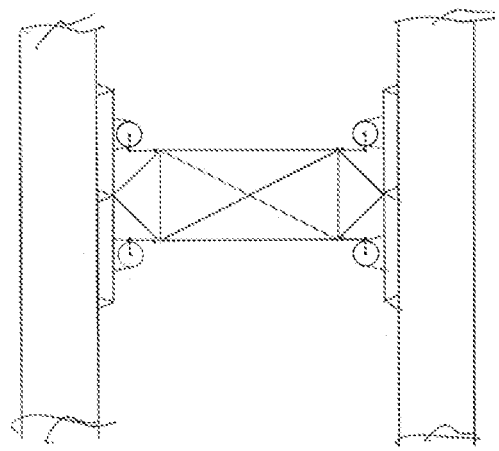
Figure 45:
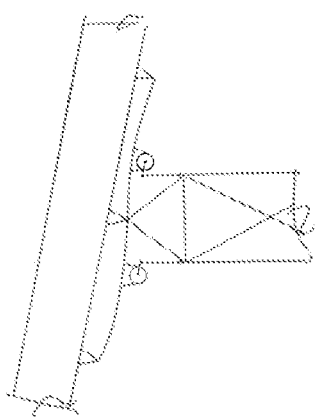
Figure 46:
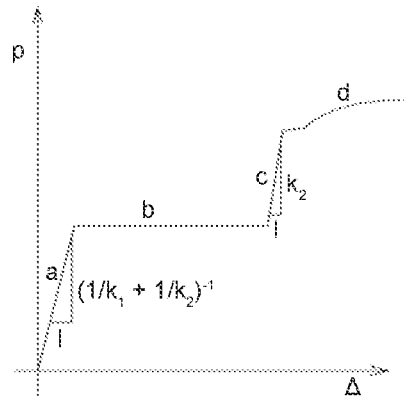
Figure 47:
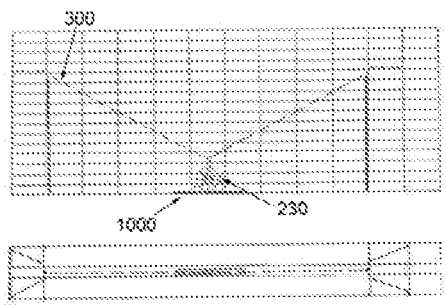
Figure 48:
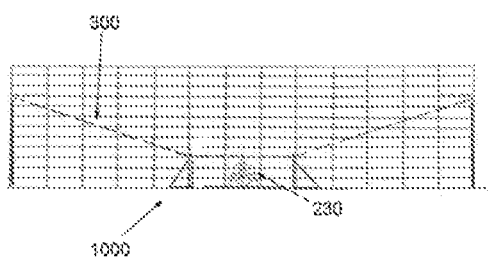

As described above, as the slopes continue to displace, the clamping force increases (with displacement) to a maximum force Tm. As shown in FIG. 669-39, resolved horizontally, this force, Tm¬, produces a horizontal resistance force of $$Tm \tan \Theta$$

FIG. 204 shows the system at its elastic limit. With continued displacement in this direction it is the two horizontal surfaces that are in contact. With continued displacement the clamping force remains constant at Tm, and orthogonal to the two displacing surfaces. This produces a preferably constant resistive force with displacement, and this is the plastic component of the system.

FIG. 205 shows three elastic-plastic load paths.

FIG. 205*a* shows the case where the tangent value of the angle, Θ, of the frictionless sloping surface is greater than the coefficient of friction of the flat surfaces, μplateau.

FIG. 205*b* shows the case where the tangent value is less than the coefficient of friction of the flat surfaces.

And, FIG. 205*c* shows the case where the tangent value of the angle of the frictionless sloping surfaces is the same as the coefficient of friction, μplateau, of the flat contact surfaces.

FIG. 205*c* is that of an ideal elasto-plastic response. If, for example, the coefficient of friction of the flat surfaces, μplateau, was 0.3, for this ideal case the angle of the sloping frictionless surfaces would be 16.67° (i.e. tan-1 0.3). Similarly, if μplateau was 0.4 the required slope would be 21.80° as shown in FIG. 206.

FIG. 183 shows the load-displacement path of clamped frictional sloping surfaces which have been pretensioned.

FIG. 182 shows the load-displacement path of clamped frictionless surfaces which have also been pretensioned. The load path to pretension force PI (and then beyond) is that of a rigid-elastic response. The ratio of response acceleration to base input acceleration will be high in the rigid region. That is for low ground accelerations response accelerations will be high.

However, where a flexible structure links the device to a mass, although the device remains rigid at lower demand, the structure as a whole is no longer rigid, but has flexibility at all load stages, as shown in FIG. 207. This can also be overcome by the addition of a secondary flexural member.

The corrugated friction yield block with frictionless sloping contact surfaces (elastic phase) and frictional flat contact surfaces (plastic phase) has the following properties:

- angle of frictionless sloping surfaces is able to be adjusted to a wide range of practicable angles, thus directly adjusting elastic stiffness, while ability to (elastically) return (slide back) to origin is not impeded by friction
- in elastic state (displacing along frictionless sloping surfaces), it is able to be configured to maintain low response accelerations within masses it is supportive of
- it is able to be configured to remain elastic (that is return to origin as with any elastic structure) while subject to high ground motion input. This is achieved simply by increasing its flexibility (e.g. by lowering the angle of its frictionless surfaces)
- in plastic state (displacing along frictional flat surfaces) it produces a preferably constant resistive yield force
- the capacity to do work (that is dissipate energy) in its plastic state is able to be arbitrarily increased simply by increasing the lengths of the flat sections of the frictional contact surfaces. That is its capacity to endure higher peak displacement demands for its given yield strength
- the simple response of the system (that is a constant natural frequency and yield strength) simplifies an elasto-plastic dynamic analysis (time history)

The corrugated friction yield block returns to its origin, as with all elastic systems, only when its elastic strength or elastic yield displacement has not been exceeded. It (the block) is able to be configured to remain elastic at given earthquake input (or particular earthquake record). But when this magnitude is exceeded the friction yield block shifts into its plastic phase (that is shifts from frictionless sloping contact surfaces to frictional flat surfaces), where it is again able to be configured to endure and resist with constant resistive yield force considerably higher earthquake input (e.g. PGA). But once in this (plastic) stage the corrugated yield block does not (without an exterior force) return to its original state.

Figure 208:
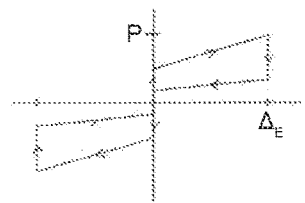

FIG. 208 shows the load-displacement paths for an elastic (that is return to origin) slip friction device with pre-tensioned clamped frictional sloping contact surfaces, as referenced above. The hatched area represents energy dissipation (non recoverable work done by the displacing frictional surfaces).

Figure 209:
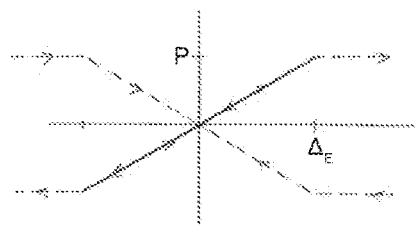

FIG. 209 shows the load displacement paths for a corrugated friction yield block, as discussed above, which comprises frictionless sloping surfaces and frictional flat surfaces. The elastic paths in FIG. 209 are drawn to match the maximum resistive force and displacement that the device as shown in FIG. 208 is configured for. That is, up to a resistive force P, both systems are elastic, and return to origin. However the corrugated friction yield block has capacity for post-elastic displacement, and this capacity is increased simply by increasing the length of its flat contact surfaces.

Figure 210:
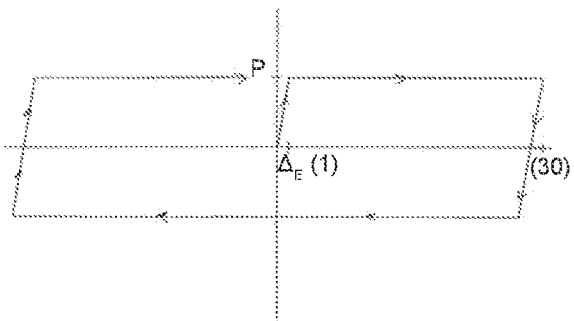
Figure 214:
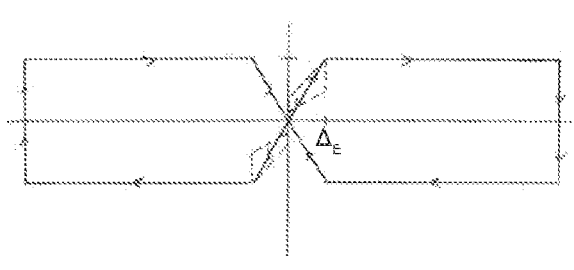

FIG. 210 shows the elasto-plastic load displacement path of a flexural yield plate as described herein. The plate has an elastic displacement limit (to yield) of 1 mm and is shown yielding to a total displacement of 30 mm. This equates to a displacement ductility factor of 30. As discussed herein 8 mm and 12 mm yield plates, as described, have been cyclically tested to ductility factors in excess of 40 while maintaining a constant resistive yield force. The load displacement path of a corrugated friction yield block, with frictionless sloping surfaces and frictional flat surfaces has a similar load path as shown in FIG. 214.

Figure 211:
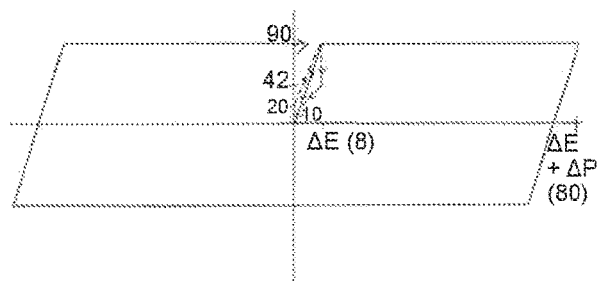
Figure 212:
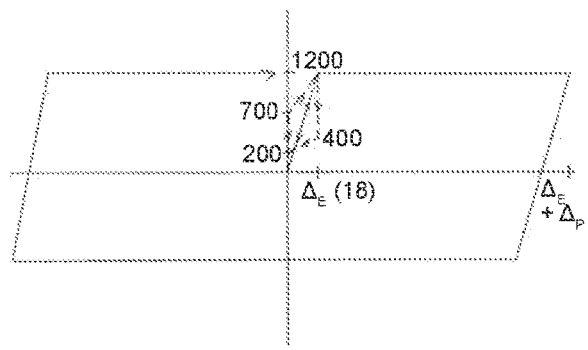
Figure 213:
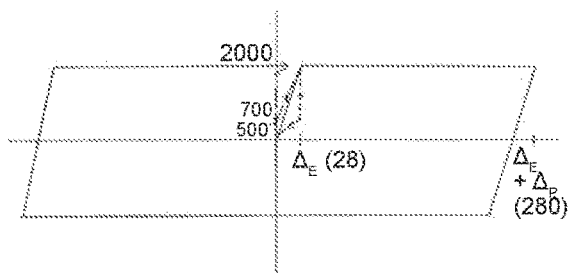

FIGS. 211, 212, 213 show the elasto-plastic displacement curves for flexural yield plates of different sizes (here 8 mm, 12 mm and 8/10 space/8 composite) and of different spans, each producing different elastic stiffnesses, that is different load paths to yield displacement. Superimposed on these paths are the load paths of various clamped sloping frictional surfaces of similar elastic stiffness. From these load paths ductility factors for the yield plates may also be derived (in terms of energy) by determining the total area under the elasto-plastic curves and equating with the area of the elastic component. Effective ductility can similarly be derived from the load paths of the sloping frictional surfaces which have elastic and non-recoverable energy components.

The flexibility (elastic stiffness) of the flexural yield plates (and rotary unit) is able to be adjusted directly by varying the thickness and/or span of the yield plates or indirectly by introducing a secondary flexural member or by adjustment of both. The yield strength (elastic limit strength) and yield displacement of the flexural yield plates is able to be adjusted by again varying the plate span or thickness, or further varying the plate material yield stress (e.g. type of steel), or varying the width of plates or number of plates. Both the flexibility and yield strength of the yield plates, that is their elastic parameters, are able to be configured with relative ease, to be the same as practicably any other elastic system. This is illustrated on FIGS. 211 to 213, where the flexibility and elastic strength of various flexural yield plates has been configured to effectively match that of a number of arbitrary elastic slip friction devices with clamped frictional sloping surface, as described above. However, the flexural yield plates, as shown on the Figures, also have the capacity and ability to continue displacing beyond their elastic displacement limit (i.e. yield displacement) to at least 10 times beyond their elastic displacement limit (which is the same in each system) while maintaining a constant resistive yield force. This means that the system with the flexural yield plates, and of same elastic strength and stiffness as the frictional sloping surface system, is able to provide or produce an elastic strength equivalent, in resisting a base motion input, of 10 times that of the sloping surface friction system while limiting and controlling forces within itself and any mass it may be seismically supportive of. That is, the flexural yield plate system is (conventionally) able to resist and endure a base motion input (i.e. earthquake) of (at least) 10 times peak ground acceleration (PGA) of the sloping friction system or any other equivalent system of same elastic strength and stiffness while maintaining a constant resistive yield force. Further, the flexural yield plate system when subject to the same maximum base motion input that the (e.g. sloping frictional surface) devices are able to endure, also returns to its origin (that is remains elastic).

With conventional elasto-plastic behaviour involving the straining of elastic-plastic materials (e.g. ductile steels), the transition back to an elastic state (from a plastic one) occurs when (response) strain velocity (here plastic strain velocity) reaches zero. At this stage, although the material is plastically (or permanently) deformed, it retains its (latent) elastic properties. That is, it responds elastically while still in its plastically deformed state. This can be envisaged from the typically small springback that occurs in a plastically deformed metal once load is removed.

Figure 215:
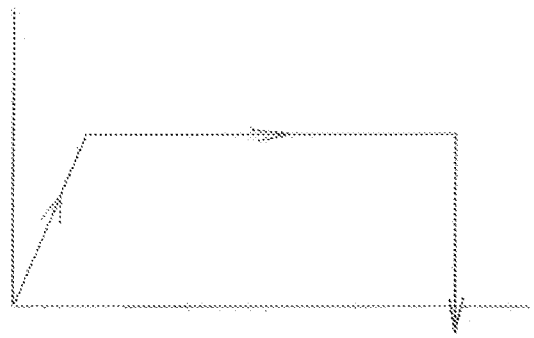

FIG. 159 shows the case of the two clamped horizontal surfaces (in their effectively plastic phase). If (plastic) displacement stops (i.e. relative surface velocity is zero), the surfaces remain in this position. There is no springback or continuation into an elastic phase. Displacement must, this time, start from or continue directly into a plastic state. This is a rigid-plastic response, as opposed to the systems initial elasto-plastic response. The system is no longer emulating an elasto-plastic response with a finite stiffness (or elastic frequency), but at this time is behaving as a rigid-plastic system. This is illustrated by the vertical line to the right of the load-displacement FIG. 215.

The friction unit assemblies with flat clamped surfaces described previously (i.e.) not corrugated) and with an elastic component, are behaving in the same manner as a conventional elasto-plastic system which involves the elastic and plastic straining of ductile materials (e.g. steels). The elastic component of the friction unit comprises conventional elastic straining and the plastic component comprises the preferably constant resistive force produced by the relative displacement of the two clamped frictional surfaces.

A ductility factor for the friction system can hence be obtained in the same way that it would for a straining system. That is the ratio of the total (elastic plus slip displacement) displacement to elastic (yield) displacement.

Further, in the same manner as a conventional elasto-plastic straining system, responding cyclically to a base motion input, once strain velocity, or in the friction case, relative intersurface velocity approaches and equals zero, the system (typically) instantly reverts to an elastic system, elastically straining and displacing in the opposite travel direction over a displacement magnitude of two yield (elastic) displacements (e.g. tension yield then compression yield displacement), before again continuing in this direction as a plastic (or friction) system.

The corrugated friction system however, behaves only in part as a conventional elasto-plastic system. As it displaces from its initial position with frictionless sloping surfaces displacing relative to each other, the system is behaving elastically, in that further force is required for the sloping forces to continue displacing (upwards), because with increasing displacement there is increasing (elastic) tension in the clamping bolts (and sprung washers if present) and increasing (force) resistance to displacement (the sloping surfaces returning to their initial positions with load reduction). As above, as the sloping surfaces reach their maximum relative (sloped) displacement, the force in the bolts (and sprung washers if present) is at a maximum.

With further displacement along the now horizontal surfaces (parallel with load direction) tension in the bolts (clamping force) remains preferably constant as does (preferably) the resistance force to further displacement (or force required to keep the surfaces displacing).

When plastic displacement between the horizontal surfaces stops (in response to change in base acceleration), the first peak response displacement has been reached. This is typically accompanied (dependent on input) by a reversal of displacement direction, and in a conventional elasto-plastic system by a transition back to an elastic state over two elastic yield displacements and a continuation into a plastic displacement state in the opposite direction of the first plastic stage.

However, with the corrugated friction units; at this stage the horizontal friction surfaces are effectively stuck on the plateau and there is no change back to an elastic phase with typical reverse displacement. Further displacement in the (typically) reverse direction involves an immediate plastic start. At this stage the friction unit is responding as a rigid-plastic system (as opposed to an elasto-plastic system). Peak response displacements (of the structure) in this system will be equal to or less than a comparable elasto-plastic system.

Peak response accelerations of masses supported, by this system, or a conventional elasto-plastic system, are governed by the yield strength of the system, and hence are no different between the two systems having the same yield strength.

The significance of having an elastic component (or not having one) (in either a straining or friction system) is that it enables either system (the elastic component) to sustain or endure higher base or ground motion input (accelerations) before plastic yielding occurs in the plastic straining system or before sliding occurs in the friction system, and hence before permanent deformation occurs in either system.

That is a rigid-plastic or near rigid-plastic system or a rigid-friction system of a given yield strength or slip resistance will plastically displace (plastically strain) or in the friction system (slip); at lower base or ground accelerations than an elasto-plastic or elasto-friction system of the same yield strength or slip resistance, but configured with sufficient flexibility in its elastic range.

The addition of a secondary flexural member to a rotary unit which contains the corrugated friction blocks enables the system to behave as an elasto-plastic system at all stages, but one in which there are two elastic components. That is secondary flexural member flexibility when friction surfaces are horizontal and secondary flexural member combined with effective elastic component when the two contact surfaces are sloping surfaces.

Figure 216:
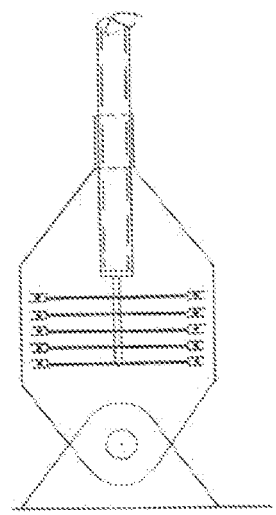
Figure 217:
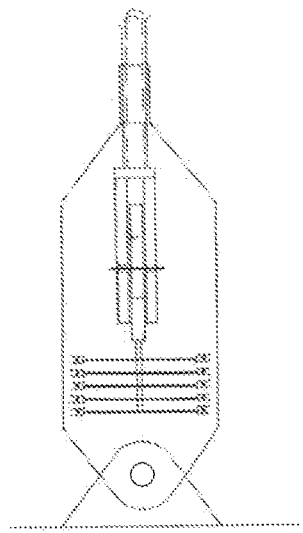
Figure 218:
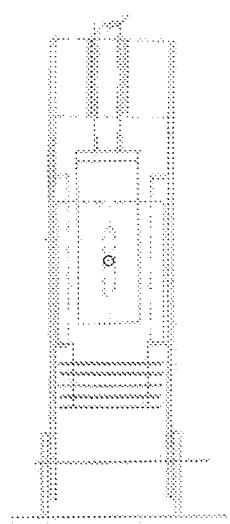
Figure 219:
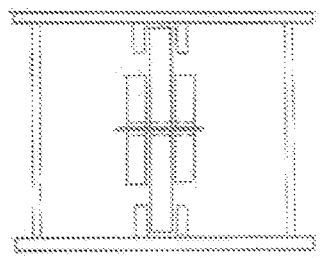
Figure 220:
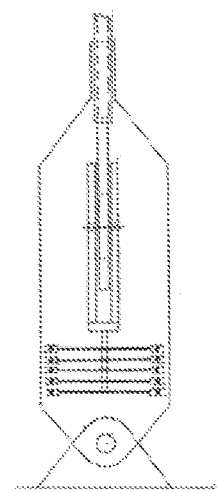
Figure 221:
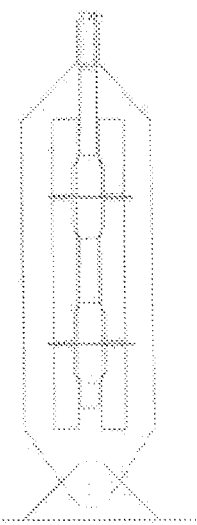
Figure 222:
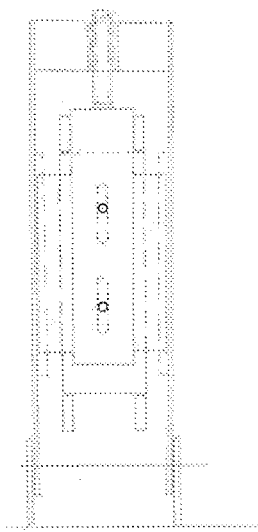
Figure 223:
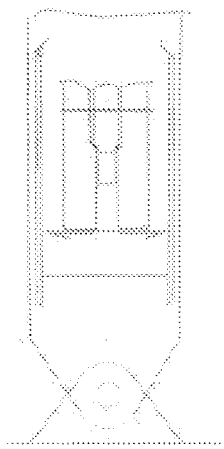
Figure 224:
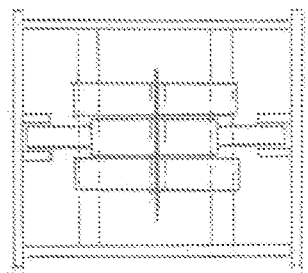

FIG. 216 shows a schematic view of DELTA1 yield plates within a sleeve guided rocker unit.

FIGS. 217 to 220 show schematic views of a friction yield unit within a sleeve guided rocker unit. Here the elastic component is provided by DELTA1 flexural plates and the separate plastic component by the clamped friction plates. As described above the friction plates travel with the elastically displacing plates until the frictional resistance between the friction plates is overcome, at which stage the friction plates slide (displace) relative to each other while displacement in the flexing (DELTA1) plates has stopped, either because their elastic resistance exceeds the frictional resistance of the plates, or their flexing is arrested by travel limiters.

FIGS. 221 to 224 show schematic views of a corrugated friction yield block within a sleeve guided rocker unit. The central block displaces with the sleeve guided push rods, while the two clamped outer plates are configured to not displace in this direction (along the line of the push rods) but are configured to freely displace or open in the lateral direction by restraints which produce preferably no resistance in this (transverse) direction (e.g. frictionless or roller).

Figure 225:
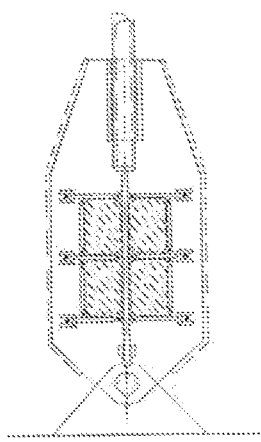
Figure 226:
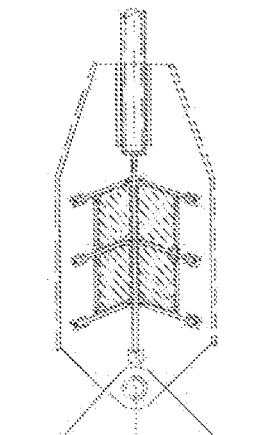

In a further embodiment shear yield blocks (elements) are located within a sleeve guided rocker unit as shown in FIG. 225. The shear blocks are of a material with very high plasticity but relatively low yield strength (e.g. lead or a composite or alloy of). Displacement of the push rods of the sleeve guided rocker unit produces a preferably constant yield resistance force as the confined or unconfined shear blocks plastically deform (shear) as shown in FIG. 226. Secondary flexural members as previously described are able to be integrated with the rotary units (of which the sleeve guided rocker units, as shown previously in FIGS. 82 and 115 are a third part) to provide an elastic component to the system.

Returning to rotary units with flexural yield plates; in a further embodiment the BETA rotor and push rod to rocker frame connection of the ALPHA1 control structure are configured so that elasto-plastic displacement of the yield plate(s) within the rotary units is primarily, or only, in one direction; as the rocker frame displaces (rocks) in opposing (both) directions while enduring base motion input.

Figure 227:
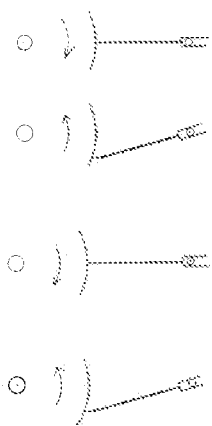

FIG. 227 shows a DELTA4 yield plate within a rotary unit which first elasto-plastically displaces downwards under the action of a push rod displacing and causing rotation of the rotary unit's drum, and is then (with change in sway direction of the rocker frame) pulled upwards to its approximate initial condition and after a rocker cycle return is then pushed downwards again. Elasto-plastic curvature within the yield zone of the yield plate is primarily of one sign (positive or negative) only.

Figure 228:
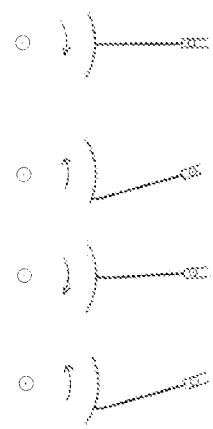

FIG. 228 shows a DELTA4 plate similar to that of FIG. 227 where the plate returns after vertical down displacement to a position just below the horizontal line, that is, curvature is of only one sign.

Figure 229:
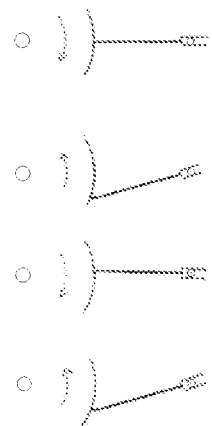

FIG. 229 shows another case where the DELTA4 plate returns to a position just above the horizontal line that is curvature of two signs but one curvature significantly larger than the other.

Figure 230:
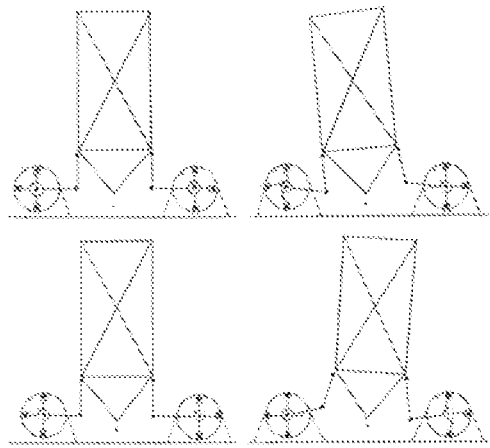

FIG. 230 shows an APLHA1 control structure with yield plates within a rotary unit. As the frame rocks, back and forth, the yield plates are elasto-plastically displacing primarily in one direction only: downwards. To achieve this, the rotor arm fixed to the drum no longer extends to pin connect with the push rod of the rocker frame. A separate lever arm is introduced which first connects to the free spin axle of the rotor drum, and second extends to pin connect with the push rod, and third connects to the end rotor by a connector which enables the lever arm and rotor plate to connect and pin-connect as the rocker frame sways back and forth. FIG. 230 shows a rocker frame first swaying to the left. The yield plates within the rotary unit to the left of the base pivot are flexurally displaced while the yield plates to the right of the base pivot do not flex, and the lever arm and end rotor plate, rotate relative to each other. The rocker frame next sways to the right, and the yield plates within the rotary unit to the left of the base pivot are pulled up by the push rod to their original (effectively flat or now displaced) positions while the yield plates in the rotary to the right remain non-displaced. At this stage as (or if) the rocker frame continues to sway to the right, the connection between the (end of drum) rotor plate and the lever arm to the left of the base pivot disconnects, and now the lever arm and rotor plate to the left rotate relative to each other while the connection between the rotor plate and the lever arm to the right of the base pivot reconnects and elasto-plastically displaces the yield plates to the right of the base pivot, while the yield plates to the left remain (as did the yield plates to the right in the previous half cycle) flexurally non displaced.

FIGS. 231 to 235 show schematic details of the connection between the end rotor plate of the drum and the lever arm which enables the two to, in this case, first push the yield plates (or elasto-plastically displace them), as the rocker frame displaces (rocks) in one direction and then, second, pull up the yield plates, after the rocking direction reverses, to their initial relative horizontal positions which coincide with the rocker frame being in its initial (non-displaced) position and then third release or dis-engage the connection between the rotor plate and lever arm so that the rocker frame is able to continue rocking while not influencing the yield plates to its (say) left of frame pivot, but re-engage with and displace the yield plates to its (say) right of frame pivot.

Figure 231:
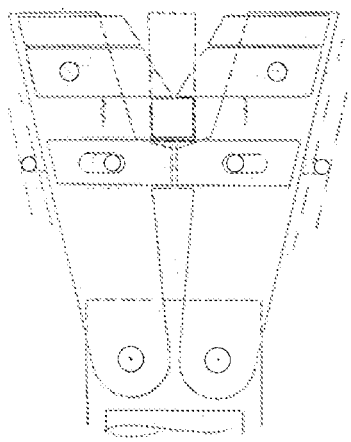
Figure 236:
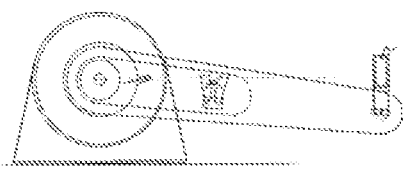

FIG. 231 shows the connector at a position which equates to the yield plates to one side of the rocker frame base pivot being elasto-plastically displaced to their maximum displacement and is depicted in FIG. 236 as the lever arm and rotor plate being in a downwards position. At this stage the frame (typically) reverses, the lever arm rotates up, and the square (pin) peg of the lever arm pulls the end rotor plate of the drum up with it, while guides or tracks integral with the arm open the connector.

Figure 232:
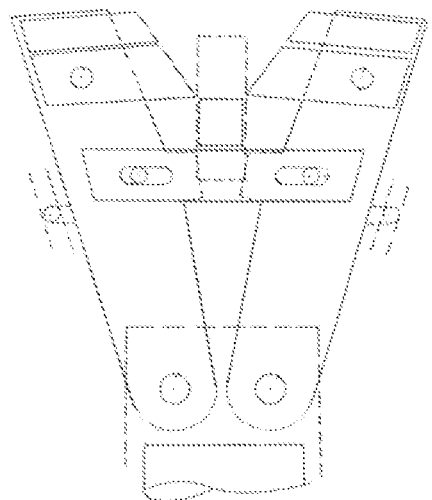
Figure 237:
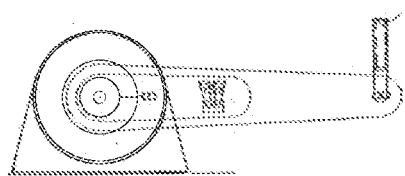

FIG. 232 shows the connector in a position that equates to the plates having been pulled back to their original non-displaced (or effectively flat) position, as depicted in FIG. 237 where lever arm and rotor plate position coincide horizontally. At this stage, dependent on structure response to ground motion the lever arm can either be pushed down (i.e. the peg moves downwards) and engage with the rotor plate which would rotate and elasto-plastically displace the yield plates again, or it can rise and disconnect from the rotor plate, hence leaving the rotor plates and yield plates to its side of the base pivot non-displaced.

Figure 233:
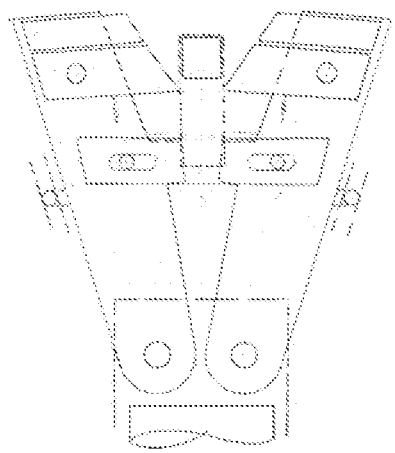
Figure 238:
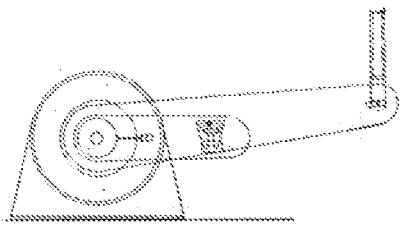

FIG. 233 shows the peg in a maximum free slide position which equates to maximum rotational separation of the lever arm and the rotor plate as depicted in FIG. 238.

Figure 234:
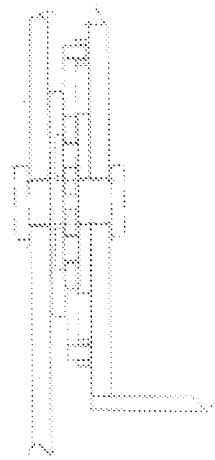
Figure 235:
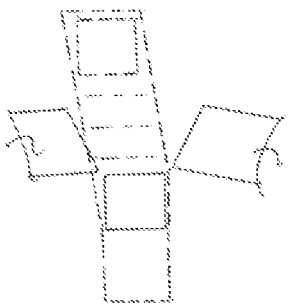

FIG. 234 shows a plan sectional view of the connector between the lever arm and the rotor plate, the connector, rotary unit and yield plates to the opposite side of the unit described above, connecting and disconnecting in a similar (but with half cycle phase difference) manner.

The connector is enabling primarily one direction elasto-plastic displacement, within the yield plates of the rotary units. This reduces differential (trough to peak) elasto-plastic displacement (or travel) on the yield plates by up to one half and will increase the number and amplitude of displacement (half-cycles) it can endure.

The connecting and disconnecting joint detail which enables the yield plates to elasto-plastically flexurally displace in primarily one direction only may also be incorporated into the ALPHA2 control structures. For vertically (tower) orientated rocker frames the connector would be located between the bottom of the external chords and foundation or structural base. For horizontally (spanning) orientated rocker frames it would be located between the ends of the horizontal exterior chords and stiff vertical chords.

In a further embodiment the rotary energy dissipator and force limiter is located within a braced frame control structure.

Figure 239:
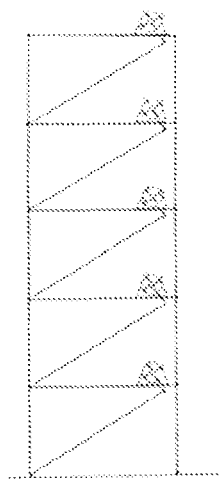

FIG. 239 shows a rotary unit, with pin ended diagonal push rods located within the braced frame. In this case DELTA4 yield plates are located within the rotary unit. The frame is effectively an eccentrically braced frame. This allows for the beam to which the rotary unit is fixed to be considered as a secondary flexural member similar to that, as described previously. This arrangement allows for a two-tier (or two stage) elastic-ductile system to be developed as previously described. FIG. 690 shows the braced frame in its non-displaced form.

Figure 240:
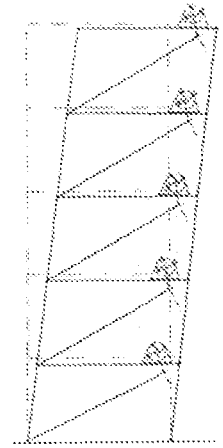

FIG. 240 shows the braced frame in its displaced form with elasto-plastically flexing DELTA4 yield plates.

Figure 241:
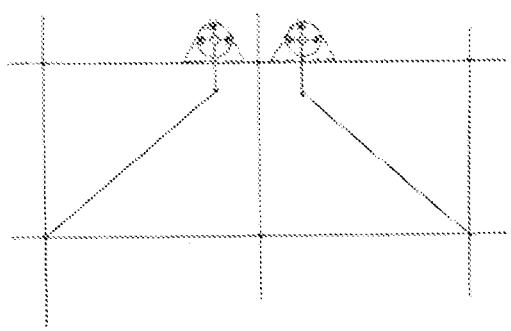

FIG. 241 shows a two bay braced frame arrangement which enables the connect/dis-connect joint described previously, to be employed. As described above this would result in elasto-plastic displacement in the yield plates, being primarily in one direction.

Figure 242:
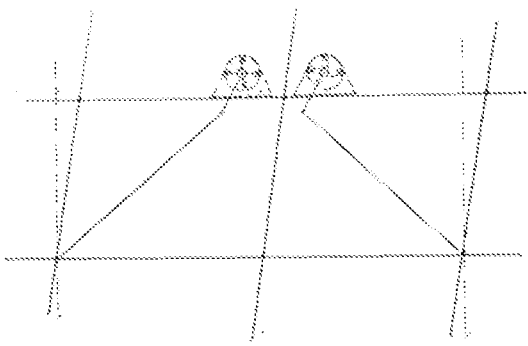

FIG. 242 shows the braced frame of FIG. 241 in displaced form. Here the connector between lever arm and rotor plate, of the rotary unit of the left bay, is disengaged and the yield plates within the rotary unit this side are not elasto-plastically displacing, while the connector between lever arm and rotor plate of the rotary unit of the right bay is engaged and the yield plates within this rotary unit are elasto-plastically flexing (yielding).

The displacement mechanics of the particular free translational or free translational and free rotational boundary conditions of the end regions of the flexure member 100 (yield plate) as described above and the constant resistive yield force produced by the yielding plate(s) with these boundary conditions are next described in detail.

Figure 243:
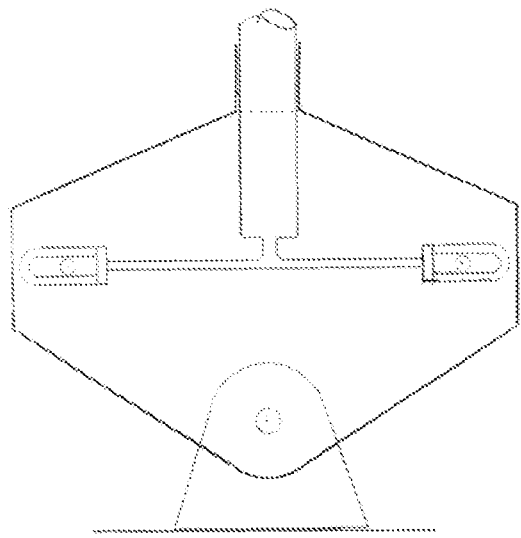

FIG. 243 shows a schematic of a flexure member (DELTA1 plate) within a BETA1 rocker with sleeve guides, all parts of a control structure within an ALPHA1 rocker frame as described in WIPO PCT/IB2017/056135 and WIPO PCT/IB2017/056137.

Figure 244:
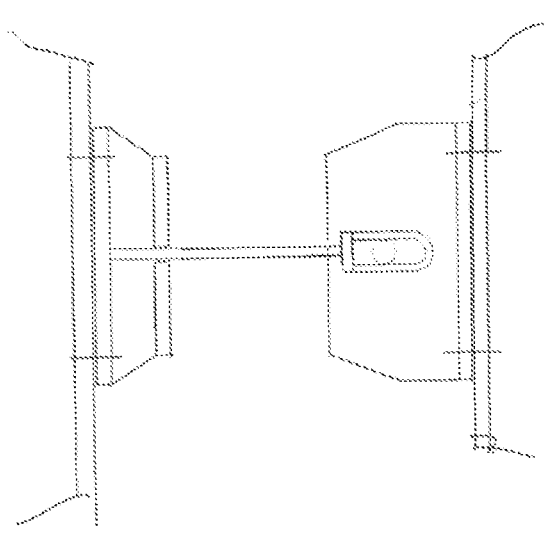

FIG. 244 shows a schematic of a flexure member (DELTA4 plate) which is part of a control structure within an ALPHA2 rocker frame as described in WIPO PCT/IB2017/056135 and WIPO PCT/IB2017/056137.

FIG. 245 shows a schematic of a DELTA4 yield plate within a BETA rotor which as described above and as with FIGS. 243 and 244 is the force limiting and energy dissipating part of a control structure within an ALPHA1 or ALPHA2 rocker frame.

In all cases (i.e. FIGS. 243, 244 & 245) the free translational or free translational and free rotational boundary conditions at the end region(s) of the flexure member (plate) are configured to be an extension of the plate itself. They are able to rotate/translate with the end regions of the plate while their anchor (cylinder/pin) reaction points remain fixed in space (refer FIGS. 246, 252 & 253). That is the (horizontal) spanning distance of the plate(s), between reactions points, remains constant, while the flexing (deforming) length along the plate, (inclusive of the sliding/rotating hinges), between reaction points, increases with load (refer FIG. 246, a increases to b).

The resultant R, at the reaction point, is orthogonal to the tangent of the restraining boundary surface (e.g. pin) at the plate to boundary surface contact point and in this case also remains orthogonal with the plate at the reaction point while the plate slides and rotates at that point. This is consistent with there being no membrane forces in the line of the plate at this point. That is, the principal directions at the reaction points are one, orthogonal to, and parallel with the plate at the reaction point.

Because the reaction points (e.g. pins) remain in a constant position while the flexing length of the plate increases a horizontal reaction, RH, is generated. (Refer FIGS. 246 & 247). The ratio of the horizontal reaction, RH, to the vertical reaction, RV, increases with displacement in this direction. (Refer FIG. 248). At high displacements the plate is effectively being horizontally squeezed between (or pulled through) the reaction points, (FIG. 246). For a yielding plate made of a material which has a flat (zero gradient) yield plateau and which does not strain harden, the effect of the movement induced horizontal reaction is to reduce the resistive yield force (in the direction of applied force) as the deflection of the plate increases. (Refer FIG. 249). This is because the internal work done within the yielding plate is a product of the yield moment at the yield zone (plastic hinge) and its angle of rotation. (Increase in rotation proportionally increasing yield work).

The internal work done at the yield zone must balance the external work done on the plate. The external work done by the applied load can be configured in this case to two components of virtual work done by the vertical reaction (RV) and the horizontal reaction (RH).

The sum of their work is equal to the internal work produced in the yield zone.

As the (half) spanning distance (i.e. horizontal distance from vertical reaction to yield zone) remains constant, the increasing work done by the horizontal reaction as the plate flows in the vertical direction must be offset by a decreasing vertical reaction (RV), the sum of which (i.e. 2× RV) must equate with the applied load in the opposite direction. That is the resistive force produced by the plate at the load point is reducing with increasing displacement. (Refer FIG. 249).

This reduction in resistive force will be offset, if, as with typical steel/aluminium materials, the material used, has a yield plateau with a positive gradient and strain hardens. In other words these yield strength increasing features offset the reduction in (vertical) force resistance described above, which results simply from the displacement mechanics of the plate which in turn are a result of its particular boundary conditions (e.g. sliding hinge which is integral with end region of plate).

FIG. 250 gives a more tangible description of the mechanics of the deforming plate. As the plate displaces, the distance from the yield zone (along the line of the deforming plate) to the resultant, R, is increasing, and the angle of resolution between the resultant R, and its vertical component, Rv, is also increasing. There is hence a compounding effect on load, Py, of the order of cos 2 Θ with increasing displacement of the plate (and increasing angle of rotation, Θ, through the yield zone).

FIGS. 254 to 263 show a further case in which the anchor pins of the free translational and rotational end regions of the plate are able to move (slide) along the restraining boundary of a general curve.

A horizontal reaction is similarly generated with displacement of the plate, but here, the length along the deforming line of the plate remains constant while the transverse (horizontal) distance between reaction points change.

The effect of the development of a horizontal reaction on yield resistance to applied load is similarly derived.

The equation a) of FIG. 254 reduces to that of FIG. 249 when there is no anchor pin movement at the boundary.

The boundary curve tangent equation, Θ, may be described as a function of the (half) plastic hinge rotation, Θ', of the yield plate.

The equations for P on FIGS. 254 & 255 show that a boundary curve Θ (Θ') exists which in conjunction with a given yield moment function M(Θ') which may be determined from load tests, will produce a constant yield force P for all values of Θ'.

FIG. 256 shows a general boundary curve.

Figure 257:
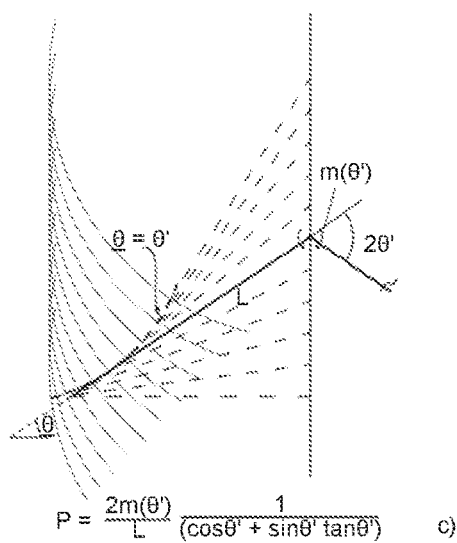

FIG. 257 shows a boundary curve, Θ, which follows the plates plastic hinge rotation Θ', at all points along its curve i.e. Θ(Θ')=Θ'.

In terms of (x,y) rectangular coordinates. This can be described as $$dy/dx = \Theta = \Theta'$$

Integration with respect to x produces $$y = \Theta' x$$

Figure 258:
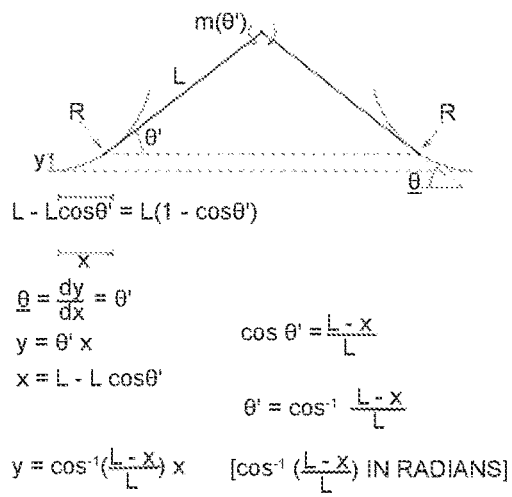
Figure 259:
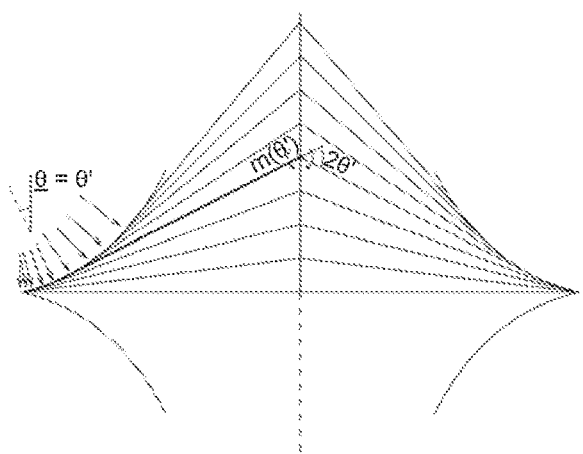

FIG. 258 shows how Θ' may be expressed in terms of x. This results in a rectangular coordinate function describing the boundary curve.

For this case the equations a) and b) of FIGS. 254 & 255 become equation c) of FIG. 257.

FIG. 258 shows the same case as FIG. 257 but in a spanning form.

Figure 260:
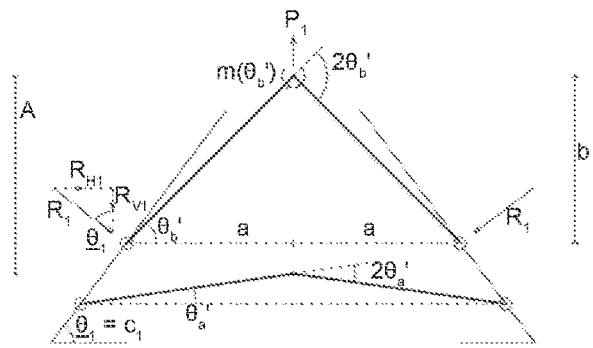
Figure 261:
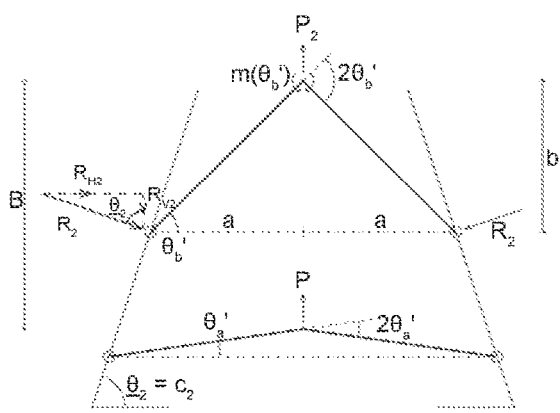

FIGS. 260 and 261 show two cases of a straight line boundary for which the tangent equation, Θ(Θ')=C In terms of (x,y) rectangular coordinates this can be described as $$dy/dx = C$$

Integration with respect to x produces the straight line boundary, y=Cx

In each case the plates are in a state of plastic flow, but at the same plastic hinge rotation (internal work) each are producing different resistive yield forces, P1, P2. This illustrates the effect of the different horizontal reactions, generated by different boundaries (Θ1 c.w Θ2), on the resistive yield loads P1, P2.

Further, in the second case, P2 is able to travel a further distance (A c.w B) for the same rotation (work done) at the yield zone as in the first case. This means that the second case is able to provide a higher displacement ductility than the first case for the same amount of yielding, or same plastic curvatures (but at a lower resistive force (P2<P1).

Figure 262:
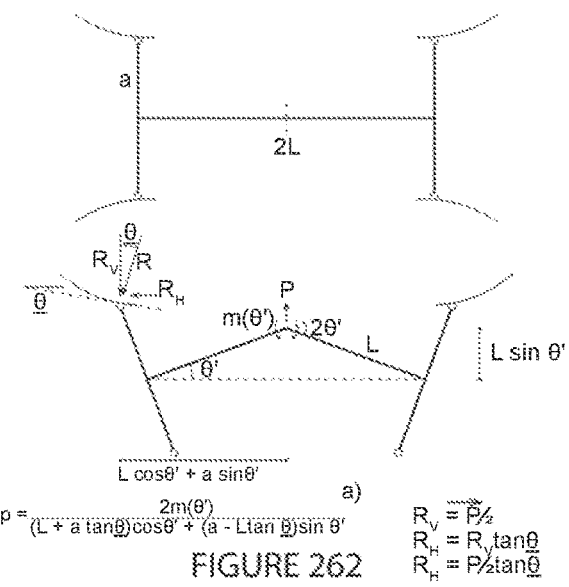
Figure 269:
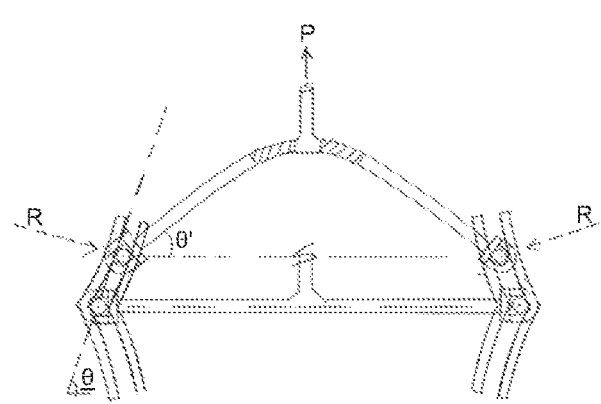
Figure 270:
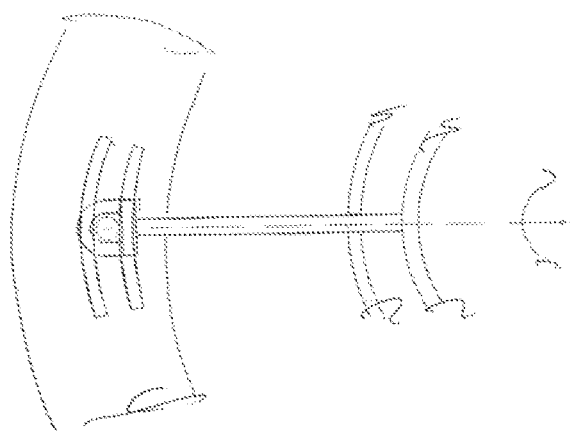
Figure 271:
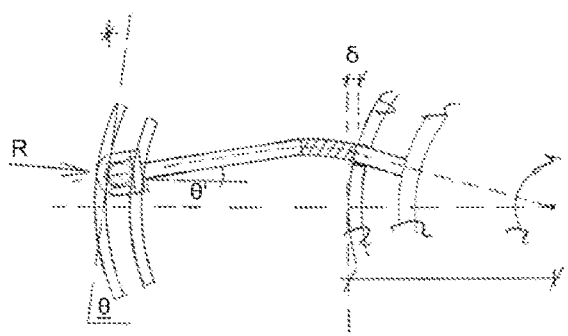

FIGS. 262 & 263 show similar cases, but here the flexure member 100 (yield plate) has extensions of length a at its end regions. This allows not only a horizontal boundary reaction to develop but also enables an increase in the spanning distance to be increased or kept constant as the plate displacement increases (contrary to FIGS. 254 to 261, where the spanning distance is decreasing).

Without a horizontal reaction generated, the arm extensions enable a yield plate, made of a material with a flat (non-strain hardening) yield stress plateau, to maintain a constant effective span between reaction points, and subsequently maintain a constant resistive yield force, as it cyclically flexes to high elasto-plastic displacements.

FIGS. 243 to 264 show three cases in which a horizontal reaction is generated at the boundary. That is, one with a constant horizontal span, one with a reducing span and one with a increasing span.

FIG. 265 shows a further case in which a horizontal reaction is generated at the boundary and both the length along the deforming plate is increasing and the horizontal distance between reaction points in increasing. For this case an additional displacement/force compatible restraint (spring or guide) is required to prevent free body (non-yielding/sliding) translation in the vertical direction.

Figure 272:
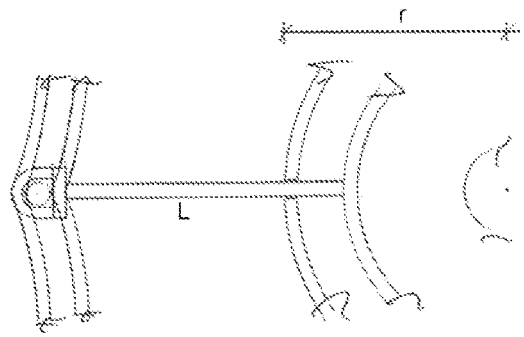
Figure 273:
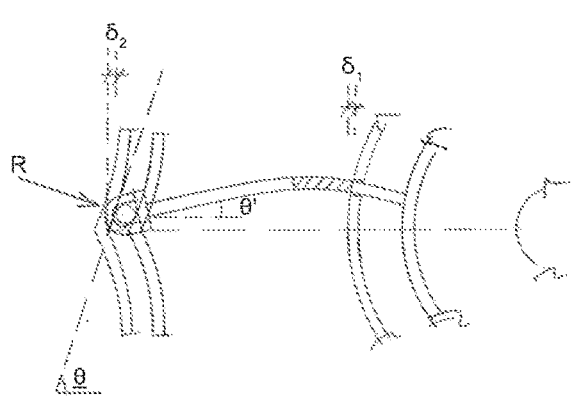
Figure 274:
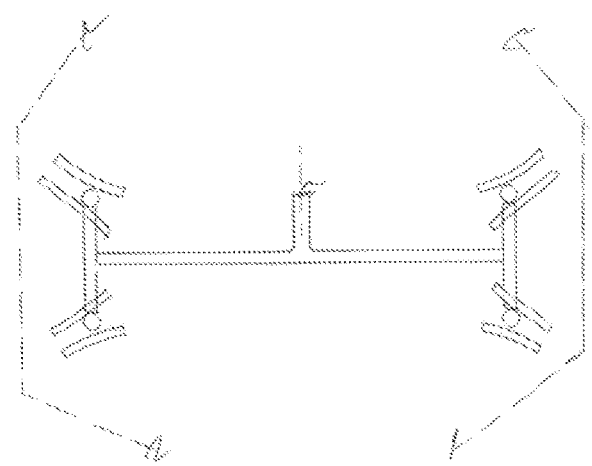

FIGS. 266 to 278 show the non-displaced and displaced forms of the cases above but in a finite dimension form. A hinge end region is used here only to provide tolerance for any length 'growth' in the plate during cycling reversals. FIGS. 272 and 273 show the non-displaced and displaced form of a yield plate with curved boundary within a BETA rotor. Here the drum radius, r, and length of yield plate, L, are similar. The drawback dr is able to be exponentially decreased by increasing the drum radius r, without effecting the plastic hinge curvature.

For small values of r, the rotor is producing the same effect as that of FIG. 265. This is, the horizontal span of the plate increases as the displacement induced horizontal reaction increases (however no secondary restraint/guide is required).

FIG. 279 shows the stress strain curves for a range of common steels produced in the US, Europe and the UK.
a) S235
b) S355
c) S460 plate
d) S690
e) Histar 460
f) A992 (grade 50S)
g) HPS70 (22 plate)
h) HPS70 (51 plate)

FIG. 280 shows the ratio of stress at a given strain to yield stress for two steels;
a) Histar 460 steel produced by ArcelorMittal (Europe)
b) A992 (grade 50S) steel produced by Bethlehem Steel (US)

As described previously cyclic load testing was done on grade 460 8 mm and 12 mm plates to very high elasto-plastic displacements.

Figure 281:
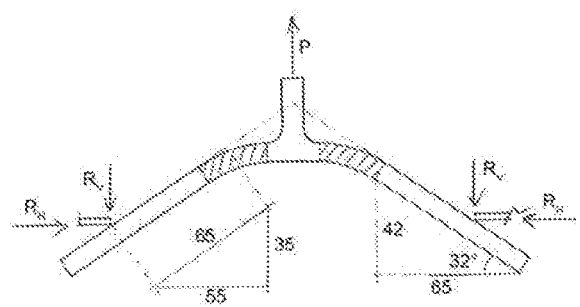

FIG. 281 shows a direct trace of the maximum cycling displacement an 8 mm plate endured.

Figure 282:
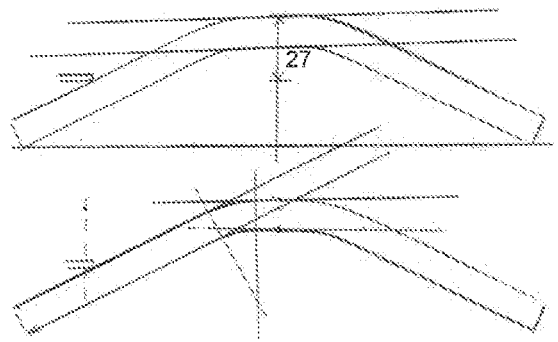

FIG. 282 shows a direct trace of the maximum displacement amplitude a 12 mm grade 460 plate was cyclically tested to. The displacement and curvature ductility demands on the plate both exceed 40 (that is a displacement of 40 times (initial) full yield displacement or curvature). As discussed above, all plastic curvature occurs within the yield zone, the plate remaining elastic between the yield zone adjacent the first end region and the non-yielding second end regions.

Figure 283:
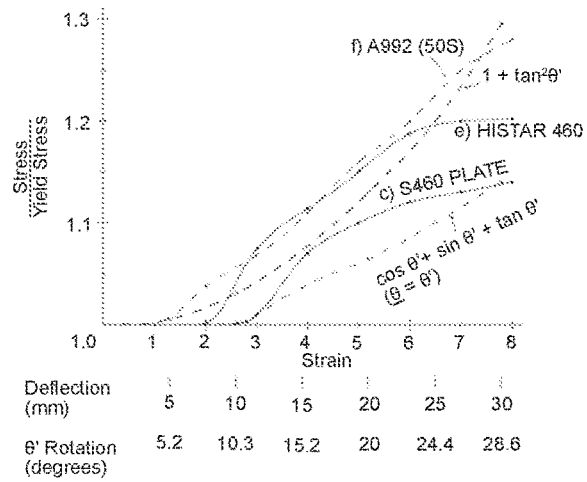
Figure 284:
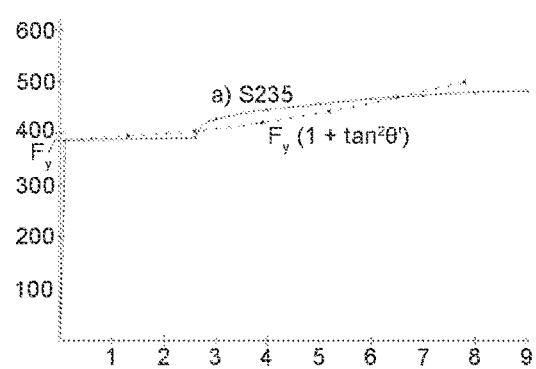
Figure 285:
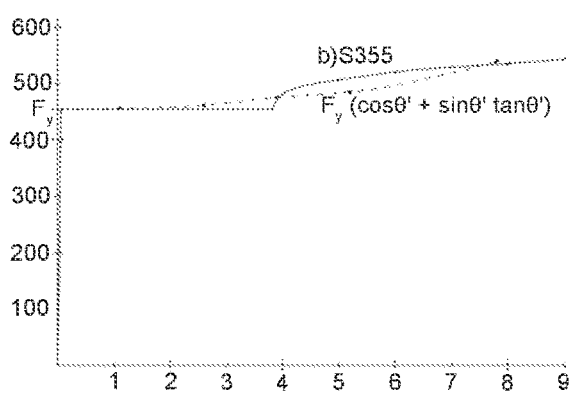
Figure 286:
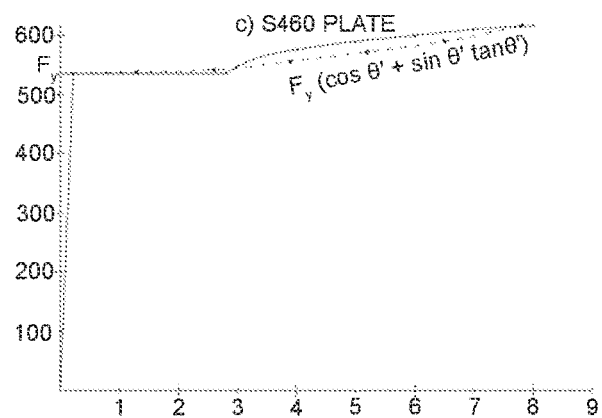
Figure 287:
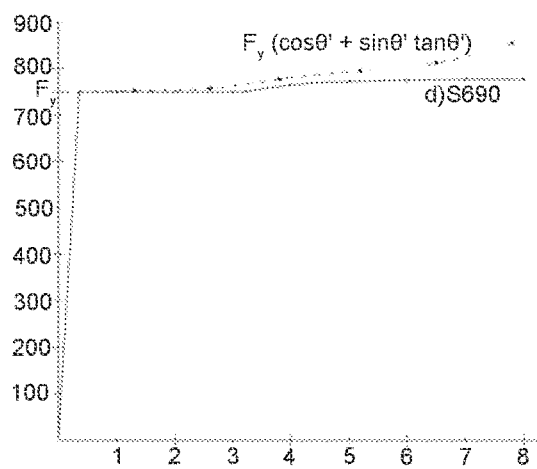
Figure 288:
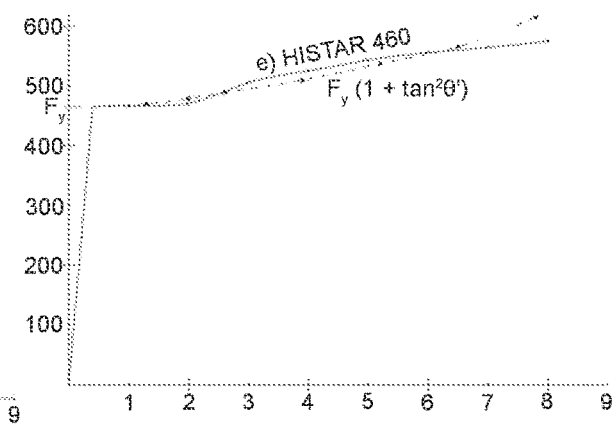
Figure 289:
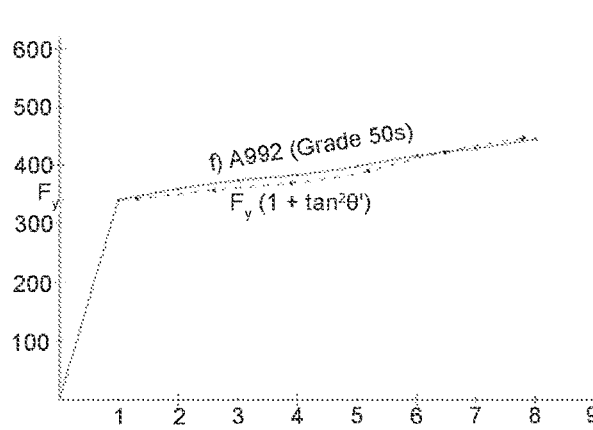
Figure 290:
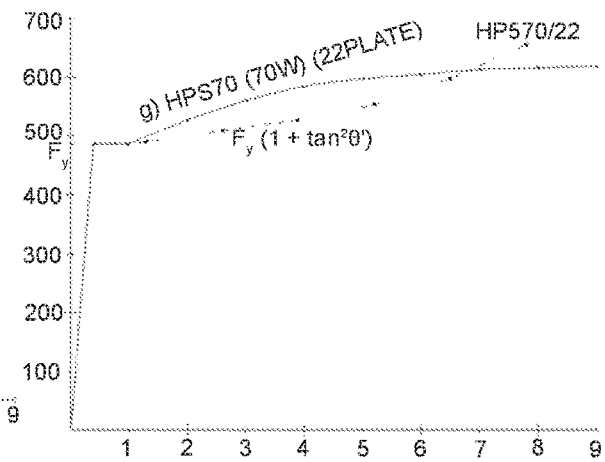
Figure 291:
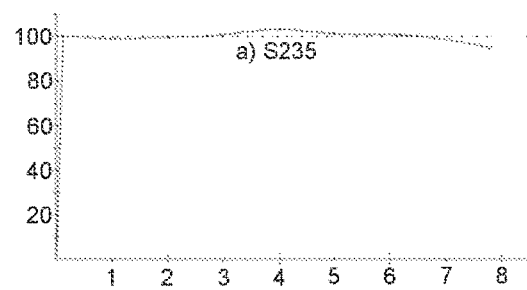
Figure 292:
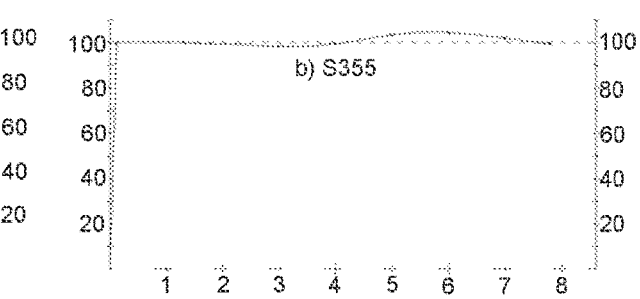
Figure 293:
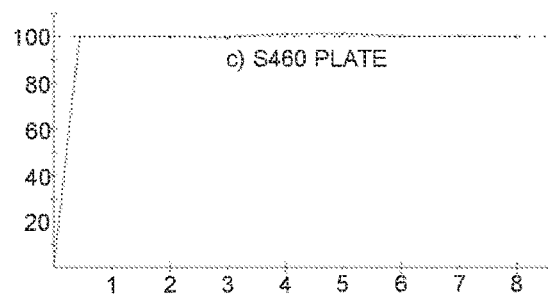
Figure 294:
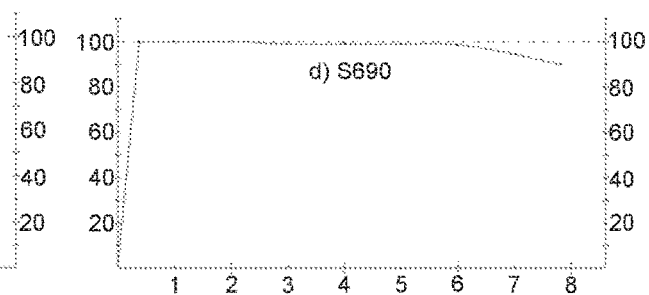

FIG. 283 (similar to FIG. 280) shows the ratio of stress at a given strain to yield stress for steels c), e) and f) and adds to the horizontal axis the displacement and plastic rotation of the plate of FIG. 281 equated with the general strain values. Further added to the graph of FIG. 283 are the reciprocals of the load reduction values derived on FIGS. 249 & 254 i.e.:

$$1+\text{TAN } 2\Theta' \text{ and } (\text{COS } \Theta' + \text{SIN } \Theta' \cdot \text{TAN } \Theta'),$$

Θ' being the (half) plastic hinge rotation of the plate.

The second equation is for the case, Θ=Θ' as derived previously i.e. the boundary curve tangent follows the plates plastic hinge rotation.

FIGS. 284 to 290 show the stress-strain curves for steels a) to g). Superimposed onto them is the effect of the displacement mechanics of the plate in an inverse form. The yield stress of the plate being multiplied by (1+TAN 2 Θ') or (COS Θ'+SIN Θ'. TAN Θ'). The ratio of these values with change in strain gives the variation in resistive yield force provided by the plate at the point of applied load as a function of strain.

FIGS. 291 to 297 show the resistive force as a percentage of initial yield resistance (force). Constant resistive yield forces are obtained over very high strain ranges for a wide range of steels.

Figure 297:
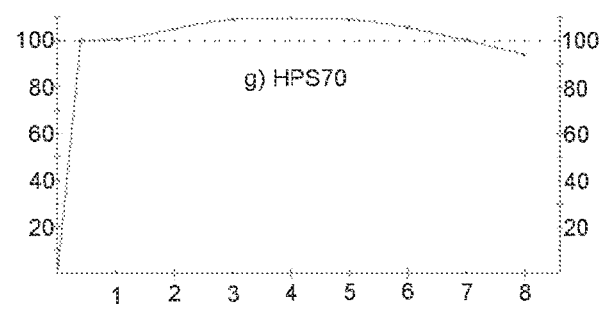

The HPS70 response on FIG. 297 is the exception. This is a high performance steel (HPS) produced in the US primarily for bridge construction. It has a relatively high tensile to yield stress ratio.

The constant resistive yield forces shown on FIGS. 291 to 296 are consistent with the (post elastic) resistive yield forces obtained from the high displacement/high cycling tests on the plate of FIG. 281.

For the HPS70 steel a (more complex) boundary curve Θ is, if required, able to be determined from equations on FIGS. 254 to 264 which will produce a constant resistive yield force.

Returning, FIG. 251 shows the case of load reversing from positive to negative direction in the reverse elasto-plastic flexing direction (say from positive yield displacement back to straightened). The (reverse) horizontal reaction now works as a splaying action on the plate as the plate returns to origin position (i.e. straightening); the splaying action reducing with return displacement.

The ratio of the horizontal reaction, RH, to the vertical reaction RV is now reducing (back to nil) as the plate straightens and returns to its origin. (Refer FIG. 251).

The horizontal reaction again negates strain hardening effects as the plate straightens, with Bauschinger effects adding a further softening effect on return to origin. Continued displacement in this (negative) direction (post origin) again generates a (now squeezing) horizontal reaction which again negates the effects of a yield plateau with a positive gradient and strain hardening effects; the result being again a constant resistive yield force in the negative (cycled) direction.

A constant resistive cycling/reversing yield force was produced through 14 reversals of the plate of FIG. 281 with no strength reduction.

Figure 298:
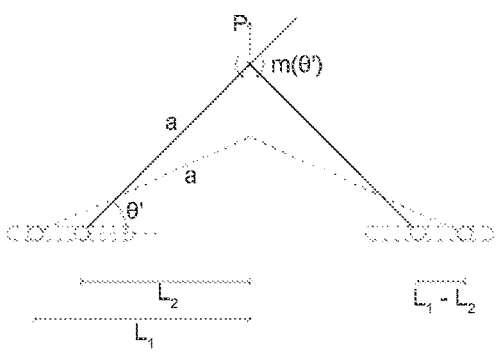

In contrast, FIG. 298 shows a plate also with free translational and rotational boundary conditions, but produced by a rotatable cylinder directly fixed to the end of the plate, which is able to slide within a slotted anchor. Here, as the plate elasto-plastically deforms under load, the length along the deforming line of plate (between cylinder reduction points) remains constant while the spanning distance of the plate between cylinder reaction points reduces. In this case no horizontal reactions at the ends of the plate are generated. If the plate was made of a material with a zero gradient yield plateau and which did not strain harden (i.e. constant yield stress), the load resistance of the plate would increase with deflection. This is simply because for flow to continue with a reducing span the applied load and vertical reactions must increase (the resistive force produced by the plate at point of load application being the sum of the vertical reactions). In other words load resistance increases with displacement. This increasing load resistance is further increased when the material effects of a yield plateau with a positive gradient and strain hardening are added. In other words load resistance is not constant and increases (considerably) with displacement. This is not a desirable effect if the aim is to limit, maintain and control forces generated in a structure as it endures a seismic event.

Figure 300:
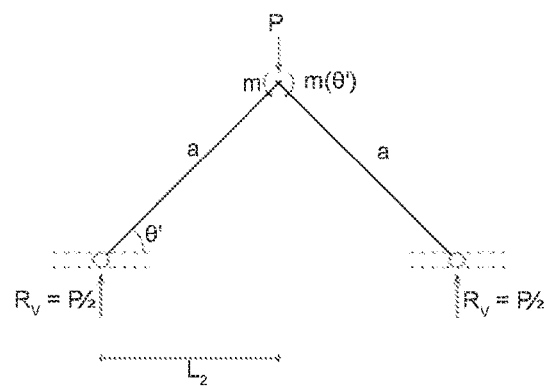

FIG. 300 shows the strength reducing with reverse cycle. When this displacement effect is combined with material stiffness/strength reduction due to Bauschinger effects the result is a further softening.

In FIGS. 55-61, sliding or sliding and rotation of the end region of the plate is achieved, similarly to FIG. 298, by slotting of the rotary units housing or outer annulus. Although these boundary conditions provide free translational or free translational and rotational movement of the end regions of the plate, as with the plate shown in FIG. 298 they do not enable the plate or rotary unit to produce a constant resistive yield force while flexing to high elasto-plastic displacements.

Figure 299:
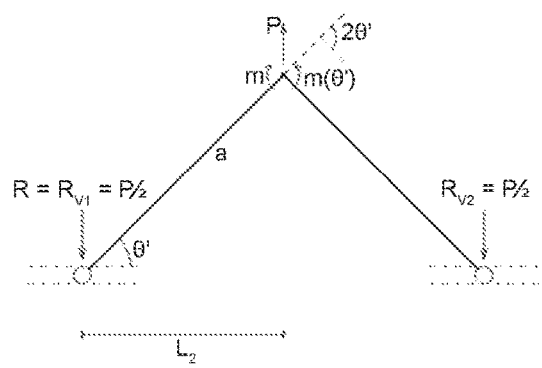
Figure 301:
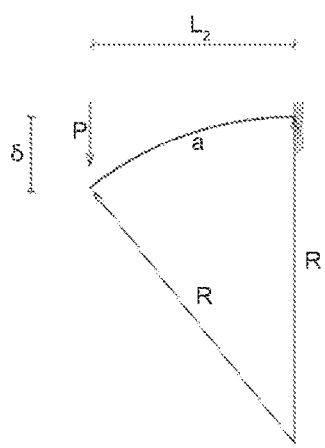
Figure 302:
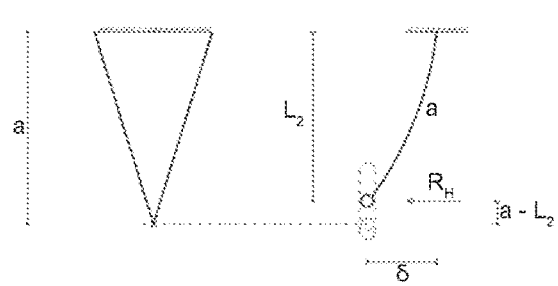
Figure 303:
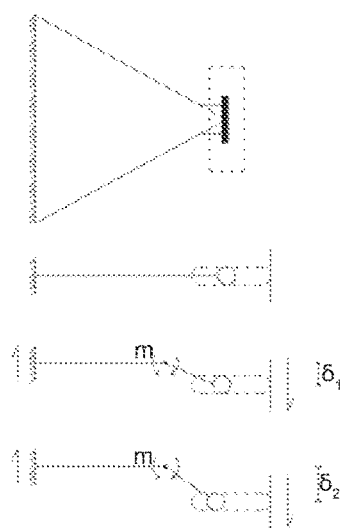

FIGS. 301 to 303 show a triangular plate as described in U.S. Pat. No. 5,533,307 which has the same free translational and free rotational boundary conditions as the previous rectangular plate. (FIGS. 298 to 300). The plate is tapered to its cylindrical reaction points, the intention being, in the elastic case, to match the linearly increasing moment demand (produced by the reaction load at the cylinder) along the flexing direction of the plate with a linearly increasing cross section and hence linearly increasing strength along the principal flexing direction of the plate.

For the elastic case (that is prior to any yielding within the plate), if moment demand along the plate equates with flexural stiffness (EI) along the plate, a constant curvature is produced along the flexing direction of the plate (ignoring shear displacements). That is, the plate is flexing into a circular curve (FIG. 301) along which longitudinal stresses at a given depth (or distance from neutral axis) are constant.

For the elastic case, matching moment demand with strength (i.e. EI) will produce a curvature close to constant.

It is envisaged in U.S. Pat. No. 5,533,307 that because the plate is at or near a constant state of stress at its top and bottom surface (when elastic) and has near constant curvature, this state will continue to develop under increased loading into a state of constant plastic curvature (i.e. constant, with depth, plastic strains) after the plate has yielded.

This spreading of yield over the entire plate would mean that for a given displacement at the cylindrical reaction point, plastic strains within the plate are at their minimum possible value. For this to occur, both in theory and practice, the plate must be of a near perfectly homogeneous/isotropic material in which yield cycle induced changes (e.g. Bauschinger effects) or strain hardening remain in step throughout and in which applied load position moves with plastic flexure to maintain a match between demand and strength at a section. In other words all things must be ideal. It is more probable that this will not be the case. The attempt to produce constant curvature and constant strains in the plastic phase, contrary to intent, produces a plate, which by the limit theorems of plasticity, Prager (1959), Allen (1994) is also able to locally yield through any section of the plate. The closer yielding occurs to the applied load position, the lower the plastic displacement of the system, the less work done (energy dissipation) and the less displacement ductility available (refer FIG. 303).

Figure 304:
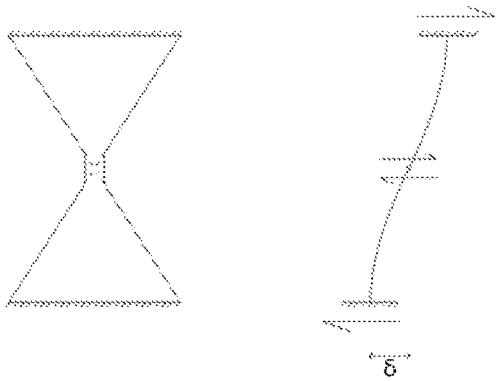
Figure 305:
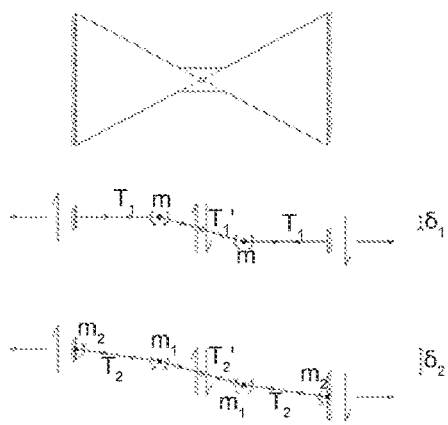

FIG. 304 shows an X-type plate as described in Whittaker (1991) (two triangles meeting at their narrowest section). Relative displacement causes the plate to contraflex; its inflexion point under loading taken as an effective point of free rotation. If local yielding occurs, membrane forces (stretching) developed by displacement, spreads yielding to other areas. The closer local yielding occurs to the centre of the plate (centre of the X) the more efficient membrane forces will be in straightening and spreading the yield zone (refer FIG. 305). This will not be the case for the triangular plate of FIG. 302 with its free translational and rotational boundary conditions which do not allow membrane forces to develop. As previously, however, for the case of the X-plates, the development of membrane forces significantly increases both the stiffness of, and forces within, a structure it is seismically supportive of, with no practicable limit. The plate is effectively changing from a bending element to a tension element.

Figure 306:
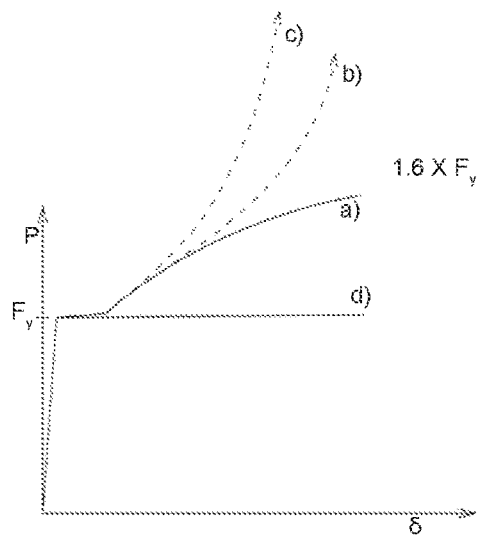

FIG. 306 shows the load displacement response for a plate with the free rotational and translational boundary conditions of FIG. 298.

Curve a) shows the increase in internal forces with displacement due to both reduction in span and strain hardening which would occur for the plate of FIG. 281 with the boundary condition of FIG. 298.

Curves b) and c) show the effects of membrane forces being present. Curve d) shows the load displacement response for a plate with the boundary conditions of FIGS. 243 to 265 consistent with the testing of the plate of FIG. 281. Here the plate produces a constant resistive yield force as the plate flexes to very high elasto-plastic displacements (strains).

Figure 307:
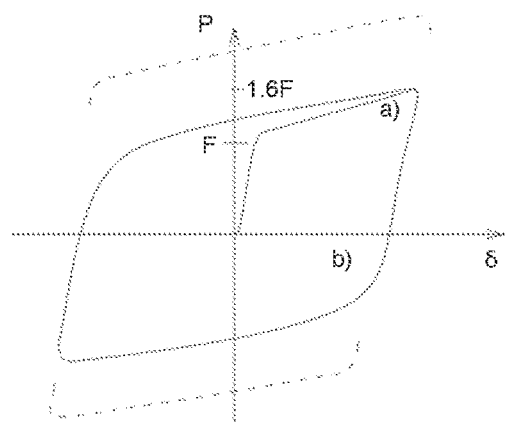

FIG. 307 shows the hysteresis loop which would be obtained from cyclic loading a plate with the boundary conditions of FIG. 298. Through region a) load and internal forces within a structure it may be seismically supportive of, increase due to span shortening and strain hardening to typically, at least, 1.6 yield force on first cycle. Softening occurs in region b) due to Bauschinger effects and increasing span of the plate with reverse displacement.

Forces are monotonically increasing within the plate and within any structure it may be seismically supportive of.

Hence if the yield strength, F, of the plate equates with the elastic design force demand required of it for a given seismic input and structure ductility, forces within a structure it may be seismically supportive of, would increase to at least 1.6 times the forces within it at, first yield. That is the structure would need to be designed (or have adequate strength) to resist forces of at least 1.6 times the forces within it at initial yield. Similarly items supported by the structure, if acceleration/force sensitive, would need to endure forces/accelerations increasing to 1.6 times initial yield force/initial yield accelerations.

Figure 308:
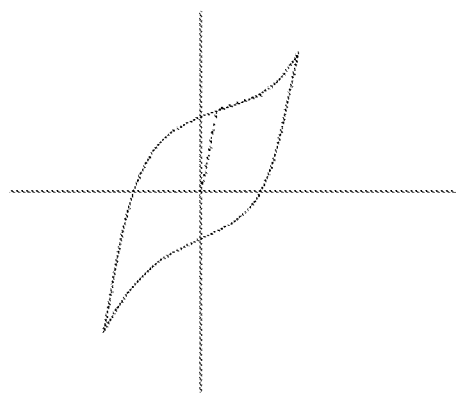

FIG. 308 shows the pinching effect on the hysteresis loop of FIG. 307, if membrane forces are generated within the structure.

Figure 309:
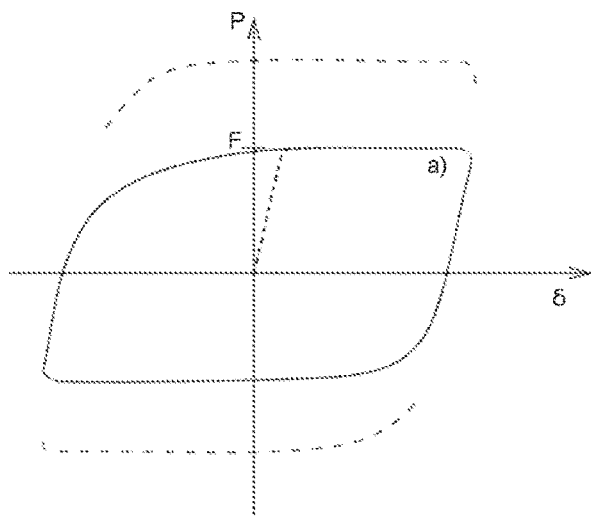

FIG. 309 shows the hysteresis loop obtained for a plate with the boundary conditions of FIGS. 243 to 265 and as obtained from the cyclic loading of the plate of FIG. 298. A constant resistive force occurs through region a). This means that forces and accelerations within a control structure the plate is part of are both maintained and limited to a constant.

Softening occurs in region b) due to Bauschinger effects and the splaying action on the plate with reverse displacement. The dotted envelope curves on FIGS. 307 and 309 show the same cases but with cyclic hardening.

Figure 310:
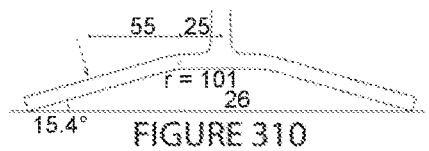
Figure 311:
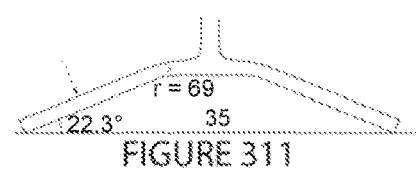
Figure 312:
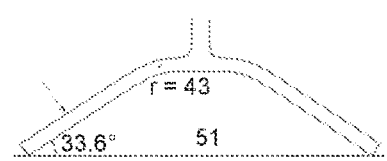
Figure 321:
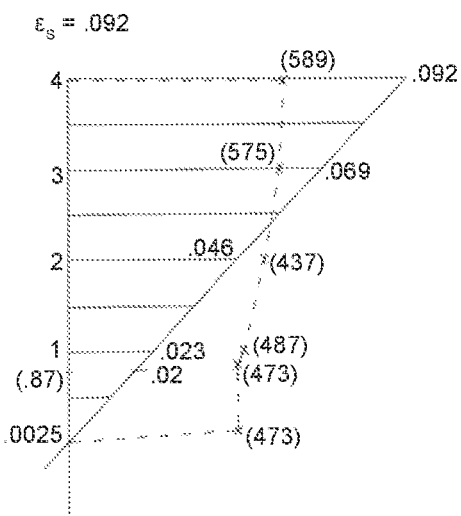
Figure 322:
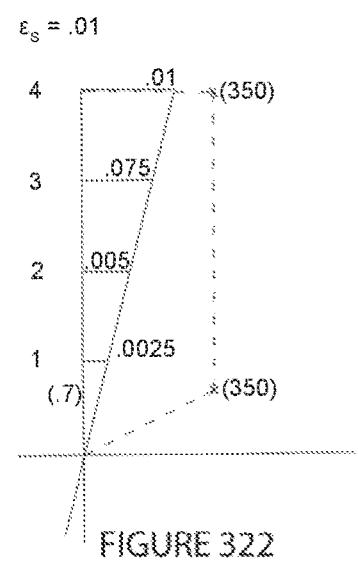
Figure 323:
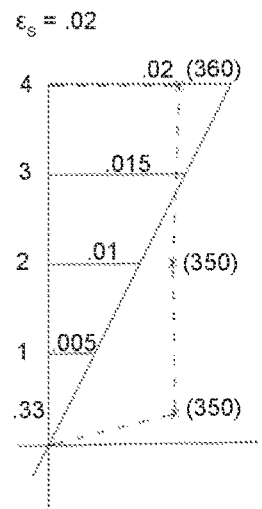
Figure 324:
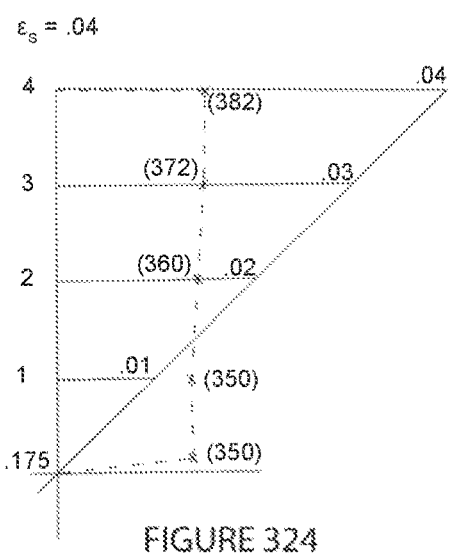
Figure 325:
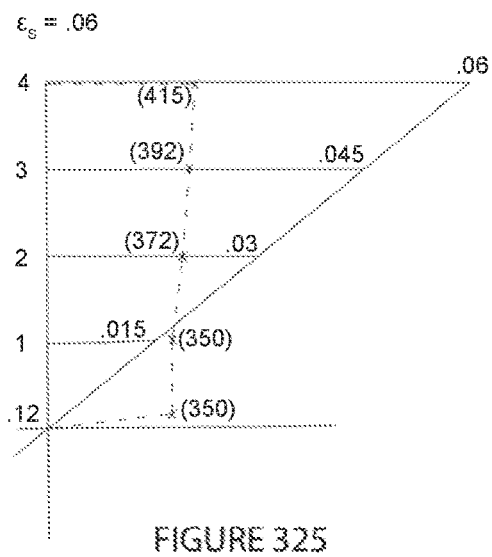
Figure 326:
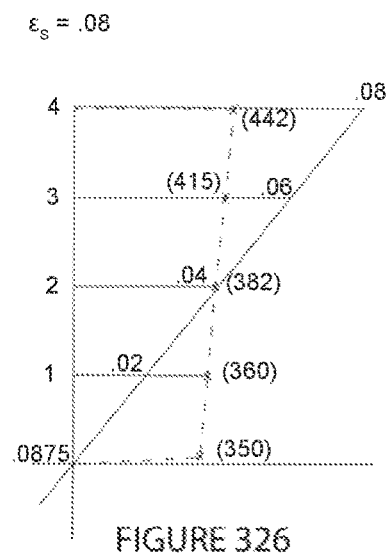

FIGS. 310, 311, 312 show direct traces, of the 8 mm plate of FIG. 281, at three displacement amplitudes that the plate was load cycled to.

FIGS. 313, 314 and 315 show close up detail of the plastic deformation in the yield zone of the plate at each displacement stage. Of note, the extent, ds of the yield zone remains constant with increasing displacement. From the total angle of rotation, dΘ, of the yield zone, this plastic curvature, κ, at each stage can be determined from $$\kappa = ds/d\Theta \qquad \text{i)}$$

On FIG. 316 the yield zones of FIGS. 313 to 315 are superimposed onto a series of concentric circles. It can be seen that curvature is constant through the yield zone, that is the yield zone is bending into a circular arc. From this Figure the radii of curvature, p, can be measured directly and for each stage the curvature can again be determined from $$\kappa = 1/\rho \qquad \text{ii)}$$

Results from i) and ii) are found to be the same. Plastic curvature is constant and is directly proportional to the angle of rotation of the bending yield zone.

In FIGS. 317 to 326 strains are linearly varied from surface, εs, to neutral axis (i.e. plane sections remaining plane).

FIGS. 317 to 321 show the associated stresses for the given linearly varying strains for Hi-Star 460 steel produced by Arcelormittal.

FIGS. 322 to 326 show the associated stresses for the given linearly varying strains for A992 (Grade 50S) produced by Bethlehem Steel. For each of these stress profiles the yield moment with respect to surface strain variation (or plastic curvature variation) and hence angle of rotation can be determined.

Figure 295:
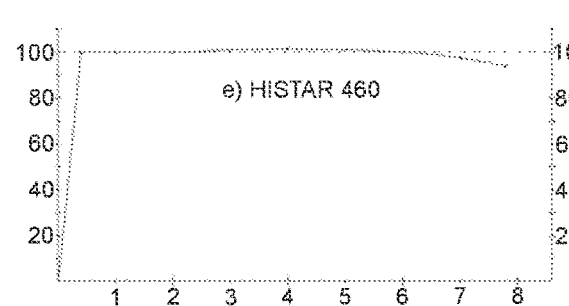

FIG. 295 shows the variation or the ratio of yield force (or applied or resistive force) to initial yield force related to surface stress (i.e. constant plastic stress profile) for Hi-Star 460 steel.

Figure 296:
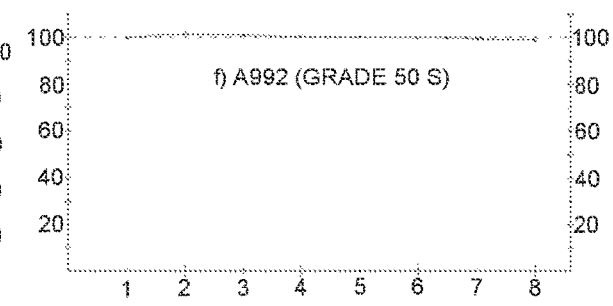

FIG. 296 similarly shows the variation of the ratio of yield force to initial yield force related to a constant (with depth) stress profile for A992 steel.

FIGS. 327 and 328 show the variation of ratio of yield moment to initial yield moment (both in terms of surface strain) for Hi Star 460 and A992 steels, plotted on the linear strain graphs of FIGS. 295 and 296 for the same steels. All moment values are based on the assumption that plane sections remain plane after flexure (i.e. linear strain variation with depth of section). Values for composite plates as shown in FIG. 329 (still assuming plane sections remain plane) will lie between the linear and flexing values. The load tests (as discussed previously) on plane grade 460 8 mm and 12 mm plates as shown in FIGS. 281 and 282 showed no variation with load force. This is consistent with the curved strain variation with depth (e.g. parabolic) obtained from an exact strain analysis at least for the elastic case, as opposed to the (straight line) linear variation assumption of plane sections remaining plane.

Note, for a given (or maximum plastic curvature) within the yield zone of a plate, the displacement ductility derived from it (that is its total elasto-plastic displacement divided by its elastic (yield) displacement) is a function of the span of the plate, and reduces with increasing plate span (and increases with reducing span). This is illustrated in FIG. 330.

With increase in natural frequency of an elasto-plastic system, with same yield strength to connected mass ratio and when subject to same base motion input (displacement, velocity, acceleration) the magnitude of peak (elasto-plastic) response displacement decreases, but the ductility demand increases (exponentially). However with increase in stiffness of the flexural yield plates by reduction in their span, their ductile capability is similarly increasing. That is any increase in ductility demand in a structural system which is due to a stiffening of the yielding element (e.g. by reducing span) is naturally compensated by the increase in displacement ductility capacity of the (reducing span) plate.

FIG. 331 shows the load displacement path of a linear elastic system. FIG. 331 shows a spring and mass system in its undisplaced form. Here the mass is fixed in position as the base moves to the right, displacing the spring by Δ1. The elastic force generated in the spring is F1, and this is the force applied to the fixed position mass. With respect to the spring, F1 is here a compressive force. With the base next moving to the left (but still to the right of the origin) the force F¬2 is still in the same direction as F1. On the base returning to the origin, force within the spring is again of zero value. With the base moving to the left of the origin, the force F3 is generated in the spring and the force with respect to the spring is tensile, and the direction of force F3 is opposite to F1 and F2. If the mass is not fixed in position the response motion of the mass (displacement/velocity/acceleration) and the response of the spring (internal displacement/strain velocity/strain acceleration) when subject to a base motion input (D/V/A), is able to be determined by solving the piece-wise differential equations of motion.

FIG. 332 shows a similar case to the spring-mass model of FIG. 331, but here the load displacement curves of the spring have two stiffness values. One that is greater than that of FIG. 331 when load is increasing (or the base is moving to the right) and one that is equally less when the base is moving to the left. With displacement Δ1 a force F1+ is generated. This produces a greater force on the mass (than with same displacement of FIG. 331), and if the mass was free to move, a higher acceleration (than with F1 of FIG. 331). When the base moves to the left and displacement is reducing from Δ1 to Δ2 a force F2—(still in the same direction as F1+ and as F2 in FIG. 331) is generated. This movement is coinciding with the lower stiffness load path. The base then continues to original position where the forces within the spring are zero. The base motion in first moving from the origin to the right a displacement value A and then moving to the left and returning to origin, has produced in the systems of FIG. 331 and FIG. 332 both the same average force and same internal energy in the spring for each case. If the mass were free to move it is not clear which system would produce the larger response acceleration for the mass or the larger response displacement for the spring. This can however be readily determined by for example, as above, a time history analysis. The initial response of increased mass response acceleration and reduced structure (spring) displacement response associated with the increased stiffness for base motion in one direction will be potentially nullified by the reduced stiffness with base motion in the opposite direction. With the slip friction system with frictional sloping surfaces, both the (horizontally) resolved direct force and (horizontally) resolved friction forces increase with displacement. Hence although the work done by the frictional forces is non-recoverable (dissipated energy), the frictional forces in one direction are increasing work (when compared with a same clamped but frictionless sloping surface) and decreasing it in the other (FIG. 333).

FIG. 334 shows the elasto-plastic load displacement curve of two 12 mm flexural yield plates of 200 mm cantilever span. The total elasto-plastic displacement equates with the plastic curvature (or hinge rotation) shown on FIG. 282.

FIG. 335 shows the same load displacement curve, but superimposed onto it is the load path of a slip friction device with clamped sloping frictional surfaces. The upper load-displacement path (increasing load) for the slip friction system is the same as that of the flexural yield plates. That is, same elastic stiffness, with same resistive load to same displacement.

FIG. 336 shows the same elasto-plastic load curve for the yield plate of FIGS. 334 and 335 but here the elastically responding load paths for the slip friction system are shown for the case of its displacement being the same as that of the elasto-plastic displacement, $\Delta tot\neg$, of the yield plates. To reach this displacement the force within the slip friction system and the force applied to any mass directly connected to the device, and forces within foundations supporting the slip friction device would be 14 times that of the yield plate system.

FIG. 337 shows a similar system to FIG. 336. The same (wider) yield plates produce a higher yield force at same yield displacement (8 mm) as a now pretensioned slip friction system.

FIG. 338 similar to FIG. 336 shows the load path of the pretensioned sloping surface slip friction system when its displacement equates with the elasto-plastic displacement of the yield plates, $\Delta tot$. At this displacement forces within the slip friction system are (similarly) 11 times higher than that with the flexural yield plates. The difference in FIGS. 336 and 338 between the clamped frictional sloping surface device and the flexural yield plates, is the same difference that occurs between the clamped frictional sloping surface device, and the rotary friction units described earlier which comprise an elastically straining (e.g. flexural plate) elastic component and a separate frictional plastic component. The differences between the device with clamped frictional sloping surfaces and the corrugated yield block described above with frictionless clamped sloping surfaces and clamped frictional flat surfaces is also similarly the same.

Figure 339:
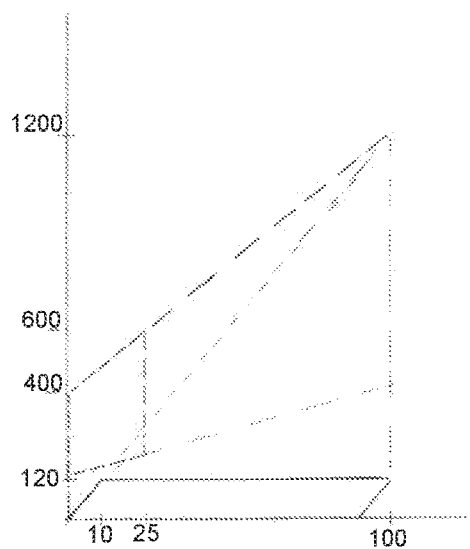

FIG. 339 shows a similar case but one in which pretension forces are higher.

The equal displacement theory which forms the basis of most seismic codes states that, for a given base motion input, the maximum displacement response in an elastically responding system of a given natural frequency (i.e. function of mass and stiffness) is the same as that in a weaker yielding elasto-plastic system but of the same natural frequency. That is, as with FIGS. 336, 338, 339, for a given and same base motion input the maximum displacements of the flexural yield plate system is the same as that in the slip friction system with clamped sloping frictional surfaces. But the forces generated within a structure and within its foundations that the yield plates are a part of are at least $\frac{1}{10}$th that in a same structure which the sloping slip friction device would be a part of.

That is, in resisting the same base motion input (i.e. same earthquake), forces within a structure; with the rotary yield units and flexural yield plates described herein, forces within the structure's foundations and response accelerations (dynamic forces) of masses it is supportive of are $\frac{1}{10}$th that of a same structure of same natural frequency, but one that utilizes the elastic slip friction device or any other elastic device of same stiffness; while peak response displacements of the structure are the same. This is due to the rotary yield units being able to sustain and endure high post-elastic displacements and ductilities while resisting a seismic event. This is also the case for the rotary friction yield units described herein and the corrugated friction yield blocks (with clamped frictionless sloping surfaces and clamped frictional flat surfaces) when compared with any elastic device of same stiffness.

As described previously, the flexibility (elastic stiffness) of the flexural yield plates (and rotary unit) is able to be adjusted directly by varying the thickness and/or span of the yield plates or indirectly by introducing a secondary flexural member or by adjustment of both. The yield strength (elastic limit strength) and yield displacement of the flexural yield plates is able to be adjusted by again varying the plate span or thickness, or further varying the plate material yield stress (e.g. type of steel), or varying the width of plates or number of plates. Both the flexibility and yield strength of the yield plates, that is their elastic parameters, are able to be configured with relative ease, to be the same as practicably any other elastic system. This is illustrated on FIGS. 211 to 213, where the flexibility and elastic strength of various flexural yield plates has been configured to effectively match that of a number of arbitrary elastic slip friction devices with clamped frictional sloping surface, as described above. However, the flexural yield plates, as shown on the Figures, also have the capacity and ability to continue displacing beyond their elastic displacement limit (i.e. yield displacement) to at least 10 times beyond their elastic displacement limit (which is the same in each system) while maintaining a constant resistive yield force. This means that the system with the flexural yield plates, and of same elastic strength and stiffness as the frictional sloping surface system, is able to provide or produce an elastic strength equivalent, in resisting a base motion input, of 10 times that of the sloping surface friction system while limiting and controlling forces within itself and any mass it may be seismically supportive of. That is, the flexural yield plate system is (conventionally) able to resist and endure a base motion input (i.e. earthquake) of (at least) 10 times peak ground acceleration (PGA) of the sloping friction system or any other equivalent system of same elastic strength and stiffness while maintaining a constant resistive yield force. Further, the flexural yield plate system when subject to the same maximum base motion input that the (e.g. sloping frictional surface) devices are able to endure, also returns to its origin (that is remains elastic).

Further variations of a system 1000 (control structure) are shown in FIGS. 47 to 51 where an energy absorbing system 1000 may be used to both restrain storage racks 3 and dissipate racking energy during a seismic event. The energy absorbing system 1000 utilises restraining ties 300 to brace itself to the racks 3. These ties 300 are connected to a control structure (energy absorbing system 100) which consists of a rotary unit alone.

During a seismic event the forces transferred through the ties 300 are tensile forces. More than one tie 300 can be attached to a rotary unit. The rotary unit is preferably provided intermediate two ties 300. In alternative embodiments, the rocker 2000 may be at the end of a rack and only attached to a single tie 300.

The ties 300 have a low elasticity and minimal deformation during seismic activity. Preferably the ties 300 are metal cables. However the ties 300 may be braided line, or solid bar or the like. Any material and geometry substantially strong enough to take the tensile forces with low deformation may be used for the ties 300.

The flexure member 100 (plate) is part of the yield connector (rotary unit). The flexure member 100 (plates) are able to flex to high elasto-plastic displacements. Absorption of energy through elastic and plastic deformation at the constant yield force of the plate reduces and limits the internal forces that can be generated within the control structure (rotary unit) or any adjacent structure it is seismically supportive of. Both structures are hence able to withstand seismic activity with damage confined to the replaceable yield members (plates).

Preferably, the material variables of the rotary unit, and more specifically the flexure member(s) 100, do not change significantly after each cycle. Importantly, the variables that stay substantially similar are the yield strength and elastic stiffness of the flexure member(s) 100. Preferably the flexure member(s) 100 has 1) a stable and constant cycling yield strength and 2) a stable and constant cycling elastic stiffness.

Because the structural behaviour of the yield plates (flexure member 100) is simple to calculate or verify by load test their performance can be accurately assessed. This allows the performance of the control structure and any adjacent structure it seismically supports to also be accurately assessed. For example, the stiffness, deflection and deformation in operation, weaknesses, stress concentrations et cetera are able to be readily calculated. This allows the rotary unit to be specifically designed. As such the more simplified the design can be, and the more accurate the analysis can be.

The energy absorbing system 1000 (control structure) of the present invention utilises the flexure member(s) 100 as described above, that throughout the oscillating forces does not significantly change its material properties.

Figure 49:
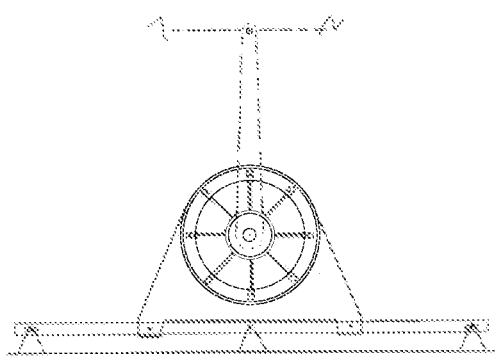
Figure 50:
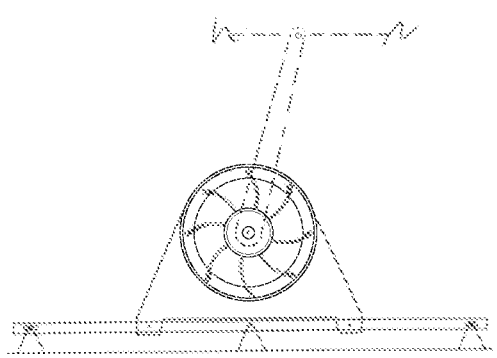
Figure 51:
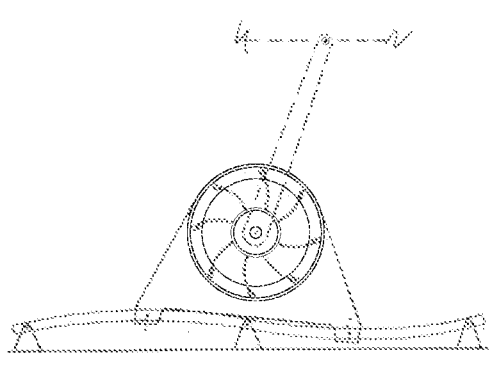

FIGS. 49 to 51 are schematic figures of finite dimension, of a tie restraining control structure.

These control structures are seismically supportive of load carrying rack structures or general building structures. Connection of these structures to the control structures is through typically inclined tensile cables or rods.

FIG. 49 shows a control structure (rotary unit) as described previously. The rotary unit connects to a base member whose flexibility is independently adjustable.

Figure 20:
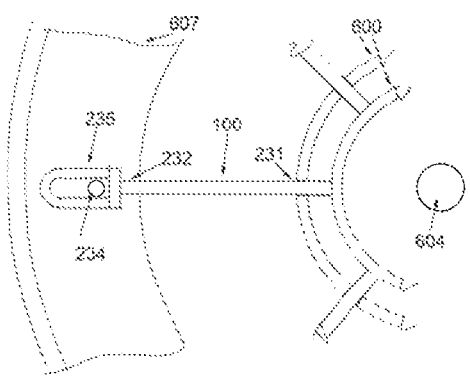
Figure 21:
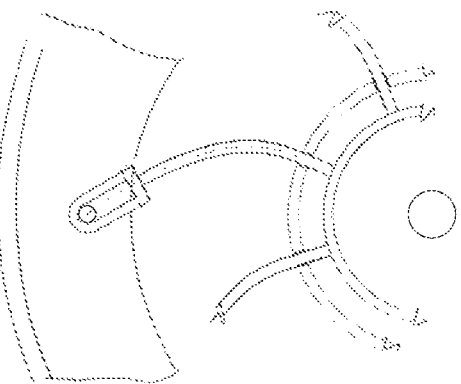
Figure 22:
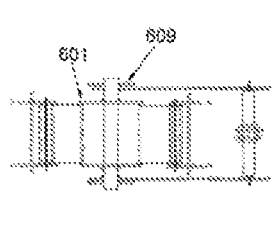
Figure 23:
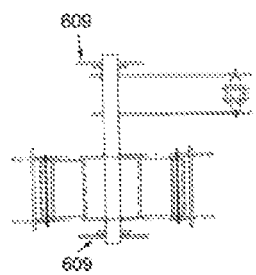
Figure 24:
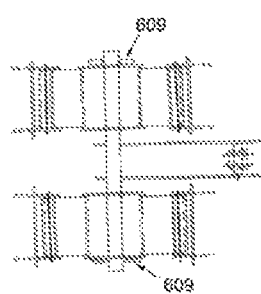
Figure 25:
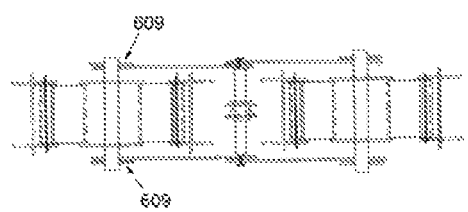
Figure 26:
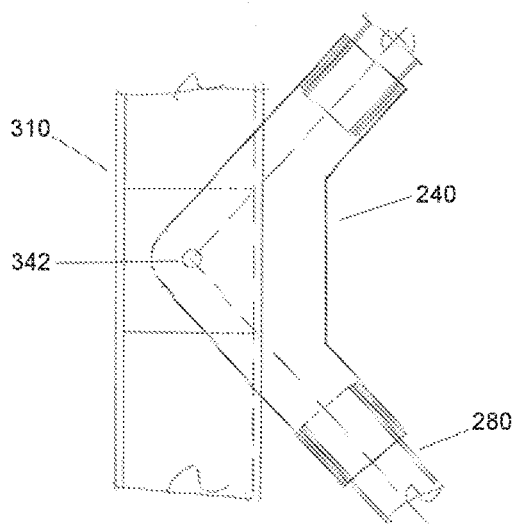
Figure 27:
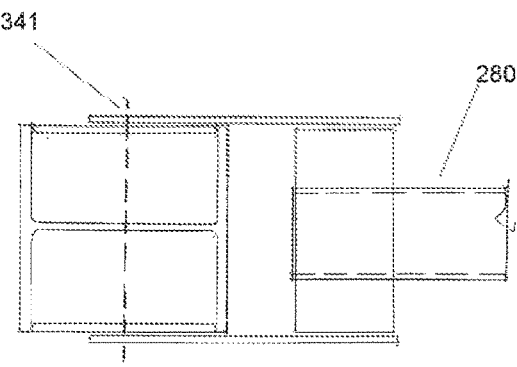
Figures 28, 29:
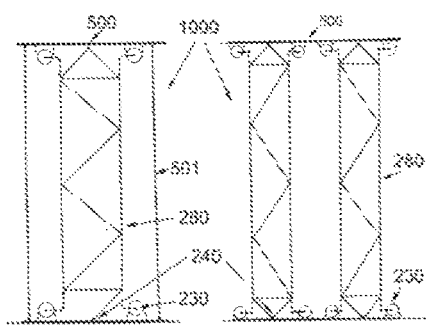
Figure 30:
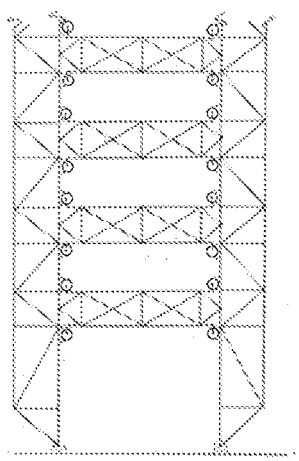
Figure 31:
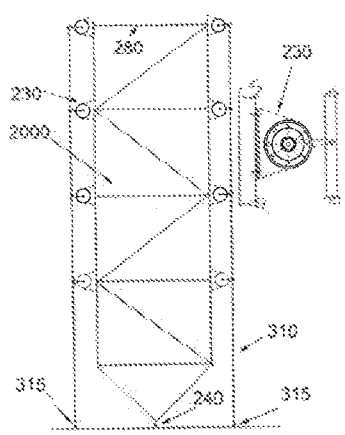
Figure 32:
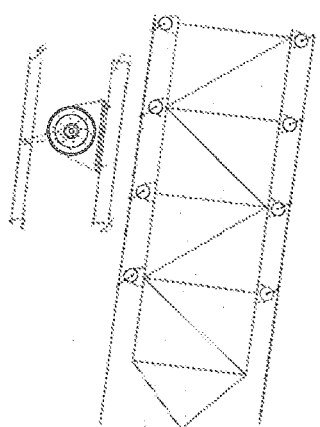
Figure 33:
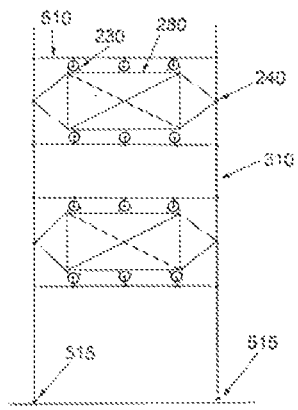
Figure 34:
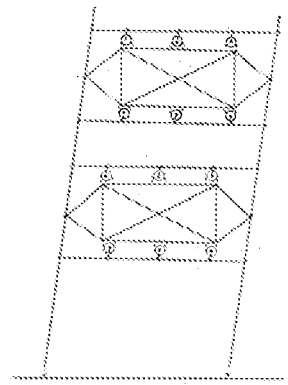
Figure 35:
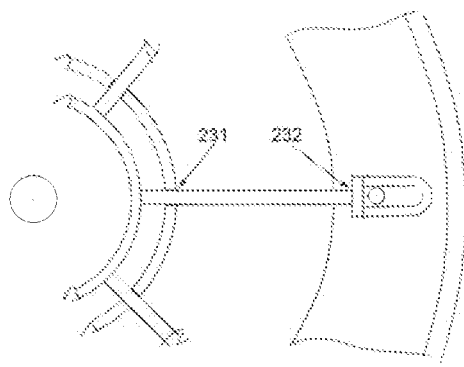
Figure 36:
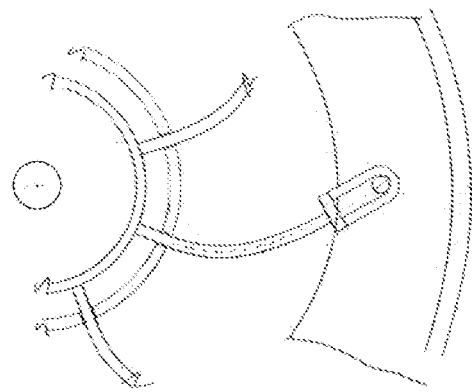
Figure 37:
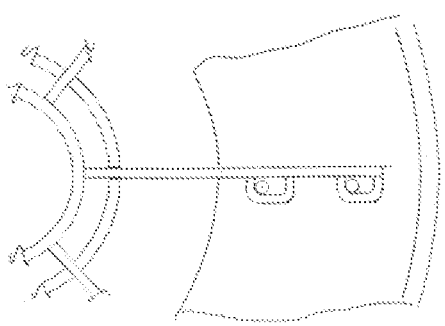
Figure 38:
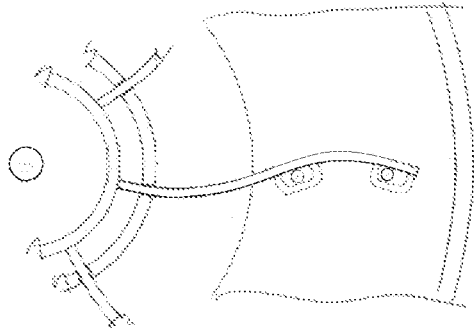

FIG. 50 shows the displaced form of FIG. 20A under the action of a tensile force in the ties.

FIG. 50 shows the displacement form for the case of a rigid (inflexible) base.

FIG. 51 shows the similar but increased displacement form for the same case but with a flexible base member.

The base member allows
 i. the fixing (anchor) forces to the foundation (base) generated by the moment couple within the rotary unit to be reduced by leverage through the base member about its central pivot.
 ii. the natural elastic frequency and force/displacement characteristics of the control structure, in conjunction with any other structure it is seismically supportive of, to be adjusted independently.
 iii. As discussed previously from Figures; the development of a two-tier ductile system.

The control structure in most instances is intermediate two ties 300 of a racked system. In alternative embodiments, the tie anchor may be at the end of a rack system and only attached to a single tie 300 (not shown). The examples shown in FIG. 47 onwards show a tie anchor located intermediate to ties 300.

The desirability of having two ties 300, acting in opposite directions, is due to the cycling response of the restrained structure during a seismic event.

The ties are typically in cable or rod form and are only able to carry tensile loads. Hence at any time only one tie is engaged in load transfer from main structure to energy absorbing system 1000 (control structure). Load and motion reversal between both the main structure and ground results in switching tensile loads in the ties, the rotation of the 1000 system and the yield working of the flexure members 100 (plates). With only one tie 300, after deformation in one direction, racking during the next cycle will incur slack in the tie 300 due to the previous deformation. However, one tie may be used albeit with less effectiveness than two tie, this could be at the ends of a rack where one tie is better than no ties to a tie anchor.

In an alternative embodiment the flexure member(s) 100 could be substituted with hydraulic energy absorbent members. This is used to absorb the energy of the lever. In this embodiment, the tie anchor is converting the substantially lateral forces of the ties into substantially circular distributed forces.

Figure 52:
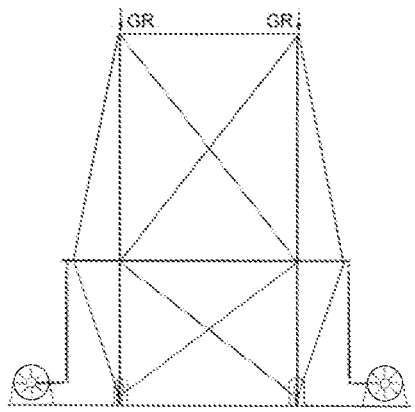
Figure 53:
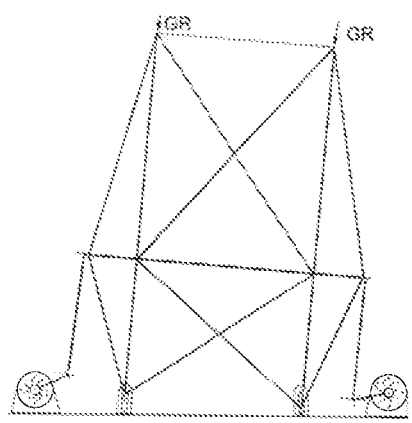
Figure 54:
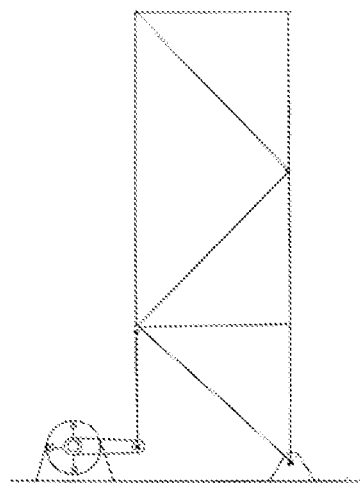
Figure 55:
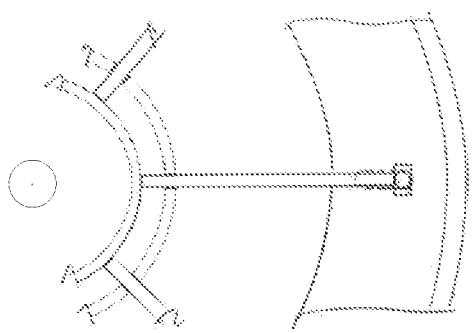
Figure 56:
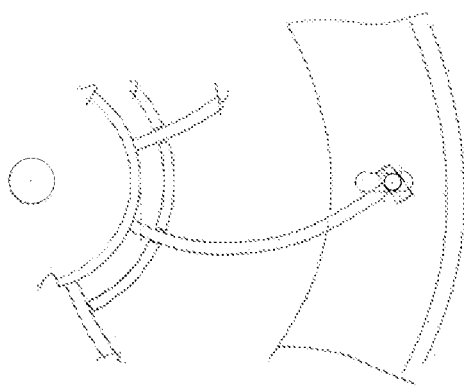
Figure 57:
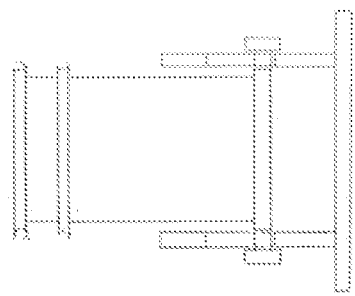
Figure 58:
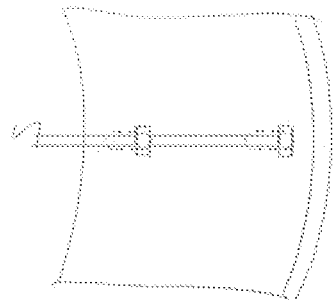
Figure 59:
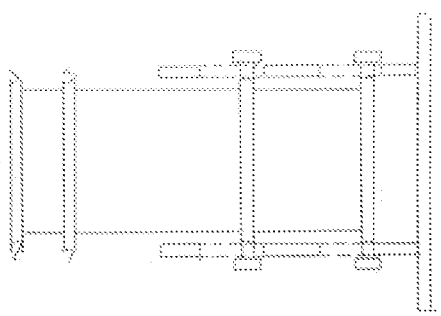
Figure 60:
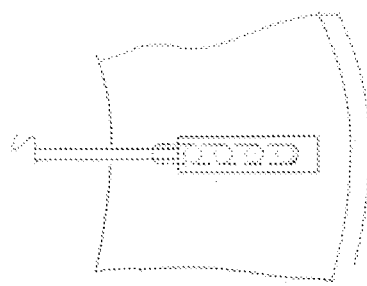
Figure 61:
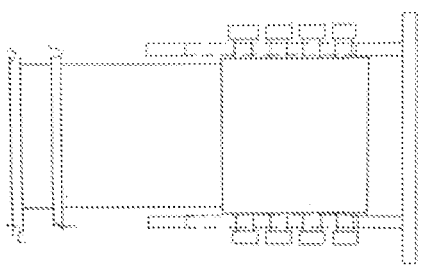
Figure 62:
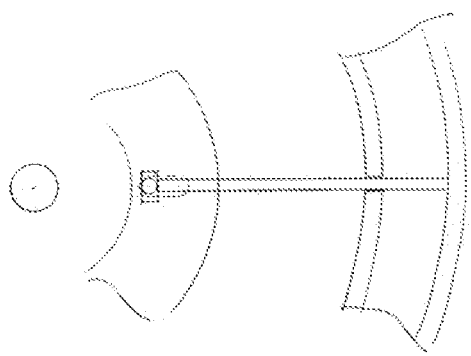
Figure 63:
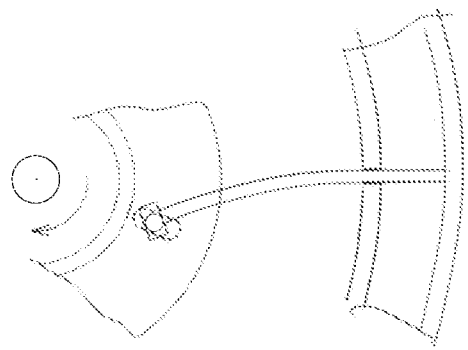
Figure 64:
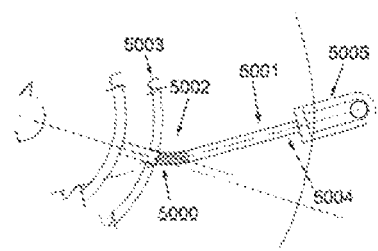
Figure 65:
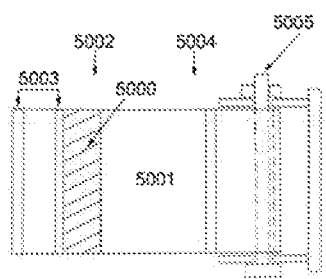
Figure 66:
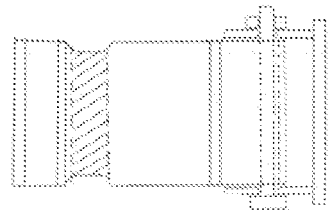
Figure 67:
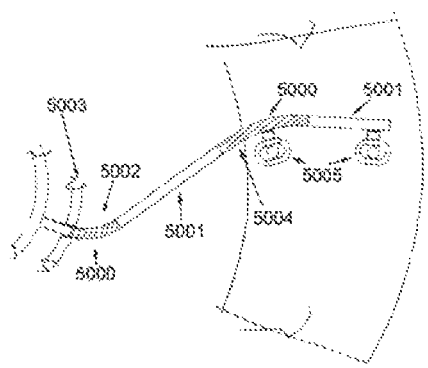
Figure 68:
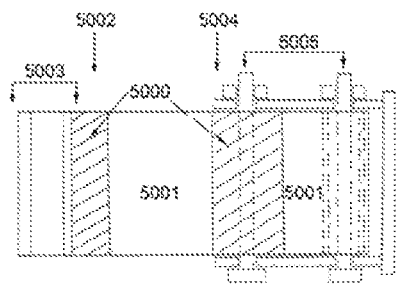
Figure 69:
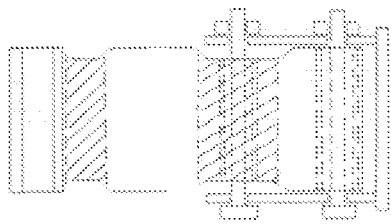
Figure 70:
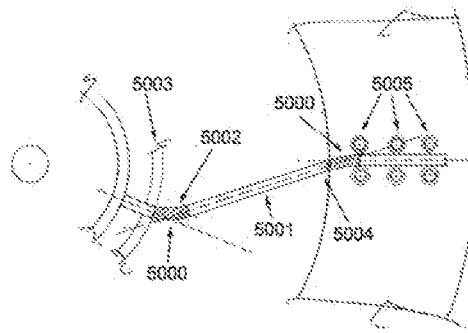
Figure 71:
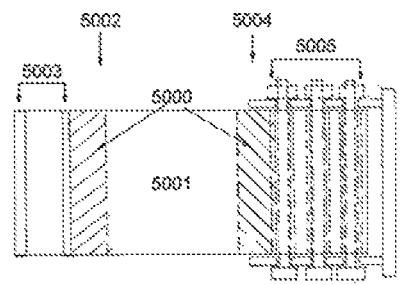
Figure 72:
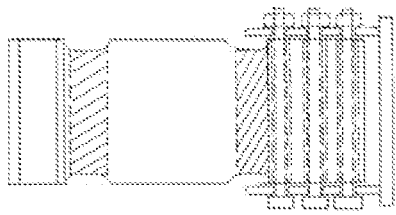
Figure 73:
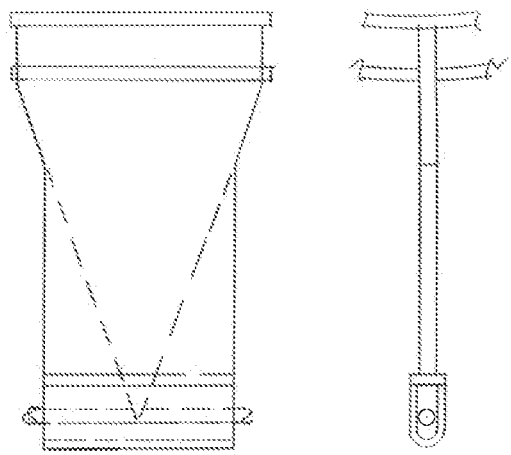
Figure 74:
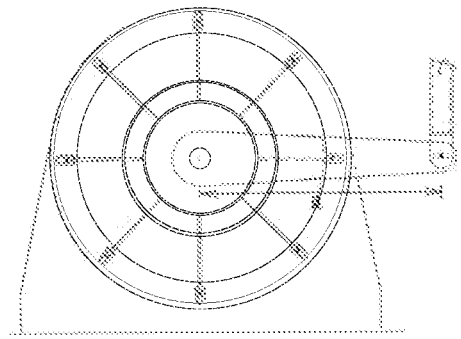
Figure 75:
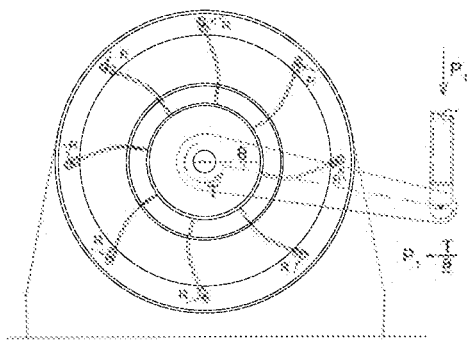
Figure 76:
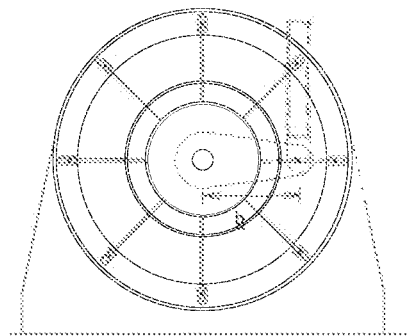
Figure 77:
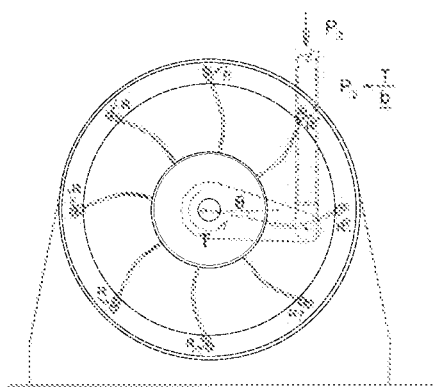
Figure 78:
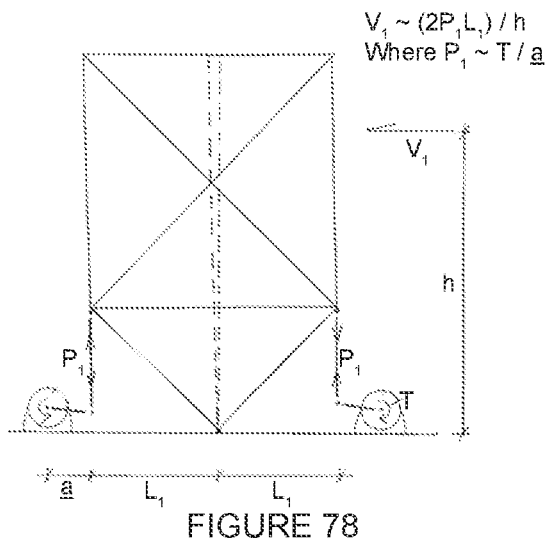
Figure 79:
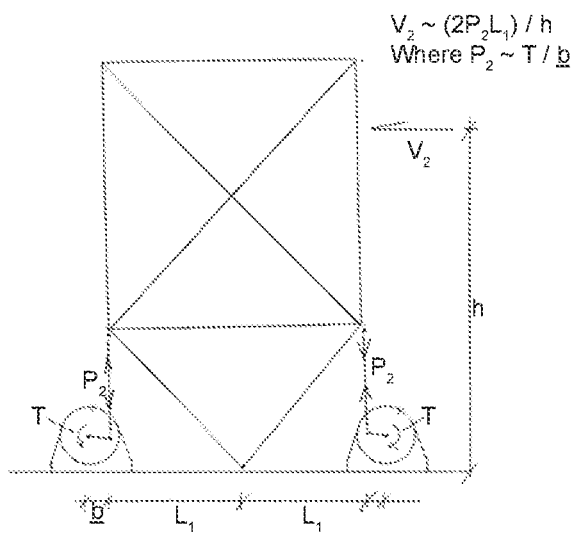

A further embodiment of the rocker frames is shown in FIGS. 52 and 53. Here the frames are able to directly support gravity loads without any reliance on the flexure members (plates) within the rotary unit providing vertical stability. Single direction compression load dampers are added to the base of the vertical gravity load carrying columns to cushion the rocking action as the frame returns to vertical (original) position, with each cycle, under the added effect of gravity load (GR).

Preferably the entire rocker 2000 is substantially composed of metal. Even more preferably, the rocker 2000 is composed of steel. The rocker, rocker arms, upstand, and anchors are substantially stiff and rigid so as not to yield during a seismic event. There are many alternatives in the design to fabricate a rigid rocker frame.

Where a foundation 4 has been mentioned, it is envisaged that the ground could also be a floor or ceiling of a building or structure, a beam, or truss, or part of a structure that is engaged to the anti-racking system as described.

It is appreciated that where all of these structures and systems herein described are symmetrical, the systems may be halved or double or so forth and still be effective. For example the energy absorbing system 1000 may only have one yield connector 230 on one side of the pivot anchor 240.

FIGS. 340 to 346 show a range of pivotably based control structures, all within which are located rotary yield units which produce a constant resistive yield force (torque) while the yield plates within them cyclically flex to high elasto-plastic displacements. As above the constant resistive yield force (torque) produced by the rotary units is utilized and transferred by lever arm to the control structure, enabling it (as a whole) to also form a stable elasto-plastic mechanism which is able to displace to high cycling elasto-plastic displacements and high ductilities while maintaining a constant resistive yield force as it resists and endures base motion input from a seismic event.

Figures 340, 341:
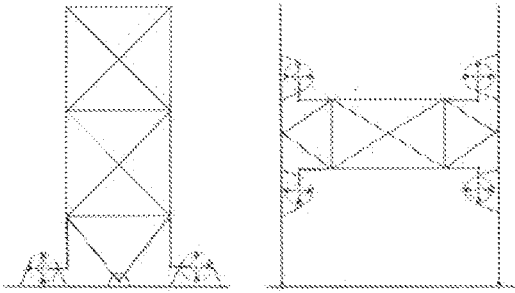

FIG. 340 shows an ALPHA1 control structure comprised of a pivotably based rocker frame, double pin ended push rods and base located rotary yield units all forming a pivotably based control structure of vertical (tower) aspect (or pivotably based cantilever wall).

FIG. 341 shows a control structure comprised of pivotably based stiff vertical chords, rocker frames in horizontal (spanning) aspect pivotably connected to vertical chords, double pin ended push rods and rotary yield units all forming a pivotably based control structure of a moment frame aspect.

Figures 342, 343:
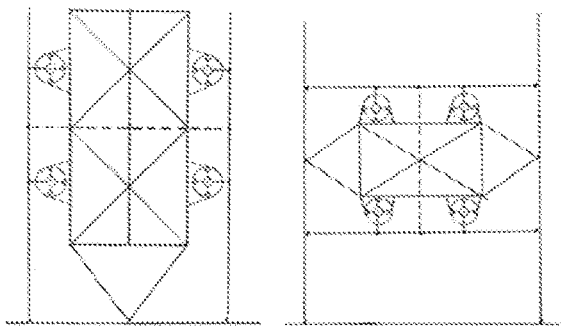

FIG. 342 shows a control structure comprised of a pivotably based rocker frame, pivotably based exterior chords (parallel with the chords of the rocker frame), pin-ended motion control ties and rotary yield units distributed between and along the rocker frame and exterior chords, all forming a pivotably based control structure.

FIG. 342 shows an ALPHA2 rocker frame assembly with rotary units connecting one part by lever arm to two (each side) stiff and pivotably based exterior chords and other part to secondary flexural member, in turn connected to rocker frame. Pin ended motion control ties connect the centreline of the rocker frame with the centrelines of the exterior chords.

FIG. 343 shows a control structure comprised of pivotably based vertical chords, rocker frames in horizontal (spanning) aspect pivotably connected to the vertical chords, exterior chords (parallel with the chords of the rocker frame) and pin connected to the vertical chords; pin ended motion control ties, and rotary yield units distributed between and along the rocker frame and exterior chords all forming a pivotably based control structure.

Figure 344:
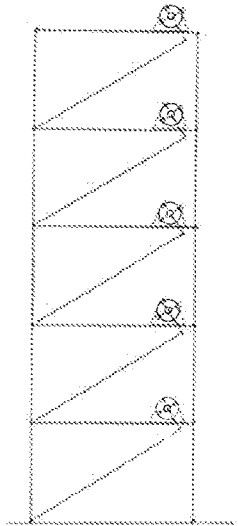

FIG. 344 shows a control structure comprised of pin connected beams and columns, double pin ended push rods and rotary yield units forming a pivotably based eccentrically braced frame.

Figure 345:
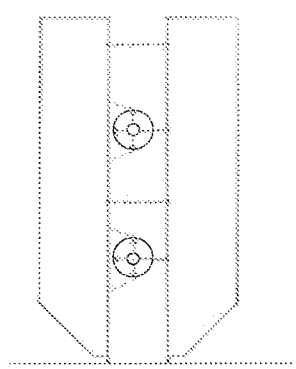
Figure 346:
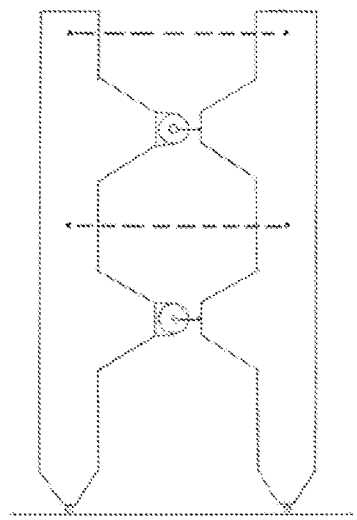

FIGS. 345 and 346 show a control structure comprised of pivotably based wall elements, connected by pin ended motion control ties, with rotary yield units located and connected between the walls, all forming a pivotably based control structure of coupled shear wall form.

Features particular and common to the yield plates, rotary units and control structures include:

1) The yield plate has particular boundary conditions which allow the flexing or deforming length of the plate to increase (or decrease) as the plate cyclically flexes to high elasto-plastic displacement, while its spanning distance (or distance between anchors or supports) remains effectively constant (test attained).
2) Plastic yielding (plastic curvature) occurs only in specific and fixed zones of the plate and the plate remains elastic (non-yielding) between yield zones or between a yield zone and non-yielding reaction point (test attained).
3) The extent (area/width/length) of the yield zone(s) remains constant with increasing (or decreasing) displacement of the plate, and increasing (or decreasing) plastic curvature of the yield zone (test attained).
4) The plastic curvature remains constant throughout the yield zone. That is, the plate is flexurally yielding into circular arcs whose radii of curvature decreases (or increases) with increasing (or decreasing) displacement of the plate (or increasing/decreasing plastic curvature of the yield zone) (test attained).
5) The resistive yield force produced by the plate as it cyclically flexes to high elasto-plastic displacements remains constant (test and calculation attained).
6) The constant resistive yield force produced by the yielding plates within the rotary units, vectorially summed, produces a constant resistive yield force about the axis of the rotary unit.
7) The constant resistive yield torque produced by the rotary unit converts or transfers to a direct constant resistive yield force by a lever arm integral with the axis of rotation of the rotary unit. By varying the length of the lever arm, the magnitude of the transferred direct constant force can be varied or geared.
8) A rotary unit incorporated with a secondary flexural member allows for both the constant force produced by the rotary unit and the stiffness (or flexibility) of the rotary unit to be independently adjusted.
9) The addition of a connect-disconnect-connect joint into the lever arms of the rotary unit enables flexural yielding of the yield plates within the rotary units to be primarily of one curvature only.
10) The constant resistive yield force produced by the yielding rotary units enables a control structure, of which the rotary units are a part, to also form an elasto-plastic mechanism of constant resistive yield force.
11) Adjustment of a rotary unit's arm length, and secondary flexural member properties (e.g. length/section properties), enables both the yield strength and elastic (natural) frequency of the control structure to be adjusted (or tuned) without change to its superstructure and (if required) without change to the yield plates within the rotary units.
12) The use of rotary yield units integral with secondary flexural members also enables a two tier ductile system (with bi-linear elastic stiffening) to be developed for the control structure in which yielding could occur in rotary yield unit(s) or secondary flexural member(s) or both (while the superstructure remains elastic).
13) The control structure is able to utilize the constant resistive yield force (torque) produced by the rotary units, and form a stable plastic mechanism which is also able to cyclically displace to high elasto-plastic displacements (and ductilities) while maintaining a constant resistive yield force. Response forces (dynamic) and accelerations within the control structure (e.g. superstructure forces/floor accelerations) and within a structure it may be seismically supportive of are consequently able to be limited to maximum values as the control structure resists and endures (with constant resistive yield force) the base motion input (ground accelerations) of a seismic event.

The pivotably based control structures described above have high elasto-plastic displacement and high ductility capability. They are able to form and maintain a stable constant resistive yield force mechanism while cycling to high elasto-plastic displacements and ductilities.

The constant resistive yield force mechanism formed by the control structure enables it (control structure) to control and limit forces developed within itself, to control and limit forces developed in its supporting foundations, and to control and limit response accelerations (dynamic forces) developed in masses (e.g. floors and equipment/materials/people supported by the floors) which may be supported by the control structures as the control structure resists and endures ground motion input (ground accelerations) from a seismic event.

FIGS. 340 to 345 include a (non-exhaustive) range or family of pivotably based control structures, all of which are able to maintain a constant resistive yield force (at high cycling elasto-plastic displacements and ductilities), and limit forces developed within themselves, within their foundations, or within structures that they are seismically supportive of, as they resist and endure base motion input from a seismic event.

Located within each of the rotary units shown in the control structures of FIGS. 340 to 345 are yield plates (DELTA4 to DELTA6) which are able to elasto-plastically flex to high cycling displacements and ductilities while maintaining a constant resistive yield force; their summing producing a constant resistive yield (torque) for the rotary unit. The yield plates each have free translational or free translational and free rotational boundary conditions at one of their support points or regions. Further, and of significance, the deforming length of the yield plates along their flexing curve(s) between support or reaction points or regions is able to freely increase or decrease as the plates displace, and/or develop horizontal reactions at their reaction points, regions or reaction surfaces (alternatively, friction block assemblies with or without an elastic component may be located within the rotary units).

Components within the control structures and/or part of the rotary units may also include:

Secondary flexural members (integral with the rotary units) of any form, with any support conditions and of any displaced shape (curve) which are able to be configured to produce a two tier ductile system.

A joint integral with the arm(s) or lever(s) of the rotary unit which is able to cyclically connect and disconnect and produce within the yield plates of the rotary units elasto-plastic flexing, displacement, and curvature of primarily one direction or sign.

Figure 351:
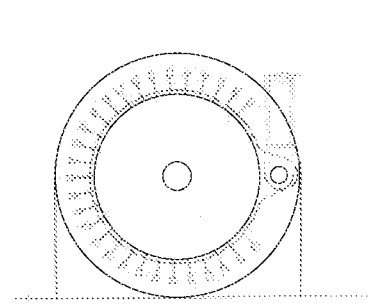
Figure 352:
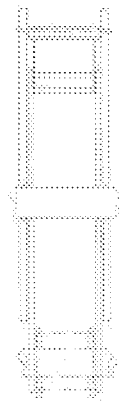

For a practical perspective, FIG. 351 shows a rotary yield unit within which DELTA4 yield plates are located. FIG. 352 is a schematic plan view of FIG. 351. The yield plates are distributed at approximately 150 mm spacing around the periphery of the rotary unit and the radial distance to the yield plates is 1000 mm.

With 8 mm grade 460 yield plates of a width of 200 mm and span of 100 mm the rotary unit, (with lever arm of same length as radial distance to yield plates) has an elastic yield strength of 500 kN.

In conventional terms (or approach), at a displacement ductility factor (for the plates) of 10, the unit is providing an elastic strength or elastic performance equivalent of 5000 kN elastic strength. Halving the lever arm length increases (doubles) this value to 10,000 kN. The yield plates and rotary unit, as drawn are capable of displacement ductility factors in excess of 25.

With 12 mm grade 460 plates of same dimensions (rotary unit and plates) the rotary unit has a yield strength in excess of 1000 kN. Again at a displacement ductility factor of 10 (plates and unit), the rotary unit provides an elastic strength or elastic performance equivalent to 10,000 kN elastic strength. Again, halving the lever arm length doubles this value to 20,000 kN. And again, the yield plates and rotary unit are capable of displacement ductility factors in excess of 25.

Figure 353:

FIG. 353 shows a sleeve guided rocker unit with push rods, as described previously, connecting with and forming an ALPHA1 rocker frame assembly. The unit comprises 15 DELTA1 yield plates in three groups of 5 plates between which guides for the ties linking all plates are located.

Figure 354:
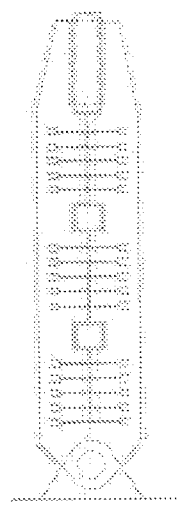
Figure 355:
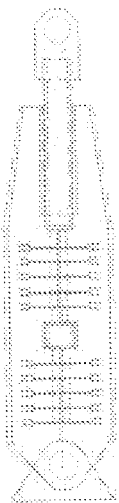

FIG. 354 shows a close up detail of FIG. 353 and FIG. 355 shows a similar unit but with 10 plates.

Figure 356:
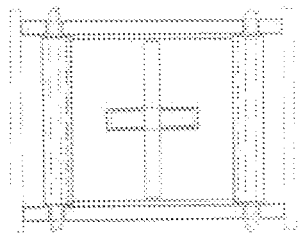

FIG. 356 shows a plan view of the yield plate inclusive of a cut out in it to accommodate the ties.

Figure 357:
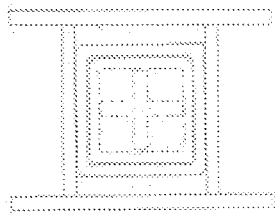

FIG. 357 shows a plan view of the guide and tie within the rocker unit casing.

Figure 358:
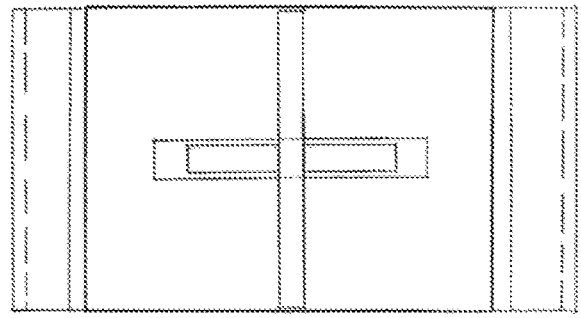
Figure 359:
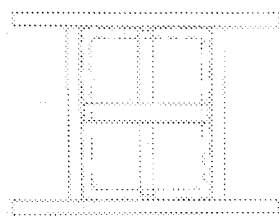

FIG. 358 similarly shows a plan view of a DELTA1 yield plate and FIG. 359 shows a plan view, again, of a guide and tie, but here the guide and tie take up the entire interval space of the rocker unit.

Figure 360:
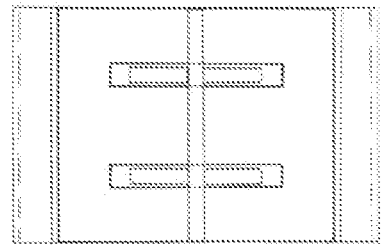

FIG. 360 shows a plan of a yield plate with two ties and cut outs in the plate.

Figure 361:
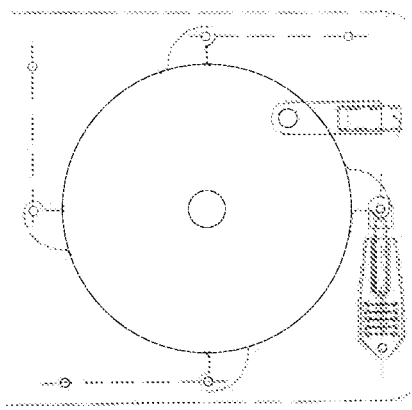

FIG. 361 shows a schematic view of a rotary unit as described previously in which a sleeve guided rocker unit(s) forms a third part of the rotary unit. Here four rocker units are located within the rotary unit. Each of the rocker units contains five DELTA1 yield plates.

Figure 362:
Figure 363:
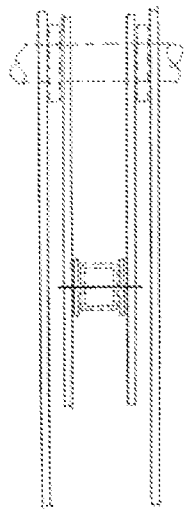

FIG. 362 shows a schematic plan view of FIG. 361.

The rocker unit of FIG. 353, with 8 mm grade 460 plates of 200 mm effective width and 200 mm span has an elastic yield strength in excess of 500 kN and is capable of displacement ductility factors in excess of 25. Similarly, with 12 mm grade 460 plates the rocker unit has an elastic yield strength in excess of 1000 kN, and again is capable of displacement ductility factors in excess of 25.

As described previously; For tall control structures or control structures which are seismically supportive of tall buildings (e.g. 20 storey or higher); the flexibility (plates elastic yield displacement) of the yield plates and the flexibility (structures elastic yield displacement) of the pivotably based rocker frame assemblies (i.e. superstructure of control structure), and the sum of their flexibilities and the ratio of their flexibilities are able to be configured so that the high ductility capability of the yield plates (capable of flexing to high elasto-plastic displacements) is transferred to provide a high (global or structural) ductility capability for the control structure as a whole; and (also) that while (or if) the yield plates are flexing to high elasto-plastic displacements (and strains or ductilities), the drift in the control structure (while at high structural ductilities) is low, and P-DELTA effects are negligible (or manageable).

That is the control structure is able to resist and endure severe ground or base motion input (i.e. high peak ground accelerations, PGA) while (both) maintaining a constant resistive yield force (limiting peak response acceleration of masses supported by the control structure, limiting forces developed within the control structure, limiting forces within its foundations and limiting forces within a structure the control structure may be seismically supportive of) all (while) maintaining a low (or manageable) peak (elasto-plastic) displacement response for the control structure as a whole (i.e. low lateral drift).

In a further embodiment the plane of the rotary units is oriented not in the vertical plane as previously described, but it lies effectively flat in the horizontal plane. That is, its axis of rotation is vertical. In this embodiment the rotary units may be located between the base of a building's superstructure and its supporting foundations. First part (e.g. casing) of the rotary unit laterally connecting with the foundation (e.g. first structural) member and the second part (e.g. slot and pin end of lever arm) of the rotary unit laterally connecting with the base of the overlying superstructure. The rotary units behave or displace as previously described, that is, the yield plates (DELTA4 to DELTA6) within the units are able to flex to high elasto-plastic displacements and high ductilities while maintaining a constant resistive yield force. The rotary unit is subsequently able to displace (rotate) with a constant resistive yield torque, and its lever arm, transfer or produce a direct constant resistive yield force. The base of the superstructure and its (gravity) supporting foundation structure are configured to laterally displace relative to each other, preferably without developing shear (lateral) forces between their bearing or contact surfaces, this could be achieved for example by use of load bearing shearing materials (e.g. slip pads) or pivoting roller systems, between the two. That is, it is preferable that the only lateral (shear) forces developed between and across the superstructure and its foundation base (as the foundation base responds to or moves with ground motion input from a seismic event) are the constant resistive yield forces developed within and by the displacing rotary units which connect the superstructure with its foundation base. The rotary units are preferably limiting the lateral (shear) force that can be transferred between and across the foundations and its overlying superstructure. That is, limiting the force to the constant resistive force developed by the rotary units as they displace with the differential (or lagging) displacement between foundation and superstructure. Base acceleration of the superstructure (and hence dynamic forces developed within it) is hence limited by the constant resistive yield force developed by the rotary units laterally linking the superstructure with its foundations.

The response (displacement/velocity/acceleration) of the superstructure is hence governed by the elastic flexibility of the rotary units (with or without secondary flexural members) and the constant (limited) resistive yield force produced by them and transferred across them between foundation and superstructure. The rotary units are dynamically separating or isolating the superstructure from its foundation which is moving with or responding to the ground motion input (displacement/velocity/acceleration) of a seismic event.

Figure 347:
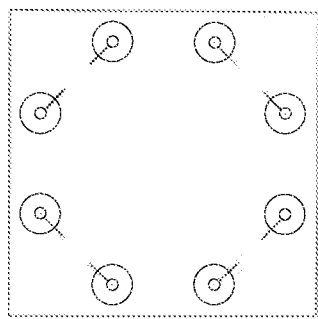
Figure 348:
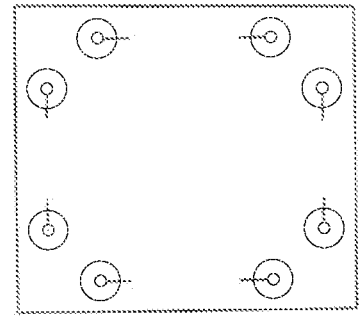

FIGS. 347 and 348 show a plan view of rotary units located between the foundation and overlying superstructure of a building structure.

Figure 349:
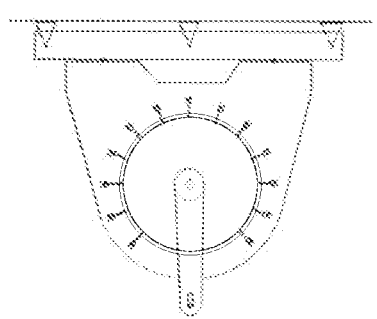

FIG. 349 shows a schematic plan detail of the rotary units of FIG. 347/348 with a secondary flexural member.

Figure 350:
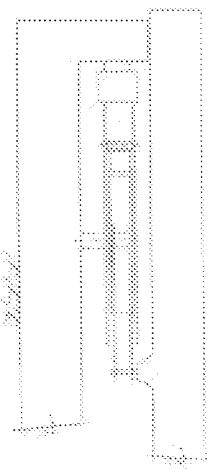

FIG. 350 shows a longitudinal section of FIG. 347, one part of the rotary unit connecting to the foundations and the other part to the base of the superstructure.

As with the rotary units previously described, the direct force generated from the constant torque produced by the elasto-plastically rotating units is able to be directly adjusted by varying the lever arm length of the rotary unit, the lever arm (first part) connecting to the superstructure and the housing of the rotary unit (second part) connecting to the foundation or vice versa. Similarly, a secondary flexural member is able to be integrated with the rotary unit and a two tier ductile system developed from it. And as previously described a connect-disconnect-connect (CDC) joint is able to be integrated with the rotary unit. Friction units or shear yield units as described previously with or without an integral elastic component can alternatively be used within or as part of the rotary unit.

Again, for a practical perspective, FIGS. 364 to 368 show a range of pivotably based ALPHA1 and ALPHA2 control structures of varying heights, (arbitrarily) supporting proprietary (e.g. steel tray composite) concrete floors, each (arbitrarily) of a seismic mass (inclusive of contributary applied load) of 600 kg/m2.

Figure 365:
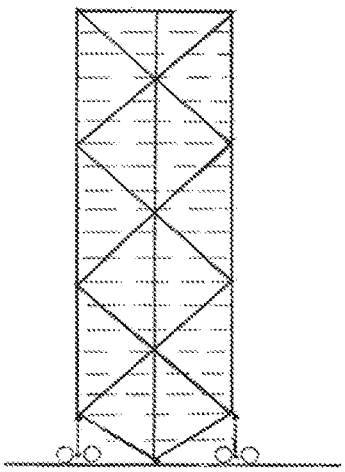

FIG. 365 shows an ALPHA1 control structure to 70 m height and supporting 20 floors. Each frame (again arbitrarily) supports a contributary floor area of 325 m2 (or 195 tonnes per floor level). For this control structure to resist and endure the floor mass acceleration response (for this structure as read from a standard code response spectra) to a base motion acceleration input of 0.4 g peak ground acceleration associated with standard soils; would (arbitrarily) require four base located rotary units, each of 1600 mm diameter, located at each end of the frame and connecting to the pin ended push rods of the ALPHA1 frame. A different arrangement of rotary units (number and size of units, number and size of yield plates within, lever arm length) is equally able to be configured (in conjunction with the superstructure) to produce the same (or different) strength stiffness and ductility values to the control structure. The strength, stiffness, and strength/stiffness ratios of the yield plates within the rotary units are able to be independently adjusted by simply varying the thickness and span of the yield plates. This adjusts the same values for the rotary units as a whole which may be further adjusted by varying the length of their lever arms or by adding a secondary flexural member.

The combined elastic flexibilities of the (non yielding) superstructure and the (yielding) rotary units are able to be configured to produce stiff (low drift) combinations in which P-DELTA effects are minimised, or more flexible (and economic) structures but in which the additive P-DELTA force and displacement effects are higher. In both cases the rotary units are readily configured to provide the required strength, flexibility and ductility for the control structure.

Figure 366:
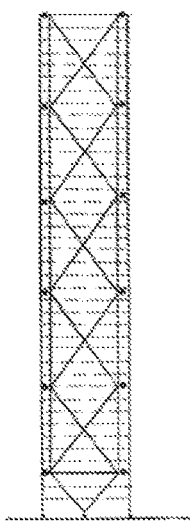

FIG. 366 is a schematic view of a control structure, similar to FIG. 365 but of twice the height (140 m) and supportive of twice the number of floors (40 levels) but with same contributary floor area per frame (325 m2). For perspective, for the same base motion input (0.4 g PGA associated with standard soils) and again using a standard code (e.g. Eurocode 8) response spectra, the control structure would require (arbitrarily) four 2500 mm base located rotary units at each end of its 25 m wide ALPHA1 frames. Again these rotary units connect to the push rods of the ALPHA1 control structure, the rotary units able to be located below base (or ground) level. Again lateral drift of the yielding structure is able to be limited by configuring the elastic flexibilities of the yielding rotary units and non-yielding superstructure.

Figure 367:
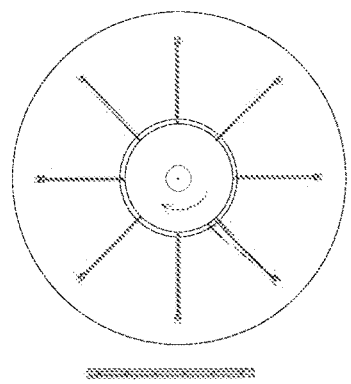

One of the plate options used in this analysis (arbitrarily) comprised composite plates of 8 mm thickness, of span 600 mm and width 600 mm, as shown in FIG. 367, the plates effectively of the form of flaps. Here the span (dimension) of the yield plates is of the same order as the hub radius of the rotary unit, and the flexibility of the unit is (visually) tangible. For the 40 storey example to resist and endure a base motion input of 0.4 g associated with standard soils or 0.5 g associated with rock, of the order of 400 of these 8/10 space/8 composite plates distributed over e.g. 8 (2500 mm DIA) rotary units (50 per unit) would be required, each side of the 40 storey frame. Despite their flexibility, the units:
  control and limit base shears to a minimum (code) level, hence limiting forces within the superstructure and mass (floor) accelerations to a minimum level.
  control and limit lateral drift (inclusive of P-DELTA additions) to within (code) maximum levels
  reduce forces within the superstructure and its foundations to approximately 60% that of an elastically (only) responding structure
  make minimal (local) ductility demand on the yield plates of the rotary unit (order of 3) while producing a structural (global) ductility for the structure as a whole of order 2

This rotary unit configuration is one of any (of varying stiffness and strength) which could be used for this case.

This particular configuration, due to its flexibility produces an overall design in which the superstructure is at its drift limit (and governed by this), for this base motion input, and in which ductility demand on the yield plates is very low. The example is used to illustrate the two extremes that this particular unit is operating at (at the same time) while limiting response base shears. For an increased base motion input (e.g. to 1.0 g) the same scale (diameter), number of, and yield strength of rotary unit can still be used. But one in which the yield plate's elastic stiffness is increased. This can be achieved by both reducing the span of the same 8/10/8 composite plates (to increase their stiffness) and reducing the width of the plates (to maintain their yield strength), or through using a different plate. This is done to produce a superstructure of the same strength, and with the same maximum response base shears, but one in which lateral drift is further controlled. With this, the ductility demand on the rotary unit increases, but to values still well within its capacity. Further note, for the original case of a 0.4 g/0.5 g input; increasing the stiffness of the rotary units (e.g. by adjusting plate dimensions) also reduces elasto-plastic displacement response (lateral drift) of the superstructure, but similarly increases (local) ductility demand on the yield plates of the rotary unit.

Figure 368:
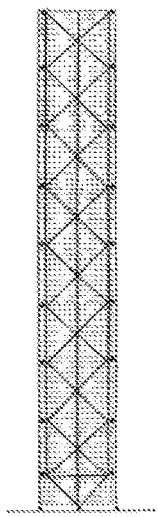

FIG. 368 shows a schematic view of the extreme case of an ALPHA2 control structure of 342 m height and supportive of 100 concrete floors of 600 kg/m2 mass.

Figure 369:
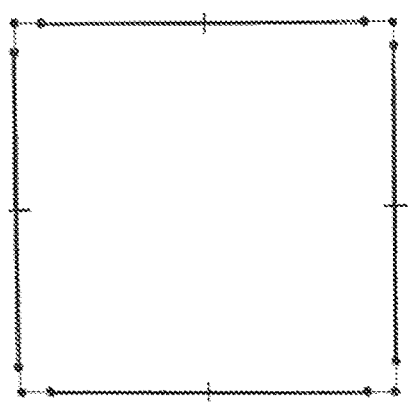

FIG. 369 shows a plan view of the representative building. The base dimensions are 50 m×50 m. The structure is of the same height, number of stories and average floor area as the John Hancock Centre. It is similarly cross braced only at its perimeter, with internal columns carrying gravity loads only (i.e. providing no lateral resistance). Where the John Hancock Centre is rectangular in plan (79 m×49 m base) and tapers with height, the control structure considered here is square in plan and prismatic. That is it does not taper (i.e. all floors are of equal weight and area). The very high total mass supported by these structures (despite having relatively large section structural members) results in the structures having very low angular frequencies (i.e. long natural periods).

For the case of a ground motion input of 0.4 g PGA, lateral coefficient limits (at around T=4.5 s) govern or determine the scale of superstructure for this height and scale, whether the superstructure is designed to respond elastically (only) or respond elasto-plastically with the rotary units. With this restriction (and a base motion input of 0.4 g) the use of rotary units still produces a more economical superstructure, but only of the order of 80% tonnage of the same elastically designed structure. However, when the structures (elastic and elasto-plastic) are designed for increased ground motions of the order of 1.0 g PGA and acceleration response is associated with standard soils; a superstructure with the rotary yield units is of the order of only 50% of the tonnage of the elastically designed structure, both designed to resist and endure the same base motion input. Both designs (elastic and elasto-plastic) also inclusive of P-DELTA effects. This result is explained further on. Even at these still very high flexibility levels (for the 100 storey examples) the rotary units are able to produce effective structural ductility factors which result in reduced tonnage.

The efficiency of the rotary units ductility, (the rotary units being a part of the control structure), that is the ratio of the (global) structural ductility of the control structure (extracted from the rotary units) to the (local) ductility of the rotary units, decreases with increasing flexibility (inclusive of the rotary unit flexibility) of the control structure as does the mass acceleration response and hence force demand on the control structure. That is with increasing natural (elastic) period of the control structure (decreasing angular frequency) both the force demand on a given control structure and efficiency of the rotary units, decrease. Hence the ratio of (superstructure) tonnage required for a yielding structure with rotary units, compared with a structure designed to remain elastic increases (that is the difference in tonnages) closes.

However even for the extreme case of the 100 storey example considered, the rotary units were still able to produce a ductility capability for the control structure as a whole for a range of base motion inputs which enables tonnages of half that required for the elastic model, while accommodating additive (higher order) forces and displacements due to drift (elasto-plastic) and P-DELTA effects. Further to the reduction in tonnage, floor (response) acceleration and foundation forces are more than halved. Of note, as described above, with increasing ground accelerations (from say 0.4 g to 1.0 g) applied to the more flexible structures (40 to 100 stories) the rotary units become more efficient. That is the ratio of (steel) tonnage required in a control structure's superstructure with rotary units to the (steel) tonnage required for an elastically designed superstructure (without rotary units) reduces with increasing ground acceleration. As explained further on, this is due to code limits placed on base shear. Further, as the natural frequency of the control structure increases (period decreases) and mass response accelerations increase (above limited minimums) the efficiency (and economy) of control structures with rotary units rapidly increases.

For the example of the 20 storey structure of FIG. 365 the steel tonnage required of the superstructure with rotary units is of the order of ¼ that of the same height/weight elastically designed structure. Foundation loads from the yielding control structure and floor accelerations are again less than ¼ that of an elastic structure.

Figure 364:
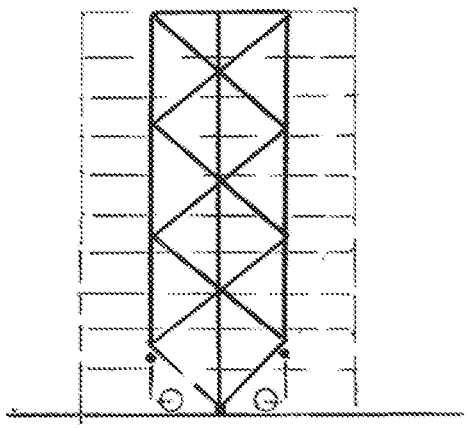

For the 10 storey structure of FIG. 364 this ratio becomes less than ⅛.

As described previously, when compared with other conventional ductile structures which are able to yield (but not with a constant resistive yield force); the control structures as described above (with rotary units which are able to yield at a constant resistive yield force), are of the order of ⅔'s the tonnage of conventional (same initial yield strength) ductile structures and similarly produce foundation loads and floor accelerations of ⅔'s that of ductile structures of same initial yield strength.

Figure 370:
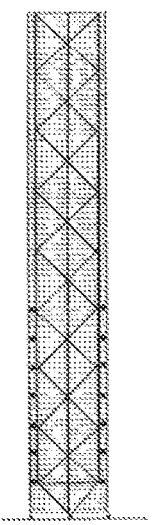
Figure 384:
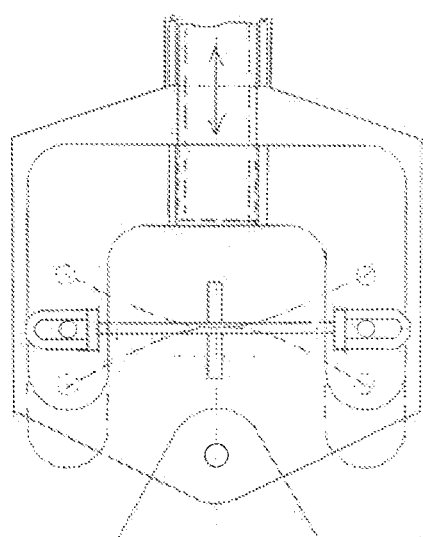
Figure 385:
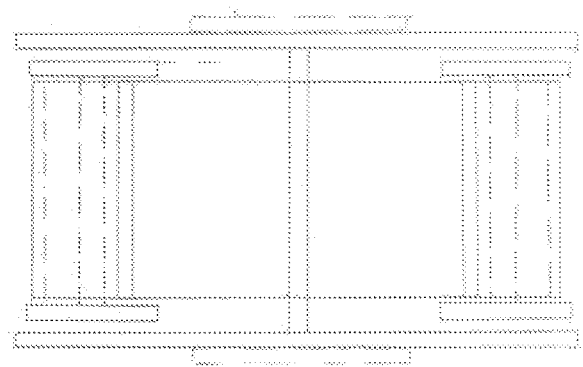
Figure 386:
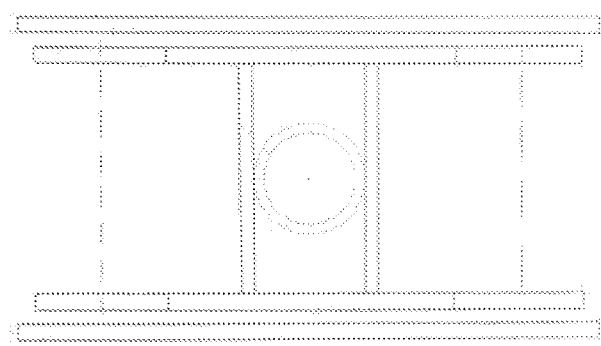
Figure 387:
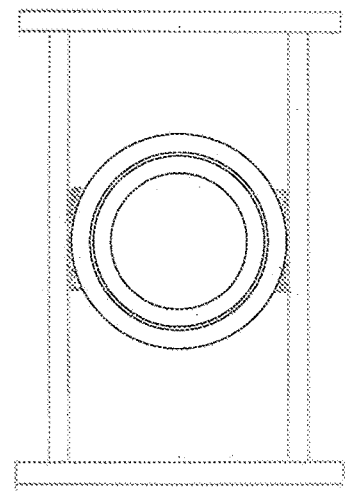
Figure 388:
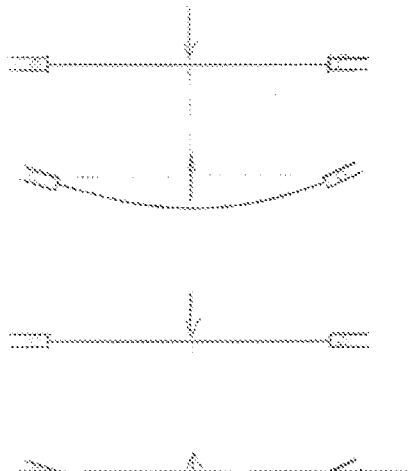
Figure 389:
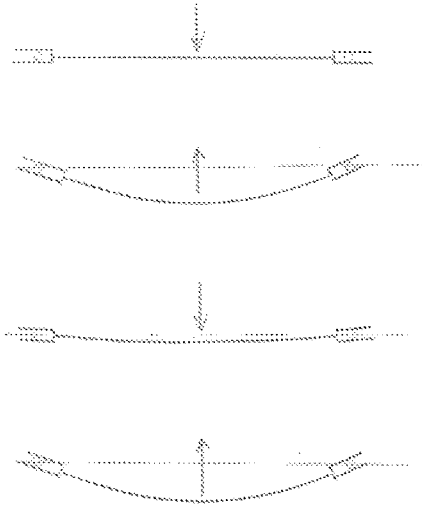
Figure 390:
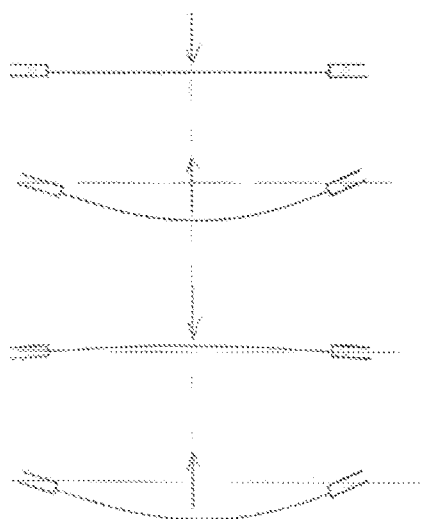

Further, for tall ALPHA2 control structures, the flexibility of rotary units located between and along the exterior chord, and the interior chord integral with the rocker, all part of the ALPHA2 control structure, can be individually adjusted by variation of number, span and thickness of plates within the rotary unit, variation of the rotary units diameter and lever arm length and variation or addition of secondary flexural members. For tall structures in particular, the adjustment of each rotary unit's flexibility and their (vertical) location between chords in conjunction with the frame and exterior chord flexibility enables displacement differentials between exterior and interior chords (from one rotary unit to the next) due to elastic shortening or stretching of the chords to be compensated for, so that yielding occurs in each of the rotary units at the same time. It further enables a different yield force to be configured for each rotary unit if required, while still producing a combined constant resistive yield force for the control structure as a whole. The rotary units may be concentrated nearer the base of the control structure as shown in FIG. 370, or nearer the top as shown in FIG. 371 or in any other regular (or irregular) arrangement.

As described previously where the connection of the end of the rotary unit arm to the exterior chord is pin and slot connected, pin end motion control ties are added to connect the centrelines of the exterior chords to the centreline of the rocker frame of the ALPHA2 control structure as shown in FIG. 372.

Equation 1) below is of a form typically used in seismic building codes (e.g. Eurocode), to establish the equivalent lateral force to be applied to a structure, and hence the required strength or yield strength of that structure.

$$C = \frac{A_g R(T)}{\mu_{St}} \geq C_{min} \quad 1)$$

Ag is the peak ground acceleration.

R(T) is the normalised response acceleration of the mass supported by the structure. It is a function of the natural elastic frequency of the structure and its value flatlines at high natural periods beyond 4 s or 4.5 s and increases exponentially as the natural period of the structure decreases (or natural angular frequency of the structure increases) to an elastic resonance value where ground motion frequency equates with the natural elastic frequency of the structure.

$\mu_{St}$ is the structures ductility (or yielding) capability. It is the quotient of the total elasto-plastic displacement (or total strain) the structure is able to endure to its displacement at elastic yield (or elastic strain limit).

C is the lateral force coefficient, which, multiplied by the weight of the building produces the equivalent lateral force the structure must elastically resist before yielding (i.e. the yield strength of the structure).

Cmin is the minimum or lower value (regardless of ground acceleration input, natural frequency of structure, or ductility capability of structure) of C. It is the lower set of the elastic strength of a structure.

For a given ground acceleration and natural frequency (period) of a structure, Cmin also sets an upper limit on the value of $\mu_{St}$ that can be used for a structure regardless of what the ductility capability of the structure is. This is particularly relevant with tall and/or flexible structures whose natural period is of the order of 4 s to 4.5 s and higher, and with ground accelerations of the order of 0.2 g to 0.4 g. For these values (flexible structures subject to low/moderate accelerations) only low values of ductility (restricted by Cmin) can be utilised. Hence the superstructure tonnage of a structure designed to remain elastic for a given ground acceleration will be only of the order of 20% higher than a structure with yield units (that is, structures with natural periods of around 4 s and higher, with rotary yield units and subject to ground accelerations of around 0.2 g to 0.4 g, will be of the order of 80% of the tonnage/strength of the same structure form designed to remain elastic for the same ground acceleration). However, as ground acceleration increases, or natural frequency of structure increases, or both increase, the value of $\mu_{St}$ which can be utilized also increases. That is, as the numerator of equation 1) increases, so can the denominator, while the value of Cmin is maintained. With linearly increasing acceleration Ag and exponentially increasing R(T) (with decreasing T), the value of $\mu_{St}$ that can be utilized is also exponentially increasing, and the ratio of the superstructure tonnage (or strength) required for an elastically designed structure to a yielding structure is also exponentially increasing. That is, the tonnage or strength required for these structures with rotary yield units is rapidly changing to being of the order of 10 to 15% of the same structure designed elastically. Of note, for a structure of natural period T (that is constant value R(T)); as ground acceleration, Ag, increases, higher values of $\mu_{St}$ may be utilized within the confines of the Cmin limit. That is, as ground acceleration increases, the rotary yield units are becoming more efficient and the difference in required tonnage/strength between a structure with yield units and one designed elastically is increasing. For taller structures (e.g. 30 to 40 stories and higher) or more flexible structures with rotary yield units, the superstructures tonnage/strength required to resist and endure a ground acceleration of 1.0 g reduces (from around 80% with ground acceleration of 0.4 g) to around ⅔'s (67%) of that of the same structure required to remain elastic.

The structural (or global) ductility or ductility as a whole for the control structure (superstructures) that can be extracted or utilized from the ductility (or ductile capability) of the rotary yield units is dependent on the elastic flexibility of the superstructure relative to the elastic flexibility of the rotary yield unit. For a superstructure with no flexibility (i.e. rigid) the ductility of the structure is equal to the ductility of the rotary unit. As the superstructures flexibility increases the ratio of structure ductility to rotary yield unit ductility reduces. That is, the efficiency of utilizing the ductility capability of the rotary yield units reduces with increasing superstructure flexibility. However, the very high ductility values able to be produced by the rotary units enables useable structural ductility values even for extreme cases such as the 100 storey example above. From elasto-plastic dynamic analyses; for a given yield strength (of structure) and given base acceleration, ductility demand (or plastic strain) increases exponentially with increasing stiffness (or increasing natural angular frequency) of a structure. The high ductile capability of the rotary units combined with the increasing, local (rotary unit) to global (superstructure), ductility efficiency with increasing natural frequency of the structure enables a stiffer structure with rotary yield units to also resist and endure very high base motion inputs (acceleration, velocity, displacement).

FIGS. 373 and 374 are schematic plan views of rotary units located (as discussed above), between a building foundations and its overlying superstructure. That is, they are base isolation units. For perspective the 40 storey example (discussed previously), of net floor area 625 m2 (25 m×25 m) and seismic floor mass of 600 kg/m2 is considered. This equates to a seismic mass of 15×106 kg or a seismic weight of 150,000 kN at superstructure base level. For a superstructure of this height and weight and of negligible flexibility (i.e. rigid block); four rotary units alone (or two sets of two as shown in Figure A100) of 2 m diameter each with 40 composite (2×8 mm plates spaced 10 mm apart) yield plates distributed around each of their circumferences, are able to produce a constant resistive yield force of minimum code standard (base shear) with ductility values well within their capability, and maintaining minimum lateral drift while resisting and enduring a (arbitrary) peak ground acceleration of 0.4 g associated with standard soils. With increasing flexibility of the superstructure (i.e. non rigid) and/or the addition of secondary flexural members to the rotary units, (global) ductility demand on the control structure, acceleration response of the floors and base shear; all reduce (while ductility demand on the rotary units increases). Alternatively the same system (with increased flexibility) is able resist and endure higher (than 0.4 g)

ground motion input. As flat lying base isolation units the rotary yield units are able to practicably be of a large diameter (e.g. 5 m or more).

FIG. 374 is a schematic of a rotary unit with sleeve guided rocker units (third part as described previously) within which DELTA1 plates are located. The plan view shows eight rocker units (two per quadrant). This number as discussed previously with the ALPHA2 rocker frames can be readily doubled to four units per quadrant. As base isolation units, the rotary units, with or without secondary flexural members, are able to be configured to resist and endure very high base motion inputs.

The sleeve guided rocker units and yield elements within, both as described previously, and which may form the third part of a rotary unit as shown for example in FIGS. 81 to 84 and FIG. 374 above, are next described and considered as separate yield units.

FIGS. 375 and 376 show a DELTA1 yield plate, both undeformed and flexing. As described previously, the boundary conditions are allowing the flexing length of the plate between reaction points to increase or decrease with displacement. FIGS. 377 and 378 illustrate this principle.

Similar to FIGS. 64 to 72, FIGS. 379 to 383 show the displaced forms, with yield zones of DELTA1 to DELTA3 yield plates within a sleeve guided rocker unit. As described previously, the profiles are a direct trace of an 8 mm yield plate which was cyclically tested.

FIGS. 384 to 387 show a DELTA1 yield plate within a sleeve guided rocker unit in which load from the push rods is applied to the ends of the plates through the sliding hinges, rather than centrally at the yield zone.

Similar to FIGS. 227 to 229, FIGS. 388 to 390 show the displaced profiles of a DELTA1 yield plate which is flexing primarily in one direction only.

Figure 391:
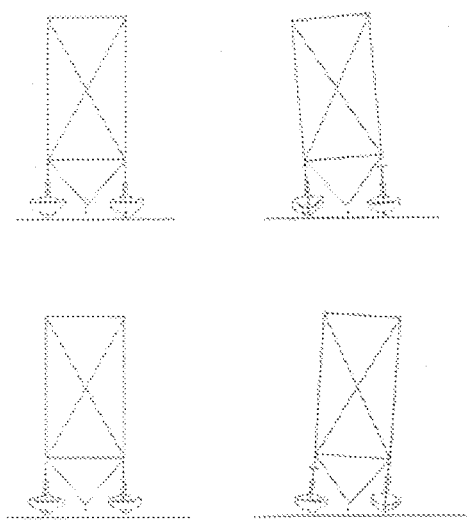
Figure 392:
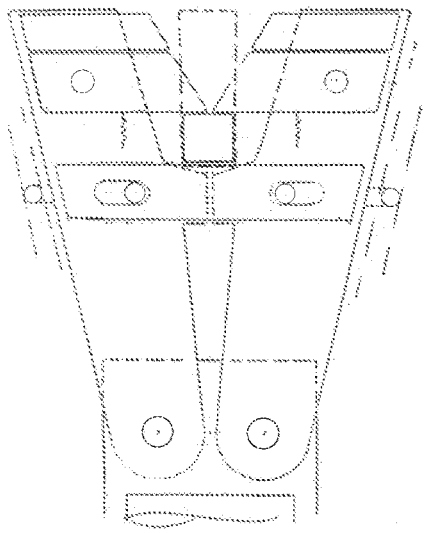
Figure 393:
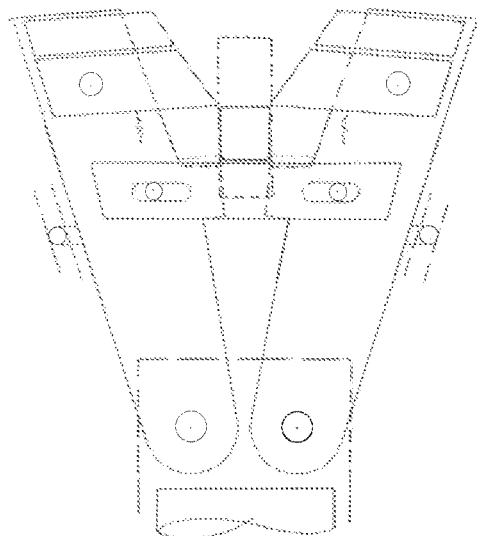
Figure 394:
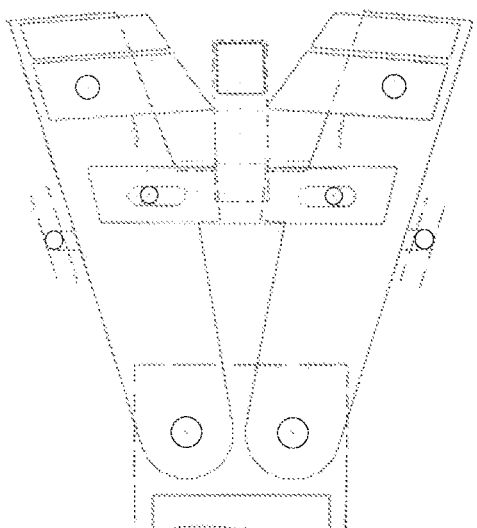
Figure 395:
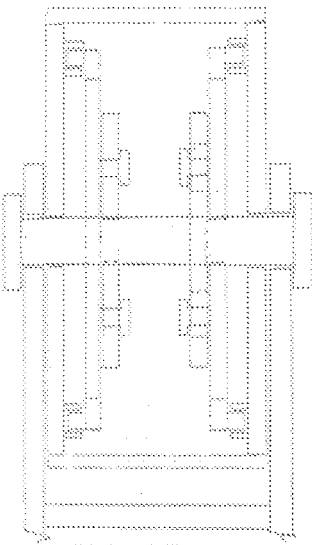
Figure 396:
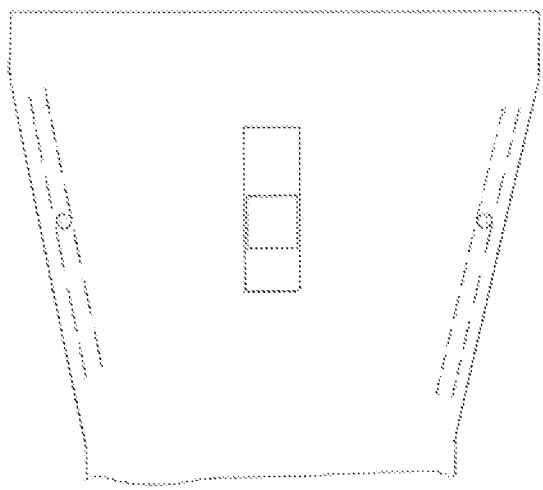
Figure 397:
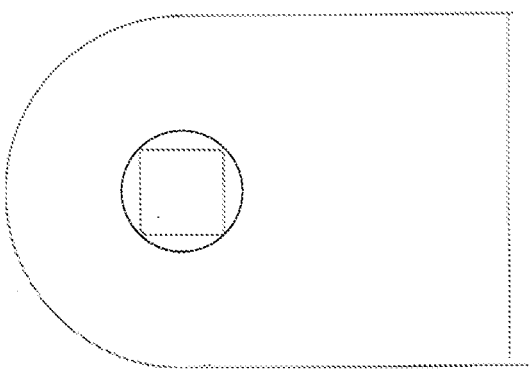

FIG. 391 shows the deflection profiles within an ALPHA1 rocker frame.

FIGS. 392 to 397 show the connect-disconnect-connect joint as described previously.

Figure 398:
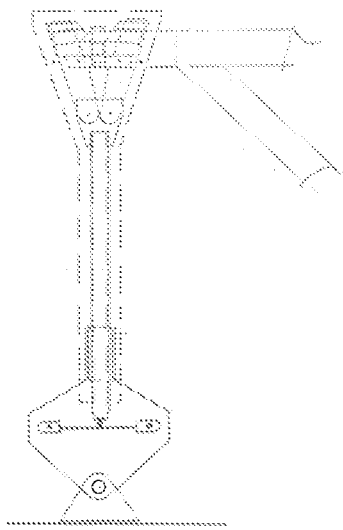
Figure 399:
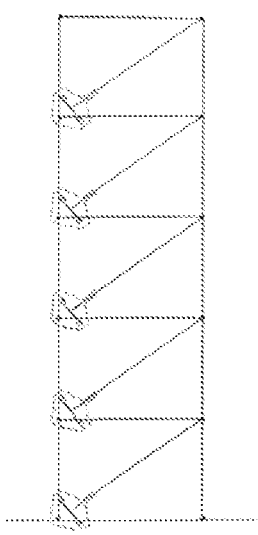
Figure 400:
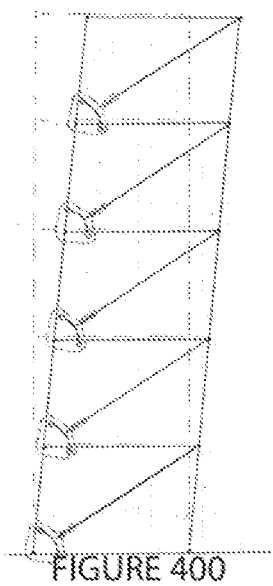
Figure 401:
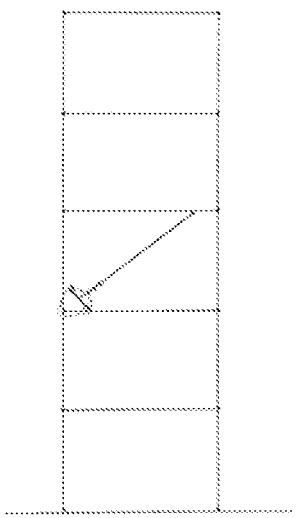
Figure 402:
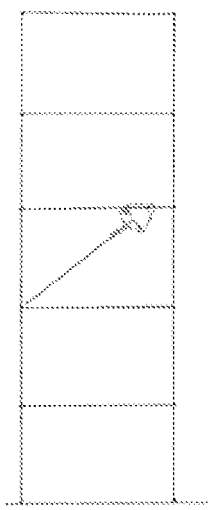
Figure 403:
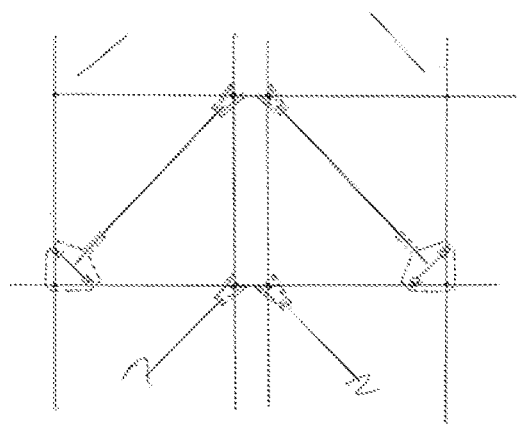
Figure 404:
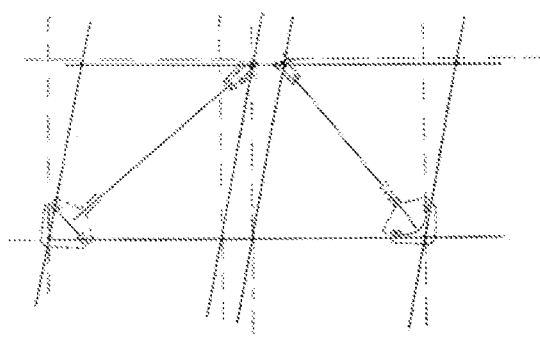
Figure 405:
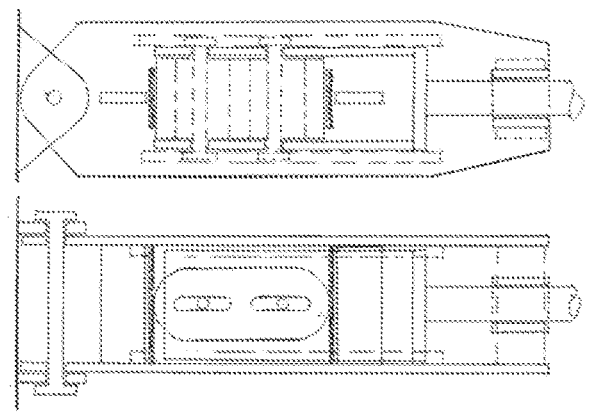
Figure 406:
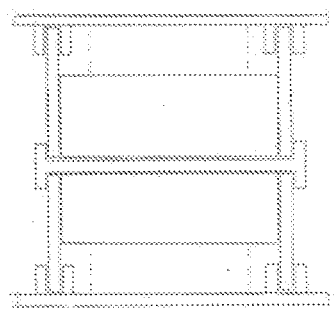
Figure 407:
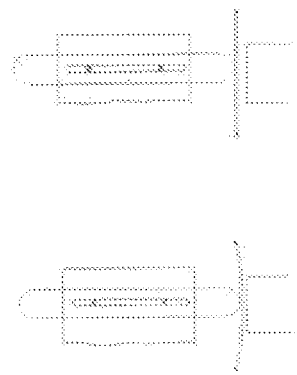
Figure 414:
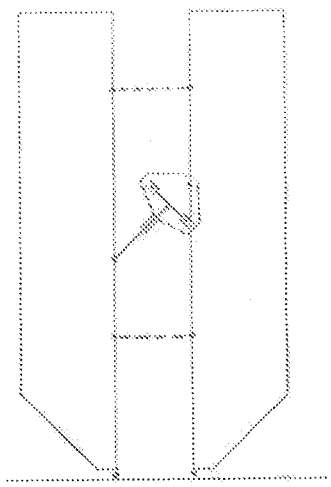
Figure 415:
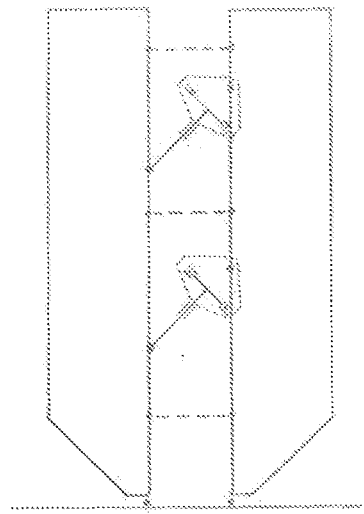
Figure 416:
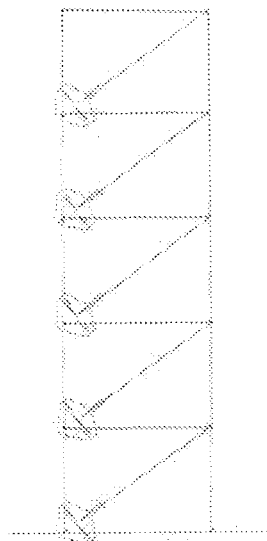
Figure 417:
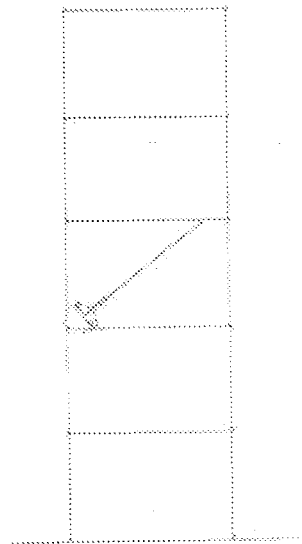
Figure 418:
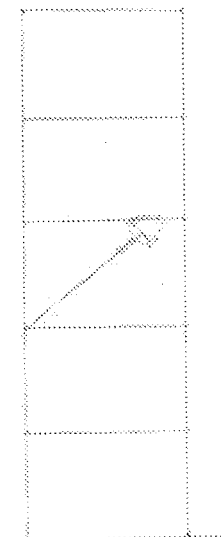
Figure 419:
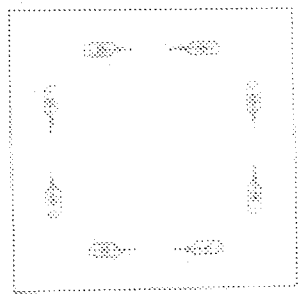
Figure 420:
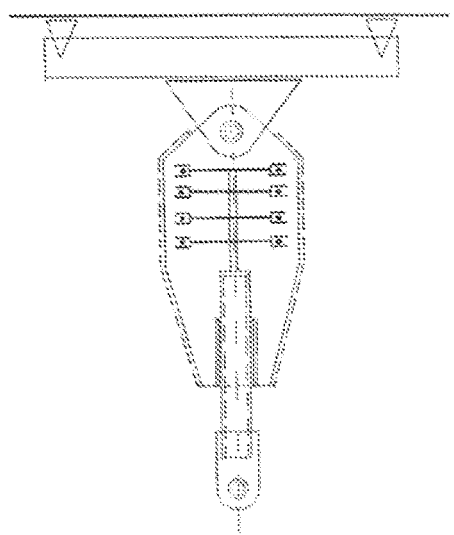
Figure 421:
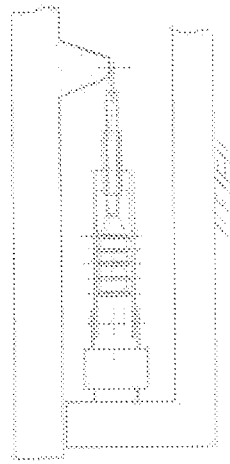

FIG. 398 shows the connect-disconnect-connect joint, one end of the push rod of a sleeve guided rocker unit.

Similar to FIGS. 239 to 242, FIGS. 399 to 404 show the displaced profiles of concentrically and eccentrically braced frames within which sleeve guided rocker units with a connect-disconnect-connect joint are located.

Similar to FIGS. 118 to 123 FIGS. 405 to 409 again show a friction yield block with separate elastic flexural plate, within a sleeve guided rocker unit. The mechanics of this unit are as described previously for FIGS. 134 to 138.

FIGS. 410 and 411 again show shear yield blocks within a sleeve guided rocker unit.

Similar to FIGS. 340 to 343, FIGS. 412 and 413 show sleeve guided rocker units incorporated into ALPHA1 and ALPHA2 rocker frames as described previously, and similar to FIGS. 344 to 346 into coupled shear walls and concentrically and eccentrically braced frames.

Similar to FIGS. 347 and 348, FIGS. 419 to 421 show sleeve guided rocker units, as described previously, located between a building's foundations and overlying superstructure, and functions as base isolation units.

As described previously, and for a practical perspective, FIGS. 422 to 424 show a sleeve guided BETA rocker unit within which DELTA1 yield plates are located.

Figure 425:
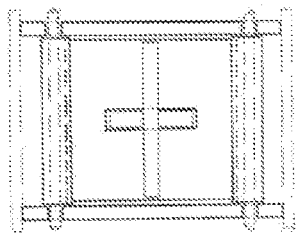

FIG. 425 is a schematic plan view of FIGS. 351 to 353.

Figure 426:
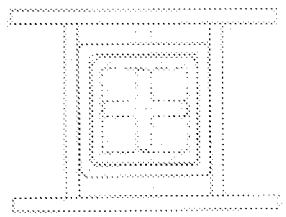

FIG. 426 is a schematic plan view of the guides for the ties which link all plates.

Figure 427:
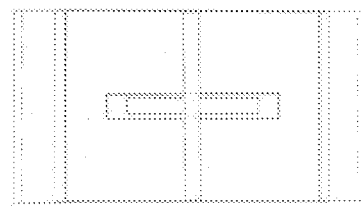

FIG. 427, similar to FIG. 426 shows cut outs in the plate to accommodate the tie.

Figure 428:
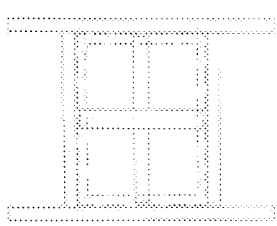

FIG. 428 shows a tie guide (lateral restraint) which extends to and directly utilizes the rocker unit casing.

Figure 429:
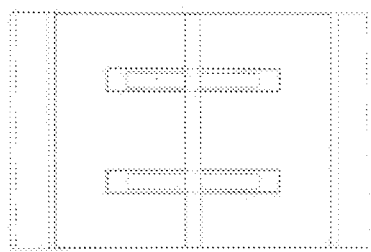
Figure 430:
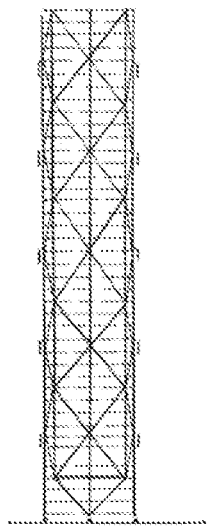
Figure 431:
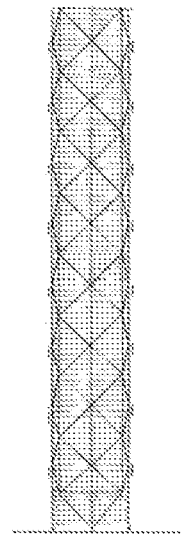
Figure 432:
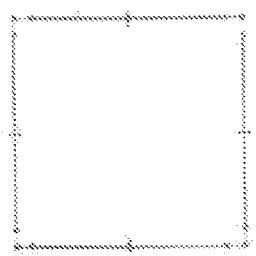
Figure 433:
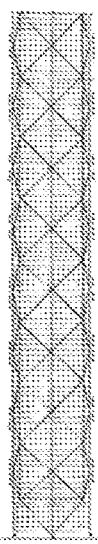

FIG. 429 shows a plan view of a yield plate with cut-outs to accommodate two ties.

Figure 422:
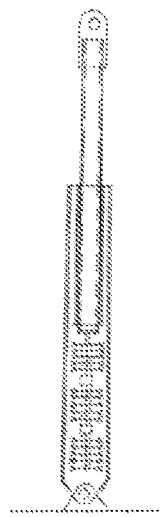
Figure 423:
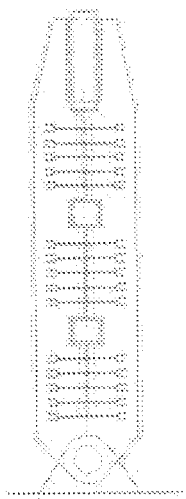
Figure 424:
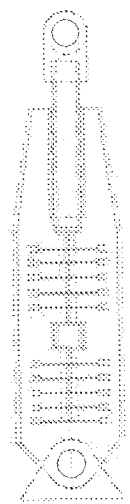

Located within the rocker unit of FIGS. 422 and 423 are 15 DELTA1 yield plates in three groups of 5 with 8 mm grade 460 plates of an effective width of 200 mm and spanning 200 mm. The rocker unit has an elastic yield strength in excess of 500 kN. In conventional terms, at a displacement ductility factor of 10, the unit is providing an elastic strength or elastic performance equivalent of 5000 kN elastic strength. The rocker unit as drawn with DELTA1 yield plates is capable of displacement ductility factors in excess of 25.

Again, for a practical perspective, and similar to FIGS. 364 to 372 described previously, FIGS. 430 to 433 show a range of pivotably based ALPHA1 and ALPHA2 control structures with sleeve guided rocker units.

Figure 434:
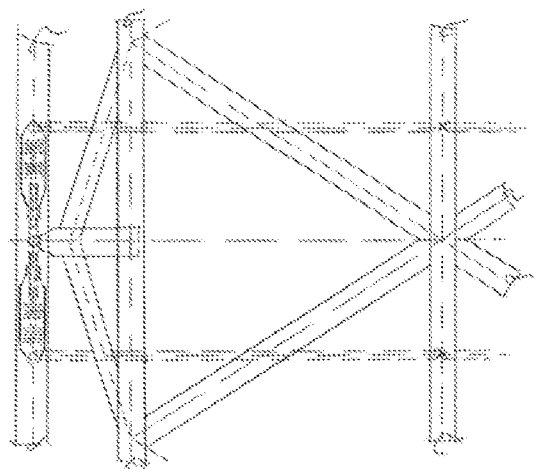
Figure 435:
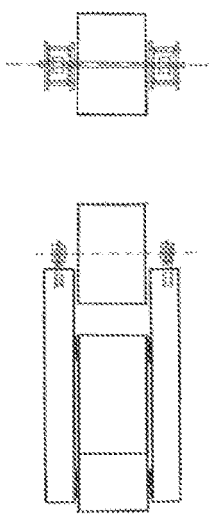

FIGS. 434 and 435 show a schematic of four symmetrically located units within an ALPHA2 structure. This enables very high yield strengths (and ductilities) to be achieved at these single points (e.g. 4000 kN).

Figure 436:
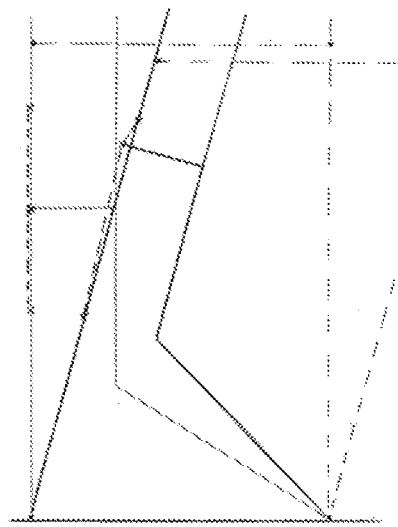
Figure 437:
Figure 438:
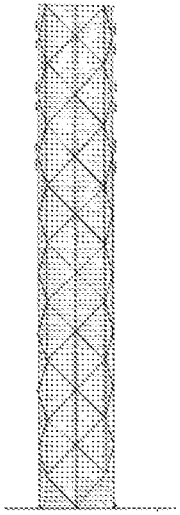
Figure 439:
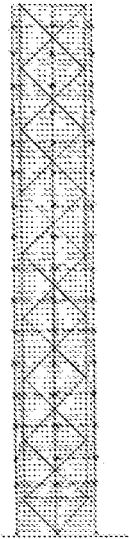
Figure 440:
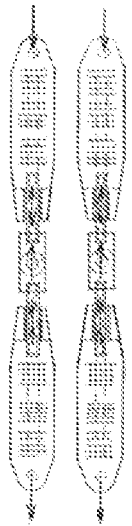

FIG. 436 shows the non-displaced and displaced form of these units. The displaced shape showing that although the exterior chords are pivotably based, each rocker unit housing also (still) needs to be pivotably connected to the centreline of the exterior chord.

The embodiments described above may be altered and combined together to form further embodiments. A person skilled in the art will realise that these configurations can be adapted to suit many different purposes and functional characteristics of a structure or storage rack. Such as the height of the structure or storage rack, the number of storage racks to restrain, the weight of the structure or storage rack, the weight of the goods or structure, the tendency and frequency and magnitude of seismic events where the structure or rack is installed. Furthermore these configurations may be adapted depending on the materials used and the factor of safety required.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

NOTATION

| | |
|---|---|
| Θ (THETA) | angle or slope of restraining boundary surface at reaction point with plate. |
| Θ' (THETA') | (half) angle of rotation of plastic hinge at yield zone of plate. |
| m (Θ') (M(THETA')) | yield moment of plate at yield zone as function of plastic hinge rotation angle. |
| x, y | rectangular coordinates. |
| dy/dx | slope of restraining boundary surface in terms of rectangular coordinates. |
| Θ1, Θ2 | slopes of two different boundary surfaces. |
| P1, P2 | resistive yield force of plate at point of applied load. |
| R | reaction at plate to boundary surface contact (orthogonal to plate). |
| RV | vertical reaction |
| κ | curvature of yield zone |

| | |
|---|---|
| ρ | radius of curvature of yield zone |
| s | curved length of yield zone |
| RH | horizontal reaction |
| E | modulus of elasticity (Youngs modulus) |
| I | second moment of area |

REFERENCES CITED

Prager, W, 'An Introduction to Plasticity', Addison-Wesley (1959)
J. D. Allen, I. F. Collins, P. G. Lowe, 'Limit Analysis of Plates and Isoperimetric Inequalities', Phil. Trans. Roy. Soc. Lond. A347 (1994)
S. Whittaker, V. V. Bertero, C. L. Thompson, L. J. Alonso, 'Seismic Testing of Steel Plate Energy Dissipation Devices', Earthquake Spectra, Vol. 7, No. 4 (1991)
Tsai et al. U.S. Pat. No. 5,533,307 (1996)
WIPO PCT/IB2017/056135 (J. D. Allen)
WIPO PCT/IB2017/056137 (J. D. Allen)

I claim:

1. A force limiting and energy dissipating control structure comprising:
a pivotable rocker frame assembly having a pivot connection to a structural member,
a rotary yield unit comprising a first part rotatably connected to a second part,
a yield connector comprising a resistively and resiliently deformable elastoplastically yielding flexural member, the yield connector located and connected between the first part and the second part of the rotary yield unit, the rotary yield unit located between and directly or indirectly connected between the rocker frame and the structural member, wherein in response to a forcing or seismic event the rotary yield unit maintains a constant resistive yield force between the rocker frame and the structural member, and enables the control structure to form an elastoplastic mechanism, able to cyclically displace and plastically flow with a constant resistive yield force, and enables the control and limiting of the dynamic response of the control structure to base motion input, and limits and controls response accelerations and dynamic forces of a mass seismically supported by the control structure.

2. The force limiting and energy dissipating control structure as claimed in claim 1, further comprising a secondary flexural member connected to the rotary yield unit, and located between the rotary yield unit and connecting to the rocker frame, or located between the rotary unit and connecting to the structural member, the secondary flexural member enabling independent adjustment of the natural elastic response frequency of the control structure.

3. The force limiting and energy dissipating control structure as claimed in claim 2, further comprising a rotary unit rotational displacement limiter, and or flexural member displacement limiter, configured to stop rotation of the rotary unit or displacement or flexure of the flexural member at a prescribed limit, wherein the secondary flexural member is configured to yield upon, before, or after the prescribed limit is reached, enabling development of a two tier, elastic stiffening, ductile system.

4. The force limiting and energy dissipating control structure as claimed in claim 1 wherein the yield connector comprises:
a first anchor secured to the first part of the rotary unit,
a second anchor secured to the second part of the rotary unit,
the flexural member having a first region and a second region spaced from the first region and located respectively by the first anchor and second anchor, wherein the first anchor secures the first region to the first part of the rotary unit and the second anchor secures the second region to the second part of the rotary unit so that the first region is able to move with the first part of the rotary unit, relative to the second region, the second anchor and the second part, during cyclic rocking motion of the rocker frame, and rotation of the rotary unit, caused by a forcing event or base motion input from a seismic event.

5. The force limiting and energy dissipating control structure as claimed in claim 4 wherein a push rod connector element is sleeve guided by a pivotable rocker unit, the push rod anchored at one end to the first region of the flexural member, and pivotably connecting the other end to the first part of the rotary yield unit, and wherein the flexural member has two second regions, each second region being anchored by second anchors to a casing or body of the pivotable rocker unit, which pivotably connects to the second part of the rotary yield unit, whereby the pivotable rocker unit guides the push rod connector element, indirectly connecting the flexural member to the first and second parts of the rotary unit, and wherein the sleeve guide maintains with displacement an orthogonal connection between the push rod and the first region of the flexural member and alignment of the push rod with the pivotable connections of the rocker unit.

6. The force limiting and energy dissipating rocker flexural member as claimed in claim 5, wherein the rocker unit comprises a third part of the rotary yield unit, and is located peripherally and distal to the rotary axis or the rotary unit, and peripherally and pivotably connecting the first part to the second part.

7. The force limiting and energy dissipating control structure as claimed in claim 5 wherein the second anchors allow unrestrained translation or translation and rotation of the second region relative to the second anchors, and enable the length along a flexing curve of the flexural member to freely increase and decrease between the first and second anchors without generating membrane forces within the flexural member, and enable reaction resultants at the second anchors to rotate with displacement of the flexural member and remain orthogonal to the tangent plane of the flexural member, wherein the horizontal component of the reaction resultant acts in the same direction as the horizontal translation components of the displacing second region.

8. The force limiting and energy dissipating control structure as claimed in claim 1 wherein the flexural member flexurally displaces about its minor bending axis, and flexurally yields at specific yield zones, and cyclically displaces and plastically flows to high displacement values and high ductility values while maintaining a constant resistive yield force.

9. The force limiting and energy dissipating control structure as claimed in claim 7 wherein the flexural member has a spanning aspect configured at its second regions and second anchors, with simply supported, flexurally continuous or flexurally restrained boundary conditions; and is able to cyclically displace to positive and negative displacement values.

10. The force limiting and energy dissipating control structure as claimed in claim 1 wherein the rotary yield unit comprises a lever arm, of adjustable length, and in which the length or distance of the lever arm from the rotary axis of the rotary yield unit is less, equal to, or more than the distance from the rotary axis to the first or second anchors or the first and second end region of the flexural member and less, equal to, or more than one or more peripherally located flexural members, the lever arm enabling adjustment of the magnitude of the constant resistive yield force produced by the rotary yield unit.

11. The force limiting and energy dissipating control structure as claimed in claim 1, further comprising one or more friction yielding plate elements located distal to the rotary axis of the rotary unit and directly or indirectly, peripherally connecting to, and connecting first part and second part of the rotary unit.

12. The force limiting and energy dissipating control structure as claimed in claim 11 further comprising an elastic spring element, peripherally connected to first or second part of rotary unit, and engaging with the friction yielding plate elements.

13. The force limiting and energy dissipating control structure as claimed claim 6 further comprising a shear yielding element, located within a pivotable device providing parallelogram shearing displacement, and located within the third part of the rotary yield unit, connecting peripheries of first part and second part of rotary yield unit.

14. The force limiting and energy dissipating control structure as claimed in claim 5, further comprising one or more elasto-frictional corrugated elements transversally clamped together, wherein an elastic component of the element is provided by frictionless or near frictionless sloping contact surfaces, and or roller surfaces, oblique to both the clamping force direction and axis of connector element or push rod, and in which the frictional yield component of the element is provided by clamped planar frictional contact surfaces orthogonal to the clamping forces and parallel with the axis of the sleeve guided push rod or connector element, the corrugated elasto-frictional element located within the third part of the rotary yield unit.

15. The force limiting and energy dissipating control structure as claimed in claim 5, further comprising a plurality of spanning flexural members, located within the third part of the rocker unit, wherein the push rod connector element comprises clamped frictional yielding plate elements, the elastic or elastoplastic response component of the element provided by the spanning flexural elements and the frictional yield response component provided by the frictionally yielding push rod connector element.

16. The force limiting and energy dissipating control structure as claimed in claim 1 further comprising a joint configured to enable a lever or push rod to cyclically connect-disconnect-reconnect or cyclically engage and disengage, the thereby enable the or each flexural member to displace and yield primarily in one displacement direction.

17. The force limiting and energy dissipating seismic control structure as claimed in claim 1 wherein the structural member comprises a structural base or foundation, or the structural member comprises a chord pivotably connected to a structural base or foundation, and the yield connector is directly or indirectly connected between the rocker frame and the structural member.

18. The force limiting and energy dissipating seismic control structure as claimed in claim 1 wherein the yield connector is connected between the rocker frame and a further structural member, the further structural member being pivotably connected to the structural member.

19. The force limiting and energy dissipating seismic control structure as claimed in claim 1 wherein the structural member and further structural member comprise chords.

20. The force limiting and energy dissipating seismic control structure as claimed in claim 1 wherein the rocker frame comprises a vertical aspect and the structural member comprises a horizontal structural base or foundation, or the structural member comprises a vertical chord pivotably connected to a horizontal structural base or foundation.

21. The force limiting and energy dissipating seismic control structure as claimed in claim 1 wherein the rocker frame has a horizontal aspect and is pivotably connected at each end to vertical chords which are pivotably connected to a horizontal base or foundation.

22. The force limiting and energy dissipating seismic control structure as claimed in claim 1, wherein the structural member comprises a chord pivotably connected to a structural base or foundation, and the rotary unit is directly or indirectly connected between the rocker frame and the structural member wherein the pivotable chord is external to, in plane with, spaced from, parallel with, and connected to rocker frame, chord of rocker frame or other pivotable chords or lamina, and wherein the rotary unit with flexural members are located between and along and are connecting chords, and wherein motion control ties maintain chords parallel during displacement of control structure, and wherein interlaminar displacement along and between chords is resisted by a constant interlaminar shear force produced by flexural yielding of the flexural members within the rotary unit.

23. The force limiting and energy dissipating seismic control structure as claimed in claim 1, wherein:
the rotary yield, unit within which the restively and resiliently deformable elastoplastic flexural yield member is located, the rotary yield unit being located distal to the rocker frame pivot, the flexural yield members having a first end region and a second end region, the first end region located and secured by a first anchor to the first part of the rotary yield unit, the second end region located and secured by a second anchor to the second part of the rotary yield unit;
the first part of the rotary yield unit is pivotably connected to a first structural member and the first structural member being a part of the rocker frame, or the first structural member being a linking part of the rocker frame assembly, and indirectly and pivotably connecting the first part of the rotary unit to the rocker frame;
the second part of the rotary yield unit is located and secured to a second structural member, the second structural member being a structural base or foundation;
the second anchor(s) and second end region(s) of the flexure member configured with free translational boundary conditions, or free translational and free rotational boundary conditions, to allow the flexure members to flex between the reaction points or reaction surfaces at anchors, and for the length along the flexing curve of the flexure member between the reaction points or reaction surfaces at anchors, to freely increase or decrease, and without generating tensile or compressive membrane forces in the flexure member,
the flexure member able to flex about its minor bending axis, and yield at specific yield zones, while cyclically displacing; and the flexure member maintaining, with displacement, a constant resistive yield force within and across itself, between the first and second anchors; and
the rotary yield unit, with flexural yield members, able to rotationally, cyclically displace while maintaining a constant resistive yield torque within itself, being the vectorial sum of the constant resistive yield forces of the yielding flexural members, and a constant resistive yield force across itself, between first and second parts, and between first and second structural members and enabling the control structure to control and limit forces developed within itself, and control and limit forces developed within its foundations or structural base, and control and limit response accelerations and dynamic forces developed within masses that it may be seismically supportive of, or masses supported by other structures which it may be seismically supportive of, as it resists and endures with a constant resistive yield force, base motion or ground motion input due to a seismic event, including base or ground motion input from extreme seismic events, and from blast and ground impact at distance, and from loading and impact loading applied directly to structure.

24. The force limiting and energy dissipating seismic control structure as claimed in claim 1 wherein:
the pivotable rocker frame is pivotably connected to a structural member or structural base;
a pivotable chord is pivotably connected to the structural member or structural base, and exterior to, in plane of, spaced from, and parallel with the chord of the rocker frame, the pivotable chord exterior to, and chord integral with and of the pivotable rocker frame able to remain parallel with rocking motion by motion control ties pin connecting a centreline of the pivotable exterior chord to a centreline of the pivotable rocker frame;
the rotary yield unit being located, distal to the pivotable rocker frame pivot, the rotary yield unit located in a plane between and along the pivotable exterior chord and the chord integral with the rocker frame,
the flexural yield member having a first end region and a second end region, the first end region located and secured by a first anchor to the first part of the rotary unit, the second end region located by a second anchor to the second part of the rotary unit, the rotary unit located in plane, between and along the pivotable chord, and the chord integral with the rocker frame;
the first part of the rotary unit pivotably connected to a second structural member;
the second structural member being the pivotably based chord or member and part of the rocker frame assembly, and indirectly and pivotably connecting the first part of the rotary unit to a structural base or foundation;
the second part of the rotary unit located and secured to a first structural member, the first structural member being a pivotably based chord, or chord integral with the pivotable rocker frame,
the second anchor and second end region of the flexure member configured with free translation boundary conditions or free translational and free rotational boundary conditions, to allow the flexure members to flex between the reaction points or reaction surfaces at the anchors, and for the length along the flexing curve of the flexure member between the reaction points or reaction surfaces at anchors, to freely increase or decrease, and without generating tensile or compressive membrane forces in the flexure member,
the flexure member able to flex about its minor bending axis, and yield at specific yield zones, while cyclically displacing, and the flexure member maintaining with displacement a constant resistive yield force within itself and across itself between first and second anchors;
the rotary yield unit, with the flexure member, able to rotationally, cyclically displace, the rotary yield unit with flexure member, elastically or elastoplastically rotationally displacing, with rocking motion of the pivotable rocker frame, and with interlaminar displacement between the first and second structural members, the rotary yield unit, maintaining a constant resistive yield torque within itself, being the vectorial sum of the constant resistive yield forces of the yielding flexure members, and a constant resistive yield force across itself, between the first and second part, and a constant resistive interlaminar yield force between the first and second structural members and with displacement of the control structure and shearing displacement between and along chords, the rotary yield unit resisting displacement and transferring a constant resistive interlaminar shear force between chords,
the constant resistive interlaminar yield force between first and second structural members, enabling the control structure to form an elastoplastic mechanism, also of constant resistive yield force and enabling the control structure to control and limit forces developed within itself, and control and limit forces developed within its foundations or structural base, and control and limit response accelerations and dynamic forces developed within masses that it may be seismically supportive of, or masses supported by other structures which it may be seismically supportive of, as it resists and endures with a constant resistive yield force, base motion or ground motion input due to a seismic event, including base or ground motion input from extreme seismic events, and from blast and ground impact at distance, and from loading and impact loading applied directly to the control structure.

25. A force limiting and energy dissipating seismic control base isolation structure comprising;
a rotary yield unit having a plurality of elastoplastic flexural members, the rotary yield unit having a first part and second part rotatably connected, the first part of the rotary yield unit pivotably connected to a first structure, the first structure being a superstructure;
the second part of the rotary yield unit located and secured to a second structure, the second structure being a foundation structure and providing only gravity support to the first structure;
the rotary yield unit able to rotationally cyclically displace;
the rotary yield unit maintaining a constant resistive yield torque within itself and a constant resistive yield force across itself and between the first and second structures; and
the constant resistive yield force between the first and second structures enabling the first structure to be dynamically separated or isolated from the second structure, by the constant resistive yield force produced by the rotary yield unit providing a control structure located between the first and second structure and enabling the control structure to control and limit forces developed within itself, and control and limit forces developed between the first structure and second structure, and able to control and limit response accelerations and dynamic forces developed within masses of the first structure, as the first structure and second structure displace relatively, and resist and endure with constant resistive yield force between the first and second structure generated by base motion or ground motion input due to a seismic event.

26. The force limiting and energy dissipating seismic control base isolation structure as claimed in claim 25 further comprising:
- a pivotable elastoplastically yielding rocker unit comprising a pivotable cased unit, integral with sleeve guides at a first end and a pivotable pin connector at a second end, within which the resistively and resiliently deformable, elastoplastically yielding flexural members, having a first end region and a second end region;
- the first end region located and secured by a first anchor to a push rod connected to the first part of the rotary unit and guided at one end by sleeve guides at the first end of the rocker unit, to secure the first anchor with the first end region of the flexure members; and
- the second end region of the flexural yield member being located and secured by its second anchor within, and to, the casing of the rocker unit, the second end of the rocker unit pivotably connected to the second part of the rotary unit,
- the second anchor and second end region of each flexure member configured with free translational boundary conditions or free translational and free rotational boundary conditions, to allow the flexure member to flex, and the length along the flexing curve of the flexure member, between reaction points or reaction surfaces at the anchors, to freely increase or decrease, and without generating tensile or compressive forces in the flexure member, each flexure member able to flex about its minor bending axis, and yield at specific yield zones, while cyclically displacing,
- the rocker unit with the flexure members, connecting the first part of the rotary unit to the second part of the rotary unit and able to cyclically displace,
- the sleeve guides of the rocker unit maintaining with displacement, an orthogonal connection between the push rod and the first region of each flexural yield members and maintaining alignment along the push rod to the pivotable second end of the rocker unit.

27. The force limiting and energy dissipating seismic control base isolation structure as claimed in claim 25 wherein between the second part of the rotary yield unit and the second structure, indirectly connecting the rotary unit to the second structure, and the first part of the rotary unit which is pivotably connected to the first structure, wherein first structure comprises a superstructure and the second structure comprises a foundation which provides gravity support only to the superstructure;
- the secondary flexural member enabling independent adjustment of a natural elastic response frequency of the control structure, wherein the first part of the rotary unit comprises a circular plate with a centroidal axis at which the first part rotatably connects with the second part of the rotary unit,
- a lever arm being integral with the first part of the rotary unit which extends to pivotably connect with the first structure, the first part having a continuous circumferential band at its periphery, the second part of the rotary unit comprising a circumferential band at its periphery, and the second part of the rotary unit fixed directly to the second structure or integral with the secondary flexural member,
- the first and second parts of the rotary units also connecting and frictionally bonding at their peripheral circumferential bands via tensioned ties, the tensioned ties located through and within holes or slots within the first part and through and within holes or slots of the second parts or second circular plates, the tension ties providing a known clamping force,
- a relative rotary displacement between the first and second parts requiring a known torque imparted via the lever arm of the first part of the rotary unit, the torque producing opposing forces at the clamped circumferential bands of the first and second parts, the opposing forces being normal to the radius of rotation and tangential to the circumferential bands, equal and opposite opposing forces being required to overcome the threshold resistance to sliding force between the peripheral bands for the rotary units to rotationally displace, the equal and opposite tangential forces being constant with sliding displacement between the surfaces of the circumferential bands, providing a torque reaction which is constant with relative rotational sliding displacement of the two parts of the rotary unit, the resistive forces between first and second structures being constant, and the resistive force of the control structure of which the rotary units is part also being of constant resistive force as the control structure displaces and resists and endures base motion input.

28. The force limiting and energy dissipating control structure as claimed in claim 1 further comprising:
- a sleeve guided and guiding pivotable rocker yield unit within which are located a plurality of flexural members comprising spanning flexural members,
- clamped planar frictional plates comprising a central plate normal to the flexural members and first anchored one end to the first region of the flexural members, the central frictional plate configured with longitudinal slots along the axial direction of a sleeve guided push rod first structural member,
- two outer plates between which the central plate is sandwiched, the outer plates configured with circular holes also aligned along the axial direction of the sleeve guided push rod first structural member, and the slots of the central plate, the outer plates in line, fixed to, and a continuation of the first structural member, the central and outer plates transversely clamped together with tension bolts or ties, the clamping force from the tension bolts or ties applied directly to the outer surface of the outer plates,
- the contact surfaces between the central and outer plates being frictional surfaces and the clamped frictional surfaces providing a rigid resistance to sliding against axial forces generated in and between the first structural member and flexural resistance of the flexural members resistance to sliding at contact surfaces between the friction plates, overcome at a known force at which continued relative displacement between first structural member and flexural members within rocker unit occurs only by sliding of the friction plates, the flexure members configured with or without displacement limiters, and sliding displacement between frictional plates occurring at a constant resistive force between first structural member and flexural yield plates.

29. The force limiting and energy dissipating control structure as claimed in claim 5 further comprising:
- clamped corrugated blocks or corrugated plates comprising a central corrugated block or plate anchored at one end to the sleeve guided push rod first structural member,
- the central corrugated block or plate configured with longitudinal slots along the axial direction of the sleeve guided push rod first structural member, the outer corrugated blocks or plates configured with circular holes also aligned along the direction of the sleeve guided push rod first structural member and aligning with the slots of the central plate, the outer plates restrained against displacement along the longitudinal direction or axis of the first structural member, by contact anchors set within the pivotable rocker unit the inner corrugated plate or block sandwiched between the outer plates, and the plates or blocks transversely clamped together with bolts or ties, the clamping force from the bolts or ties applied via bolt heads or washers to the outer surfaces of the plates, the corrugated central block or plate comprising sloping and flat surfaces wherein the principal direction of the sloping surfaces, being along a longitudinal axis of the sleeve guided push rod first structural member, wherein the sloping surfaces comprise frictionless or near frictionless or roller surfaces, and the flat surfaces comprise frictional surfaces, the corrugated outer blocks comprising frictionless or near frictionless or roller surfaces and frictional flat surfaces, the inner and outer blocks configured so that the sloping surfaces of each are able to make consistent planar contact, the flat frictional surfaces configured such that they are spaced apart and not in contact, when planes of the sloping surfaces of the inner and outer plates or blocks are in contact the sloping surfaces of the inner and outer plates are configured to displace relatively along the sloping surfaces, the central plate being fixed to the first structural member and able to displace with the first structural member relative to the outer plates anchored longitudinally within the rocker unit and the pivotable connection of the rocker unit to a second structural member or foundation, the outer plates restrained against displacement along the direction of the first structural member but with relative longitudinal displacement between inner and outer plates able to displace transversely, with resistance to their transverse displacement provided only by the bolts or ties, the corrugated blocks being configured, so that relative displacement in the longitudinal direction, involving relative displacement along and between their sloping surfaces is able to continue and transfer to relative displacement along and between the flat frictional surfaces, and relative displacement along and between sloping surfaces and resistive force generated by such displacement providing the elastic component of the rotary yield unit and relative displacement along and between the flat frictional surfaces and constant resistive force generated by such providing the plastic or pseudo-plastic frictional component of the rotary yield unit.

30. The force limiting and energy dissipating control structure as claimed in claim 5 further comprising shear yield blocks of a superplastic material configured to provide a shear yield force, wherein shear displacement of the superplastic shear blocks produce a constant resistive yield force.

31. The force limiting and energy dissipating control structure as claimed in claim 5 further comprising:

a third part, located between, and at the peripheries of the first and second rotatably connected parts, wherein one end of a casing of the rocker unit pivotably connects with the second part of the rotary unit, and the pivotable or first end of the push rod pivotably connects with the first part of the rotary unit, the second end of the push rod being anchored to the flexural members located within the casing of a third part rocker unit, rotation of the first part of the rotary unit relative to the second part of the rotary unit being resisted by the third part of the rotary unit and causing the flexural members and push rods of the third part of the rotary unit to displace and with displacement produce a constant resistive yield force across the third part and between peripherally connected first and second parts, and with rotational displacement a constant resistive yield torque being provided within the rotary unit and via an extended lever arm of the first part of the rotary unit a constant resistive yield force of the control structure as it displaces, resists, and endures base motion input from a seismic event.

32. The force limiting and energy dissipating control structure of claim 1 further comprising a displacement generated opening and closing device, which is able to connect-disconnect-reconnect, and engage and disengage connection between the structural member and one or more of the flexural members, as a structure cyclically responds to a base motion input; the device comprising:

a joint with two principal parts, each pivotably connected one end to the first end of the structural member and together arranged in a 'V' formation with respect to a longitudinal direction coincident with the first structural member, the second end of the first structural member being sleeve guide located and connected to the one or more flexural members located within and supported by the casing of a sleeve guided rocker unit, the two 'V' arranged parts, each having transverse cantilevered sections pivotably connected to each and pivotable and rotationally sprung in one rotational direction towards the first end of the part, and block fixed against rotation in the opposite rotational direction the ends of each cantilever section abutting, but not connecting, when the joint is closed, a third part comprising a spanning bridge section with longitudinally slotted ends, pivotably connected to, and spanning between, each 'V' formation first and second parts, the third part being normal to the longitudinal direction and axis of the first structural member and located between the pivotable connections at first end of first and second parts to the structural member and transverse pivotable cantilevers of second end of parts, each 'V' arranged, or splayed part, pivotably connected to splayed guides or tracks also aligned in 'V' formation in the longitudinal direction, the splayed guides or tracks fixed to a first end of a link plate or structural section parallel with the structural member and fixed at its second end to the casing of the pivotable sleeve guided rocker unit, the structural member pivotably connected at the first end to a first structure or to the rocker frame, the structural member connected at the second end to a flexural member located within the sleeve guided rocker unit, the casing of the rocker unit pivotably connected through its casing to a further structural member, or foundation, the second end of the structural member, sleeve guided to, and anchored to the flexural member, able to displace with the flexural member within the rocker unit, the pivotable connection between the first end of the structural member and the first structure or rocker frame comprising a square or rectangular pin set within a round hole of a connector plate integral with the first structure, the square or rectangular pin also located within a slot or guide at the first end of the link structure between splayed guides and rocker unit casing, the joint enabling the cyclically displacing or rotationally rocking first structure or rocker frame to engage while displacing or rocking in one direction from origin or initial position, with the structural member, and move via the spanning and slotted bridge or third part of the joint to elastoplastically or plastically displace the flexural member of the rotary yield unit in a positive displacement direction and to enable, after displacement in this direction, with reverse displacement or rocking of the first structure or rocker frame, the first structure or rocker frame, to pull via force contact with the closed cantilever sections, opening with further reverse displacement, the structural member to elastoplastically or plastically displace the flexural member, in a negative displacement direction, and back to, or close to, its original non-displaced position, and allowing the first structure or rocker frame and structural member to, with further reverse displacement of the structure or rocker frame, to disconnect along the longitudinal direction of the structural member via splaying action of the device and opening of its cantilever bridging sections such that there is no force transfer between first structure or rocker frame and structural member, and flexural member and no future deformation or displacement of the flexural member with further displacement or rocking of the first structure or rocker frame in that direction, the square or rectangular pin being pivotably set within the connecting hole of the first structure or rocker frame, able to freely translate or slide within the slot or guide of the link plate and not able to transfer force between the first structure and flexural member, the joint enabling the first structure or rocker frame, on return, displacement, to origin or initial position, to force reconnect and reengage with the first structural member and flexural members, via the third spanning or bridging part of the joint, and with continued displacement in same direction, to again elastoplastically or plastically displace flexural member on return displacement, the square or rectangular pin freely displacing past the open and rotationally sprung, in this direction, cantilever sections at the second end of the joint, to contact and re-engage with the bridging plate, to, via the bridging plate, push again the first structural member, to again push and displace the flexural members to positive displacements or curvatures, and wherein two joints are provided in a conjunctive pair having an opposing action to enable the flexural members within the casing of the sleeve guided rocker units, to be elastoplastically or plastically displaced in one direction, principally, to elastoplastically or plastically, cyclically displace or push the flexural member primarily to one displaced curvature sign only, and to then displace or pull back the flexure member to, or close to its origin, the joint disconnecting the first structure or rocker frame with the flexural member, while reconnecting with an opposite flexural member as the first structure or rocker frame cyclically responds to a base motion or seismic input.

33. The force limiting and energy dissipating control structure as claimed in claim 1, further comprising:
   a connect-disconnect-reconnect joint connected to the rotary yield unit, the connect-disconnect-reconnect joint able to engage and disengage connection between the first part of the rotary unit and second part of the rotary unit as a control structure cyclically responds to base motion input;
   the joint having a curved square or curved rectangular pin fixed to a lever arm of the first part of the rotary unit and the opening and closing joint with 'V' formation guides is connected to a second lever or rotary plate fixed to the second part of the rotary unit, the curved square or curved rectangular pin being fixed to the first lever and connecting to the second lever and guided via a curved slot in the second lever; and
   the joint enabling the two parts of the rotary unit to engage and disengage so that flexural displacement and yielding of the flexural members within the rotary yield unit is primarily of one sign of curvature.

34. The force limiting and energy dissipating control structure as claimed in claim 1, further comprising
   friction blocks located at and distributed about a periphery of the rotary yield unit and distal to a rotational axis of the rotary yield unit,
   the friction blocks clamped to the first part of the rotary yield unit,
   a plurality of elastic elements comprising the flexural members or plates or springs, fixed to a periphery of the second part of the rotary yield connector,
   the friction blocks clamped to the first part able to be located within and guided by curved slots along and within a periphery of second part,
   the elastic elements of the second part in contact with each end of the friction blocks clamped to the first part of the rotary yield unit,
   the clamping force between interplanar frictional contact surfaces of first part and friction blocks, provided by tensioned ties transversely connecting through circular holes in the friction blocks and curved circular arcing slots along periphery of first part,
   the tension ties directly or via spring washers applying contact forces to the outer, non-interplanar, surfaces of the friction blocks,
   the friction blocks configured to rotationally displace and travel, without relative sliding, with the first part of the rotary yield unit, each rotationally displacing relative to the second part,
   increasing rotational displacement between the first and second parts resisted elastically, with increasing force with displacement, by the flexing or displacing elastic elements, the resistive force applied directly to the friction blocks,
   relative sliding between frictional contact surfaces of first part and friction blocks, occurring and enabled only after a prescribed elastic force is exceeded in the elastic elements, or relative displacement between first and second parts exceeded, and relative displacement between friction blocks and second part arrested,
   continuing rotational displacement between first part and second part being resisted by frictional shear forces between contact surfaces of arrested friction blocks and first part, the transverse clamping tension ties free to circular arc displace within the peripheral curved slots of the first part, as first part rotationally displaces relative to second part, the frictional shear forces producing a constant resistive rotational force or torque about the rotational axis, and between first and second part, and constant resistive direct force across the rotary yield unit, and between first and second structural members.

\* \* \* \* \*

UNITED STATES PATENT AND TRADEMARK OFFICE
CERTIFICATE OF CORRECTION

PATENT NO. : 11,828,083 B2
APPLICATION NO. : 17/177204
DATED : November 28, 2023
INVENTOR(S) : John Damian Allen It is certified that error appears in the above-identified patent and that said Letters Patent is hereby corrected as shown below:

In the Specification

Column 60 Line 25 should read:
effect on load, Py, of the order of $\cos^2\Theta$ with increasing Column 62 Line 27 should read:
$1 + TAN^2\Theta'$ and $(COS\ \Theta' + SIN\ \Theta'\ .\ TAN\ \Theta')$, Column 62 Line 35 should read:
yield stress of the plate being multiplied by $(1 + TAN^2\Theta')$ or Signed and Sealed this
Twelfth Day of March, 2024

Katherine Kelly Vidal
*Director of the United States Patent and Trademark Office*